US010565298B1

(12) United States Patent
Bisignani et al.

(10) Patent No.: US 10,565,298 B1
(45) Date of Patent: Feb. 18, 2020

(54) SYSTEMS AND USER INTERFACES FOR DYNAMIC AND INTERACTIVE REPORT GENERATION AND EDITING BASED ON AUTOMATIC TRAVERSAL OF COMPLEX DATA STRUCTURES

(71) Applicant: Addepar, Inc., Mountain View, CA (US)

(72) Inventors: Christopher Thomas Bisignani, San Francisco, CA (US); Justin D. Ross, San Francisco, CA (US); Yueyang Alice Li, San Francisco, CA (US); Alexander Daniel Zirbel, Mountain View, CA (US); Jason Mirra, Mountain View, CA (US); Michael Lee Greenbaum, Mountain View, CA (US)

(73) Assignee: Addepar, Inc., Mountain View, CA (US)

( * ) Notice: Subject to any disclaimer, the term of this patent is extended or adjusted under 35 U.S.C. 154(b) by 318 days.

(21) Appl. No.: 15/213,722

(22) Filed: Jul. 19, 2016

Related U.S. Application Data

(63) Continuation of application No. 14/644,038, filed on Mar. 10, 2015, now Pat. No. 9,424,333.
(Continued)

(51) Int. Cl.
*G06F 17/20* (2006.01)
*G06F 17/24* (2006.01)
(Continued)

(52) U.S. Cl.
CPC .......... *G06F 17/24* (2013.01); *G06F 3/04883* (2013.01); *H04L 63/08* (2013.01)

(58) Field of Classification Search
CPC ....... G06F 17/24; G06F 3/04883; H04L 63/08
See application file for complete search history.

(56) References Cited

U.S. PATENT DOCUMENTS

| | | | |
|---|---|---|---|
| 5,704,371 | A | 1/1998 | Shepard |
| 5,893,079 | A | 4/1999 | Cwenar |

(Continued)

FOREIGN PATENT DOCUMENTS

| | | |
|---|---|---|
| CA | 2817652 | 12/2013 |
| CA | 2817660 | 12/2013 |

(Continued)

OTHER PUBLICATIONS

"Compressing your PDF files," very.PDF.com, Inc., 2006, available at http://www.verypdf.com/pdfinfoeditor/pdfcompress.htm, 4 pages (Year: 2006).*

(Continued)

*Primary Examiner* — Mohammed H Zuberi
(74) *Attorney, Agent, or Firm* — Knobbe Martens Olson & Bear LLP

(57) ABSTRACT

Various systems and methods are provided for accessing and traversing one or more complex data structures and generating a functional user interface that can enable non-technical users to quickly and dynamically edit and generate detailed reports. The user interfaces are interactive such that a user may make selections, provide inputs, and/or manipulate outputs. In response to various user inputs, the system automatically accesses and traverses complex data structures (including, for example, a mathematical graph having nodes and edges), calculates complex data based on the traversals, displays the calculated complex data to the user, and/or enters the calculated complex data into the reports. The reports may be automatically updated based on a context selected by the user, and the system may automatically publish reports in multiple contexts.

18 Claims, 79 Drawing Sheets

Related U.S. Application Data

(60) Provisional application No. 62/046,644, filed on Sep. 5, 2014.

(51) Int. Cl.
*H04L 29/06* (2006.01)
*G06F 3/0488* (2013.01)

(56) References Cited

U.S. PATENT DOCUMENTS

| | | | |
|---|---|---|---|
| 5,930,774 | A | 7/1999 | Chennault |
| 6,338,047 | B1 | 1/2002 | Wallman |
| 6,601,044 | B1 | 7/2003 | Wallman |
| 6,865,567 | B1 | 3/2005 | Oommen et al. |
| 7,046,248 | B1 | 5/2006 | Perttunen |
| 7,171,384 | B1 | 1/2007 | Fitzpatrick et al. |
| 7,222,095 | B2 | 5/2007 | Squyres |
| 7,299,223 | B2 | 11/2007 | Namait et al. |
| 7,395,270 | B2 | 7/2008 | Lim et al. |
| 7,418,419 | B2 | 8/2008 | Squyres |
| 7,512,555 | B2 | 3/2009 | Finn |
| 7,533,057 | B2 | 5/2009 | Whipple et al. |
| 7,533,118 | B2 | 5/2009 | Chaudri |
| 7,644,088 | B2 | 1/2010 | Fawcett et al. |
| 7,769,682 | B2 | 8/2010 | Mougdal |
| 7,818,232 | B1 | 10/2010 | Mead et al. |
| 7,822,680 | B1 | 10/2010 | Weber et al. |
| 7,827,082 | B1 | 11/2010 | Shanmugan |
| 7,836,394 | B2 | 11/2010 | Linder |
| 7,873,557 | B2 | 1/2011 | Guidotti et al. |
| 7,949,937 | B2 | 5/2011 | Wu |
| 7,966,234 | B1 | 6/2011 | Merves et al. |
| 7,991,672 | B2 | 8/2011 | Crowder |
| 7,996,290 | B2 | 8/2011 | Dweck et al. |
| 8,117,187 | B2 | 2/2012 | Mostl |
| 8,249,962 | B1 | 8/2012 | Stephens et al. |
| 8,271,519 | B2 | 9/2012 | Young |
| 8,306,891 | B1 | 11/2012 | Findlay, III et al. |
| 8,458,764 | B2 | 6/2013 | Karjoth et al. |
| 8,745,625 | B2 * | 6/2014 | Tobin .................. G06F 16/2471 718/102 |
| 8,781,952 | B1 | 7/2014 | Biase |
| 8,819,763 | B1 | 8/2014 | Cheung et al. |
| 8,949,270 | B2 | 2/2015 | Newton et al. |
| 9,015,073 | B2 | 4/2015 | Mirra et al. |
| 9,087,361 | B2 | 7/2015 | Mirra et al. |
| 9,105,062 | B2 | 8/2015 | Posch et al. |
| 9,105,064 | B2 | 8/2015 | Posch et al. |
| 9,218,502 | B1 | 12/2015 | Doermann et al. |
| 9,244,899 | B1 | 1/2016 | Greenbaum |
| 9,424,333 | B1 | 8/2016 | Bisignani et al. |
| 9,485,259 | B1 | 11/2016 | Doermann et al. |
| 9,760,544 | B2 | 9/2017 | Mirra et al. |
| 9,916,297 | B1 | 3/2018 | Greenbaum |
| 9,935,983 | B1 | 4/2018 | Doermann et al. |
| 10,013,717 | B2 | 7/2018 | Posch et al. |
| 10,331,778 | B1 | 6/2019 | Greenbaum |
| 10,372,807 | B1 | 8/2019 | Greenbaul et al. |
| 2001/0039500 | A1 | 11/2001 | Johnson |
| 2002/0042764 | A1 | 4/2002 | Gardner et al. |
| 2002/0059127 | A1 | 5/2002 | Brown et al. |
| 2002/0107770 | A1 | 8/2002 | Meyer et al. |
| 2003/0018556 | A1 | 1/2003 | Squyres |
| 2003/0144868 | A1 | 7/2003 | MacIntyre et al. |
| 2003/0174165 | A1 | 9/2003 | Barney |
| 2003/0208432 | A1 | 11/2003 | Wallman |
| 2004/0039706 | A1 * | 2/2004 | Skowron ................ G06Q 10/10 705/51 |
| 2004/0236655 | A1 | 11/2004 | Scumniotales et al. |
| 2005/0171886 | A1 | 8/2005 | Squyres |
| 2005/0187852 | A1 | 8/2005 | Hwang |
| 2005/0222929 | A1 | 10/2005 | Steier et al. |
| 2005/0262047 | A1 | 11/2005 | Wu |
| 2005/0267835 | A1 | 12/2005 | Condron et al. |
| 2006/0036525 | A1 | 2/2006 | Ramos et al. |
| 2006/0041539 | A1 | 2/2006 | Matchett |
| 2006/0146719 | A1 | 7/2006 | Sobek et al. |
| 2006/0212452 | A1 | 9/2006 | Cornacchia |
| 2007/0011071 | A1 | 1/2007 | Cuscovitch et al. |
| 2007/0038544 | A1 | 2/2007 | Snow et al. |
| 2007/0050273 | A1 | 3/2007 | Burke, Jr. |
| 2007/0244775 | A1 | 10/2007 | Linder |
| 2007/0288339 | A1 | 12/2007 | Squyres |
| 2008/0086345 | A1 | 4/2008 | Wilson et al. |
| 2008/0139191 | A1 | 6/2008 | Melnyk et al. |
| 2008/0243721 | A1 | 10/2008 | Joao |
| 2008/0270316 | A1 | 10/2008 | Guidotti et al. |
| 2009/0006226 | A1 | 1/2009 | Crowder |
| 2009/0006227 | A1 | 1/2009 | Chen-Young et al. |
| 2009/0006271 | A1 | 1/2009 | Crowder |
| 2009/0164387 | A1 | 6/2009 | Armstrong et al. |
| 2009/0198630 | A1 | 8/2009 | Treitler et al. |
| 2009/0240574 | A1 | 9/2009 | Carpenter et al. |
| 2009/0249359 | A1 | 10/2009 | Caunter et al. |
| 2010/0005033 | A1 | 1/2010 | Boyda et al. |
| 2010/0057618 | A1 | 3/2010 | Spicer et al. |
| 2010/0083358 | A1 | 4/2010 | Govindarajan et al. |
| 2010/0100802 | A1 | 4/2010 | Delaporte |
| 2010/0169130 | A1 | 7/2010 | Fineman et al. |
| 2011/0066951 | A1 | 3/2011 | Ward-Karet et al. |
| 2011/0078059 | A1 | 3/2011 | Chambers et al. |
| 2011/0161371 | A1 | 6/2011 | Thomson et al. |
| 2011/0258139 | A1 | 10/2011 | Steiner |
| 2011/0264467 | A1 | 10/2011 | Green |
| 2011/0271230 | A1 | 11/2011 | Harris et al. |
| 2011/0283242 | A1 * | 11/2011 | Chew ...................... G06F 16/34 715/863 |
| 2011/0302221 | A1 | 12/2011 | Tobin et al. |
| 2011/0313948 | A1 | 12/2011 | Hagerman et al. |
| 2012/0030141 | A1 | 2/2012 | Boyda et al. |
| 2012/0089432 | A1 | 4/2012 | Podgurny |
| 2012/0101837 | A1 * | 4/2012 | McCorkle .............. G16H 10/20 705/2 |
| 2012/0136804 | A1 | 5/2012 | Lucia et al. |
| 2012/0182882 | A1 | 7/2012 | Chrapko et al. |
| 2012/0259797 | A1 | 10/2012 | Sarkany et al. |
| 2012/0317052 | A1 | 12/2012 | Heyner et al. |
| 2013/0073939 | A1 | 3/2013 | Honsowetz |
| 2013/0073940 | A1 | 3/2013 | Honsowetz |
| 2013/0166600 | A1 | 6/2013 | Snyder, II et al. |
| 2013/0212505 | A1 | 8/2013 | Herold |
| 2014/0150114 | A1 * | 5/2014 | Sinha ...................... G06F 21/62 726/28 |
| 2014/0156560 | A1 | 6/2014 | Sarkany et al. |
| 2014/0157142 | A1 | 6/2014 | Heinrich et al. |
| 2014/0172683 | A1 | 6/2014 | Curtis |
| 2014/0250375 | A1 | 9/2014 | Malik |
| 2014/0282034 | A1 | 9/2014 | Aydin et al. |
| 2014/0317018 | A1 | 10/2014 | Schneider |
| 2015/0026075 | A1 | 1/2015 | Mondri et al. |
| 2015/0026098 | A1 | 1/2015 | Ramos et al. |
| 2015/0074541 | A1 | 3/2015 | Schwartz et al. |
| 2015/0106748 | A1 | 4/2015 | Monte et al. |
| 2015/0161626 | A1 * | 6/2015 | Chu ................... G06Q 30/0201 705/7.29 |
| 2015/0186338 | A1 | 7/2015 | Mirra et al. |
| 2015/0378979 | A1 | 12/2015 | Hirzel et al. |
| 2016/0035035 | A1 | 2/2016 | Posch et al. |
| 2018/0024970 | A1 | 1/2018 | Mirra et al. |
| 2018/0276758 | A1 | 9/2018 | Posch et al. |

FOREIGN PATENT DOCUMENTS

| | | |
|---|---|---|
| CA | 2834265 | 6/2014 |
| EP | 1862955 | 12/2007 |
| EP | 2439691 | 4/2012 |
| EP | 2672446 | 12/2013 |
| EP | 2672447 | 12/2013 |
| EP | 2743881 | 6/2014 |
| HK | 1193898 | 10/2014 |
| JP | 2002197277 | 7/2002 |
| SG | 195517 | 12/2013 |

(56) References Cited

FOREIGN PATENT DOCUMENTS

| | | |
|---|---|---|
| SG | 195518 | 4/2015 |
| WO | WO 2005/036364 | 4/2005 |
| WO | WO 2011/038491 | 4/2011 |

OTHER PUBLICATIONS

Chakrabarti, D., & Faloustsos, C. (2006). Graph mining. ACM Computing Surveys, 38(1), 2. doi:http://doi.acm.org.10.1145/1132952.1132954 retrieved on Feb. 6, 2015.
Wagner et al., Assessing the Vulnerability of Supply Chain Using Graph Theory, 2010, International Journal of Production Economics 126, pp. 121-129.
Yang et al., Incremental Mining of Across-Stream Sequential Patterns in Multiple Data Streams, Mar. 2011, Journal of Computers, vol. 6, No. 3, pp. 449-457.
European Patent Office, "Extended Search Report" in application No. 13170954.5, dated Jan. 21, 2014, 6 pages.
European Patent Office, "Search Report" in application No. 13170952.9, dated Jan. 21, 2014, 6 pages.
European Patent Office, "Search Report" in application No. 13197286.1, dated Mar. 14, 2014, 5 pages.
Singapore, "Search and Examination Report" in application No. 201304379-9, dated Jan. 23, 2014.
Singapore, "Search and Examination Report" in application No. 201304378-1, dated Jul. 3, 2014.
Chabrow, L. (2000). Visualization software: Looking for a market—IT departments search for the best ways to adapt the tools to business users' needs. InformationWeek, 112, Retrieved from http://dialog.proquest.com/professional/professional/docview/669839509?accountid=142257 on Apr. 28, 2017.
MacVittie, L. (2000). An expert on performance monitoring—all three products aim to pinpoint reasons for slow response times, but compuware's superior drill-down capabilities put it on top. Network Computing, 102. Retrieved from http://dialog.proquest.com/professional/prefessional/docview/673199655?accountid=142257 on Apr. 28, 2017.
State street launches industry leading over-the-counter derivatives servicing platform. (Aug. 21, 2008). Business Wire Retrieved from https://dialog.proquest.com/professional/professional/docview/677663916?accountid=142257 on Apr. 28, 2017.
Examination Report in Canadian Patent Application No. 2817660 dated Mar. 12, 2019.
Examination Report in Canadian Patent Application No. 2817652 dated Apr. 29, 2019.

* cited by examiner

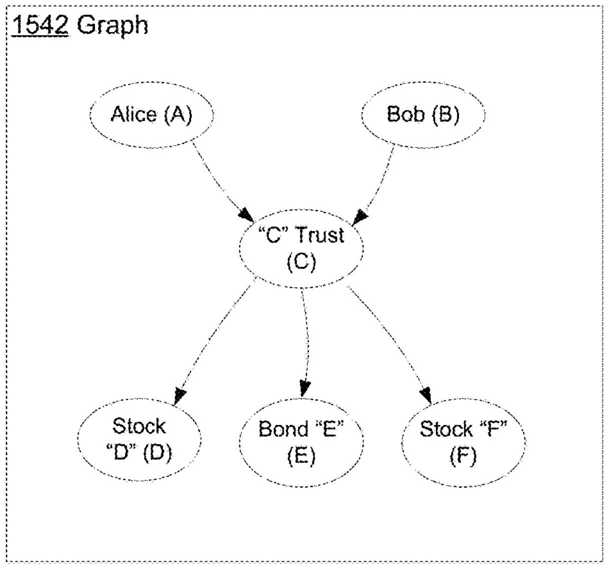
FIG. 13C
Perspective = Bob
Bucketing Factor = Asset Type
Column Factor = Asset Value ("Value")
Paths:
1: B
2: B,C
3: B,C,D
4: B,C,E
5: B,C,F
FIG. 13D
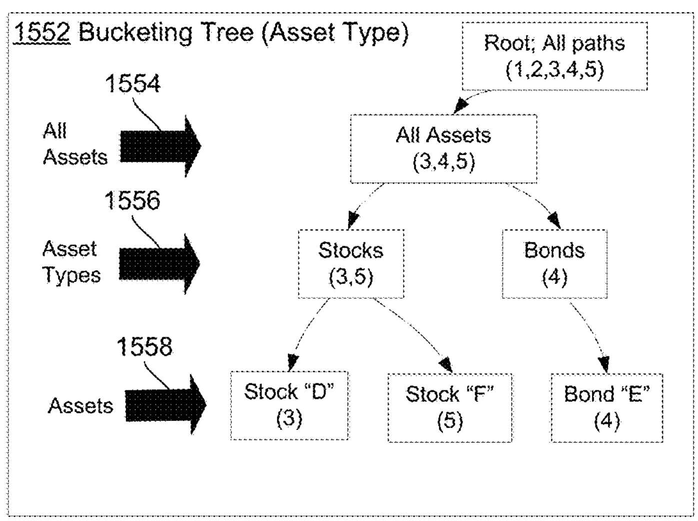
FIG. 13E

FIG. 34
Untitled Linked Section
Adam Smith
Quarterly Report
Prepared for Adam Smith
Asset Allocation
3400

SYSTEMS AND USER INTERFACES FOR DYNAMIC AND INTERACTIVE REPORT GENERATION AND EDITING BASED ON AUTOMATIC TRAVERSAL OF COMPLEX DATA STRUCTURES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/644,038, filed Mar. 10, 2015, and titled "SYSTEMS AND USER INTERFACES FOR DYNAMIC AND INTERACTIVE REPORT GENERATION AND EDITING BASED ON AUTOMATIC TRAVERSAL OF COMPLEX DATA STRUCTURES," which application claims benefit of U.S. Provisional Patent Application No. 62/046,644, filed Sep. 5, 2014, and titled "SYSTEMS AND USER INTERFACES FOR DYNAMIC AND INTERACTIVE REPORT GENERATION AND EDITING BASED ON AUTOMATIC TRAVERSAL OF COMPLEX DATA STRUCTURES." The entire disclosure of each of the above items is hereby made part of this specification as if set forth fully herein and incorporated by reference for all purposes, for all that it contains.

TECHNICAL FIELD

Embodiments of present disclosure relate to systems and techniques for accessing one or more databases in substantially real-time to provide information in an interactive user interface. More specifically, embodiments of the present disclosure relate to user interfaces for editing and generating reports based on electronic collections of data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A report is a way of presenting and conveying information, and is useful in many fields (for example, scientific fields, financial fields, political fields, and/or the like). In many fields, computer programs may be written to programmatically generate reports or documents from electronic collections of data, such as databases. This approach requires a computer programmer to write a program to access the electronic collections of data and output the desired report or document. Typically, a computer programmer must determine the proper format for the report or document from users or analysts that are familiar with the report or document. Some man-machine interfaces for generating reports or documents in this manner are software development tools that allow a computer programmer to write and test computer programs. Following development and testing of the computer program, the computer program must be released into a production environment for use. Thus, this approach for generating reports or documents may be inefficient because an entire software development life cycle (for example, requirements gathering, development, testing, and release) may be required even if only one element or graphic of the report or document requires changing. Furthermore, this software development life cycle may be inefficient and consume significant processing and/or memory resources.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a computer system designed to provide interactive, graphical user interfaces (also referred to herein as "user interfaces") for enabling non-technical users to quickly and dynamically edit and generate detailed reports. The user interfaces are interactive such that a user may make selections, provide inputs, and/or manipulate outputs. In response to various user inputs, the system automatically accesses and traverses complex data structures (including, for example, a mathematical graph having nodes and edges), calculates complex data based on the traversals, displays the calculated complex data to the user, and/or enters the calculated complex data into the reports. The reports may be automatically updated based on a context selected by the user, and the system may automatically publish reports in multiple contexts.

The computer system (also referred to herein simply as the "system") may be useful to, for example, financial advisors, such as registered investment advisors (RIAs) and their firms. Such RIA's often need to view data relating to investment holdings of clients for purposes of analysis, reporting, sharing, or recommendations. Client investments may be held by individuals, partnerships, trusts, companies, and other legal entities having complex legal or ownership relationships. RIAs and other users may use the system to view complex holdings in a flexible way, for example, by selecting different metrics and/or defining their own views and reports on-the-fly.

Current wealth management technology does not offer the capability to generate views, reports, or other displays of data from complex investment holding structures in an interactive, dynamic, flexible, shareable, efficient way. Some existing wealth management systems are custom-built and therefore relatively static in their viewing capabilities, requiring programmers to make customized versions (as described above). Other systems lack scalability and are time-consuming to use. Yet other systems consist of MICROSOFT VISUAL BASIC scripts written for use with MICROSOFT EXCEL spreadsheets. This type of system is an awkward attempt to add some measure of flexibility to an otherwise static foundation.

Various embodiments of the present disclosure enable report generation and editing in fewer steps, result in faster creation of reports, consume less processing and/or memory resources than previous technology, permit users to have less knowledge of programming languages and/or software development techniques, and/or allow less technical users or developers to create reports than the user interfaces described above. Thus, the user interfaces described herein are more efficient as compared to previous user interfaces, and enable the user to cause the system to automatically access and initiate calculation of complex data automatically. Further, by storing the data as a complex mathematical graph, outputs (for example, a table) need not be stored separately and thereby take additional memory. Rather, the system may render outputs (for example, tables) in real time and in response to user interactions, such that the system may reduce memory and/or storage requirements.

For example, in some embodiments the system provides a user interface for generating and/or editing reports (for example, financial reports). The reports may include multiple report sections. Each report section may include multiple pages. The report sections and pages of the report may be represented in the user interface, and may, when the report is published and/or exported, correspond to sections and pages of a report file (for example, a portable document format (PDF) file) and/or a physical report printed on paper.

Report sections may be linked to template report sections (also referred to herein as "linked sections" and/or "master report sections"). A template report section may define a particular layout and/or arrangement of information in a report section. A template report section may further include one or more linked variables which may be filled in with information drawn from a context of a financial report that is linked to the template report section. For example, a template report section may reference a client name. When that template report section is linked to a report section of a financial report in the context of a client names "John Smith," the client's name ("John Smith") is automatically input into the client name variable designated in the template report section. Further examples of linked variables include tables and charts of numerical information. In these examples numerical information may be automatically calculated (by, for example, traversal of complex data structures) and presented in each applicable context.

In some embodiments the system provides dynamic page generation in the user interface for generating and/or editing financial reports. In these embodiments, the system automatically adds pages to a financial report as needed to display requested data. For example, the user may insert a table into the report, specifying particular financial data that is to be calculated and input into that table. In this example, depending on the context, more or fewer pages may be needed in the report to display the table with the requested financial data. Accordingly, when a context is specified, the system automatically calculates the financial data by accessing and traversing one or more complex data structures (as described above and below), determines a number of pages needed to display the table, and inserts the determined number of pages. The user interface may include, in an embodiment, thumbnail views of the pages in the report, including dynamically inserted pages. In this embodiment, the dynamically inserted pages may be indicated by, for example, greying out of the thumbnails.

In some embodiments the system provides automatic splitting of report sections based on a specified split attribute. In these embodiments, the system automatically, based on a split attribute (provided, for example, by a user), divides a report section into multiple parts and inserts needed pages into the report. Each of the parts generated by the system may be based on the report section which is split. For example, a report section may include a table displaying calculated financial data of multiple asset classes. The user may specify a split attribute of "asset class," such that the system automatically splits the report section into multiple parts, each part including a table displaying calculated financial data of different respective asset classes. In this example, the system automatically calculates the financial data to be put in each part of the report section by accessing and traversing one or more complex data structures (as described above and below).

In some embodiments the system provides for automatic PDF report generation. In these embodiments, the system may initialize multiple instances of PDF generation processes in parallel. Each PDF generation process may be provided with an authentication token and a context, such that the process may generate and render the report, and generate the PDF based on the rendered report. Generated reports may be automatically electronically delivered to a specified recipient, and/or the specified recipient may be provided with a notification that the report is generated and a link to access the generated report.

Various embodiments of the system may include some or all of the aspects described herein. For example, an embodiment of the system includes linking to template report section, dynamic page generation, automatic splitting of report sections, and PDF report generation. However, other embodiments of the system may include fewer or other combinations of the aspects described herein.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Various embodiments of the system further reduce memory requirements and/or processing needs and time via a complex graph data structure. For example, as described below, common data nodes may be used in multiple graphs of various users and/or clients of a firm operating the system. Utilization of common data nodes reduces memory requirements and/or processing requirements of the system.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the report generation and/or editing interactive user interfaces described herein may provide an optimized display of report-related information and may enable a user to more quickly access, navigate, assess, digest, and edit report information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

According to an embodiment, a computer system is disclosed that is configured to access one or more electronic data sources in response to inputs received via an interactive user interface in order to insert a linked section into a report and automatically calculate data for insertion into the linked section, the computing system comprising: a computer processor; and a computer readable storage medium storing program instructions configured for execution by the computer processor in order to cause the computing system to: generate user interface data for rendering an interactive user interface on a computing device, the interactive user interface including: a report including at least one report section, the report associated with at least one of a plurality of contexts, each of the plurality of contexts being associated with at least one of an individual or legal entity, each of the plurality of contexts further being associated with a date range; and a plurality of selectable linked sections, each of the plurality of selectable linked sections including at least one report element and defining a format, the at least one report element including at least one of a text box, a table, or a graph; receive, via the interactive user interface, a selection of one of the at least one of the plurality of contexts associated with the report; receive, via the interactive user interface, a selection of one of the plurality of selectable linked sections; calculate, based on the selected context, numerical data for insertion into the at least one report element included in the selected linked section; insert the calculated numerical data into the at least one report element; and insert the selected linked section into the report based on the respective defined format.

According to another embodiment, the program instructions are further configured for execution by the computer processor in order to cause the computing system to: receive, via the interactive user interface, a selection of a second one of the at least one of the plurality of contexts associated with the report; calculate, based on the selected second context, second numerical data for insertion into the at least one report element included in the selected linked section; and update the at least one report element by inserting the calculated second numerical data into the at least one report element.

According to yet another embodiment, the program instructions are further configured for execution by the computer processor in order to cause the computing system to: receive, via the interactive user interface, a selection of a second one of the plurality of selectable linked sections; calculate, based on the selected context, second numerical data for insertion into the at least one report element included in the selected second linked section; insert the calculated second numerical data into the at least one report element included in the selected second linked section; and insert the selected second linked section into the report based on the respective defined format.

According to another embodiment, the program instructions are further configured for execution by the computer processor in order to cause the computing system to: receive, via the interactive user interface, a selection of a second one of the at least one of the plurality of contexts associated with the report; calculate, based on the selected second context, third and fourth numerical data for insertion into the at least one report elements included in the respective selected linked section and selected second linked section; and update the at least one report elements by inserting the calculated third and fourth numerical data into the at least one report elements.

According to yet another embodiment, the program instructions are further configured for execution by the computer processor in order to cause the computing system to: in response to a change to the selected linked section: re-calculate, based on the selected context, numerical data for insertion into the at least one report element included in the selected linked section; and insert the re-calculated numerical data into the at least one report element. 6. The computing system of claim 1, wherein the inserted linked section may not be edited in the interactive user interface.

According to another embodiment, the program instructions are further configured for execution by the computer processor in order to cause the computing system to: generate second user interface data for rendering a second interactive user interface on a computing device, the second interactive user interface used for editing linked sections and including an editable linked section selected from the plurality of selectable linked section; receive, via the interactive user interface, an input editing the editable linked section; and updating the editable linked section in response to the input.

According to yet another embodiment, the editable linked section comprises the selected linked section, and wherein the program instructions are further configured for execution by the computer processor in order to cause the computing system to: in response to the update to the selected linked section: re-calculate, based on the selected context, numerical data for insertion into the at least one report element included in the selected linked section; and insert the re-calculated numerical data into the at least one report element.

According to another embodiment, the program instructions are further configured for execution by the computer processor in order to cause the computing system to: receive, via the interactive user interface, an input unlinking the inserted linked section; and allow the inserted unlinked section to be edited in the interactive user interface.

According to yet another embodiment, the plurality of selectable linked sections includes at least one of a header or footer.

According to another embodiment, the plurality of selectable linked sections are associated with a library of linked section that may be shared among multiple users.

According to an embodiment, a computer system is disclosed that is configured to access one or more electronic data sources in response to inputs received via an interactive user interface in order to dynamically insert pages into a report and automatically calculate data for insertion into the inserted pages, the computing system comprising: a computer processor; and a computer readable storage medium storing program instructions configured for execution by the computer processor in order to cause the computing system to: generate user interface data for rendering an interactive user interface on a computing device, the interactive user interface including a report including at least one page and at least one report element, the at least one report element including at least one of a text box, a table, or a graph, the report associated with at least one of a plurality of contexts, each of the plurality of contexts being associated with at least one of an individual or legal entity, each of the plurality of contexts further being associated with a date range; receive, via the interactive user interface, a selection of one of the at least one of the plurality of contexts associated with the report; calculate, based on the selected context, numerical data for insertion into the at least one report element; determine a quantity of pages needed to display the calculated numerical data in the at least one report element; dynamically insert the determined quantity of pages into the report; and insert the at least one report element including the calculated numerical data into the dynamically inserted pages of the report.

According to another embodiment, at least one report element is spanned across the dynamically inserted pages.

According to yet another embodiment, calculating the numerical data is further based on one or more filters applied to the at least one report element.

According to another embodiment, the at least one report element includes a table, and wherein calculating the numerical data associated with the table is further based on one or more data groupings and data columns associated with the table.

According to yet another embodiment, the dynamically inserted pages may not be edited in the interactive user interface.

According to another embodiment, the program instructions are further configured for execution by the computer processor in order to cause the computing system to: receive, via the interactive user interface, a selection of a second one of the at least one of the plurality of contexts associated with the report; calculate, based on the selected second context, second numerical data for insertion into the at least one report element; determine a second quantity of pages needed to display the calculated second numerical data in the at least one report element; dynamically insert the determined second quantity of pages into the report; and insert the at least one report element including the calculated second numerical data into the dynamically inserted pages of the report.

According to yet another embodiment, the interactive user interface further includes thumbnails corresponding to each of the at least one page, including the dynamically inserted pages.

According to another embodiment, the program instructions are further configured for execution by the computer processor in order to cause the computing system to: provide indications, via the interactive user interface, of the thumbnails corresponding to the dynamically inserted pages.

According to yet another embodiment, the indications comprise greying out of the thumbnails corresponding to the dynamically inserted pages.

According to an embodiment, a computer system is disclosed that is configured to access one or more electronic data sources in order to automatically generate PDF reports, the computing system comprising: a computer processor; and a computer readable storage medium storing program instructions configured for execution by the computer processor in order to cause the computing system to: receive a report generation request, including identification of a report to be generated, one or more contexts associated with the report, and an identity of a user, wherein the report includes at least one report element, the at least one report element including at least one of a text box, a table, or a graph, each of the one or more contexts is associated with at least one of an individual or legal entity, each of the one or more contexts further being associated with a date range; generate a unique authentication token based on the identity of the user; transmit the unique authentication token to a report data provider configured to provide calculated data useable to render reports; for each of the one or more contexts, initiate an instance of a PDF report renderer configured to: provide the authentication token and the context to the report data provider; receive, from the report data provider, calculated data associated with the context; render the report in the context based on the received calculated data; convert the rendered report to PDF.

According to another embodiment, the program instructions are further configured for execution by the computer processor in order to cause the computing system to: compile rendered PDF reports from each of the one or more contexts into a compressed file.

According to yet another embodiment, the program instructions are further configured for execution by the computer processor in order to cause the computing system to: provide a notification to one or more individuals associated with each respective context, each notification including the respective rendered PDF report.

According to another embodiment, the program instructions are further configured for execution by the computer processor in order to cause the computing system to: for each of the one or more contexts, wait until completion of conversion of the rendered report to PDF before providing the notification.

According to yet another embodiment, the program instructions are further configured for execution by the computer processor in order to cause the computing system to: generate user interface data for rendering an interactive user interface on a computing device, the interactive user interface including a portal through which individuals associated with each respective context may access their respective rendered PDF reports.

According to another embodiment, the program instructions are further configured for execution by the computer processor in order to cause the computing system to: generate user interface data for rendering an interactive user interface on a computing device, the interactive user interface including dialog through which indication of preferences may be provided, the preferences including at least one of a selection of the one or more contexts, a selection for creation of a zip file, a selection for notification to be sent to recipients of reports, or a selection for publication of reports to a portal user interface.

According to yet another embodiment, the interactive user interface further includes a preview of a report in one of the one or more contexts.

According to another embodiment, the reports are rendered and converted to PDF before an indication by the user is received.

According to an embodiment, a computer system is disclosed that is configured to access one or more electronic data sources in response to inputs received via an interactive user interface in order to split a page of a report and automatically calculate data for insertion into the split page, the computing system comprising: a computer processor; and a computer readable storage medium storing program instructions configured for execution by the computer processor in order to cause the computing system to: generate user interface data for rendering an interactive user interface on a computing device, the interactive user interface including a report including a page, the page including at least one report element, the at least one report element including at least one of a text box, a table, or a graph, the report associated with at least one of a plurality of contexts, each of the plurality of contexts being associated with at least one of an individual or legal entity, each of the plurality of contexts further being associated with a date range; receive, via the interactive user interface, a selection of one of the at least one of the plurality of contexts associated with the report; receive, via the interactive user interface, an indication of a splitting factor; determine values associated with the indicated splitting factor; and for each of the determined values associated with the indicated splitting factor: calculate, based on the selected context and the determined value of the indicated splitting factor, numerical data for insertion into the at least one report element; insert a page into the report; and insert the at least one report element including the calculated numerical data into the inserted page of the report.

According to another embodiment, the splitting factor comprises at least one of asset class, country, or sector.

According to yet another embodiment, the program instructions are further configured for execution by the computer processor in order to cause the computing system to: determine metadata associated with the page; and for each of the determined values associated with the indicated splitting factor: determine updated metadata, based on the determined value; and associated the updated metadata with the inserted page.

According to another embodiment, the metadata associated with each of the inserted pages is coupled by reference to the page of the report.

According to yet another embodiment, each of the inserted pages inherits any changes made to the page of the report.

According to another embodiment, each of the inserted pages may not be edited.

According to yet another embodiment, edits to the page of the report are propagated to the inserted pages.

According to another embodiment, propagation of edits to the page of the report comprises: for each of the determined values associated with the indicated splitting factor: re-calculating, based on the selected context and the determined value of the indicated splitting factor, numerical data for insertion into the at least one report element; and inserting the re-calculated numerical data into the at least one report element of the inserted page of the report.

According to yet another embodiment, a computer system is disclosed that is configured to access one or more electronic data sources in response to inputs received via an interactive user interface in order to split a section of a report and automatically calculate data for insertion into pages of the split section, the computing system comprising: a computer processor; and a computer readable storage medium storing program instructions configured for execution by the computer processor in order to cause the computing system to: generate user interface data for rendering an interactive user interface on a computing device, the interactive user interface including a report including at least one section including a page, the page including at least one report element, the at least one report element including at least one of a text box, a table, or a graph, the report associated with at least one of a plurality of contexts, each of the plurality of contexts being associated with at least one of an individual or legal entity, each of the plurality of contexts further being associated with a date range; receive, via the interactive user interface, a selection of one of the at least one of the plurality of contexts associated with the report; receive, via the interactive user interface, an indication of an attribute associated with the selected context; determine, based on the selected context, values associated with the indicated attribute; and for each of the determined values associated with the indicated attribute: calculate, based on the selected context and the determined value of the indicated attribute, numerical data for insertion into the at least one report element; determine a quantity of pages needed to display the calculated numerical data in the at least one report element; dynamically insert the determined quantity of pages into the report; and insert the at least one report element including the calculated numerical data into the dynamically inserted pages of the report.

In an embodiment, a method comprises importing asset data from a memory of a computer, representing financial assets for any of accounts in which one or more of the assets are held, individuals who own one or more of the assets, or legal entities who own one or more of the assets; retrieving report metadata and formatting attributes, wherein the report metadata comprises one or more of contexts, bucketing factors and column factors, and wherein the formatting attributes comprise one or more of report formatting attributes, page formatting attributes, and widget formatting attributes; selecting display data from the asset data based on the report metadata, wherein the selecting the display data preserves the asset data unchanged in the memory of the computer; applying one or more formats from the formatting attributes to the display data, wherein the applying preserves the asset data unchanged in the memory of the computer and results in formatted data; displaying the formatted data on a graphical user interface; wherein the method is performed by one or more computing devices.

According to an aspect of the embodiment, selecting the display data from the asset data further comprises: creating and storing, in the memory of the computer, a graph having nodes and edges, wherein the nodes represent the financial assets and anyone or more of: the accounts in which one or more of the assets are held; the individuals who own one or more of the assets; or legal entities who own one or more of the assets; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; selecting the display data of the value nodes and the column result values from the asset data.

According to another aspect of the embodiment, the method further comprises displaying the formatted data in at least one page of a plurality of pages in a report, and wherein the report comprises the pages, the report metadata, and the formatting attributes.

According to yet another aspect of the embodiment, the method further comprises: receiving a request to generate a report; in response to receiving the request, displaying a report selection dialog that enumerates a plurality of reports, wherein each report in the plurality of reports has a plurality of pages associated with the report; receiving a selection of the report from the report selection dialog; receiving a selection of a particular page of the plurality of pages associated with the report; in response to receiving the selection, displaying the formatted data in the page.

According to another aspect of the embodiment, the method further comprises: displaying the formatted data in a plurality of widgets in the page, wherein the formatted data in a particular widget in the plurality of widgets is displayed in a widget format described by widget formatting attributes of the particular widget, wherein the widget formatting attributes are controlled by a plurality of widget controls; displaying the plurality of widget controls for the particular widget; receiving a modification to a widget control of the plurality of widget controls; in response to receiving the modification, modifying the widget formatting attributes of the particular widget, wherein the modifying of the widget formatting attributes preserves the asset data associated with the formatted data unchanged in the memory of the computer; causing re-displaying the formatted data in the particular widget in a different format described by the modified widget formatting attributes.

According to yet another aspect of the embodiment, the particular widget is a text widget, and wherein the displaying the formatted data further comprises displaying textual representations of a plurality of symbolic links, wherein each symbolic link identifies an entry in the asset data of the display data for a particular context.

According to another aspect of the embodiment, the entry in the asset data of the display data corresponds to a column factor for the particular context.

According to yet another aspect of the embodiment, the method further comprises: receiving a selection of a particular symbolic link in the text widget; in response to receiving the selection of the particular symbolic link, displaying in the graphical user interface a column factor selection dialog box, wherein the column factor selection dialog box enumerates a plurality of column factors for the particular context; receiving a column factor from the plurality of column factors; and in response to receiving the column factor, causing re-displaying the textual representations for the particular symbolic link pointing to a different entry in the asset data of the formatted data corresponding to the column factor for the particular context in the text widget.

According to another aspect of the embodiment, the particular widget is a table widget and wherein the displaying the formatted data further comprises displaying a table view by forming rows based on the bucketing factors and forming columns based on the column factors for a particular context.

According to yet another aspect of the embodiment, the method further comprises: receiving a selection of a graphical element for column properties in the table view; in response to receiving the selection, displaying in the graphical user interface a column formatting dialog box; displaying a column widget control for a column in the column formatting dialog box, wherein the column widget control is a widget control from the plurality of widget controls for the table widget; receiving a modification to the column widget control; in response to receiving the modification, modifying the widget formatting attributes for the table widget, wherein the modifying of the widget formatting attributes preserves the asset data of the formatted data unchanged in the memory of the computer; causing re-displaying the formatted data in the table view in the table widget in a different format described by the modified widget formatting attributes.

According to another aspect of the embodiment, the method further comprises: receiving a label for the page containing the plurality of widgets; associating the formatting attributes of the plurality of widgets and of the page with the label; storing in the memory of the computer the formatting attributes associated with the label.

According to yet another aspect of the embodiment, the method further comprises: displaying the formatted data in the page in a format described by the page formatting attributes, wherein the page formatting attributes are controlled by a plurality of page controls; displaying the plurality of page controls for the page; receiving a modification to a page control from the plurality of page controls; in response to receiving the modification, modifying the page formatting attributes, wherein the modifying of the page formatting attributes preserves the asset data of the formatted data unchanged in the memory of the computer; causing re-displaying the formatted data in the page based on the modified page formatting attributes.

According to another aspect of the embodiment, the method further comprises: receiving a request to split the page based on a split factor of a bucketing factor or a column factor, wherein a plurality of values are associated with the split factor; selecting display data sets from the asset data based on the report metadata and the factor, wherein each display data in the display data set has a different value from the plurality of values associated with the split factor; for each of the display data, creating a new page; applying the formatting attributes to the new page.

According to yet another aspect of the embodiment, receiving a request to split the page further comprises: receiving the request to split the page; in response to receiving the request, displaying a factor selection dialog; wherein the factor selection dialog enumerates a plurality of split factors of bucketing factors or of column factors; receiving a selection of the split factor from the plurality of split factors.

According to another aspect of the embodiment, the method further comprises: displaying the formatted data in the page in a format described by the report formatting attributes, wherein the report formatting attributes are controlled by a plurality of report controls; displaying the plurality of report controls for the plurality of pages; receiving a modification to a report control from the plurality of report controls; in response to receiving the modification, modifying the report formatting attributes for the plurality of pages, wherein the modifying of the report formatting attributes preserves the asset data of the formatted data unchanged in the memory of the computer; causing re-displaying the formatted data in the page in a different format described in the modified report formatting attributes.

In an embodiment, a non-transitory data storage medium storing one or more sequences of instructions which when executed cause performing: importing asset data from a memory of a computer, representing financial assets for any of accounts in which one or more of the assets are held, individuals who own one or more of the assets, or legal entities who own one or more of the assets; retrieving report metadata and formatting attributes, wherein the report metadata comprises one or more of contexts, bucketing factors and column factors, and wherein the formatting attributes comprise one or more of report formatting attributes, page formatting attributes, and widget formatting attributes; selecting display data from the asset data based on the report metadata, wherein the selecting the display data preserves the asset data unchanged in the memory of the computer; applying one or more formats from the formatting attributes to the display data, wherein the applying preserves the asset data unchanged in the memory of the computer and results in formatted data; displaying the formatted data on a graphical user interface.

According to an aspect of the embodiment, the instructions which cause selecting the display data from the asset data further comprise one or more sequences of instructions which when executed cause: creating and storing, in the memory of the computer, a graph having nodes and edges, wherein the nodes represent the financial assets and anyone or more of: the accounts in which one or more of the assets are held; the individuals who own one or more of the assets; or legal entities who own one or more of the assets; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; selecting the display data of the value nodes and the column result values from the asset data.

According to an aspect of the embodiment, the instructions which cause selecting the display data from the asset data further comprise one or more sequences of instructions which when executed cause displaying the formatted data in at least one page of a plurality of pages in a report, and wherein the report comprises the pages, the report metadata, and the formatting attributes.

According to an aspect of the embodiment, the instructions which cause selecting the display data from the asset data further comprise one or more sequences of instructions which when executed cause: receiving a request to generate a report; in response to receiving the request, displaying a report selection dialog that enumerates a plurality of reports, wherein each report in the plurality of reports has a plurality of pages associated with the report; receiving a selection of the report from the report selection dialog; receiving a selection of a particular page of the plurality of pages associated with the report; in response to receiving the selection, displaying the formatted data in the page.

According to an aspect of the embodiment, the instructions which cause selecting the display data from the asset data further comprise one or more sequences of instructions which when executed cause: displaying the formatted data in a plurality of widgets in the page, wherein the formatted data in a particular widget in the plurality of widgets is displayed in a widget format described by widget formatting attributes of the particular widget, wherein the widget formatting attributes are controlled by a plurality of widget controls; displaying the plurality of widget controls for the particular widget; receiving a modification to a widget control of the plurality of widget controls; in response to receiving the modification, modifying the widget formatting attributes of the particular widget, wherein the modifying of the widget formatting attributes preserves the asset data associated with the formatted data unchanged in the memory of the computer; causing re-displaying the formatted data in the particular widget in a different format described by the modified widget formatting attributes.

Accordingly, the various embodiments of the present disclosure provide interactive user interfaces that embody two levels of abstraction and enable efficient and rapid generation of multiple reports. Linked, or template, sections may provide a first level of abstraction for efficient creation of reports. For example, a linked section may be considered to be templates of a section that may be inserted into reports and automatically populated with report data. The report itself, likewise, may be considered a second level of abstraction for efficient creation of reports. For example, a report may be considered a template of a report that may be generated and/or edited by a user, and then populated with report data in multiple contexts (for example, when the report is published as PDFs, as described below). Accordingly, the system may provide two levels of abstraction that may be used by the user to efficiently generate and output complex reports in multiple contexts and including complex data associated with each context. Additionally, such reports may be output in multiple formats and mediums, such as electronic (for example, PDF and/or interactive user interface) and/or physical (for example, paper). Such efficient report generation may not have been available before creation of the efficient technical system and methods of the present disclosure. The report generation system and methods described herein may find particular usefulness in the field of financial management and reporting, as the various examples described herein show. However, the report generation system and methods of the present disclosure may also be used to equal advantage and usefulness in any number of other fields.

Accordingly, various embodiments of the present disclosure may provide interactive user interfaces for enabling non-technical users to quickly and dynamically edit and generate detailed reports through automatic access and traversal of complex data structures, and calculation of complex report data based on property values of multiple nodes within such complex data structures, all in substantially real-time. In various embodiments the system may eliminate the need for a skilled programmer to generate a customized report. Rather, the system may enable an end-user to customize and generate a complex report in multiple contexts automatically. Accordingly, various embodiments of the present disclosure enable report generation and editing in fewer steps, result in faster creation of reports, consume less processing and/or memory resources than previous technology, permit users to have less knowledge of programming languages and/or software development techniques, and/or allow less technical users or developers to create reports than the user interfaces described above. Thus, the systems and user interfaces described herein may be more efficient as compared to previous systems and user interfaces.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 13C-13E illustrate an example traversal of a simplified graph.

DETAILED DESCRIPTION

Figure 1:
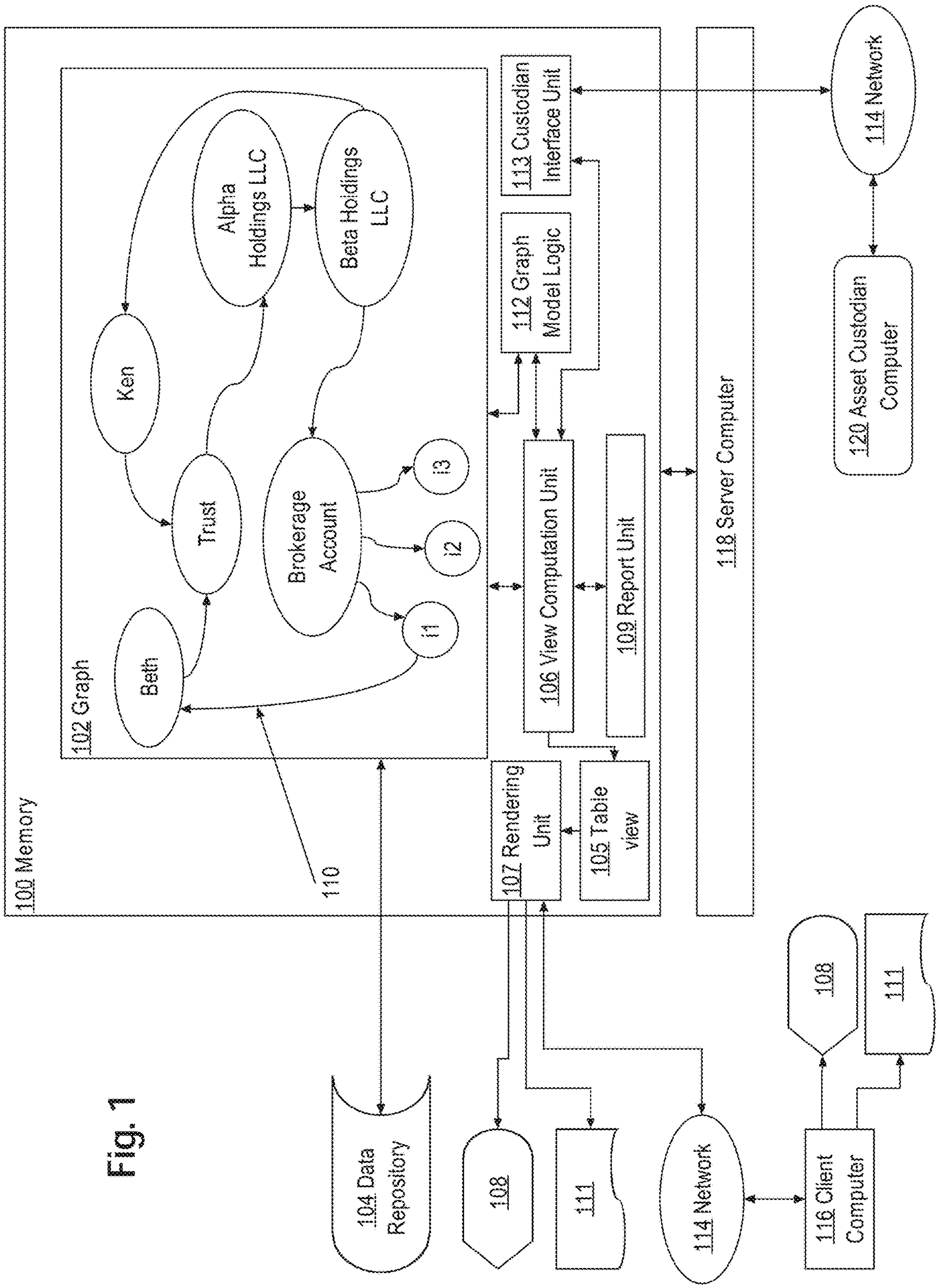
FIG. 1 illustrates a computer system that may be used to implement an embodiment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

1.0 General Overview

As described above, embodiments of the present disclosure relate to a computer system designed to provide interactive, user interfaces for enabling non-technical users to quickly and dynamically edit and generate detailed reports. The user interfaces are interactive such that a user may make selections, provide inputs, and/or manipulate outputs. In response to various user inputs, the system automatically accesses and traverses complex data structures (including, for example, a mathematical graph having nodes and edges, described below), calculates complex data based on the traversals, displays the calculated complex data to the user, and/or enters the calculated complex data into the reports. The reports may be automatically updated based on a context selected by the user, and the system may automatically publish reports in multiple contexts.

The system described herein may be designed to perform various data processing methods related to complex data structures, including creating and storing, in memory of the system (or another computer system), a mathematical graph (also referred to herein simply as a "graph") having nodes and edges. In some embodiments each of the nodes of the graph may represent any of (but not limited to) the following: financial assets, accounts in which one or more of the assets are held, individuals who own one or more of the assets, and/or legal entities who own one or more of the assets. Further, the various data processing methods, including traversals of the graph and calculation of complex data, may include, for example: receiving and storing one or more bucketing factors and one or more column factors, traversing the graph and creating a list of a plurality of paths of nodes and edges in the graph, applying the bucketing factors to the paths to result in associating each set among a plurality of sets of the nodes with a different value node among a plurality of value nodes, and/or applying the column factors to the paths and the value nodes to result in associating column result values with the value nodes. The system may also be designed to generate various user interface data useable for rendering interactive user interfaces, as described herein. For example, the system may generate user interface data for displaying of a table view by forming rows based on the value nodes and forming columns based on the column result values. Column result values may also be referred to herein as metrics.

As described above, in some embodiments the system provides a user interface for generating and/or editing reports (for example, financial reports). The reports may include multiple report sections. Each report section may include multiple pages. The report sections and pages of the report may be represented in the user interface, and may, when the report is published and/or exported, correspond to sections and pages of a report file (for example, a portable document format (PDF) file) and/or a physical report printed on paper. Example user interfaces and methods of the system for generating and/or editing reports are described in detail below in reference to FIGS. 21-26.

Report sections may be linked to template report sections. A template report section may define a particular layout and/or arrangement of information in a report section. A template report section may also, after being inserted and/or embedded in a report, maintain a link back to the template report section such that any changes to the template report section are reflected in the report. A template report section may further include one or more linked variables which may be filled in with information drawn from a context of a financial report that is linked to the template report section. For example, a template report section may reference a client name. When that template report section is linked to a report section of a financial report in the context of a client names "John Smith," the client's name ("John Smith") is automatically input into the client name variable designated in the template report section. Further examples of linked variables include tables and charts of numerical information. In these examples numerical information may be automatically calculated (by, for example, traversal of complex data structures) and presented in each applicable context. Example user interfaces and methods of the system for linking to template report sections are described in detail below in reference to FIGS. 27-53.

In some embodiments the system provides dynamic page generation in the user interface for generating and/or editing financial reports. In these embodiments, the system automatically adds pages to a financial report as needed to accommodate and display requested data. For example, the user may insert a table into the report, specifying particular financial data that is to be calculated and input into that table. In this example, depending on the context, more or fewer pages may be needed in the report to display the table with the requested financial data. Accordingly, when a context is specified, the system automatically calculates the financial data by accessing and traversing one or more complex data structures (as described above and below), determines a number of pages needed to display the table, and inserts the determined number of pages. The user interface may include, in an embodiment, thumbnail views of the pages in the report, including dynamically inserted pages. In this embodiment, the dynamically inserted pages may be indicated by, for example, greying out of the thumbnails. Example user interfaces and methods of the system for dynamic page generation are described in detail below in reference to various figures, including FIG. 54.

In some embodiments the system provides automatic splitting (also referred to herein as "duplication") of report sections based on a specified split attribute. In these embodiments, the system automatically, based on a split attribute (provided, for example, by a user), divides a report section into multiple parts and inserts needed pages into the report. Each of the parts generated by the system may be based on the report section which is split. For example, a report section may include a table displaying calculated financial data of multiple asset classes. The user may specify a split attribute of "asset class," such that the system automatically splits the report section into multiple parts, each part including a table displaying calculated financial data of different respective asset classes. In this example, the system automatically calculates the financial data to be put in each part of the report section by accessing and traversing one or more complex data structures (as described above and below). Example user interfaces and methods of the system for splitting of report sections are described in detail below in reference to FIGS. 15 and 58-61.

In some embodiments the system provides for automatic PDF report generation. In these embodiments, the system may initialize multiple instances of PDF generation processes in parallel. Each PDF generation process may be provided with an authentication token (which may be used to enable authenticated access of report data) and a context, such that the process may generate and render the report, and generate the PDF based on the rendered report. Generated reports may be automatically electronically delivered to a specified recipient, and/or the specified recipient may be provided with a notification that the report is generated and a link to access the generated report. Example user interfaces and methods of the system for automatic PDF generation are described in detail below in reference to FIGS. 71-73.

As also mentioned above, various embodiments of the system may include some or all of the aspects described herein. For example, an embodiment of the system includes linking to template report section, dynamic page generation, automatic splitting of report sections, and PDF report generation. However, other embodiments of the system may include fewer or other combinations of the aspects described herein.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

In an embodiment, a method comprises creating and storing, in memory of a computer, a graph having nodes and edges, wherein the nodes represent financial assets and any one or more of: accounts in which one or more of the assets are held; individuals who own one or more of the assets; or legal entities who own one or more of the assets; receiving and storing one or more bucketing factors and one or more column factors; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; creating and causing displaying a table view by forming rows based on the value nodes and forming columns based on the column result values.

In an embodiment, the method further comprises, for the bucketing factors, selecting a particular bucketing factor; applying the particular bucketing factor to the paths and receiving a bucketing result value; creating a value node for the result value; associating, with the value node, all child nodes of the paths having bucketing result values that match the value node.

In an embodiment, the method further comprises, for the column factors, for the value nodes, and for paths associated with a particular value node, applying a particular column factor to a particular path and receiving a column result value; associating the column result value with the particular value node. In one feature, the edges represent any one or more of: ownership; containment; or data flow. In another feature at least two of the edges comprise a circular reference from a particular node to that particular node; further comprising determining, during the traversing, whether two sequences of two or more traversed nodes are identical, and if so, backtracking the traversal and moving to a next adjacency. In yet another feature one or more of the bucketing factors or column factors comprises an executable code segment configured to perform one or more mathematical calculations using one or more attributes of nodes in a path.

In still another feature one or more of the bucketing factors or column factors comprises an executable code segment configured to invoke a function of a network resource using one or more attributes of nodes in a path.

In an embodiment, the method further comprises generating and causing display of a graphical user interface comprising the table view and one or more info-graphics, wherein each of the info-graphics is programmatically coupled to the table view using one or more data relationships, and further comprising receiving user input selecting one or more rows of the table view and, in response, automatically updating the info-graphics to display only graphical representations of the one or more rows of the table view that are in the user input.

In an embodiment, the method further comprises generating and causing display of a graphical user interface comprising the table view; causing displaying a bucketing factor menu identifying one or more available bucketing factors; receiving a selection of a particular bucketing factor; re-traversing the graph and applying the particular bucketing factor to the paths to result in associating second sets of the nodes with second value nodes among the plurality of value nodes; re-creating and causing re-displaying an updated table view based on the second value nodes and the column result values.

In an embodiment, the method further comprises generating and causing display of a graphical user interface comprising the table view; causing displaying a column factor menu identifying one or more available column factors; receiving a selection of a particular column factor; re-traversing the graph and applying the particular column factor to the paths and the value nodes to result in associating second column result values with the value nodes; re-creating and causing re-displaying an updated table view based on the value nodes and the second column result values.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a particular one of the graphical elements; creating and storing a filter that is configured to pass only data in the table view that corresponds to the particular one of the graphical elements; applying the filter to the table view and causing re-displaying the table view using only data in the table view that corresponds to the particular one of the graphical elements.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a one or more particular rows in the table view; updating the info-graphics by causing displaying graphical elements corresponding only to the particular rows in the table view.

In an embodiment, the method further comprises generating and causing display of a graphical user interface comprising the table view and one or more info-graphics; receiving a selection of one row associated with an asset; updating the graphical user interface to display a summary of attributes of the asset, based on stored asset data or based on retrieving, at the time of the selection, the attributes of the asset from one or more global data sources.

In an embodiment, the method further comprises displaying, with the summary of attributes of the asset, a transaction reference identifying a number of transactions previously completed by a particular perspective.

In an embodiment, the method further comprises receiving and storing a context comprising a perspective and/or a date, wherein the perspective identifies any of an individual, a group, and a legal entity; beginning the traversing at a first node associated with the perspective; receiving user input specifying a different perspective; repeating the traversing beginning at a second node associated with the different perspective and repeating the creating and causing displaying the table view, based on updated value nodes and updated column result values yielded from the different perspective.

In an embodiment, the method further comprises receiving an updated context comprising a changed date value; repeating the traversing, creating and causing displaying the table view based on updated value nodes and updated column result values yielded from re-applying the column factors using the changed date value.

2.0 Structural and Functional Overview

The computer system provides wealth management capabilities that enable non-technical users to create new views, reports, and other manipulations of a dataset without the need for custom programming. Custom views can be created in any user session by selecting particular columns, factors or metrics, ordering, filters providing groupings, graphics and other aspects of a desired view. The resulting views can be saved and reused in later sessions. However, a view that is needed only on a one-time basis also may be constructed rapidly using atomic components without specialized programming knowledge. Further, views may be shared with others such as team members, clients, or other applications. Sharing may include exporting to an application such as a spreadsheet, transferring to a report generator, or other mechanisms as further described herein.

FIG. 1 illustrates a computer system that may be used to implement an embodiment. The computer memory 100 stores a graph 102 that represents a set of investment holdings. In an embodiment, client or customer investment data is received from one or more sources, such as brokerages, and transformed into position data prior to storage into a data repository for use by the system. Positions, in an embodiment, are considered the most fine-grained or atomic element of data manipulated in the system rather than, for example, an account.

Memory 100 forms part of a computer system having a processor, mass storage, input-output devices, and other elements that are omitted in FIG. 1 for purposes of clarity. A view computation unit 106 can access the graph 102 for purposes of traversing the graph in response to different configuration data and generating output one or more table views 105 in the manner described further herein. View computation unit 106 may be coupled to a rendering unit 107 for rendering and communicating table views 105 to any of a computer display unit 108 or an electronic document 111 of any form such as a report, spreadsheet file, etc. In an embodiment, report unit 109 is configured to receive view data from view computation unit 106, facilitate transfer of view data to pages of reports, and receive user input specifying metadata for report formatting controls, as further described herein.

View computation unit 106 and graph 102 are implemented using object-oriented programming techniques in which nodes of the graph are represented using programmatic objects. For example, JAVA® may be used.

The foregoing elements of FIG. 1 may form part of a server computer 118 that is coupled directly or indirectly through one or more computer networks, represented by network 114, to a client computer 116. Network 114 may comprise one or more LAN, WAN, or internetwork links and may comprise the public internet through the use of appropriate protocols for ensuring data security, user authentication and user authorization. Client computer 116 may comprise an individual client computing device such as personal computer, workstation, laptop, netbook, tablet computer, or smartphone that is coupled through a computer network to the other elements of FIG. 1. Client computer 116 hosts an internet browser program which may be configured with virtual machine program execution capability. For example, client computer 116 may host a JAVA virtual machine and may receive and execute one or more JAVA files that cause the browser to display a graphical user interface that receives data (for example, user interface data) from and facilitates interaction with the server computer 118 and view computation unit 106.

View computation unit 106 also may be coupled to a custodian interface unit 113 that is coupled directly or indirectly through network 114 to an asset custodian computer 120. Asset custodian computer 120 serves as an authoritative source of data about accounts and asset positions associated with individuals or other entities represented in data repository 104 and graph 102. Custodian interface unit 113 is configured to obtain account and position snapshot data periodically or through live data feeds from asset custodian computer 120. Inbound data may be transformed from account-level data into position-level data and stored in data repository 104 or represented in graph 102 in memory for further reference and manipulation.

Embodiments may also interface in a similar manner to global data sources such as market data feeds that are independent of particular accounts or positions but report current or historic market value of assets or instruments. Examples of sources of global data include Thomson Reuters, New York Stock Exchange, NASDAQ, etc. In such an embodiment, global data sources may or may not override asset values that are stored in the graph, based on configuration data. For example, a particular node of graph 102 representing an asset may store an asset value attribute that was obtained from positions data derived from account data obtained from an asset custodian. However, if the asset is, for example, a market traded security, then a current intraday value for the asset may be available from the global data source. Configuration data may indicate whether global data source values for assets should override position data obtained from a custodian or other sources.

A set of investment holdings may be associated with an individual, a legal entity, or a group of individuals and/or legal entities such as one or more clients of an RIA firm. Graph 102 may be formed in memory 100 based on data records obtained from data repository 104. Graph 102 may comprise any number of nodes and edges, and the particular graph shown in FIG. 1 is provided solely to illustrate one example and not as a requirement or limitation.

Graph 102 may comprise nodes and edges having any level of complexity, and there is no requirement that nodes are organized in a hierarchical arrangement; circular references may be represented. As an example, graph 102 comprises nodes for individuals named Beth and Ken who have an ownership or trusteeship relationship to a Trust. The Trust is related to a company, Alpha Holdings LLC, which is also related to a second company, Beta Holdings LLC that may own a Brokerage Account having instruments i1, i2, i3. Instruments i1, i2, i3 may represent stocks, bonds, options, or any other financial instrument that may be traded or receive an investment; for purposes of illustrating a example, three (3) instruments are shown in FIG. 1 but practical embodiments may use any number of instruments. Beta Holdings LLC further has a relationship to Ken and instrument i1 has a relationship to Beth; these relationships circle back within the graph and provide examples of non-hierarchical node-edge relationships. For example, one circular reference is the path Ken→Trust→Alpha Holdings LLC→Beta Holdings LLC→Ken.

The edges of the graph 102 may represent any type of relationship among the nodes connected by the edge. For example, the edges may represent asset ownership relationships, liability relationships, equity ownership relationships, data flow relationships, and/or the like. Thus, for example, one node may represent a security, another node may represent a brokerage account, and an edge connecting the two node may represent that the first node owns a particular number of shares of the second node.

As a further example, edge 110 may represent a flow of instrument data from a third party data source such as a brokerage data feed. For example, edge 110 could represent a brokerage data feed for instrument i1 indicating that Beth owns 200 units, such as shares, having a value of 25 per unit. Edge 110 may also represent an ownership relationship separate from value attributes. Edge 110 or other edges may represent other concepts such as issuance of an asset; thus, one node may represent an issuer of an asset, another node may represent the asset, and an edge connecting the two nodes may represent that the first node issued the second node.

Graph nodes may receive data for attributes of the nodes from a custodian, from a global data source, or from other data in the data repository. For example, processing a particular client's custodial account may enable populating the graph 102 with some, but not all, values of attributes that are defined in the graph model. In an embodiment, view computation unit 106 is configured to investigate alternative data sources to supply missing node attribute values when all attribute values are not available from a custodian. For example, a particular global data source may have a sector attribute value that the custodian does not have, and if so, the substitute value indicating sector may be added to a node attribute. As another example, if data previously received from a custodian is determined to be stale, then updated data could be requested from one of the global data sources.

Further, overriding prior values is made straightforward through the representation of ownership relationships in graph edges, whereas nodes represent assets per se, possibly with value attributes. Consequently, modifying a value attribute of an asset node, based on received market-based values, enables the received values to affect all calculations that reference the asset node. Other asset node attributes may propagate in a similar manner. For example, if a particular RIA user modifies an asset node representing ALPHA COMPANY to add an earnings report document as an attribute, all clients of that particular user who own positions in ALPHA COMPANY obtain access to the earnings report through principles of object inheritance.

Figure 4:
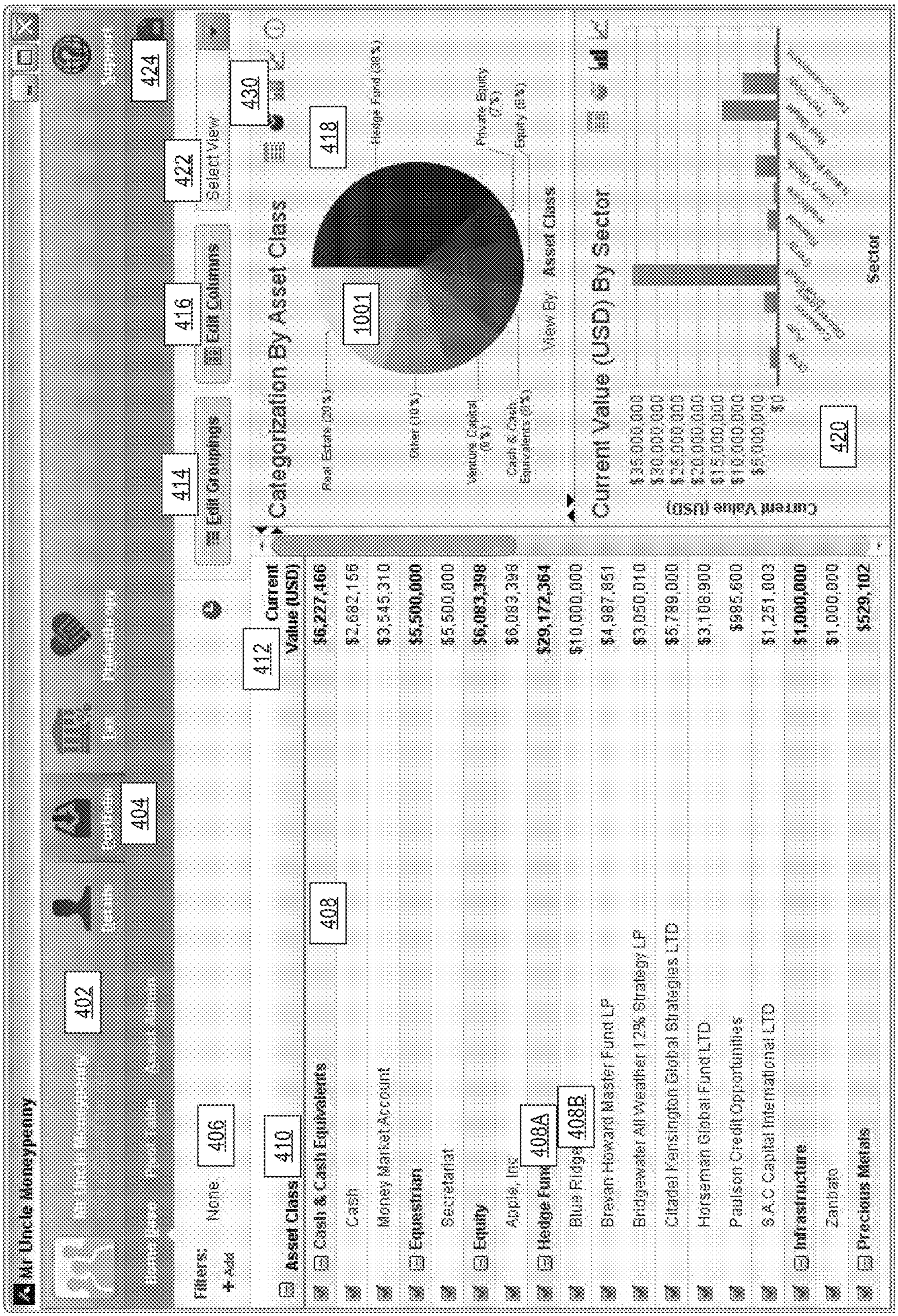
FIG. 4 illustrates an example of a graphical user interface for a computer display unit.

View computation unit 106 is configured to transform graph 102 into one or more table views, graphs, charts, and other output. Tables, charts, graphs, and other components that may be inserted into user interfaces and/or reports of the present disclosure may be referred to herein as elements, report elements, or in some instances widgets. For purposes of illustrating the example embodiments which follow, FIG. 4 illustrates an example of a graphical user interface for a computer display unit. In an embodiment, the elements of FIG. 1 and the output of FIG. 4 are implemented using the ADDEPAR computer software system commercially available from Addepar, Inc., Mountain View, Calif.

FIG. 4 illustrates a view of holdings from the perspective of an individual named Uncle Moneypenny as indicated by Perspective label 402. A Portfolio tab 404 indicates that the user is viewing a portfolio of holdings of Moneypenny. A Filters region 406 indicates that no data display filters are presently applied to change a view of the data in the GUI. Selecting an Add link in the Filters region causes view computation unit 106 to display a GUI widget that may receive definitions of filters, as further described herein.

FIG. 4 comprises a table view 408 which, for purposes of illustrating a example, comprises rows organized by asset class as indicated by an Asset Class bucketing label 410 and columns showing asset class name and current value as indicated by column label 412. Assets within Asset Class 410 are organized in a hierarchy or tree in which boldface labels 408A indicate an asset class bucket and non-bold labels 408B indicate individual assets within the associated asset class bucket.

Selecting an Edit Groupings widget 414 causes view computation unit 106 to display a GUI dialog that may receive reconfiguration of data values that determine the identity and order of buckets and therefore the particular manner of displays of rows of the table view 408.

Figure 6:
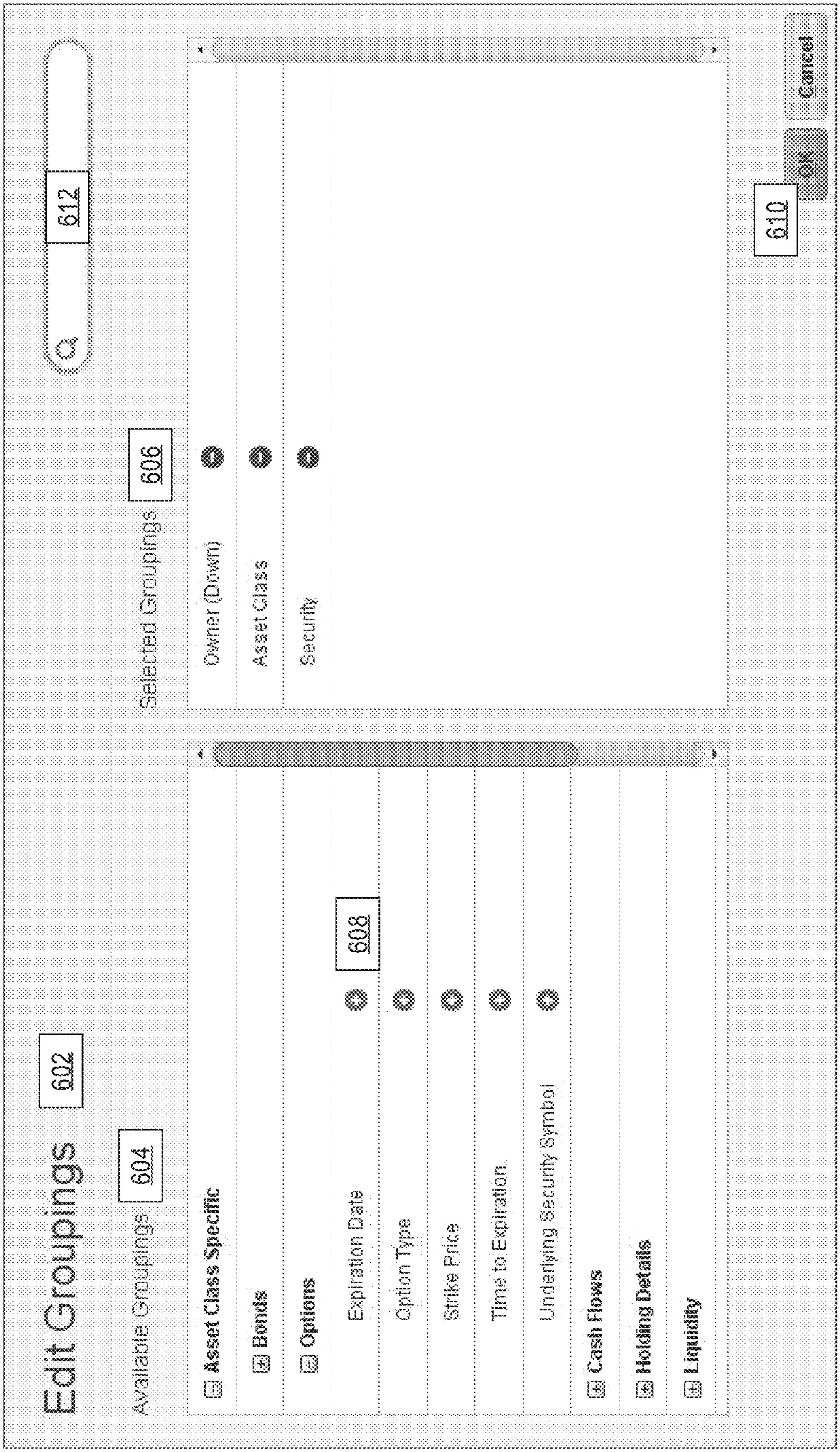
FIG. 6 illustrates an example Edit Groupings dialog that displays a list of currently selected groupings and a tree representation of available groupings.

FIG. 6 illustrates an example Edit Groupings dialog 602 that displays a list of currently selected groupings 606 and a tree representation of available groupings 604. A comparison of selected groupings 606 to FIG. 4 will show that the selected groupings of FIG. 6 are represented in FIG. 4. User selection of a remove (–) icon in the selected groupings 606 causes the view computation unit 106 to remove the selected grouping from selected groupings 606; subsequent selection of OK widget 610 in dialog 602 causes view computation unit 106 to close the dialog and re-display the table view 408 without the removed grouping. User selection of open (+) and close (–) icons in the tree display of available groupings 604 causes categories of groupings to open until leaf nodes of the tree are shown. For example, in FIG. 6 the user has selected open icons for Asset Class Specific and Options, yielding a list of available option groupings 608.

Figure 8:
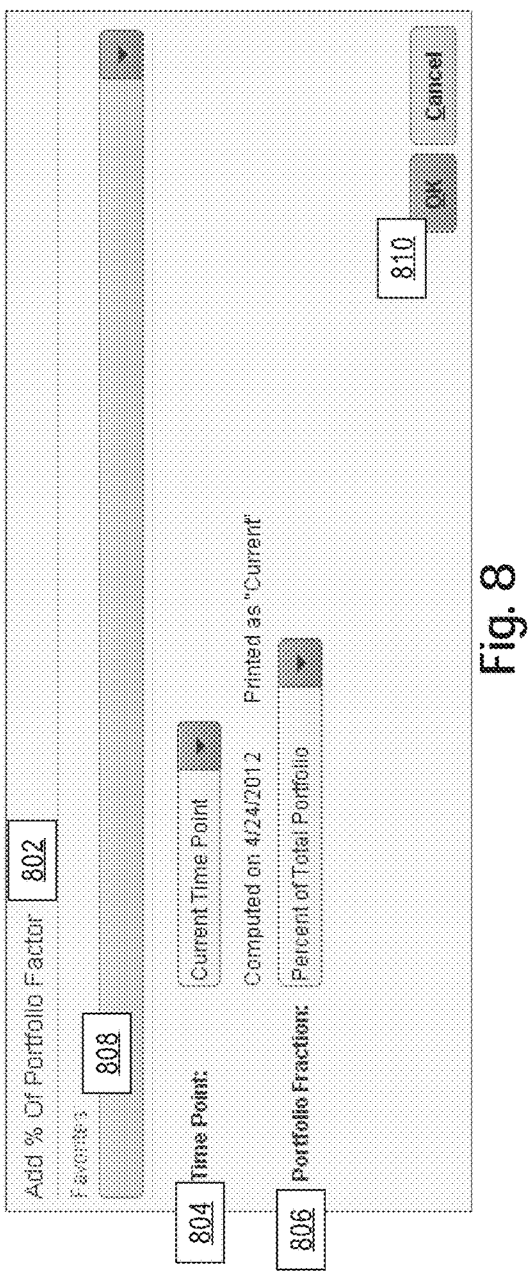
FIG. 8 illustrates an example configuration dialog for a Factor.

Selecting an add (+) icon associated with any of the available option groupings 608 causes view computation unit 106 to add the selected option grouping to selected groupings 606; subsequent selection of OK in dialog 602 causes view computation unit 106 to close the dialog and re-display the table view 408 with the added grouping. For some groupings, selecting the add (+) icon causes view computation unit 106 to display a Factor details dialog that prompts the user to enter or confirm one or more configuration values associated with a Factor that drives the grouping. FIG. 8 illustrates an example configuration dialog for a Factor. For example, assume that a user selects, from Available Groupings, Holding Details and then % of Portfolio. In response, view computation unit 106 causes displaying dialog 802, which comprises a Time Point widget 804 and Portfolio Fraction widget 806 that prompt the user to select one of several available values using drop-down menus. Alternatively, the user may select Favorites drop-down menu 808, which associates labeled menu items with stored values for Time Point and Portfolio Fraction. Selecting the OK widget 810 causes view computation unit 106 to close the dialog and store the specified values for Time Point and Portfolio Fraction in association with the % of Portfolio Factor, for use in subsequent computations. Thus, the system provides extensive opportunities for flexible customization by specifying the desired basis for computation, without requiring custom programming of algorithms or methods for particular factor computations.

Referring again to FIG. 6, a search box 612 may receive user input of keywords associated with groupings and causes view computation unit 106 to update available option groupings 608 with values that match the keywords.

Figure 7:
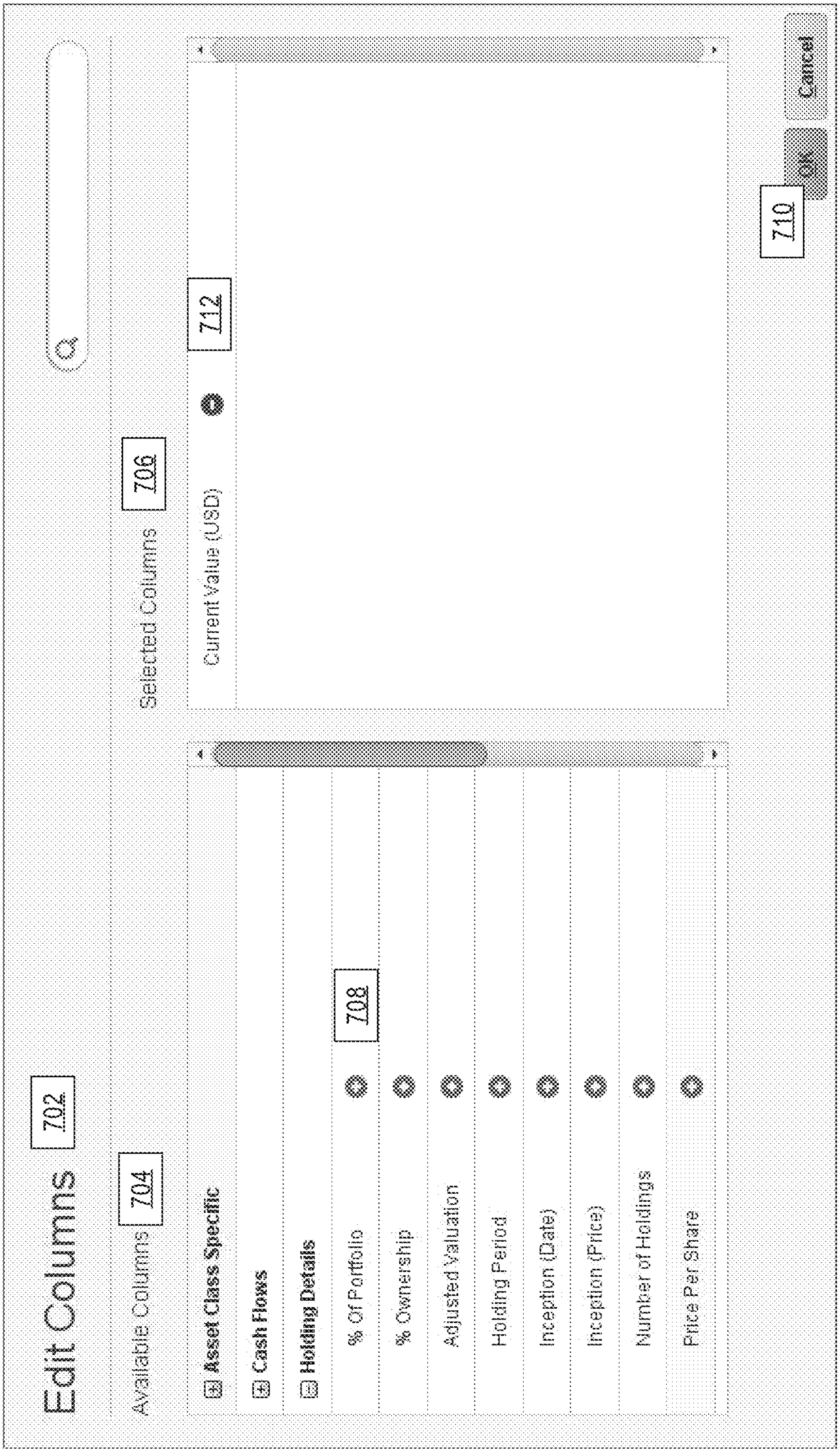
FIG. 7 illustrates an example Edit Columns dialog that displays a list of currently selected columns and a tree representation of available columns.

Referring again to FIG. 4, selecting an Edit Columns widget 416 causes view computation unit 106 to display a GUI widget that may receive reconfiguration of data values that determine the identity and order of columns of the table view 408. FIG. 7 illustrates an example Edit Columns dialog 702 that displays a list of currently selected columns 706 and a tree representation of available columns 704. A comparison of selected columns 706 to FIG. 4 will show that the selected columns of FIG. 7 are represented in FIG. 4. User selection of a remove (–) icon in the selected columns 706 causes the view computation unit 106 to remove the selected column from selected columns 706; subsequent selection of OK widget 710 in dialog 702 causes view computation unit 106 to close the dialog and re-display the table view 408 without the removed column. User selection of open (+) and close (–) icons in the tree display of available columns 704 causes categories of columns to open until leaf nodes of the tree are shown. For example, in FIG. 7 the user has selected open icons for Holding Details, yielding a list of available option columns 708.

Selecting an add (+) icon associated with any of the available option columns 708 causes view computation unit 106 to add the selected option column to selected columns 706; subsequent selection of OK in dialog 702 causes view computation unit 106 to close the dialog and re-display the table view 408 with the added grouping. In some cases, selecting the add icon may cause the view computation unit 106 to display a dialog of the kind shown in FIG. 8 for groupings, with configuration parameter values applicable to the particular selected column. A search box 712 may receive user input of keywords associated with columns and causes view computation unit 106 to update available option columns 708 with values that match the keywords.

The GUI of FIG. 4 further comprises a Select View dropdown menu 422 that may be used to select and apply different views that have been previously created and saved by others. For example, in FIG. 4 the GUI comprises a table view 408 and one or more info-graphics such as categorization pie chart 418, and bar chart 420. As an example, table view 408 reflects an ownership breakdown by asset class and value; other view selections may cause view computation unit 106 to display different combinations of buckets and columns, tables, charts and graphs. In FIG. 4 and other drawing figures herein, the info-graphics comprise a pie chart and a bar chart, solely to illustrate examples; however, in an embodiment, the GUI of FIG. 4 comprises two or more info-graphic option icons 430 indicating the availability of a table view, pie chart, bar chart, or line graph. Other embodiments may support info-graphics of other types. View computation unit 106 is configured to receive user input selecting one of the info-graphic option icons 430 and, in response, to change the info-graphic panel adjacent to the selected option icon to a different form of info-graphic. For example when pie chart 418 is displayed, selecting a line graph icon from among option icons 430 causes view computation unit to display a line graph in place of the pie chart and using the same underlying data as a basis for the line graph.

Figure 13A:
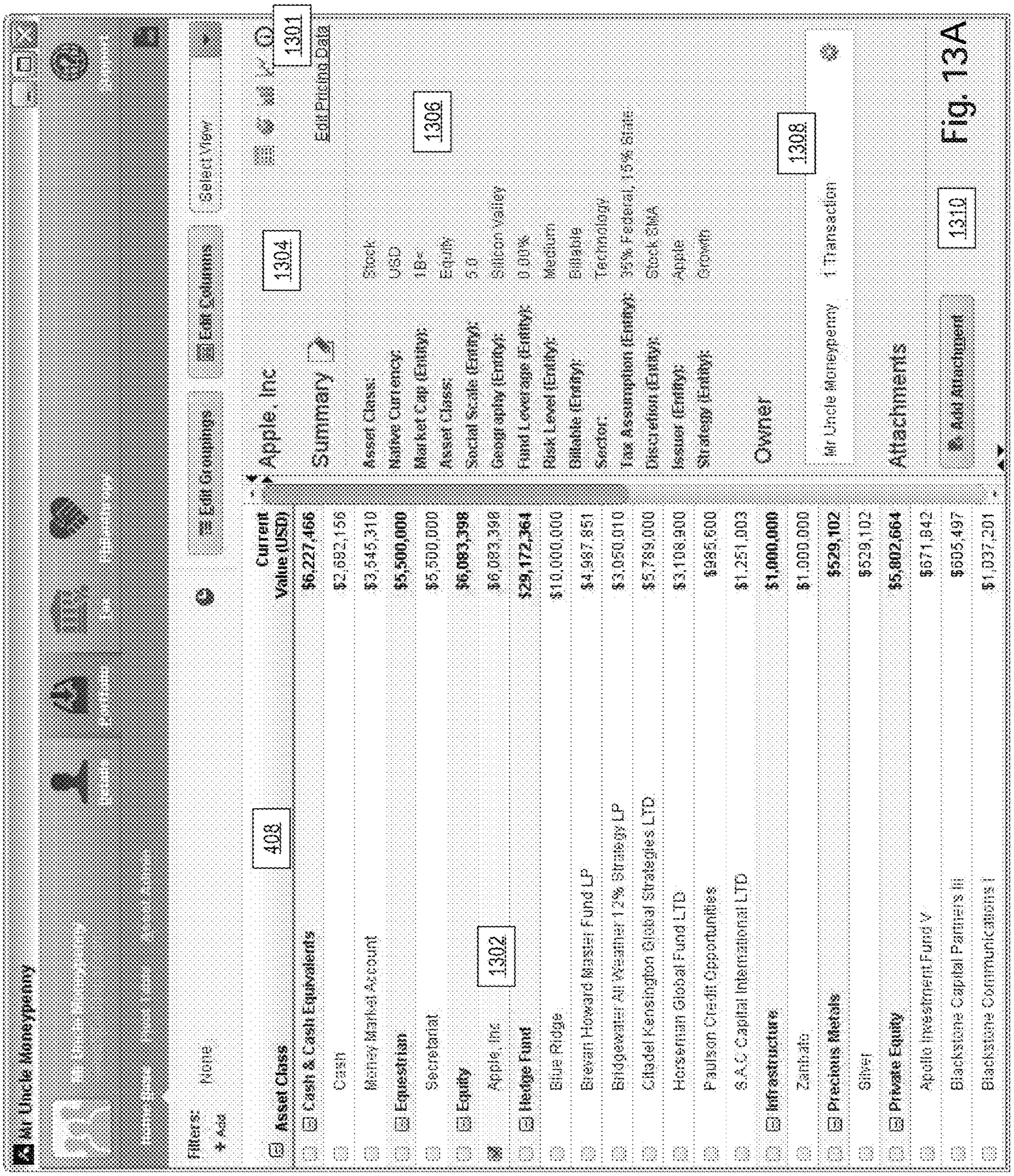
FIG. 13A illustrates the display of FIG. 4 showing asset details.

In an embodiment, icons 430 include an asset details icon that may trigger display of detailed information about a particular asset that has been selected in the table view 408. FIG. 13A illustrates the display of FIG. 4 showing asset details. In the example of FIG. 13A, in table view 408 one asset 1302 is selected as indicated by a checkbox in the row of the selected asset, and asset details icon 1301 has been selected. View computation unit 106 is configured, in response to a selection of the asset details icon 1301, to cause displaying in the info-graphics area of the display, an asset details panel 1304 comprising a summary sub-panel 1306, owner sub-panel 1308, and attachments sub-panel 1310. In an embodiment, summary sub-panel 1306 lists attributes pertaining to the selected asset, which view computation unit 106 may obtain by retrieving from data repository 104. Owner sub-panel 1308 specifies one or more owners of the selected asset; the owners are those individuals, clients or legal entities that are associated with the current logged in user of the system. For example, when the user is an RIA, the Owner sub-panel 1308 may identify all clients of that user who have a position in the selected asset. Owner sub-panel 1308 further comprises a selectable hyperlink label indicating the number of transactions that each owner has completed for the selected asset; in the example of FIG. 13A, "1 Transaction" is indicated. View computation unit 106 is configured, in response to selection of the hyperlink label, to retrieve information describing the transactions of that owner and display transaction detail in a pop-up menu. Consequently, a user is able to rapidly obtain transaction data for assets of clients or legal whose holdings are represented in the system, from within a display that has extensive viewing capabilities.

Figure 5:
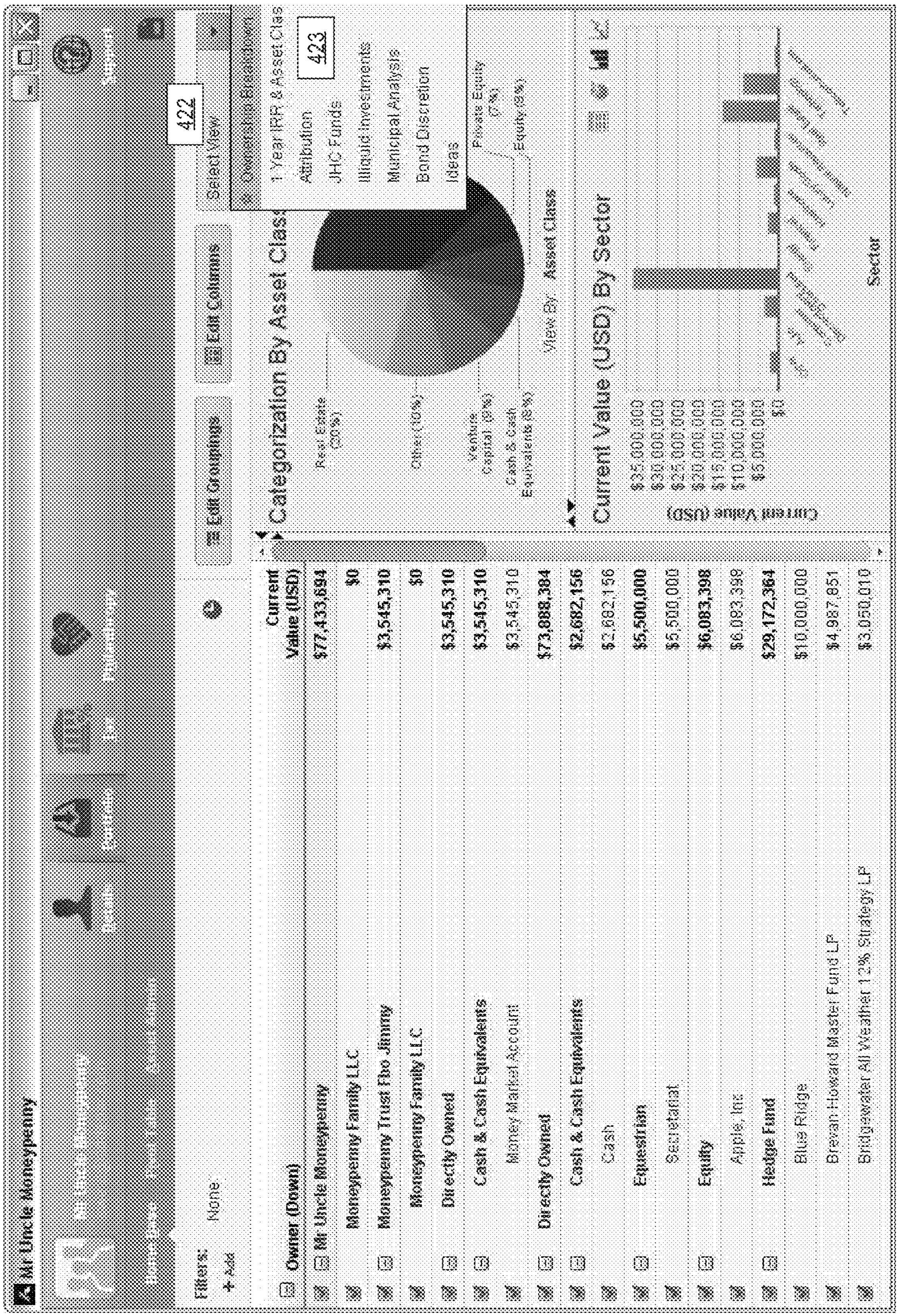
FIG. 5 illustrates the display of FIG. 4 in which dropdown menu has been selected and shows a plurality of named previously created views in a list.

FIG. 5 illustrates the display of FIG. 4 in which dropdown menu 422 has been selected and shows a plurality of named previously created views in a list 423. Selecting any particular view from list 423 causes view computation unit 106 to replace table view 408 with a new view based on the bucket Factors and column Factors that were defined for the selected view, and to update pie chart 418 and bar chart 420 based on the data in the new view. Replacement of the view involves re-computing the view based on the bucket Factors, column Factors and current Perspective of Moneypenny, in the manner described further herein. In some embodiments, pie chart 418 and bar chart 420 are replaced with different graphical views of data or removed completely.

In an embodiment, each of the info-graphics such as pie chart 418 and bar chart 420, by default, display charts and graphs based on the data that is then currently shown in table view 408. However, in an embodiment, view computation unit 106 is configured to respond to a selection of any of the info-graphics by updating the table view 408.

In an embodiment, the GUI of FIG. 4 further comprises an Export widget 424 which, when selected, begins operation of a report and data export function, as further described herein.

Embodiments operate in part based upon stored data representing a Context of a particular view of the graph 102. In an embodiment, a Context comprises a Perspective and/or a Date (or date range, also referred to herein as a time period). A Perspective indicates an individual, legal entity, or group and a Date indicates a time point at present or in the past. For example, a view of graph 102 from the Perspective of Ken may be different than a view generated from the Perspective of Beth. In an embodiment, a Perspective may comprise two or more individuals, such as a husband and wife, groups, or multiple legal entities. A change in Perspective results in a change in calculations of values of assets, in many cases. For example, the value of an asset from a particular Perspective typically depends upon the percentage of ownership of a particular person or legal entity. As an example based upon graph 102, the percentage of ownership in Beta Holdings LLC may be quite different for Beth and for Alpha Holdings LLC because of the presence or lack of intervening individuals or legal entities with different ownership arrangements, shares or percentages.

Graph 102 may be represented in a backing store such as a relational database system, represented in FIG. 1 by data repository 104. In an embodiment, each node in graph 102 is a row in a table in the database. An Edges table identifies edges in graph 102 in terms of identifiers of nodes from which an edge begins and to which an edge connects (FromID, ToID). In an embodiment, during operation all rows from the database are loaded into main memory and organized in a graph representation in memory for use during a user session. In an embodiment, view computation unit 106 interacts with graph model logic 112 to implement a graph model and perform graph manipulation operations; in various embodiments, the graph model logic may comprise custom code or may be based on an open-source project such as Tinkerbell.

Embodiments also apply one or more Factors as part of generating views. In an embodiment, a Factor may be any recognized financial metric. A Factor, for example, may be internal rate of return (IRR). A Factor is a computational unit that receives, as input, a path from a graph such as graph 102 and a Context.

For a table view, each Factor may be used as either a bucketing Factor or a column Factor. An example of a bucketing Factor is asset class, and an example of a column Factor is value. Based on such a configuration, an output table view would comprise rows identifying asset classes and a value for each asset class. The configuration of asset class as a bucketing Factor and value as a column Factor causes the view computation unit 106 to compute values by traversing graph 102 and consolidating values in terms of asset classes. In an embodiment, configuring a column Factor may be accomplished by selecting a user interface widget and selecting a Factor from a drop-down list. Selecting an additional column Factor causes view computation unit 106 to re-compute the table view by again traversing graph 102. For example, if IRR is configured as a column Factor, and rows in the table view represent Instruments, then the table view will comprise a column that shows an IRR value for each Instrument.

Further, selecting a second bucketing Factor causes the view computation unit 106 to re-compute the table view by consolidating values in terms of the second bucketing Factor; the resulting table view is displayed hierarchically so that multiple bucketing Factors are nested. For example, these techniques allow generating a table view that displays assets by asset class, then by owner, etc. In an embodiment, a user may re-order the bucketing Factors within a graphical list of all selected bucketing Factors, and the re-ordering causes the view computation unit 106 to re-compute and re-display the table view using a different hierarchy of bucketing Factors based on the re-ordered list of bucketing Factors.

3.0 Generating Table Views from Graphs

Figure 2:
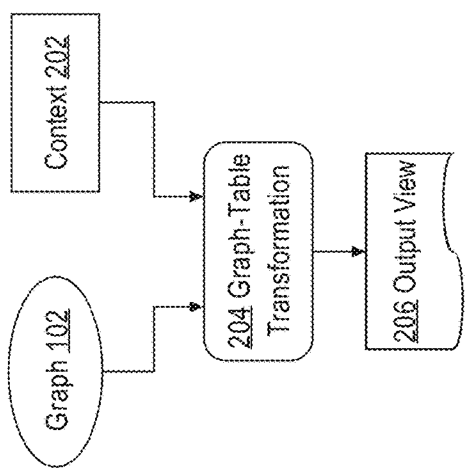
FIG. 2 illustrates a high-level view of a graph transformation.

To display a view of the data in graph 102 in a form that is familiar to the typical user, the graph is transformed into a table view consisting of rows and columns for display in a graphical display of a computer display unit. FIG. 2 illustrates a high-level view of a transformation. In general, a graph 102 and a Context 202 are received as input to a graph-table transformation 204, which generates an output view 206. The output view 206 may comprise a table, chart, or other output that is visually perceivable at a graphical display unit.

Figure 3A:
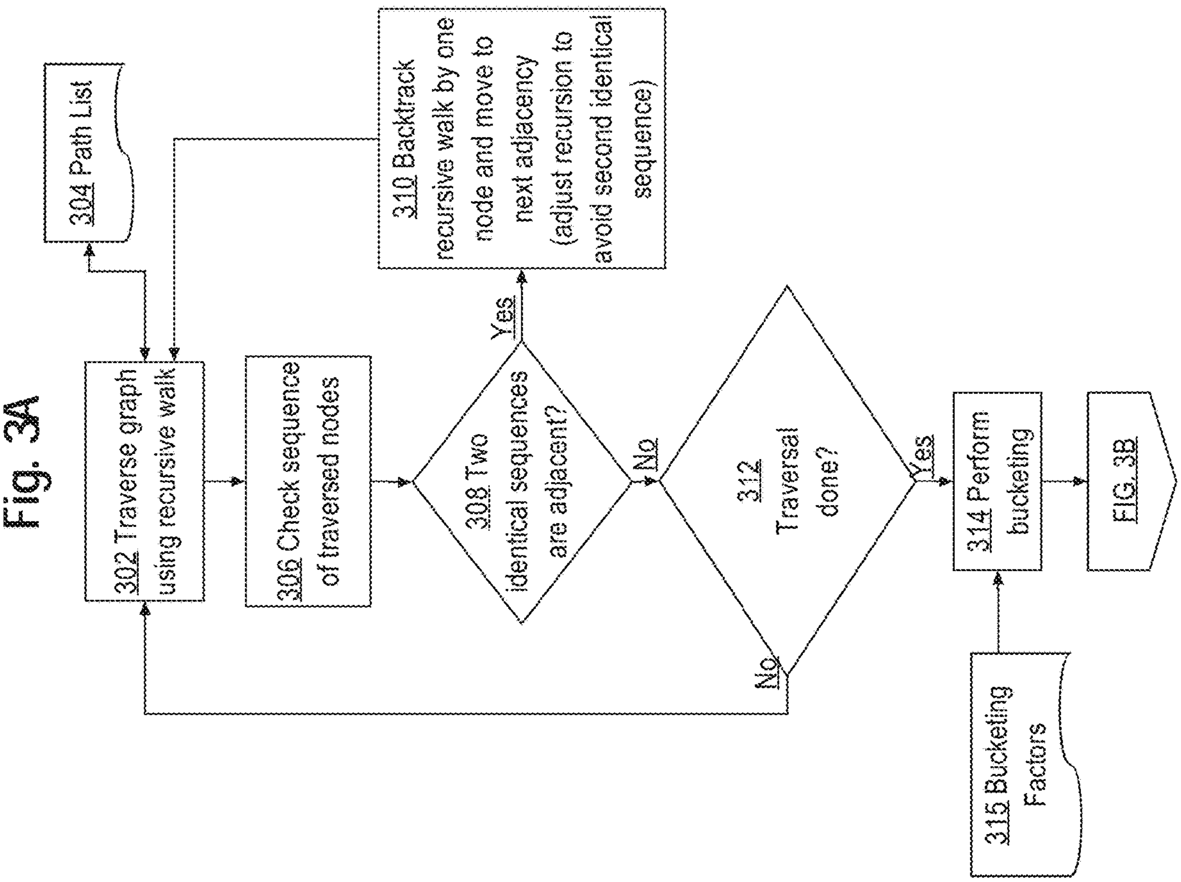
FIG. 3A illustrates a process of generating a table view based on a graph representing a set of financial asset holdings.

FIG. 3A illustrates a process of generating a table view based on a graph representing a set of financial asset holdings. In an embodiment, a view of data in a particular Context is created by computer-implemented processes that walk graph 102, creating and storing a plurality of paths within the graph. In block 302, the graph is traversed and a plurality of paths through the graph are stored in a path list 304. Traversal may use recursive transition techniques and either depth-first or width-first traversal is workable. In an embodiment, the graph is traversed starting at a source node as specified by the Perspective of the Context. For example, assume that the Perspective is Ken; graph traversal begins at the Ken node and the path list 304 would contain:

[Ken]

[Ken, Trust]

[Ken, Trust, Alpha Holdings LLC]

[Ken, Trust, Alpha Holdings LLC, Beta Holdings LLC]

[Ken, Trust, Alpha Holdings LLC, Beta Holdings LLC, Brokerage Account]

and so forth.

Changing the Context causes the view computation unit 106 to re-compute a set of paths from the changed Perspective or Date represented in the changed Context. For example, if a user during a single session changes from Ken to Beth, any and all displayed table views would re-compute and would be re-displayed, illustrating holdings from the Perspective of Beth. The Perspective also could be for Trust, causing the view computation unit 106 to re-display a table view illustrating values from the point of view of the Trust without regard to what percentages are owned by particular human individuals.

Because the same processes described herein are re-performed based on a different root node as indicated by the Perspective, the processes herein offer the benefit of rapid generation of completely different asset value and holdings displays even when the newly selected Perspective is unrelated to a prior Perspective. Further, users have complete flexibility in how to display asset holdings and custom programming is not required to obtain displays that reflect different roll-ups or different user ownership regimes.

Figure 9A:
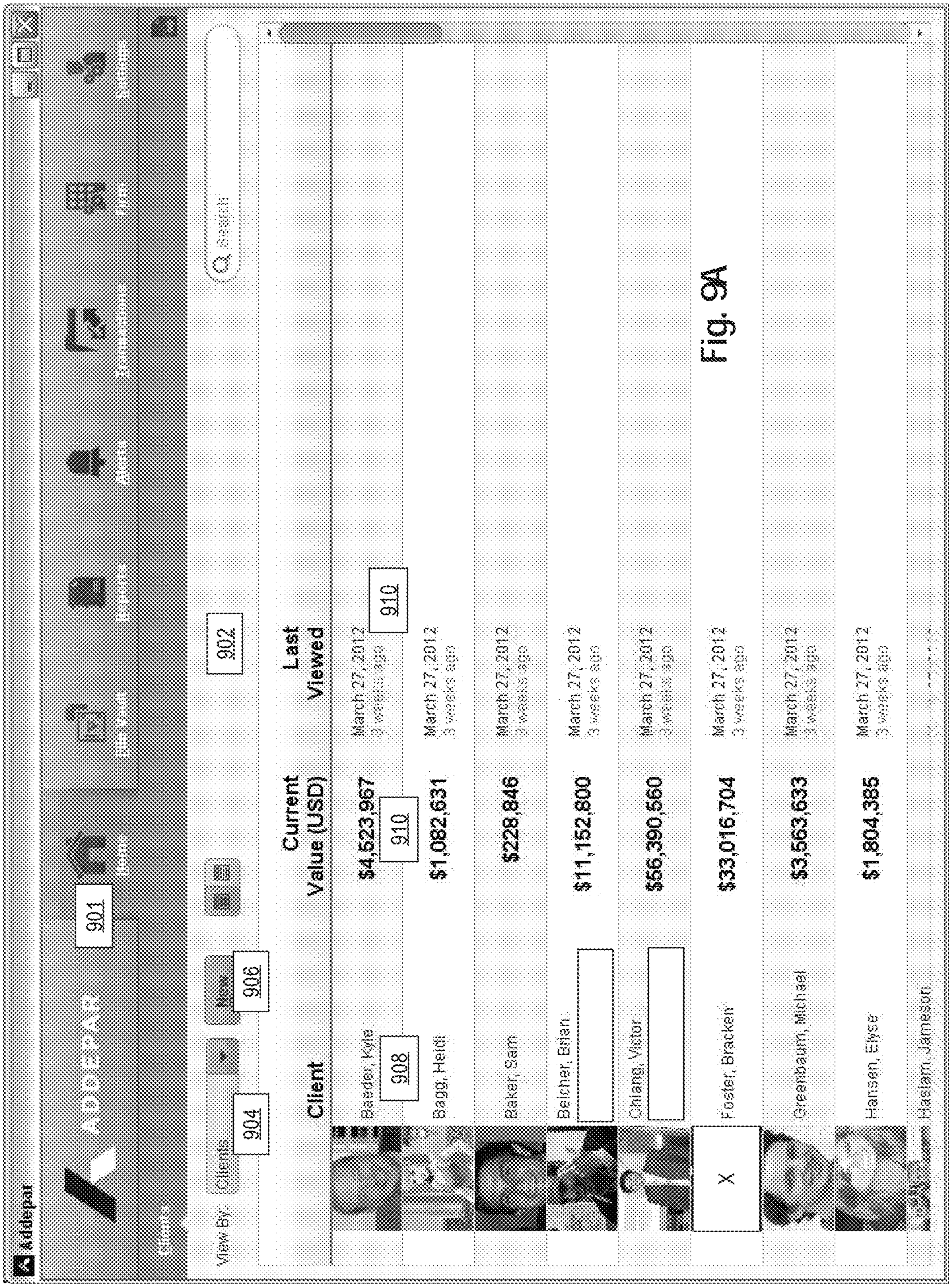
FIG. 9A illustrates a home screen display illustrating a portfolio summary view from the Perspective of Clients.

For example, FIG. 9A illustrates a home screen display 902 illustrating a portfolio summary view from the Perspective of Clients. In an embodiment, display 902 comprises a view type pull-down widget 904 which, when selected, displays a list of available views. Selecting a New widget 906 opens a dialog in which a user may specify configuration values for a new Person or Group, which then can be referenced in views. In the case of a Clients view, screen display 902 comprises a Client column 908 that identifies a person, a Current Value column that identifies aggregate current value of all holdings of that client, and a Last Viewed column that indicates the last time that the current user viewed the data.

Figure 9B:
FIG. 9B illustrates another example in which widget and a Family option has been selected.

FIG. 9B illustrates another example in which widget 904 and a Family option has been selected. In response, view computation unit 106 has re-traversed the graph 102 and consolidated values based on family membership; to support such a view, family relationships are represented in graph 102, for example using edges labeled as family relationships to connect nodes of various individuals. In the example of FIG. 9B, the view comprises a Family column 920 and Current Value column 922, which are the only columns defined for the Family view. Selecting an open (+) widget for a particular Family causes the view computation unit 106 to display child nodes of the named family and Current Value totals for the child nodes. Similar views may be generated for legal entities such as trusts. A view of Current Value for a legal entity such as a trust is given from the trust's perspective and will indicate total value of all known assets, even if the current user (for example, a particular financial advisor) only works with one individual who owns a minority stake in the trust.

The example of FIG. 1 includes circular references, and FIG. 3A implements logic to prevent block 302 from causing an infinite loop, while permitting accurate representation of the value of assets by permitting edges to loop back once. In particular, FIG. 3A incorporates logic that permits a cycle to occur only once. In an embodiment, at block 306, a sequence of already traversed nodes is periodically checked and in block 308 the process tests whether two identical sequences are adjacent. For example, if nodes are labeled with alphabetic character labels, then the traversal sequence ABCAB is considered valid, but the sequence ABCABC is invalid. Although the first sequence includes two instances of path Aft the instances are not adjacent; however, in the second sequence, two instances of path ABC are adjacent and therefore invalid. Referring again to FIG. 1, the sequence [Ken, Trust, Alpha Holdings LLC, Beta Holdings LLC, Ken, Alpha Holdings LLC] is valid, but [Ken, Trust, Alpha Holdings LLC, Beta Holdings LLC, Ken, Trust, Alpha Holdings LLC, Beta Holdings LLC] is invalid.

In block 310, upon detecting an invalid identical adjacent sequence, the process backtracks the recursive walk of the graph by one node and moves to the next adjacency. In effect the process adjusts internal recursion steps to avoid re-traversing a second identical sequence. Traversal continues until all nodes, edges and adjacencies have been traversed, as represented in the test of block 312. Upon completion, path list 304 is fully populated with all valid paths through the graph.

Figure 3B:
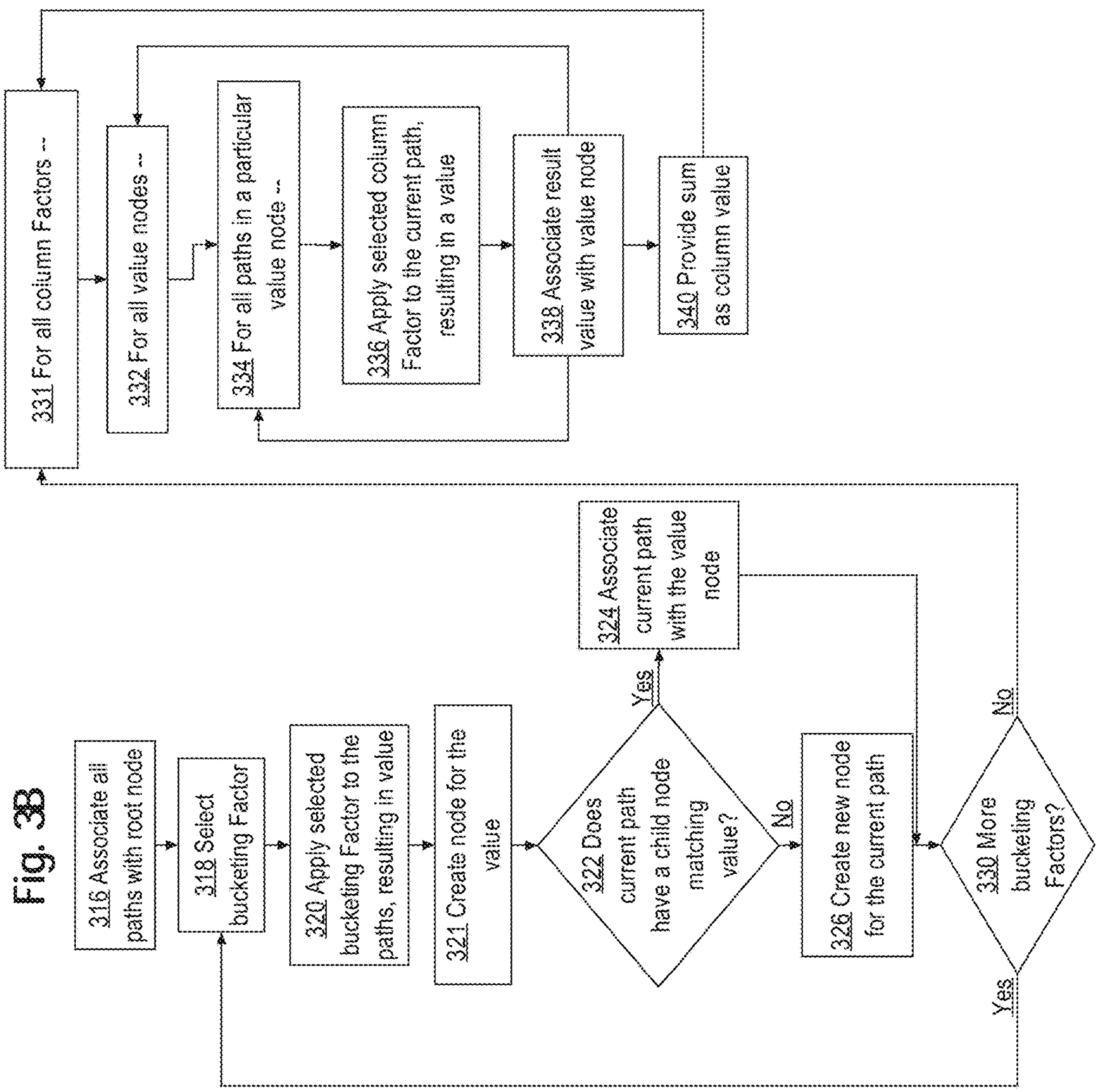
FIG. 3B illustrates other steps in the process of FIG. 3A.

At block 314, a bucketing process is performed to form nodes in the paths into a tree (also referred to herein as a "bucketing tree") or other hierarchy of buckets as specified by the then-current configuration of bucketing Factors 315. Referring now to FIG. 3B, at block 316, a root node (also referred to herein as a "root value node" and/or a "root node" of the bucketing tree) for the tree is created in memory and initially all paths in the path list 304 are associated with the root node. At block 318, a bucketing Factor is selected, and block 318 forms a loop with block 330 that iterates through all configured bucketing Factors. For example the first selected bucketing Factor could be asset class.

At block 320, the selected bucketing Factor is applied to all the paths in the path list 304, resulting in generating a value for the bucketing Factor. The following pseudocode represents applying a factor in an embodiment:

```
for (path: paths) {
val=factor.apply (path)}
factor <T>
T apply (list <Path>, Context)
```

If the first selected bucketing Factor is asset class, then the resulting value val might be Stock, Bond, etc. At block 321, a node in the tree hierarchy is created for the value; for example, a Stock node is created. At block 322, the process tests whether the current node (initially the root node) has a child node that matches the value. Thus, one test would be whether the root node has a Stock node as a child node. If the result is YES, then the current path is associated with the value node that was created at block 321. For example, if the current node has an ALPHA COMPANY Stock node as a child, then the ALPHA COMPANY Stock child node is associated with the Stock value node as shown at block 324. If the result of the test at block 322 is NO, then at block 326 a new node is created for the current path. Another example of the bucketing process is described below in reference to FIGS. 13C-13E.

In various embodiments, various filtering or correction processes may be applied to improve the appearance or analytical value of the result of bucketing. For example, certain bucketing Factors may return values that are too granular to justify creating a new value node, so the return values could be aggregated into a larger bucket. As a particular example, if IRR is a bucketing Factor and returns a value of 1.2, the process could elect to associate that result with a "1.0 to 5.0" IRR bucket, and associated value node, rather than creating a new value node just for IRR results of 1.2.

In an embodiment, configuration data may define the range of values that are included in a particular bucket, so that the nature of buckets may be customized on a per-user or per-session basis. For example, assume that a user wishes to classify stock assets as Large Cap, Mid Cap, Small Cap; different users may wish to define ranges of market capitalization differently for each of the three (3) classifications. In an embodiment, graphical user interface widgets may be selected to identify particular bucketing Factor values and the ranges of result values that each bucketing Factor should yield. Further, in an embodiment, any user may create any other desired new bucketing Factor by configuring a generic bucketing Factor to trigger on the presence of a particular metadata value in a particular asset or node. For example, a user could create a Hedge Fund Strategy (Quant) bucketing Factor that will classify assets into a node, ultimately causing reporting them as a row in a table view, when the value of a Hedge Fund Strategy metadata attribute of an asset is Quant.

Iterating to another bucketing Factor by transferring control from block 330 to block 318 results in re-processing path list 304 for a different bucketing Factor, for example, Country.

When all paths have been processed in the steps preceding block 330 for all configured bucketing Factors, the result is a set of nodes, representing each bucketing Factor, each having associated therewith all paths to nodes that match the value yielded by applying the bucketing Factor to a path. The effect is that each node representing a bucketing Factor has associated with it all matching paths and nodes in the graph 102. For example, if path list 304 comprises 100 paths, then a first bucketing Factor node for Stocks might have 50 paths, a Bonds node might have 40 paths, and a Commodities node might have 10 paths.

The association of paths with a bucketing Factor node, as opposed to individual assets or terminal nodes that represent assets provides a distinct difference as compared to other systems and provides special benefits for various other features of the systems as further described. For example, a particular Perspective, such as Ken or Beth, may have multiple paths to the same ultimate asset. The present system provides ways to consolidate or roll-up multiple different paths into a single value for a particular asset, regardless of the number, complexity or direction of the paths. For other features and reasons, the paths also matter, as subsequent description will make clear.

At block 331, the process of FIG. 3B performs column processing using each value node in the tree that was created and associated with paths in preceding steps. As shown at block 331, all configured column Factors are processed and block 331 represents starting an iteration of subsequent block for all such configured column Factors.

As indicated in block 332, for a particular column Factor, all value nodes are considered iteratively; further, block 334 represents iterating through all paths in a particular value node. For each such path, at block 336, a particular column Factor is applied to the current path, resulting in a value; as noted above, a Factor receives one or more paths and a Context as input, both of which are known and available at block 336. The same pseudocode as provided above may be used.

The resulting value is associated with the current value node at block 338. As shown in block 340, when all paths for a particular value node have been processed, the sum of all values that have been associated with the value node may be returned as a column value (also referred to herein as a "column result value" and/or a metric) for display or inclusion in a table view for a row associated with the value node. Processing continues iteratively until all column Factors have resulted in generating values for all columns of that row or value node.

Each column Factor may define a complex calculation by overriding a method in a class definition for a generic column Factor. For example, a Factor may call an ownership determination method to determine a percentage of ownership represented in a path as a precursor to computing a value of an asset. A Factor may call another Factor to perform such a computation. For example, a value Factor may call a percent-ownership Factor, which in turn could perform a matrix multiplication to determine percent ownership, and the value Factor may multiple the resulting percentage value by a current value of an asset to determine a particular Perspective's value for the asset.

Factors may implement complex logic for concepts such as internal rate of return. For example, a Factor may compute a date on which Beth became a trustee of the Trust, determine values of all transactions that occurred on or after that date, separately call a value Factor to determine a current-day value of each asset involved in each such transaction, etc.

In various embodiments, control steps may be performed in the processes of FIG. 3A, FIG. 3B to improve the quality of display. For example, if a Factor returns a result of "unknown value," the resulting column value may need to be modified or removed for a particular value node, since the user cannot gain any added information from an unknown column. The result would be that a particular section of a table view or tree represented in the table view would have blank column values.

Embodiments facilitate the ability to perform multi-currency displays and calculations so that values in multiple currencies are concurrently displayed in the same table view. For example, the Edit Columns dialog may be used to select a Value factor, and add it as a column to a table view, that is expressed in any of a plurality of currencies or in a Native Currency, which is the currency in which the underlying asset is actually held or tracked by a custodian. Any number of such columns may be added to a particular table view by repeatedly selecting the Edit Columns dialog, adding the Value factor with different currency values, and applying the selection to the view.

Figure 9C:
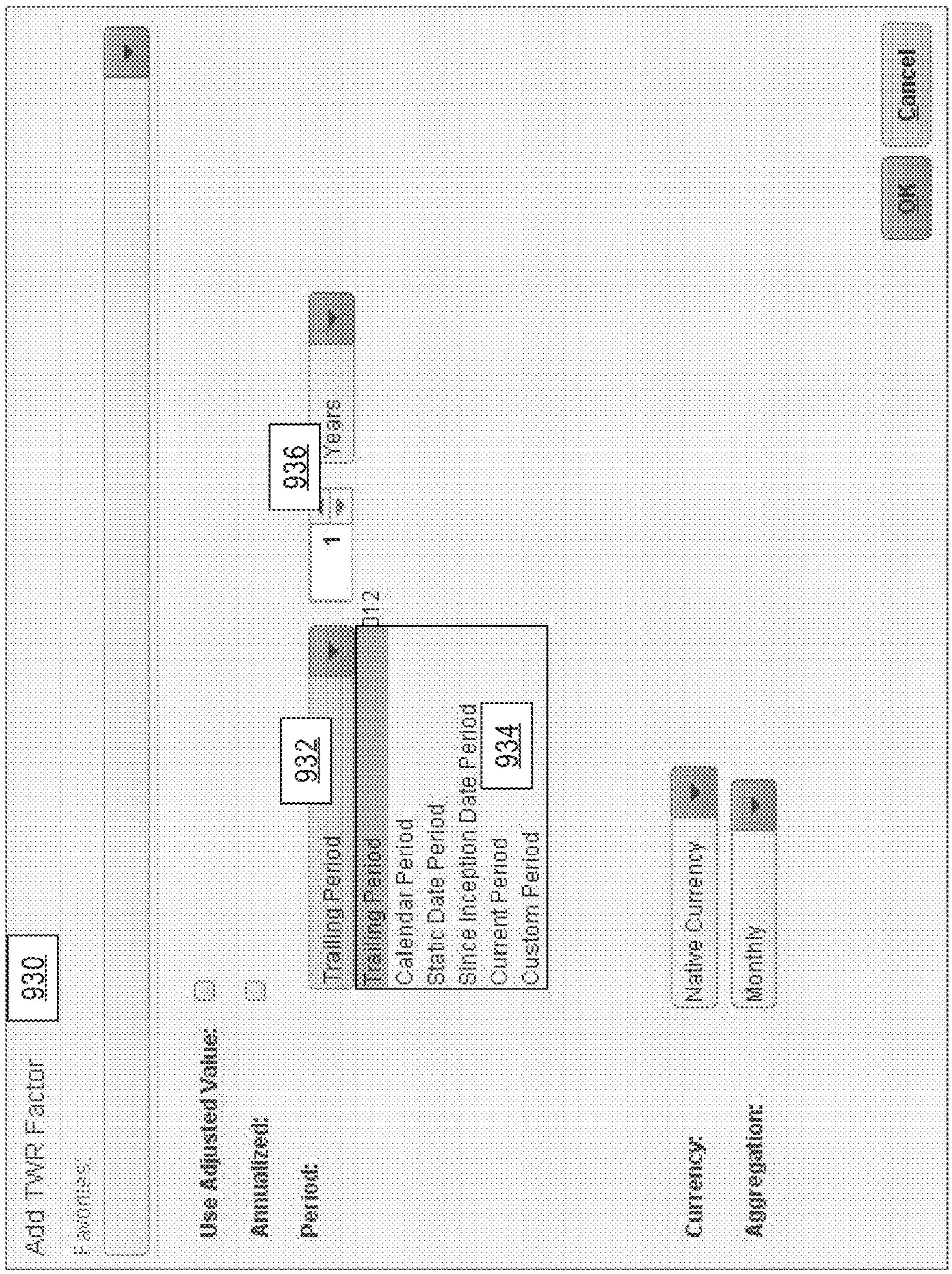
FIG. 9C illustrates an example of an Add TWR Factor dialog resulting from selecting the Edit Column dialog, selecting Performance Metrics from among the Available Columns, and adding TWR Factor as a column.

Embodiments provide the ability to display views of asset values for multiple different time periods in different columns within the same view. FIG. 9C illustrates an example of an Add TWR Factor dialog 930 resulting from selecting the Edit Column dialog, selecting Performance Metrics from among the Available Columns, and adding TWR Factor as a column. (TWR refers to Time Weighted Rate of Return.) In response, the view computation unit 106 causes displaying an Add TWR Factor comprising a Period drop-down menu 932 having a list 934 presenting a plurality of time period options. For example, for a particular view a user may add a column for TWR based on a Trailing Period, Calendar Period, Static Date Period, Since Inception Date, Current Period, or Custom Period. For some options the user is expected to enter time quantity and term values using time widgets 936. When the configuration values of dialog 930 are applied to a view, applying the TWR Factor to a traversal of the graph 102 will result in performing calculations based on available historical asset data for the time periods as specified. A user may add multiple TWR Factor columns to a particular view, each column having a different Period configuration, for example, to permit comparison of asset performance to benchmarks using different metrics of interest.

Changing the Date associated with the Context does not necessarily affect all date periods for the TWR Factor or other factors in the same manner. For example assume that the foregoing TWR Factor columns have been configured, that the current date is March 30, and then the user changes the Date associated with the Context to be March 1. The TWR Factor that is based upon a 1-year trailing date would then compute values based on March 1 and 1 year earlier. A TWR Factor that is based on a Start Date and End Date would use March 1 as the new Start Date but the End Date would be unchanged. A Factor that is based on a static date would be unaffected. Thus, the system offers the capability to independently control each column of a table view based on configuration data. Further, modification of date values in this manner enables a user to preview the impact of the change on output data that may be used later in a report.

Filters may be used to further customize the appearance or content of a table. A filter is a computational unit, such as a programmatic object, that determines whether edges and nodes in one or more paths should be reflected in output data in a table view. Filters are applied to paths using the processes described above, on a per-path basis. Thus, creating and applying a filter causes view computation unit 106 to re-traverse all paths of the current view and to apply the filter during path traversal; this approach contrasts sharply with approaches of others in which filtering is merely applied to an output table or to a dataset that has been retrieved from a database. Further, filters may be applied to entities that are not visualized in a particular table view. For example, a view may be filtered to show the top 10 holdings based on IRR, even though IRR is not present in the table view.

Figure 10:
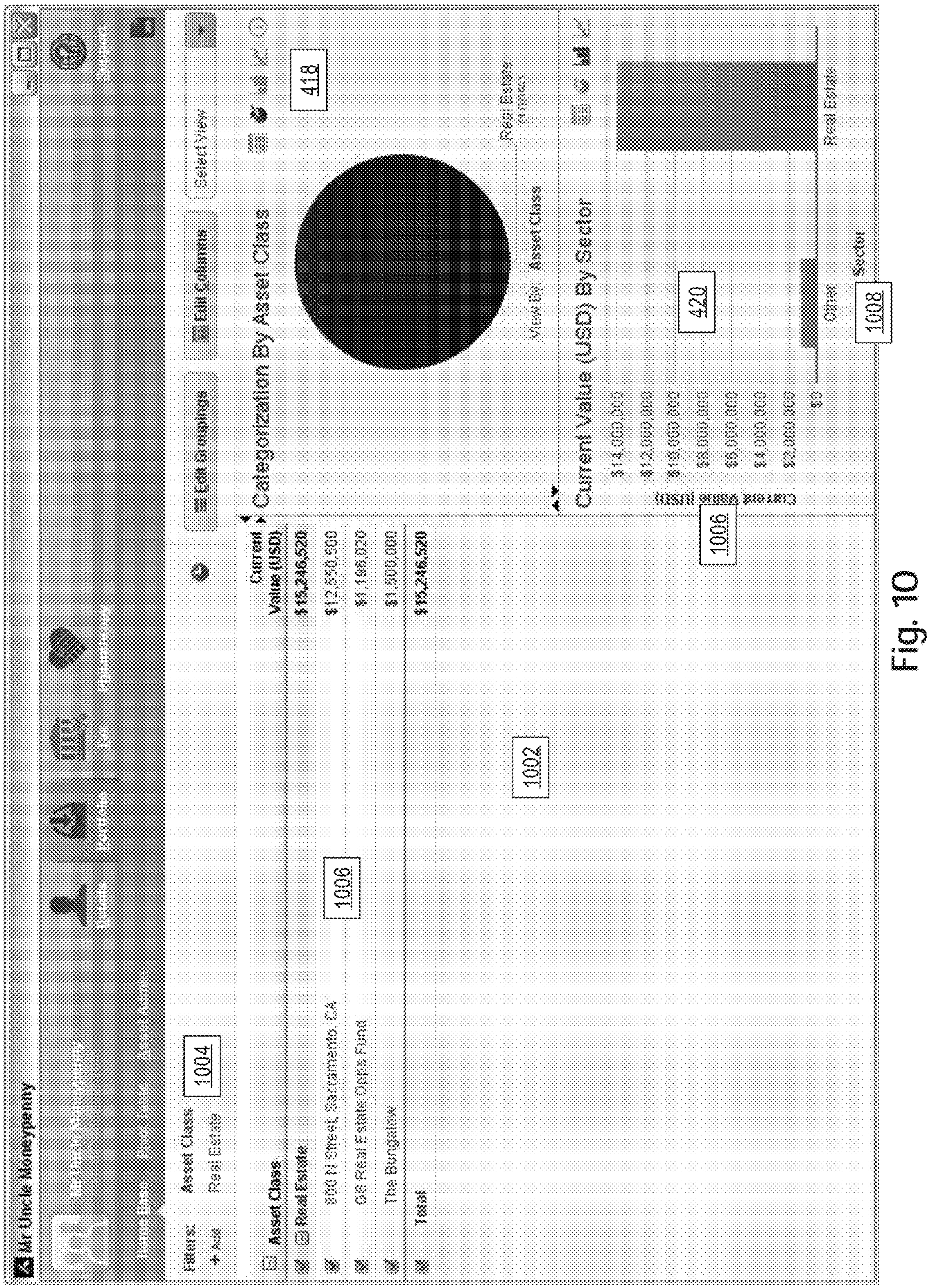
FIG. 10 illustrates the GUI of FIG. 4 after applying a Real Estate filter.

Filters may be created through manual user selection and action by selecting the Filters Add (+) icon and responding to a filter creation dialog, or semi-automatically by selecting elements of info-graphics. In an embodiment, info-graphics such as charts 418, 420 are configured with hyperlinks that cause the view computation unit 106 to create a filter and apply the filter to the table view 408. FIG. 10 illustrates the GUI of FIG. 4 after applying a Real Estate filter. In an embodiment, a user may select any pie wedge in the pie chart 418, or any bar in the bar chart 420, to cause creating a filter. In the example of FIG. 10, the user selected the Real Estate wedge 1001 of the pie chart 418 in the display of FIG. 4; in response, view computation unit created a filter 1004 as seen in the filter region and applied the filter to the table view to result in displaying only real estate assets. Further, the filter is concurrently applied to both the info-graphics with the result that the pie chart displays a single solid circle since 100% of the assets listed in the table view are real estate assets. The filter 1004 may be removed by hovering a cursor over the filter and selecting a remove (X) icon. The same form of filter control may be activated by selecting a bar of the bar chart 420.

Conversely, if the filter region of the table view is used to define one or more filters, then the info-graphics automatically update to reflect the filters that have been newly applied.

In an embodiment, the same basic processes described above for generating table views may be applied to generating the pie chart 418 and bar chart 420. For example, the X axis of the bar chart 420 may be defined using a bucket Factor and the Y axis may be defined using a column Factor. For example, a bar chart may be defined by bucketing IRR on the X axis while particular values are determined using column Factor value generating techniques as described above for table views.

Figure 11:
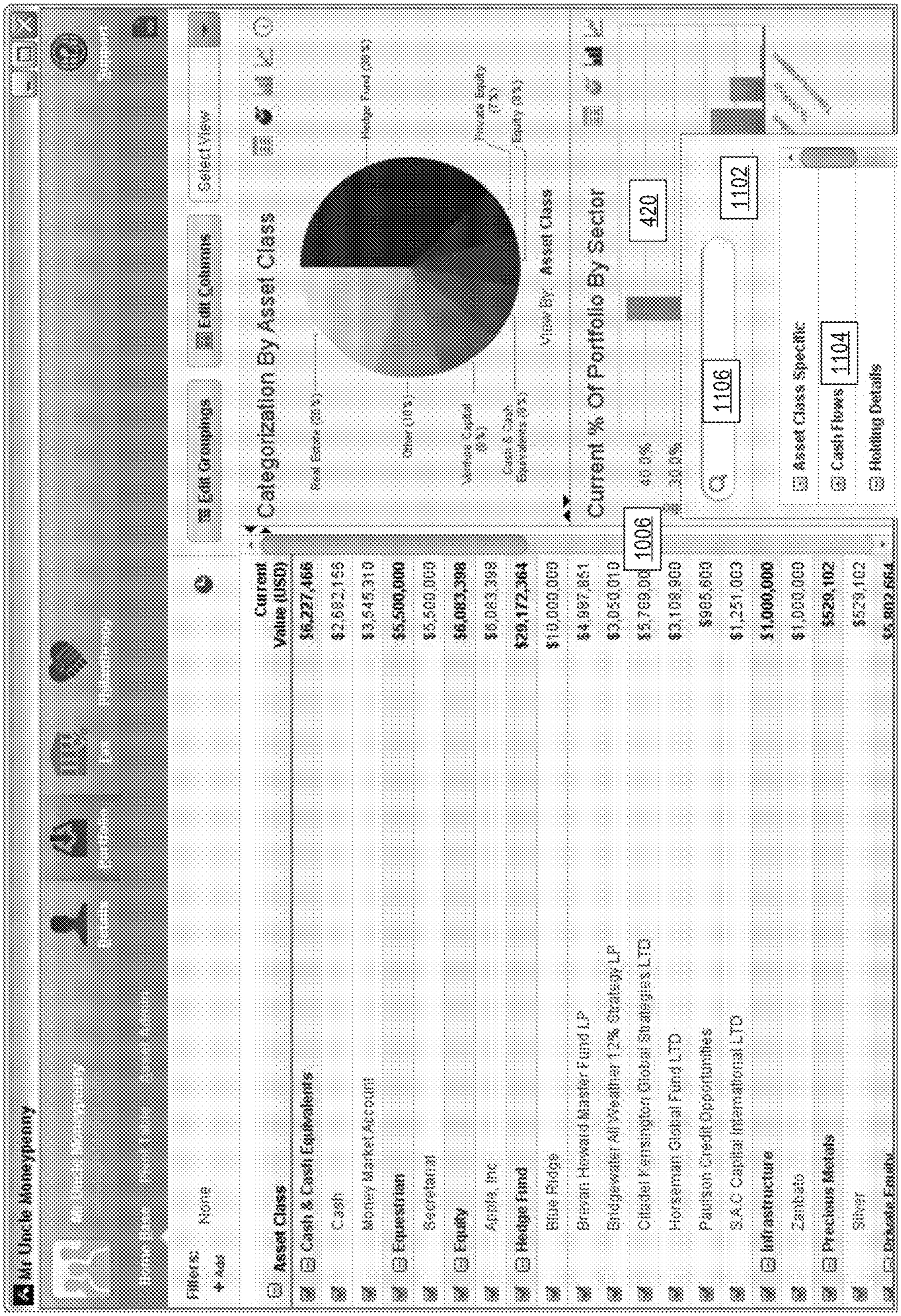
FIG. 11 illustrates the GUI of FIG. 4, FIG. 10 in which vertical axis label has been selected.

In an embodiment, bar graph 420 comprises a vertical axis label 1006 and horizontal axis label 1008 that are configured as selectable hyperlinks. View computation unit 106 is configured to cause displaying, in response to user selection of an axis label 1006, 1008, a pop-up menu listing available Factors that may be selected for use as axes. FIG. 11 illustrates the GUI of FIG. 4, FIG. 10 in which vertical axis label 1006 has been selected. View computation unit 106 is configured to cause displaying pop-up menu 1102 comprising a list 1104 of available Factors that may be selected as the basis of computing a new vertical axis for the bar graph 420. A user may scroll through list 1104 and select any Factor of interest, or type keywords for a Factor name in search box 1106 to receive a list of matching Factors. Selecting a Factor from list 1104 causes view computation unit 106 to cause closing the menu 1102 and recomputed the chart 420 using the newly selected Factor. A different Factor for the X-axis may be applied in a similar manner by selecting horizontal axis label 1008 and selecting a new Factor from a pop-up menu.

In an embodiment, Factors include value by any of a large plurality of currencies. Consequently, a user or analyst may view values by currency according to currency rates and conversions of the present day, with immediate recalculation by re-traversing the graph.

In an embodiment, view computation unit 106 is configured to re-compute and

Figure 12:
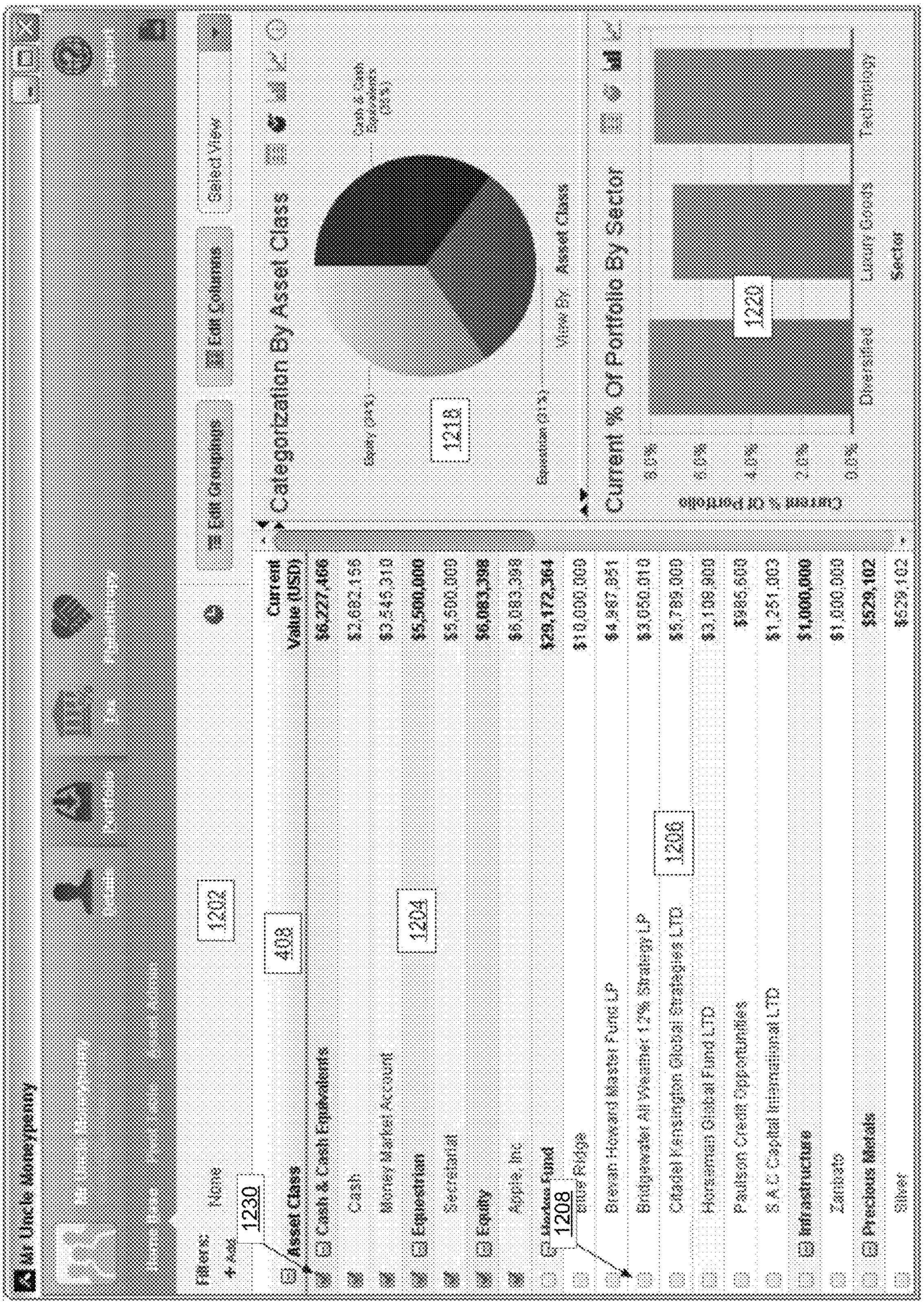
FIG. 12 illustrates an example in which some of the data in the table view is selected.

In an embodiment, view computation unit 206 is configured to re-compute and cause re-displaying info-graphics such as pie chart 418 and bar chart 420 based on changes in selections to data in table view 408. FIG. 12 illustrates an example in which some of the data in the table view is selected. In screen display 1202 of FIG. 12, table view 408 comprises a first set of rows 1204 and a second set of rows 1206 indicating assets organized by asset class. The first set of rows 1204 has been selected as indicated by checks in selection checkboxes 1230 while the second set 1206 is not selected as indicated by non-checked selection checkboxes 1208. In an embodiment, a range of rows may be selected by individually checking checkboxes 1230, 1208 or by selecting one row and then using keyboard control combinations such as SHIFT-click or CTRL-click to select a range of rows or multiple discrete rows. View computation unit 206 is configured to re-compute and cause re-displaying pie chart 1218 and bar chart 1220 to reflect only the selected rows and omit data associated with non-selected rows. For example in FIG. 12 it will be seen that pie chart 1218 comprises only three (3) wedges for Cash & Cash Equivalents, Equity, and Equestrian assets because the first set 1204 of rows comprises only assets in those asset classes. The sum of assets represented in the pie chart 1218 is the sum of only the first set 1204 of selected rows. Similarly, bar chart 1220 has been re-computed and redisplayed to reflect only the Sectors represented in the first set 1204 of selected rows.

In an embodiment, view computation unit 106 is configured to save a view of the type shown in FIG. 4, FIG. 5, FIG. 10, FIG. 11, FIG. 12 in response to user input requesting to save a view. In one embodiment, referring again to FIG. 4, a user may select the Select View menu 422 to cause displaying a list of named, previously saved views; one menu option is Save As. In response to receiving a selection of Save As in menu 422, view computation unit 106 is configured to cause displaying a dialog that prompts the user to enter a name for the current view. In response to receiving user input specifying a name, the view is saved in data repository 104 in the form of a named set of metadata defining the view. Example metadata that define a view include the Context, the Filters applicable to the view, the grouping and column Factors defining table view 408, and the Factors defining axes of the chart 420.

After a view is saved, a user may retrieve and use the view with any other Context. For example, the same user could change the Context to a different client or legal entity, and the view computation unit 106 is configured to apply, in response, the metadata defining the view to portions of the graph that relate to the newly selected client or legal entity. As a result, table view 408 and related info-graphics are re-computed and redisplayed to reflect holdings of the newly selected client or legal entity.

In an embodiment, when a user logs out and logs back in again in a later user session, the last saved view from the prior user session is used as the first view that is displayed in the new user session.

4.0 Example Graph Traversal and Table Generation

Figure 13B:
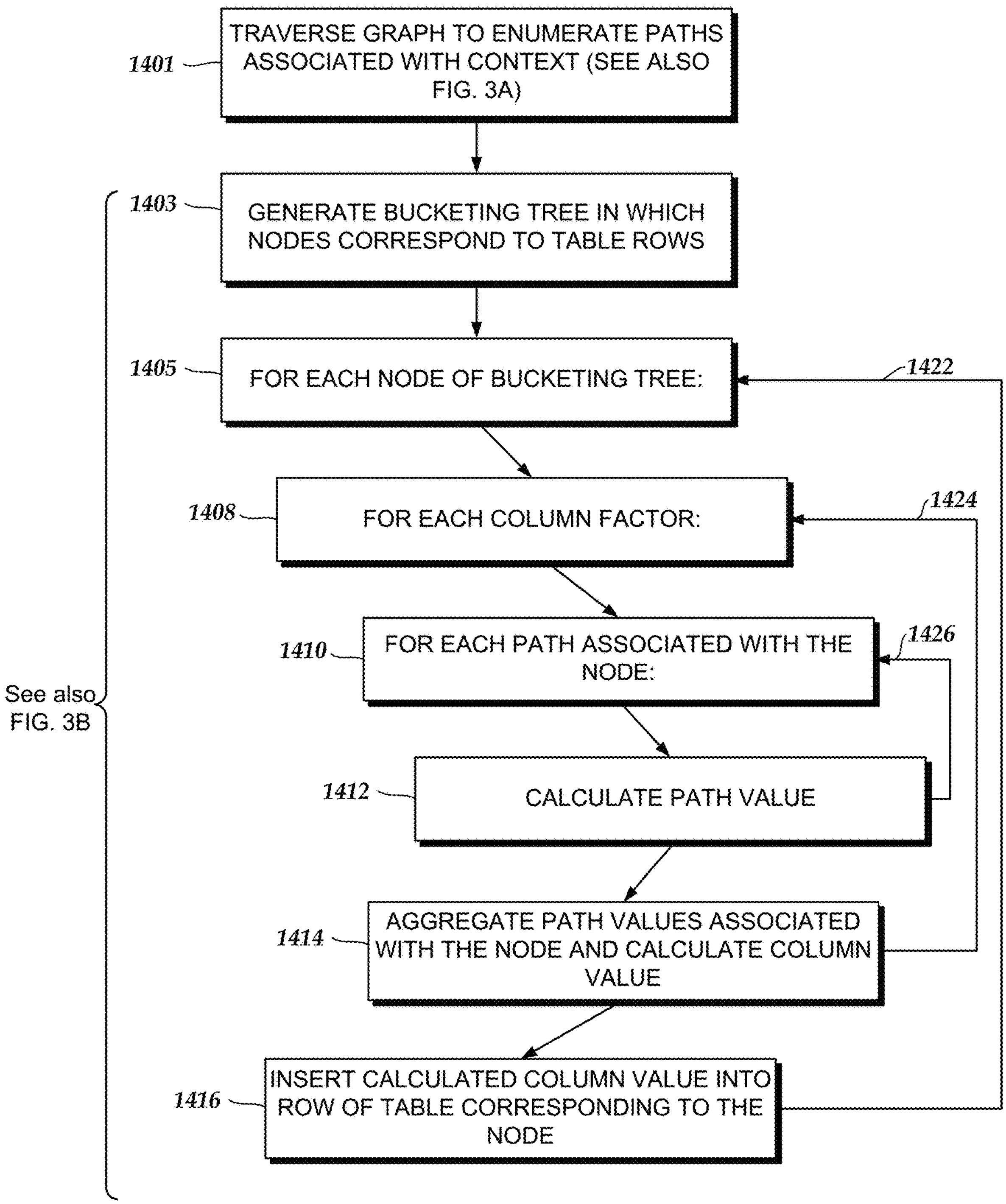
FIG. 13B is a flowchart showing an example method of the system in which a table is generated.

FIG. 13B is a flowchart showing an example method of the system in which a table is generated via graph traversal and column factor calculations. In various embodiments, fewer blocks or additional blocks may be included in the process of FIG. 13B, or various blocks may be performed in an order different from that shown in the figure. Further, one or more blocks in the figure may be performed by various components of the system as described above and below, for example, one or more of view computation unit 106 and/or report unit 109.

Beginning at block 1401, the graph, for example graph 202, is traversed and all the paths associated with the selected context are enumerated. This block is described in further detail above in reference to FIG. 3A. Graph traversal and enumeration of paths may be dependent on a particular context. For example, a given perspective (for example, an individual, legal entity, and/or the like) may indicate the locations from which the graph is traversed. An example is described above, and another example is illustrated in FIGS. 13C-13E. In particular, FIGS. 13C-13E illustrate an example traversal of a simplified graph 1542, according to an embodiment of the present disclosure. Referring to FIG. 13C, the graph 1542 includes six nodes: Alice (representing an individual, and which may be referred to as node A), Bob (representing an individual, and which may be referred to as node B), “C” Trust (representing an trust instrument, and which may be referred to as node C), Stock “D” (representing a stock instrument, and which may be referred to as node D), Bond “E” (representing a bond instrument, and which may be referred to as node E), and Stock “F” (representing a stock instrument, and which may be referred to as node F). The relationships among the various nodes of the graph are indicated by the edges. Further, as described above, various attributes and/or properties may be associated with each of the nodes and/or edges of the graph. For example, as described above and below, each of the edges of the graph may indicate a relationship between the two nodes connected by the edge. In one example, an edge may indicate a value and/or percentage of an asset (for example, a stock, bond, and/or the like) owned by an individual.

For simplicity of explanation, graph 1542 illustrates a simple graph with a small number of nodes and no complex relationships among the nodes. However, in various embodiments, and depending on actual data stored in the system, the graph may include hundreds, thousands, millions, or more nodes and/or edges. Further, the graph may include complex relationships including loops, and/or the like. Accordingly, identifying paths through a typical graph having thousands or more nodes and edges would not be practical to perform manually, at least for the reasons that it would take an impractical amount of time to perform (e.g., days, weeks, or longer to traverse a large graph) and the process would be error-prone (e.g., manual traversal of thousands or more nodes would have a nonzero error rate). Accordingly such processes are necessarily performed by computing processors and systems, using the various methods discussed herein.

According to an embodiment, FIG. 13D illustrates an aspect of traversal of the graph 1542. As described above (and as further described in reference to FIG. 2B), a graph and a context are provided in the process of graph-to-table transformation. In the embodiment of FIG. 13D, the context includes the perspective “Bob.” Accordingly, in the example the graph is traversed from the perspective of Bob so as to generate a table of information derived from the graph. As further shown in FIG. 13D, an “Asset Type” bucketing factor has been selected by a user (or automatically by the view computation unit 106 and/or report unit 109, for example). Accordingly, the generated table will include rows corresponding to assets associated with Bob, and organized according to asset types (as described above). Additionally, an “asset value” column factor (also referred to herein as an “asset” column factor) has been selected. Accordingly, the generated table will include at least one column showing values corresponding to the various rows of the table.

As described above in reference to FIG. 3A, the graph 1542 is traversed so as to enumerate all the paths associated with node B (as node B represents Bob). FIG. 13D illustrates all five paths associated with node B as determined by the system. In various embodiments, each path may include nodes and/or edges of the graph that comprise the path in the graph, as well as any attributes associated with the nodes and/or edges of the path.

Returning now to FIG. 13B, each of blocks 1403-1416 describe additional aspects of the graph-to-table transformation, which is also described above in reference to FIG. 3B. Specifically, at block 1403 (roughly corresponding to blocks 316-330 of FIG. 3B), the various enumerated paths are processed based on a selected bucketing factor to create a tree (also referred to herein as a "bucketing tree") of various values associated with the bucketing factor, and paths associated with those values. In an embodiment, the values represented in the bucketing tree may be represented by nodes (also referred to herein as "value nodes"). In the example of graph 1542 (of FIG. 13C), this step is illustrated in FIG. 13E in which the bucketing factor is asset type. As shown, a bucketing tree 1552 associated with graph 1542 includes a root node 1554 (also referred to herein as a "root value node") corresponding to all paths associated with an asset (3, 4, and 5), child nodes 1556 (also referred to herein as child "value nodes") corresponding to types of assets (for example, stocks and bonds), and further child nodes 1558 corresponding to actual individual assets (for example, Stock "D", Stock "F", and Bond "E"). Further, paths associated with each of the nodes are shown. These include, for example, path 4 for Bond "E", path 3 for Stock "D", path 5 for Stock "F", paths 3 and 5 for "Stocks", path 4 for "Bonds", and paths 3, 4, and 5 for "All Assets".

In reference again to FIG. 13B, in blocks 1405-1416 each node of the bucketing tree is processed so as to calculate column values to be displayed in the table. Some aspects of this process, according to an embodiment, are described above in reference to blocks 331-340 of FIG. 3B.

At block 1405, each node (as indicated by loop arrow 1422) of the bucketing tree, including its associated path, is processed. Processing of each node includes, at block 1408, evaluation of the node with respect to each column factor (as indicated by loop arrow 1424) (for example, each metric selected by the user including, for example, asset value, rate of return, IRR, and/or the like). For each of the column factors, at block 1410, each path associated with the node is processed (as indicated by loop arrow 1426) so as to determine, at block 1412, a path value. For example, if the column factor is "asset value," each path associated with the node is processed so as to calculate the asset value associated with the path. Then, at block 1414, the path values calculated with respect to each of the path associated with the node are aggregated so as to determine a column value. This calculated column value indicates a value of the given column factor with respect to the node being processed.

For example, in the instance of a bucketing tree node representing an asset class such as "Stocks," multiple paths may be associated with the node, each of the paths associated with different stocks. In calculating a bucketing factor "Asset Value" associated with the node, each of the paths may be traversed and values of each of the particular stocks are calculated. Then, all of the calculated values may be aggregated by summation so as to calculate a total value of all stocks.

In various embodiments, calculation of path values may be accomplished by referencing data (for example, attributes and/or metadata) associated with one or more nodes and/or edges associated with the path. Examples are given above and below. In some embodiments, attributes and/or metadata associated with nodes and/or edges of a path may be stored as transaction effects object. Examples of such transaction effects objects, including creation of the transaction effects objects and calculations based on the transaction effects objects are described in detail in U.S. patent application Ser. No. 13/714,319, filed Dec. 13, 2012, and titled "Transaction Effects," the entire disclosure of which is hereby made part of this specification as if set forth fully herein and incorporated by reference for all purposes, for all that it contains.

At block 1416, the calculated column value is inserted into the table in a column associated with the column factor, and a row associated with the node of the bucketing tree.

This process is further illustrated with reference to bucketing tree 1552 and FIG. 13E. In FIG. 13E, the "value" column factor has been selected, and the "Stock" node is associated with paths 3 and 5. Accordingly, each of paths 3 and 5 may be individually processed by the system so as to determine a value of stocks associated with Bob. For example, edges in path 3 may indicate that Bob owns 50% of Trust "C", and further, Trust "C" has $1000 of Stock "D". Thus the system may determine that Bob owns $500 of Stock "D". Similarly, the system will determine an ownership of Stock "F" with respect to Bob. Next, the system aggregates the determined values and the aggregated data is displayed in a row and column of the table corresponding to Stocks and value.

Figure 13F:
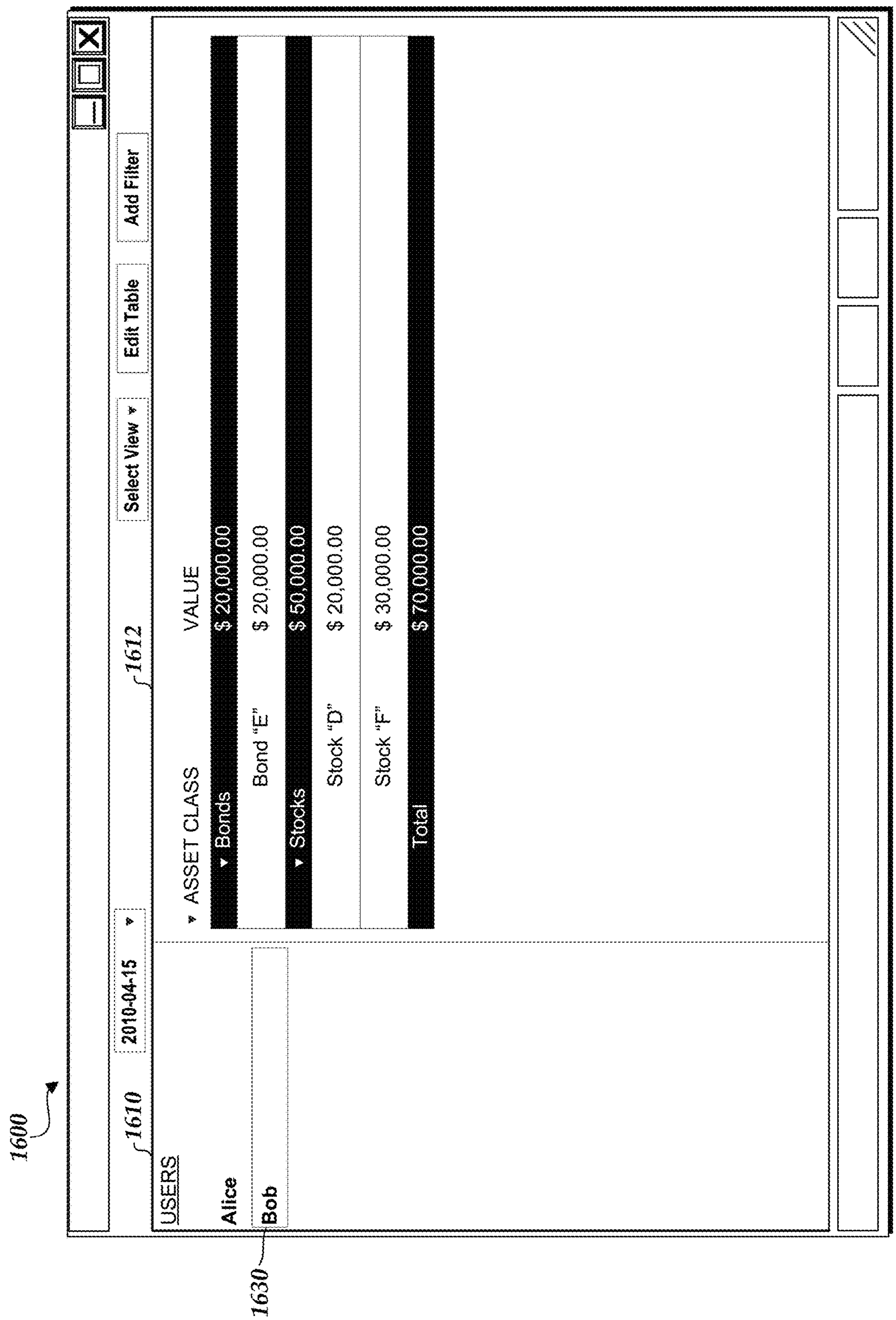
FIG. 13F illustrates an example user interface including a table generated as a result of the graph traversal of FIGS. 15A-15C.

An example of a table generated by the graph traversal of FIGS. 13C-13E is shown in FIG. 13F. FIG. 13F shows an example user interface 1600 including two portions 1610 and 1612. The portion 1610 shows that currently selected perspective 1630 (in this example, Bob), while the portion 1612 shows the table generated based on the traversal described above in reference to FIGS. 13C-13E. As shown, the table includes six rows corresponding to each of the nodes of the bucketing tree 1552 (for example, Bonds, Stocks, Bond "E", Stock "D", Stock "F", and Total). The numbers in the column "Value" are displayed with respect to each of the rows, and are determined based on processing of the associated paths, as described above.

Accordingly, in various embodiments the system may automatically generate a table of data associated with a context via rapid traversal of complex graphs of related data items.

As described above, selection of a different context, application of filters, selection of different bucketing factors (for example, changing the type and/or hierarchical arrangement of rows of the table), selection of different column factors (for example, changing the calculated information displayed with respect to each row) causes the system to automatically re-traverse the graph and regenerate the table. For example, the user may change the context to Alice, may choose to organize the rows of the table according to geographical location of assets, and/or may choose to include a column showing Internal Rate of Return (IIR) (and/or any other metric). In response, the system automatically re-traverses the graph 1542 from the perspective of node A to determine associated paths, applies the geographical location bucketing factor to generate a bucketing tree associated with the determined paths, and calculate for each of the nodes (and associated paths) of the bucketing tree an IIR and/or a value. The system may then generate a table including the calculated data.

Figure 13G:
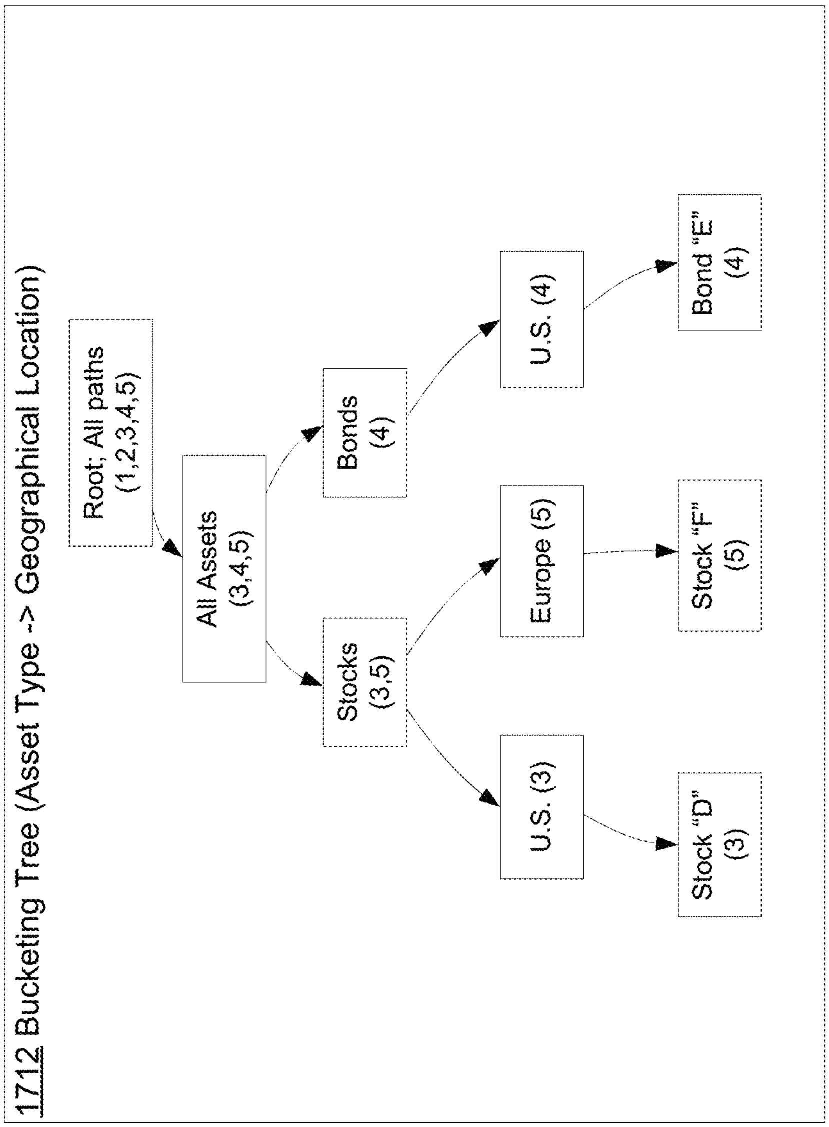
FIG. 13G-13H illustrate an example bucketing tree and user interface of the system
Figure 13H:
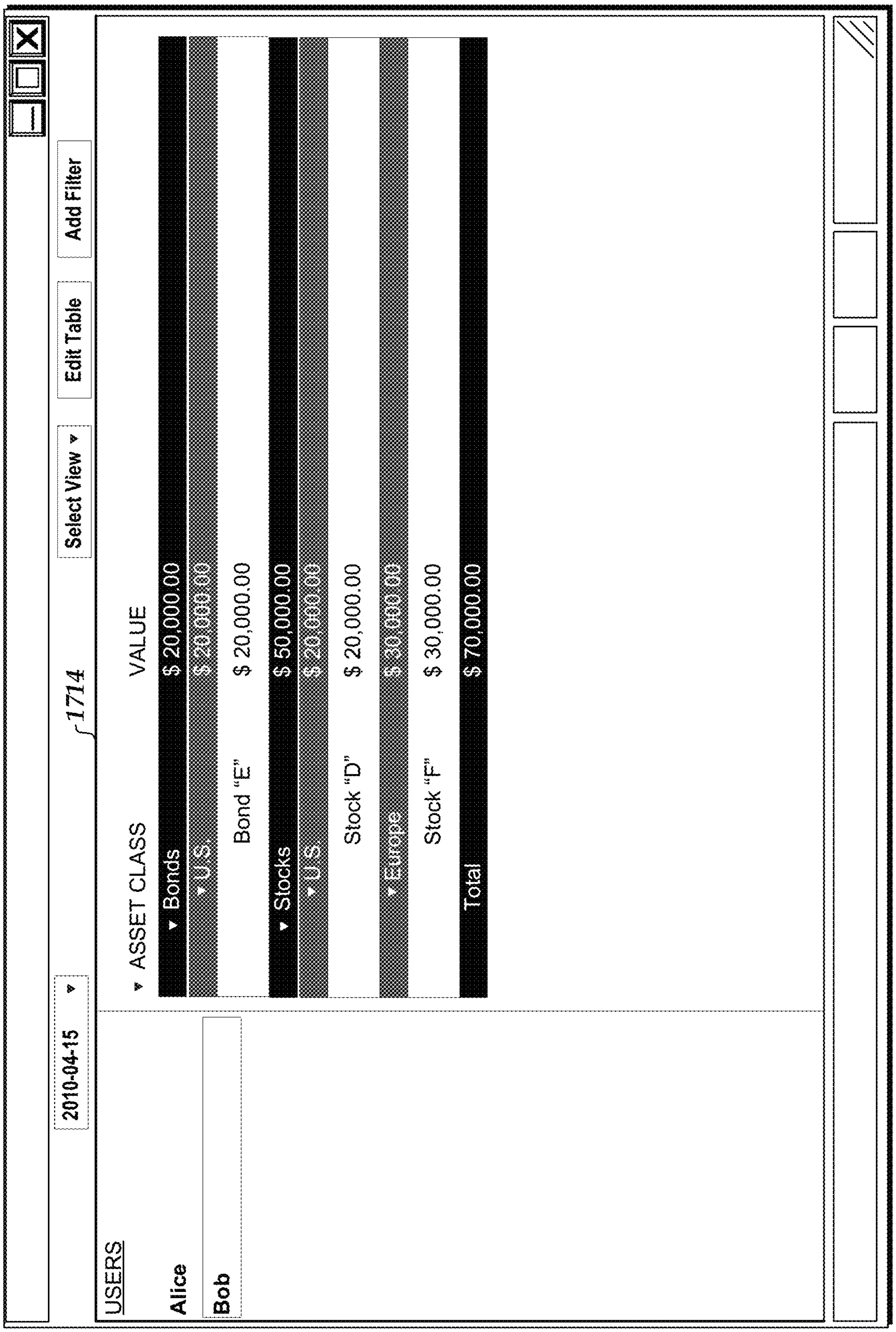

In various embodiments, the user may select multiple bucketing factors and may specify a hierarchical relationship among them, as described above in reference to FIG. 6, for example. FIG. 13G illustrates and example bucketing tree 1712 in which a user has specified two bucketing factors, Asset Type and Geographical Location. Further, the user has indicated that Geographical Location is to be a sub-categorization of Asset Type. As shown, the bucketing tree accordingly includes nodes corresponding to the Geographical Location associated with each of the asset types. Further, FIG. 13H illustrates an example user interface similar to the user interface of FIG. 13F. The example user interface of FIG. 13H includes table 1712 showing results of the new categorization illustrated in FIG. 13G.

In some embodiments, calculation of values associated with each path, and aggregation of multiple path values, varies depending on a column factor. For example, when calculating a simple current value of a given asset or asset type, calculation of path values may comprise multiplication of a current value of the asset with a number of shares held. Further, aggregation of multiple path values in this example may comprise a summation of all path values to determine a total value of the asset or asset type. However, in another example, the calculation and aggregation may differ. Examples of other column factors that may each have different path calculation and aggregation include % of portfolio, active return, alpha, beta, average daily balance, internal rate of return, and/or the like.

5.0 Exporting Views and Generating Reports and Publications

In an embodiment, view computation unit 106 is configured to export data shown in views to other applications or to other document formats such as MICROSOFT EXCEL or ADOBE PDF. In an embodiment, view computation unit 106 is configured to perform export operations based on the current view. For example, in one embodiment, exporting is initiated by a user selecting the Export widget 424. In response, view computation unit 106 causes highlighting all of the table view 408 and current info-graphics such as pie chart 418 and bar chart 420, and causes displaying, in each of the table view and info-graphics, a selectable icon representing an available export format for that area of the display. For example, view computation unit 106 may cause displaying an EXCEL icon and a PDF icon over the table view 408, but may display only a PDF icon over pie chart 418 and bar chart 420 since info-graphics of those forms cannot be exported in the form of an EXCEL table.

Figure 14:
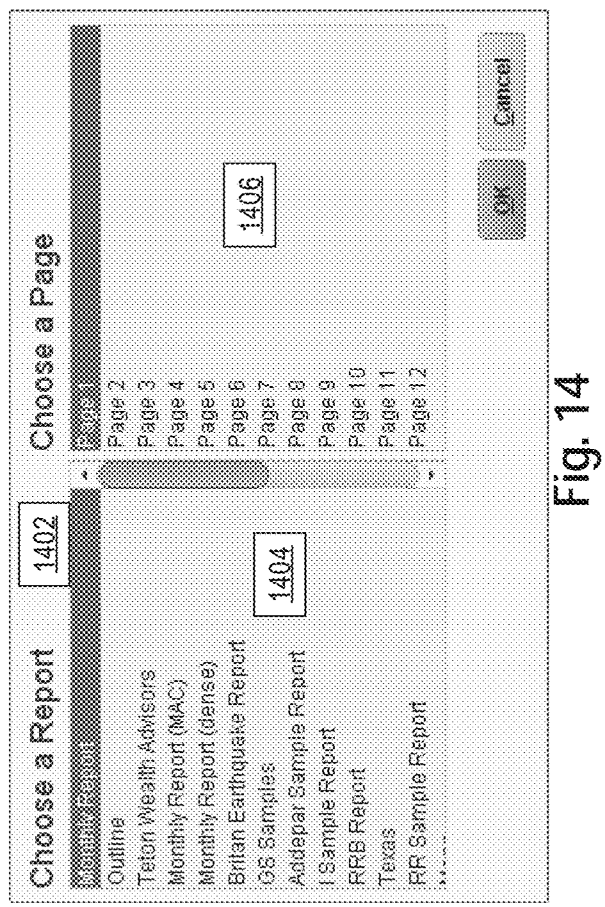
FIG. 14 is an example of a report selection dialog.

In an embodiment, view computation unit 106 is configured, in response to selection of one of the ADOBE PDF icons, to facilitate exporting data shown in views to a report center system that is configured to facilitate generating reports in the form of electronic documents. Embodiments facilitate creating reports in which the organization of pages is controlled and source data from a table view is gracefully fitted into the report pages rather than appearing as a direct cut-and-paste without appropriate fitting or formatting. In one embodiment, selecting the Export widget 424 and an ADOBE PDF icon causes displaying a report selection dialog. FIG. 14 is an example of a report selection dialog. In an embodiment, report selection dialog 1402 comprises a list 1404 of previously created and saved reports. View computation unit 106 is configured, in response to selection of a particular report in list 1404, to display a page list 1406 identifying all pages that have been previously defined in the selected report.

Figure 15:
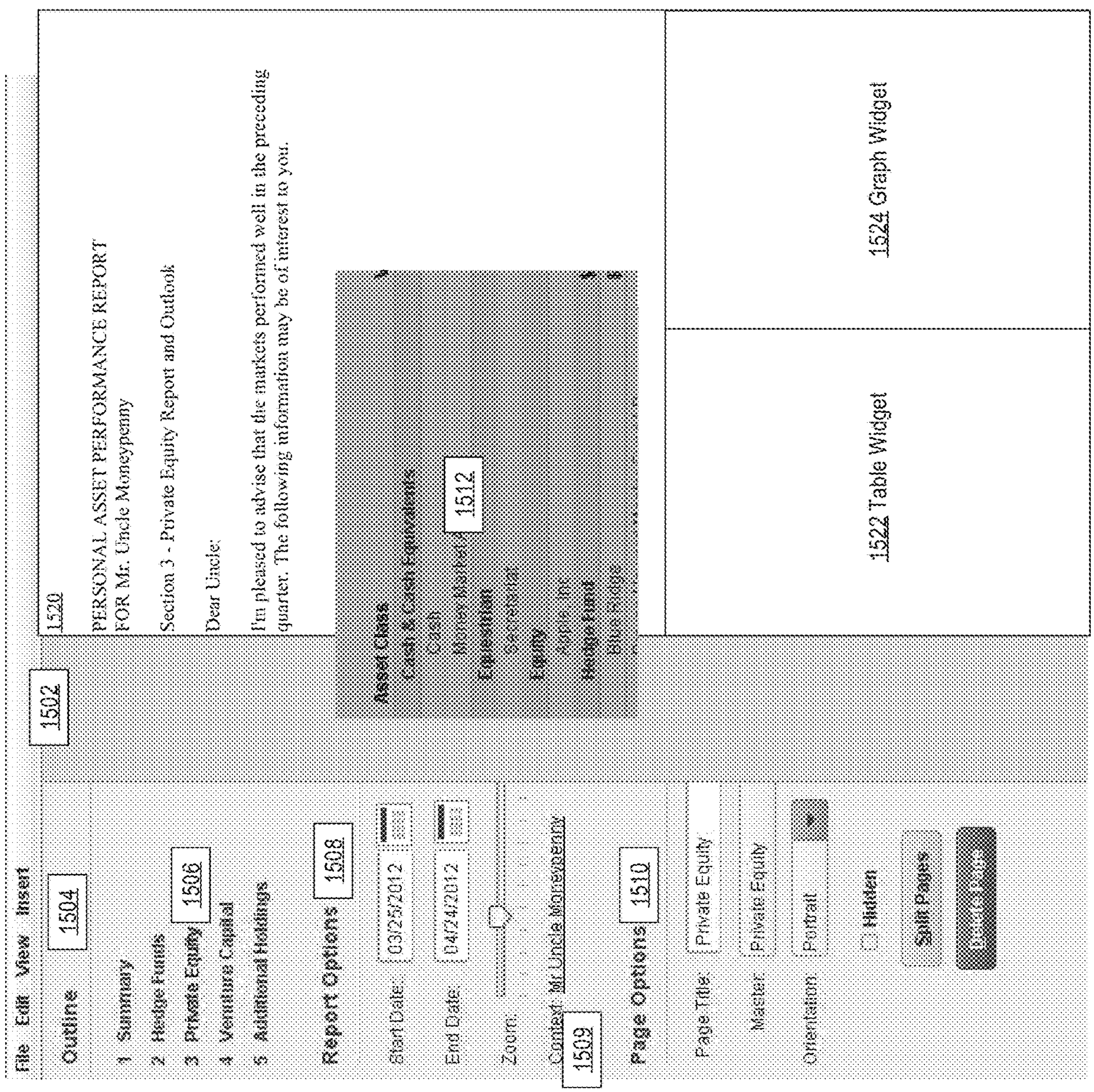
FIG. 15 illustrates an example of a report creation user interface as seen immediately after initiation of operation.

Selecting a particular page in page list 1406 causes view computation unit 106 to trigger execution of report unit 109 (FIG. 1). In response, report unit 109 causes displaying a report creation user interface. FIG. 15 illustrates an example of a report creation user interface as seen immediately after initiation of operation. In an embodiment, report creation user interface 1502 comprises an outline panel 1504, a report options panel 1508, a page options panel 1510, and a report view 1520. The outline panel 1504 presents an outline of sections or pages that have been defined in the selected report, and report view 1520 displays a graphical representation of a particular selected section or page. In the example of FIG. 15, Private Equity section 3 has been selected as indicated by link 1506.

In an embodiment, report options panel 1508 displays metadata and GUI widgets that may be modified to accomplish changes in the associated report. In an embodiment, report options panel 1508 includes Start Date and End Date widgets, a Zoom slider widget, and a Context link 1509. The Start Date and End Date widgets may be used to change a range of dates that are used for data in the report; in response to changing the values of Start Date or End Date, the report unit 1509 is configured to redisplay report pages for only data within the specified dates. The Zoom slider widget is configured to cause increasing or decreasing a size of the report view 1520.

The Context link 1509 specifies a context for the report in terms of a named individual or legal entity. As noted above, a Context may include a Perspective (an individual, legal entity, and/or group) and/or a date or date range. The report unit 109 is configured to receive user input selecting the Context link 1509 and to display a list of other individuals or legal entities that are associated with the current logged in user and/or Perspectives that may be selected for the Context. In response to receiving a selection of a different individual or legal entity, the report view 1520 is recomputed and re-rendered from the perspective of the next Context. Re-computation involves re-traversing the graph 102 in the manner described above for generating table view 408 of FIG. 4. As described further below, a report view 1520 may comprise a plurality of independent widgets for text, tables, and graphics, and in an embodiment changing the Context causes each widget to perform an independent traversal of graph 102 to re-compute values for display in that widget. Thus, working on a report involves creating and storing metadata that defines the components of the report and certain formatting attributes of the report, but not particular values in the report; instead, the current Context drives a traversal of the graph 102 to generate values for substitution into a view of the report based on the metadata. Moreover, the techniques herein have the benefit of separating the construction and format of a particular widget from the underlying data, so that programmatic changes in a widget will result in displaying the widget in updated form while rendering in correct and timely underlying data based on traversing the graph 102.

Page options panel 1510 provides options for changing the title of the current page and associating a master page with the currently displayed page. In an embodiment, a master page defines an authoritative set of formatting guidelines for a page, and applying a master page causes report unit 109 to conform the current page to the formatting guidelines. Examples of formatting guidelines include margins, allowable locations for graphics, allowable locations for tables, rules for preventing a table from splitting across a page boundary, and others. For example, assume that a user specifies, using the interface of FIG. 4, exporting a table view 408 that comprises 50 rows; then, by interacting with report unit 109 the user attempts to locate the table in a lower portion of a first page of a report so that the entire table cannot be shown on the first page. In an embodiment, report unit 109 is configured to detect that the table contains a number of rows too large to fit in an allowed table space as defined in the formatting guidelines of a particular master page, and to automatically move the table to the next page on which the table will completely fit.

In an embodiment, a report view 1520 comprises a plurality of rectangular widgets that may be designated as a table widget or graphic widget. For example, report view 1520 may include a table widget 1522 and a graphic widget 1524. A table widget 1522 is associated with a set of formatting guidelines that define how imported table data from a view such as FIG. 4 is to fit into the region of the report that contains the table widget. Similarly, a graphic widget 1524 is associated with a set of formatting guidelines that define how an imported info-graph such as pie chart 418 or bar chart 420 should fit into the region occupied by the graphic widget.

Figure 16:
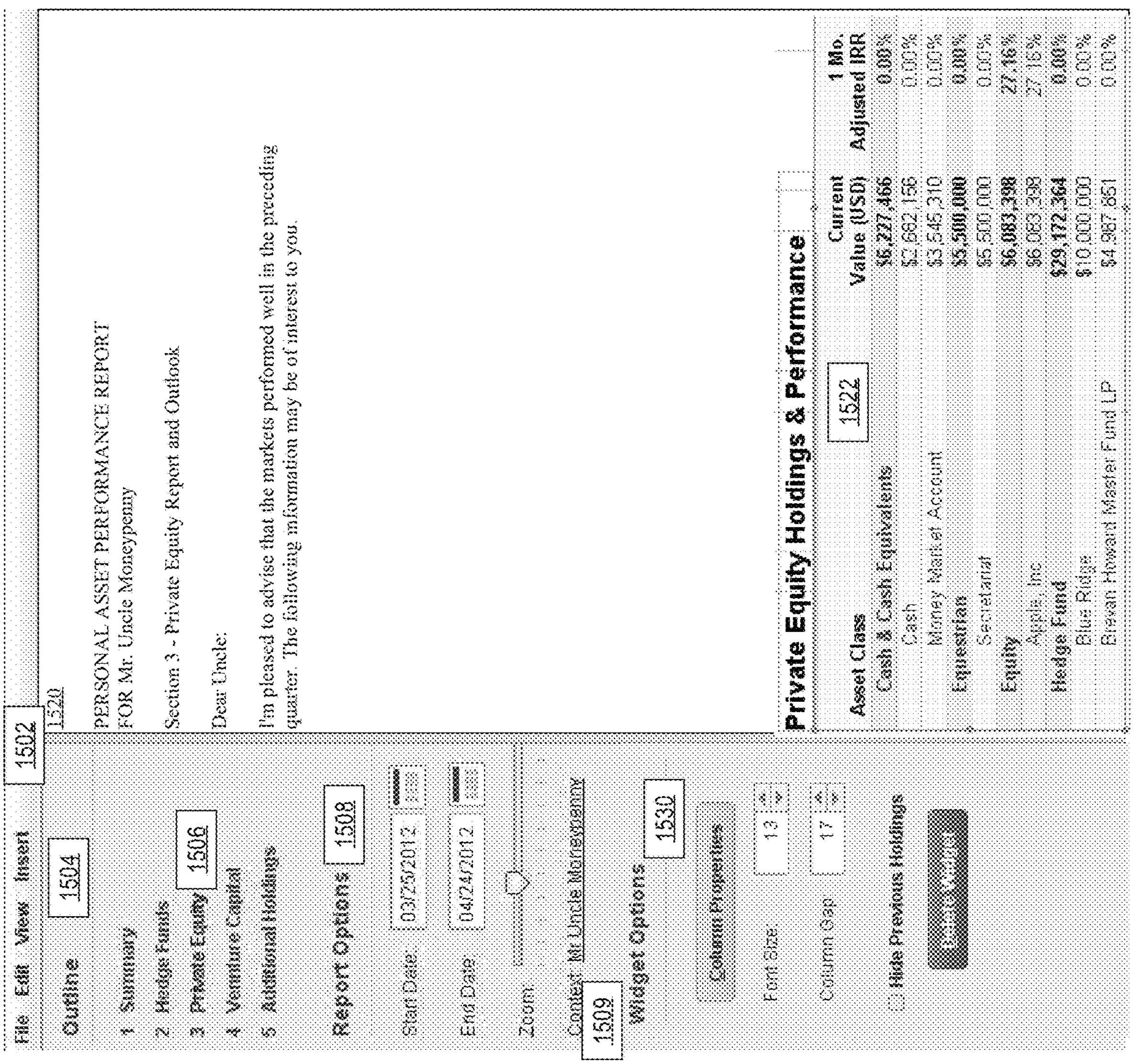
FIG. 16 illustrates the report of FIG. 15 in which an existing table widget has been selected.

FIG. 16 illustrates the report of FIG. 15 in which an existing table widget has been selected. In an embodiment, report unit 109 is configured to receive user input indicating a selection of a particular existing table widget 1522 or graphic widget 1524 and to cause displaying a context-sensitive widget options panel 1530 to replace the page options panel 1510. In an embodiment, report unit 109 causes redisplaying the page options panel 1510 when a page-level element is selected in the report, such as a header, margin or border of the page. Widget options panel 1530 comprises one or more GUI widgets that may receive user input to modify attributes or properties of the particular existing widget that was selected. For example, when table widget 1522 is selected, widget options panel 1530 comprises a column properties button, font size widget, column gap widget, and Delete Widget button. In an embodiment, modifying the numeric value shown in the font size widget or column gap widget causes report unit 109 to cause redisplaying the table widget 1522 with a modified font size and modified spacing between columns, respectively.

In an embodiment, the use of a large font size may preclude rendering all of a set of table data within a particular table widget 1522 because the number of columns or overall width of the data exceeds the defined size of the table widget. In such a case, the table data is truncated and some data becomes invisible in the report in order to maintain the size, properties and appearance of the table widget. However, the invisible data is maintained in memory. Consequently, reducing the font size with options panel 1530 causes re-rendering the table widget 1522 in the reduced font size and automatically causes displaying additional table data that had been invisible prior to the font size change. Therefore, a user can move any desired table data from a table view 408 (FIG. 4) into a report without negatively affecting the appearance of the report, its pages, or specified widgets for holding table data, and the user can adjust the size or quantity of the displayed table data to fit the defined space. Aesthetic appearance of the report is maintained while permitting custom data to be applied to an existing report.

Figure 17:
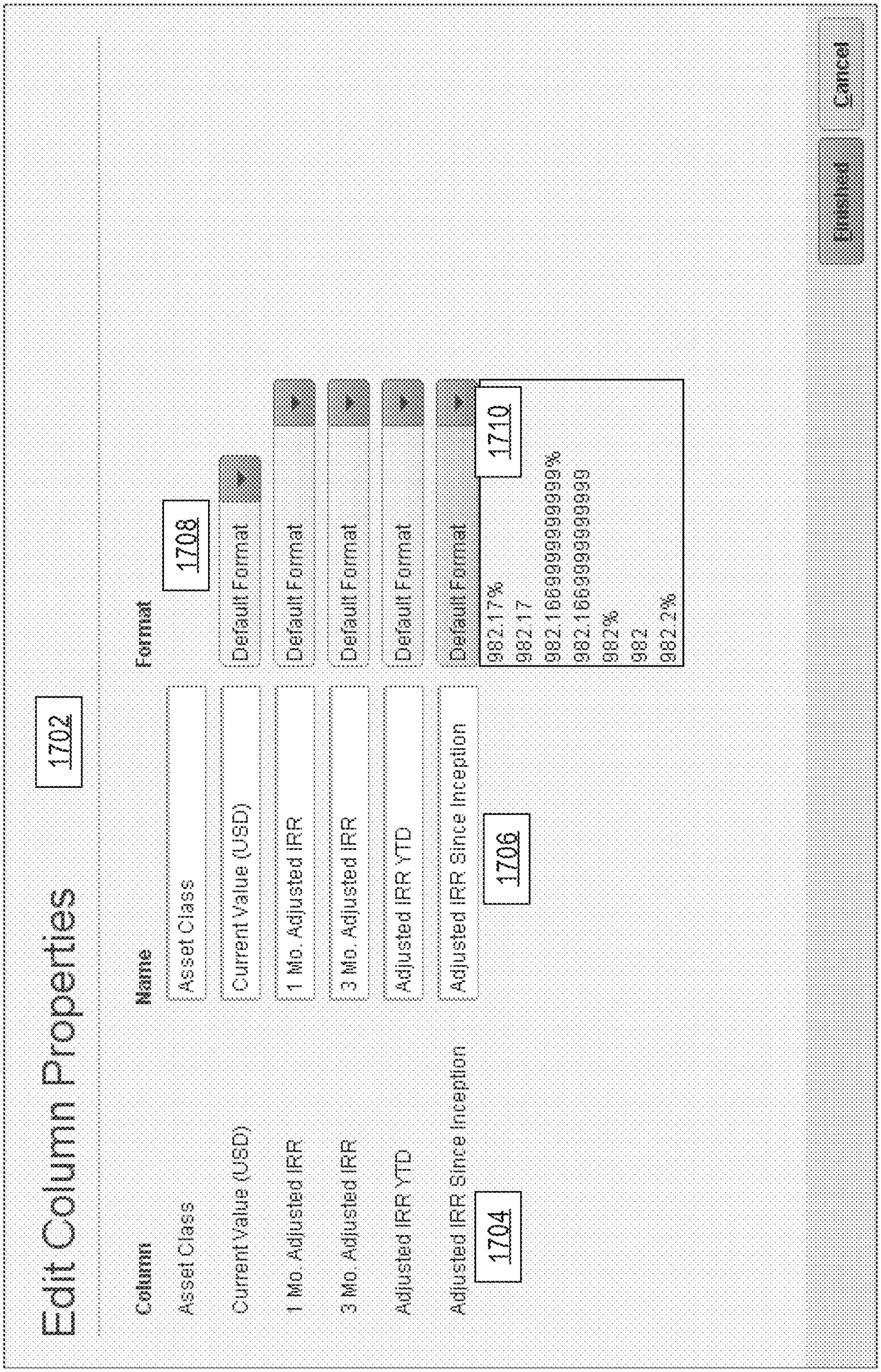
FIG. 17 illustrates an example of a column editing dialog.

In an embodiment, selecting the column properties button from options panel 1530 causes the report unit 109 to display a column editing dialog. FIG. 17 illustrates an example of a column editing dialog. In an embodiment, column editing dialog 1702 comprises a column list 1704 organized by ordinal positions of columns in the table widget 1522, a name list 1706 comprising text fields specifying corresponding names of columns, and a format list 1708 comprising pull-down menus that may be used to specify a particular format for values in an associated column. In an embodiment, user input in a text field of list 1706 causes modifying the name of an associated column in table widget 1522 when a Finished button is selected. Further, selecting one of the pull-down menus in format list 1708 causes report unit 109 to cause a display of a format menu 1710 providing available formatting options for the associated column. In an embodiment, the menu options in format menu 1710 reflect an actual data value from the associated column of the table widget 1522 and not generic or dummy data values. User input may be received to select one of the menu options in format menu 1710 and apply that format to the table widget 1522. In response to user selection of the Finished button, report unit 109 causes closing the column editing dialog 1702 and redisplays the report in updated form based on the selections that were made in the column editing dialog 1702.

In an embodiment, activating the report unit 109 as described above causes the report unit to display a representation 1512 of the selected table view 408 over report view 1520. Representation 1512 is movable over the report view 1520 in response to user input from a pointing device. Report unit 109 is configured to respond to user input selecting a particular region of the report view 1520 by applying the data shown in representation 1512, and for all other data associated with the underlying table view 408, to the report. Consequently, the report view 1520 is augmented with the data from table view 408.

Figure 18:
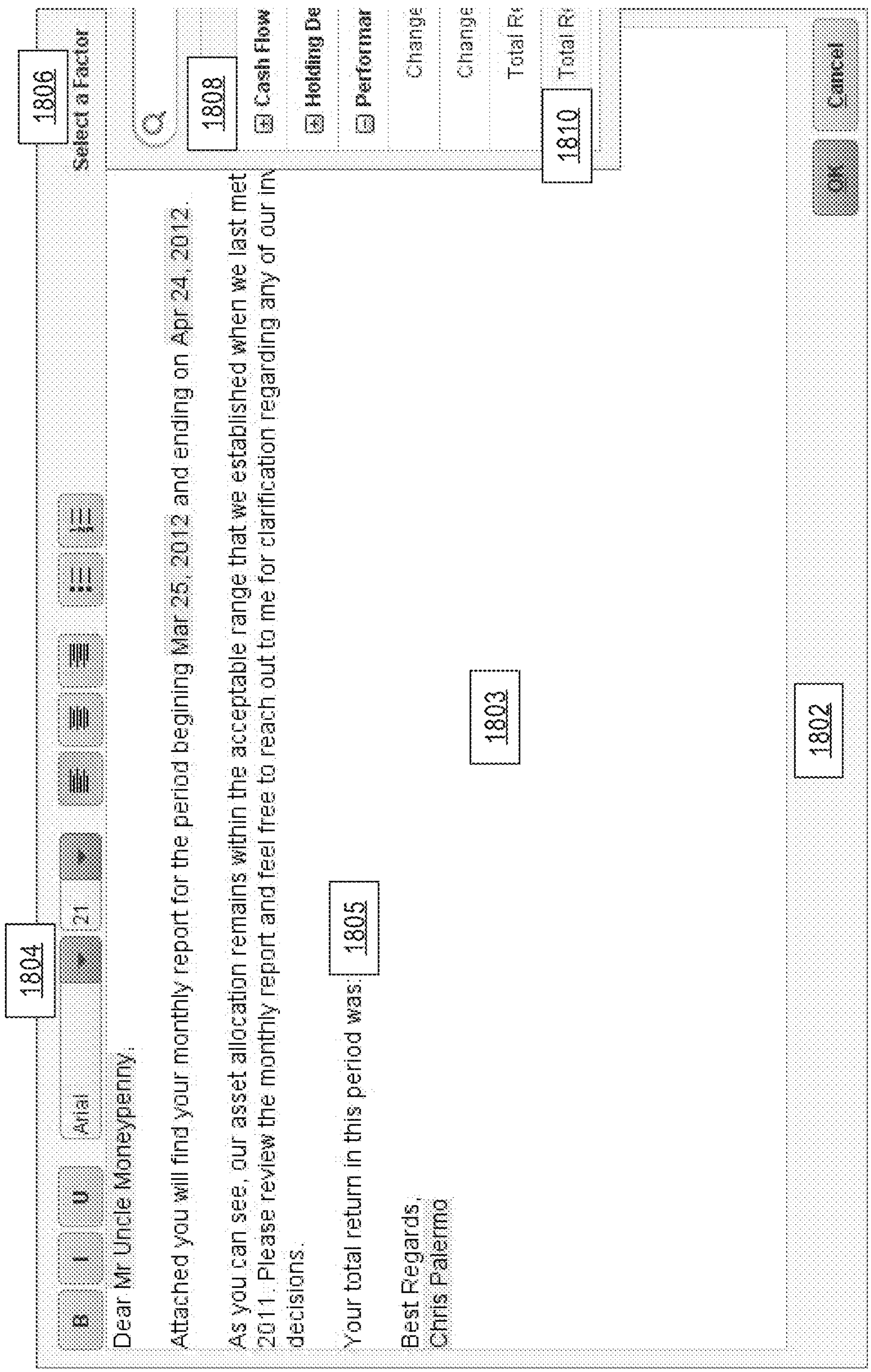
FIG. 18 illustrates an example text editing dialog.

Similar editing operations may be applied to text widgets and graph widgets. For example, context-sensitive operations for text widgets may include editing the text, changing text color, or deleting the widget. Further, in an embodiment, report unit 109 is configured to permit editing text with the capability to insert symbolic references to Factors that are substituted with specific values based on the Context when a report is displayed. In an embodiment, to insert symbolic references in text, a user selects a text widget, then selects an Edit Text control from the options panel 1530. In response, report unit 109 causes displaying a text editing dialog. FIG. 18 illustrates an example text editing dialog. In an embodiment, text editing dialog 1802 comprises formatting controls 1804 and a Factor selection link 1806 adjacent to a text display window 1803, which in the example of FIG. 18 displays previously entered example text. Assume that a user wants to insert a symbolic reference in the text at position 1805. After selecting that position, the user selects the Factor selection link 1806. In response, report unit 109 causes displaying a menu 1808 of available Factors, organized in a tree hierarchy in the same manner used in other Factor selection menus that have been previously described. The user may select any particular Factor 1810 from the menu. In response, report unit 109 causes inserting a symbolic reference at position 1805 and concurrently displays a specific value for the symbolic reference based on the current Context. Thereafter, if the Context is changed during display of the report, the specific value displayed at the same position 1805 automatically changes based on the current Context without separate editing or configuration by the user. Consequently, the user may prepare a report and re-display the report in different Contexts for the benefit of multiple different clients or legal entities, enabling the automatic generation of custom tailored reports that use appropriate client data based on the Context.

Operations for graph widgets may include changing the title of a graph or deleting the widget.

Consequently, a user can begin with a prior report and make any desired modifications to the content of the report without adversely affecting the formatting or appearance of the report, which maintains adherence to the underlying formatting guidelines that are associated with pages and widgets. In each case, filtering options and other changes that are selected in a report result only in aesthetic changes to the presentation of the report and do not result in changing underlying calculations or filtering of data.

In an embodiment, report unit 109 is configured to provide automatic page splitting in response to specified user input. Page splitting refers to automatically creating one or more copies of a particular report page based upon a specified splitting factor, such as asset class, country, or sector. With page splitting, a user can create a particular page arrangement once, and then automatically create copies of the particular page arrangement but with data divided according to the splitting factor. For example, if a client holds assets in United States, France, and Germany, a user can create a single page arrangement and then request page splitting by country; in response, report unit 109 creates two (2) additional pages and then distributes the data among the three (3) resulting pages so that only United States asset data appears on one page and asset data for France and Germany appear on other pages.

In an embodiment, the splitting factor may be any Factor that has been defined in the system. In an embodiment, to accomplish page splitting, a user selects a Split Page widget from the page options panel 1510. In response, report unit 109 causes displaying a menu of Factors, organized in a hierarchy or tree as previously described for other features. User input is received to select one of the Factors from the menu. In response, report unit 109 creates and stores metadata defining one or more other pages and associates the metadata with the current report, then causes re-computing and re-displaying the report based upon the splitting Factor and the newly created metadata. The new pages are reflected in the page outline 1506. As a result, the techniques herein provide for complete flexibility in defining reports and page groupings, and in particular, the availability of any Factor as a split factor imposes no restrictions on the ability to define page splits.

In an embodiment, the metadata for each split page is coupled by references to the first page of the report. Consequently, each split page inherits, through the references and based upon object inheritance mechanisms, any modifications that the user makes to the first page of the report. Further, in an embodiment, each split page is not capable of modification by the user, but instead receives re-rendered data in dependence on the first page and any changes made to that page.

Figure 19:
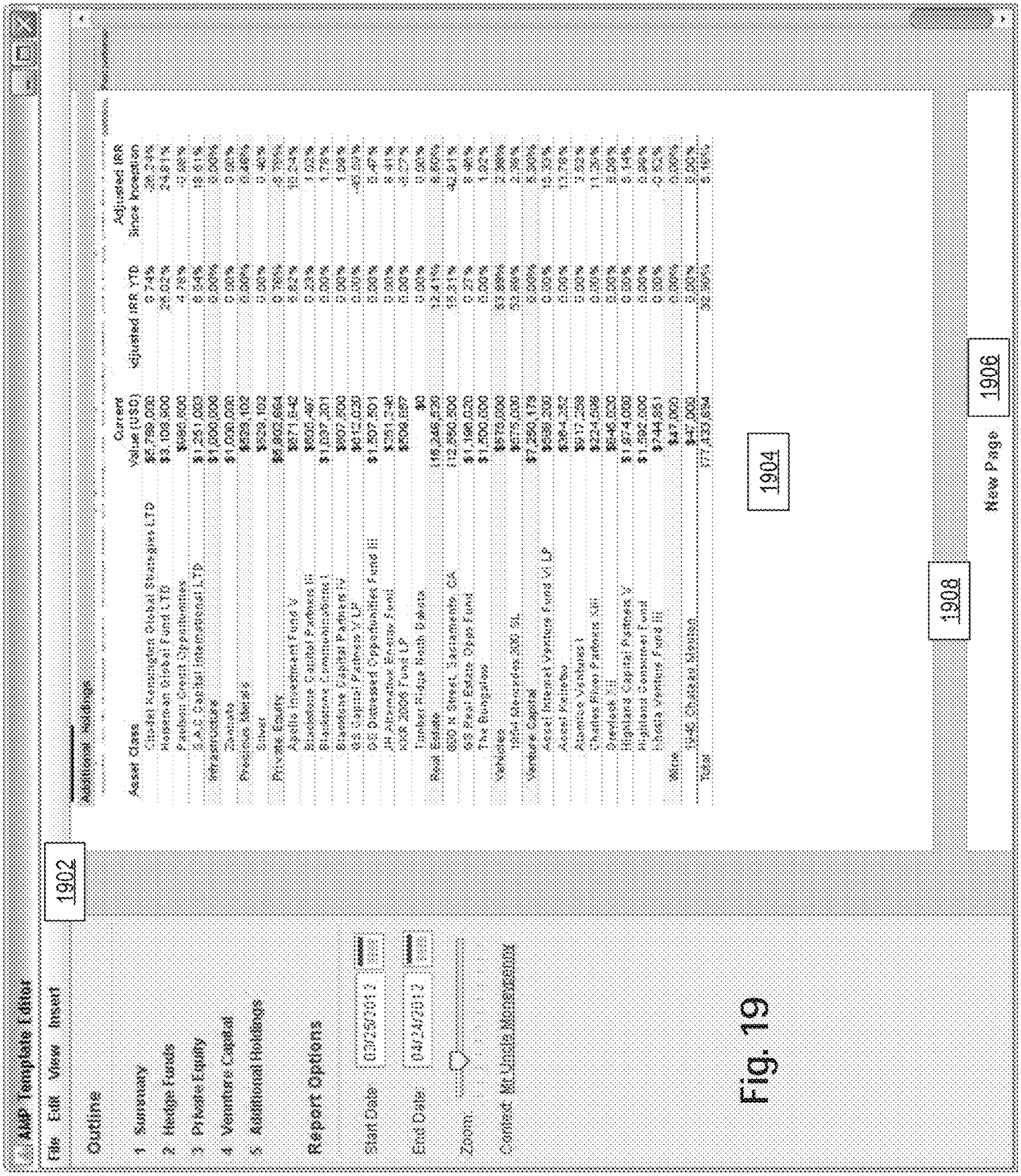
FIG. 19 illustrates an approach for adding new pages to a report.

FIG. 19 illustrates an approach for adding new pages to a report. In an embodiment, a report creation user interface 1902 may display a last page 1904 of a report, and a new page region 1906 adjacent to an end of the last page of the report. In an embodiment, pages of the report are displayed using a white background, and non-white coloring indicates borders and other regions of the report creation user interface 1902 that are not part of a page of a report. In an embodiment, new page region 1906 is separated from the last page 1904 by a gutter region 1908, and the new page region has a width equivalent to the width of the last page. In this arrangement, the new page region 1906 is configured with the appearance of a partial page or truncated page that appears after or following the last page 1904. Optionally, the new page region 1906 may have a descriptive label such as "New Page," or an icon, symbol, or hyperlink that suggests to the user that a new page could be created by selecting the new page region or a part thereof.

In an embodiment, user selection of new page region 1906 causes the page display unit 109 to add metadata defining a new page to the report and re-display the report showing the added new page. The new page region 1906 is redisplayed adjacent to the new page, again separated by gutter region 1908. In various embodiments, the new page may comprise a copy of the last page, or a page that is blank except for headers, footers, page numbers and other page-level attributes that are defined by page metadata or inherited from a preceding page. Using these techniques, the report creation user interface 1902 provides an efficient and attractive method to identify that the last page of a report has been reached and to suggest to the user a mechanism or method for creating a new page.

In an embodiment, upon completing the definition of a report using the reporting dialogs described herein, the report may be rendered in a static PDF file for communication to an external user or computer. In an embodiment, the static PDF file is rendered in a vectorized PDF format, enabling zoom-in to an arbitrary level of magnification without introducing jagged font edges or other artifacts of image transformation.

In an embodiment, report unit 109 is further configured to export or import one or more report templates in response to user selection of an export function or import function within the report interface. A report template is a set of metadata that defines the appearance of a report, including the metadata described above for the nature and form of widgets, the position of widgets in pages, the number of pages, symbolic references in text, certain static text, and references between split pages and a first page. However, a report template does not include any actual data values. Therefore, a report template may be shared and communicated across firms or using non-secure network links without compromising the privacy of actual data values. Importing a template involves reading the metadata values that comprise the template, building a memory model of the report, and rendering a display of the report based on the current Context. Actual data values are substituted into the report template and become visible only after importing is complete and computation of the report is performed using the graph traversal techniques described herein.

In an embodiment, report unit 109 is configured to permit publication of a report in electronic document form (for example, as a PDF file) to a plurality of individuals or legal entities. Publication enables transforming a particular report view into a plurality of fully rendered report files, each using data specific to one of the individuals or legal entities. Thus, using a batch publication operation, a user can generate custom reports for each of a plurality of clients, individuals or legal entities and containing only data associated with the recipient.

In an embodiment, a user may initiate publication by activating report unit 109 and selecting the menu options File→Export PDF. In response, report unit 109 causes displaying a pop-up menu that prompts the user to select a particular report and time range for data to be reflected in publications of the report. The user is also prompted to select one or more persons to be represented in one or more publications; the user may select one or more individuals, groups, or legal entities.

In an embodiment, as a particular individual, group or legal entity is selected in the prompt dialog, the report view (FIG. 15) is updated automatically in response to each selection using traversal of the graph 102 to yield data solely for the selected individual, group or legal entity. Consequently, the process of selecting targets for the publication enables the user to obtain a preview of the appearance of a publication of the report for that selected individual, group or legal entity. Further, while viewing the preview publication for a particular individual, group, or legal entity, the user may edit that individual publication to add a personal note or other customization just for one particular individual, group or legal entity.

In an embodiment, report unit 109 commences generating output for the publication in response to user input selecting a Publish widget. In an embodiment, the user can select publication by printing, generating a file, or emailing to a specified email account. In an embodiment, commencing publication causes report unit 109 to create a log entry in a log table of repository 104; this function enables an organization to monitor communication of sensitive financial data by creating an audit trail of which users communicated particular data to particular external destinations. A log entry may identify the current user, time, publication operation, destination (email, file, printer), publication identifier, etc.

Accordingly, as described above, the interactive user interfaces of the system enable non-technical users to quickly and dynamically generate and edit complex reports including tables and charts of data. The complex reports may be automatically and efficiently generated through access and traversal of complex data structures, and calculation of output data based on property values of multiple nodes within the complex data structures, all in substantially real-time. By storing the data as a complex mathematical graph, outputs (for example, a table) need not be stored separately and thereby take additional memory. Rather, the system may render outputs (for example, tables) in real time and in response to user interactions, such that the system may reduce memory and/or storage requirements. Thus, in some embodiments, the systems and user interfaces described herein may be more efficient as compared to previous systems and user interfaces.

5.0 Hardware Overview

According to various embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
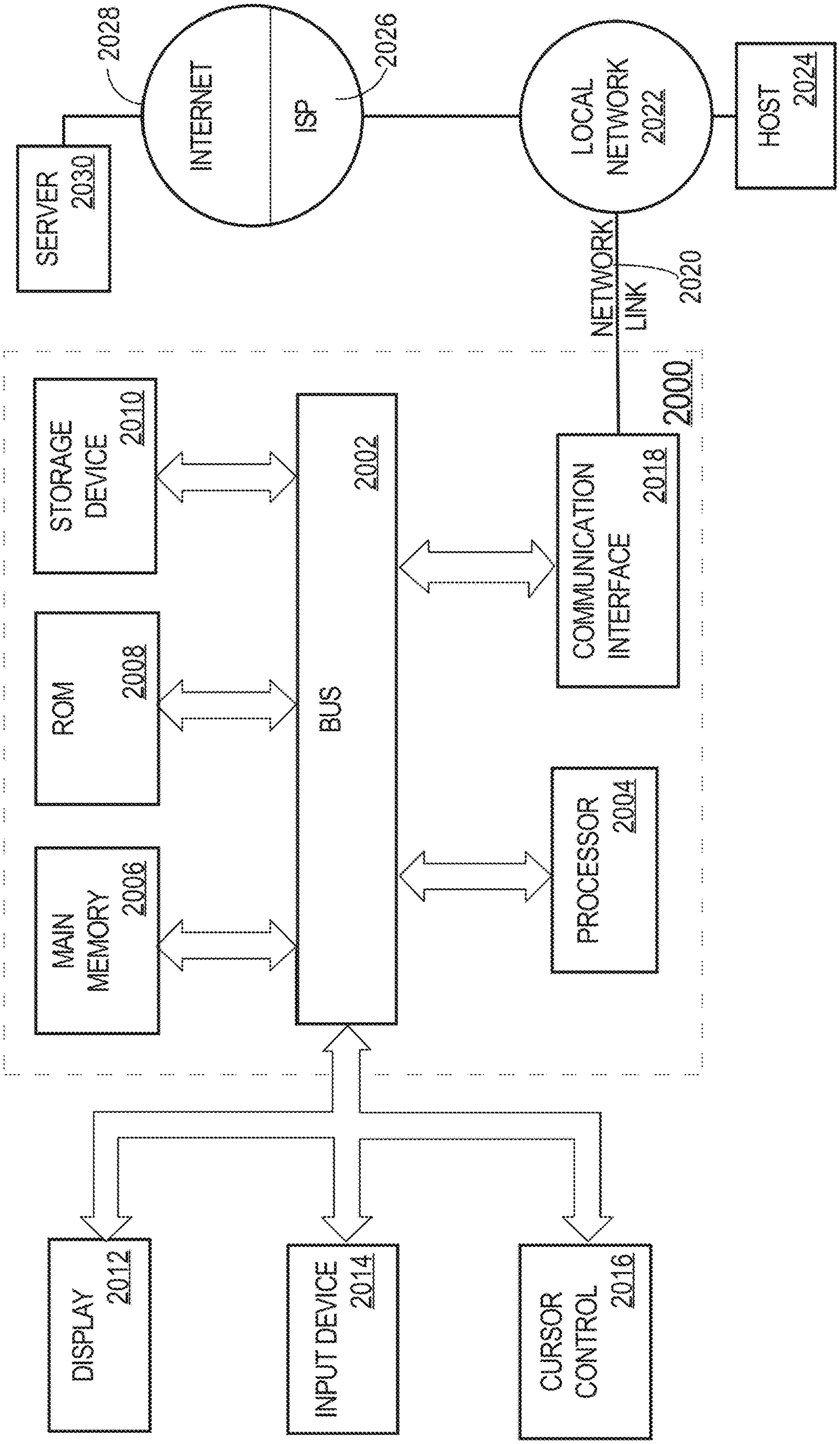
FIG. 20 illustrates a computer system with which various embodiments may be implemented.

For example, FIG. 20 is a block diagram that illustrates a computer system 2000 upon which various embodiments of the invention may be implemented. Computer system 2000 includes a bus 2002 or other communication mechanism for communicating information, and a hardware processor 2004 coupled with bus 2002 for processing information. Hardware processor 2004 may be, for example, a general purpose microprocessor. In various embodiments, one or more of the memory 100, data repository 104, table view 105, view computation unit 106, rendering unit 107, report unit 109, graph model logic 112, custodian interface unit 113, and/or the like, may be implemented on the computer system 2000. For example, the various aspects of the systems described in reference to FIG. 1 may be stored and/or executed by the computer system 2000.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk or optical disk, is provided and coupled to bus 2002 for storing information and instructions.

Computer system 2000 may be coupled via bus 2002 to a display 2012, such as a cathode ray tube (CRT), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2010. Volatile media includes dynamic memory, such as main memory 2006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

6.0 Additional Report Generation and Editing User Interfaces

FIGS. 21-26, 27-52, 55-57, 58-60, and 62-71 illustrate additional example interactive user interfaces of the system that are related to report generation and/or editing. As with the example user interfaces described above, the system may be configured and/or designed to generate user interface data (via, for example, the report unit 109 and/or rendering unit 107) useable for rendering the interactive user interfaces described below. In various embodiments, the example user interfaces described below may be views, and/or may include one or more views, and may be based on a context (including, as described above, a perspective and/or a date (or date range)). Views may be generated by the view computation unit 106 based on the graph 102. Further, the report unit 109 may be configured to receive view data from the view computation unit 106, which may be used in various user interfaces generated by the report unit 109.

For example, in various embodiments described below, user interface data may be generated by the rendering unit 107. The user interface data may be transmitted to the computer display unit 108, the client computer 116 (in, for example, embodiments in which clients view report information), and/or any other computing device, such that the example user interfaces are displayed to the user (and/or clients of the user, individuals, and/or legal entities). As described above, the computer display unit 108 and/or another computing device of the user (and/or the client computer 116) may include a browser program (and/or other software program) for rendering the user interfaces based on the user interface data. In another embodiment, the rendering unit 107 and/or the server computer 118 may render the user interfaces, which may be displayed to the user on a display of the system (for example, the computer display unit 108), and/or communicated to another computing device (for example, the client computer 116) for display to the user and/or other users of the system. Inputs from the user via the user interfaces may be transmitted back to the system via that rendering unit 107.

As is described below, the various example user interfaces may include one or more table views, graphs, charts, and other report elements. Such report elements may be generated by the system, with the data insert into the report elements being calculated by the view computation unit 106 based on traversal of the graph 102 and a selected context, as described above. The report unit 109 may facilitate selection of contexts, generation and editing of reports, and/or various other aspects of the user interfaces described below.

Further, as mentioned above, in various embodiments the system includes user authentication and permissioning. For example, a user of the system may be required to provide authentication information (for example, a username and password, a fingerprint scan, and/or the like) when accessing the system. Such authentication information may be required by the system before the user may view one or more of the user interfaces described herein, and/or may generate tables based on particular data stored by the system. In some embodiments, the user's identity may be used to determine particular data of the system which is accessible to the user. For example, the system may include data associated with many clients, only some of which are associated with the user. Accordingly, only data related to the clients associated with the user may be available via the various user interfaces. Thus, the user's identity may, in some embodiments, be authenticated before any data is shown to the user.

Permissions data may be associated with the various data stored by the system such that only data that the system may make available to a particular user only data that is permissioned such that it should be made available to that particular user.

FIGS. 21-26 illustrate example user interfaces of the system in which a report may be generated and/or edited. As described above, in some embodiments the system provides user interfaces for generating and/or editing reports. The reports may include multiple report sections. Each report section may include multiple pages. The report sections and pages of the report may be represented in the user interface, and may, when the report is published and/or exported, correspond to sections and pages of a report file (for example, a portable document format (PDF) file) and/or a physical report printed on paper.

Figure 21:
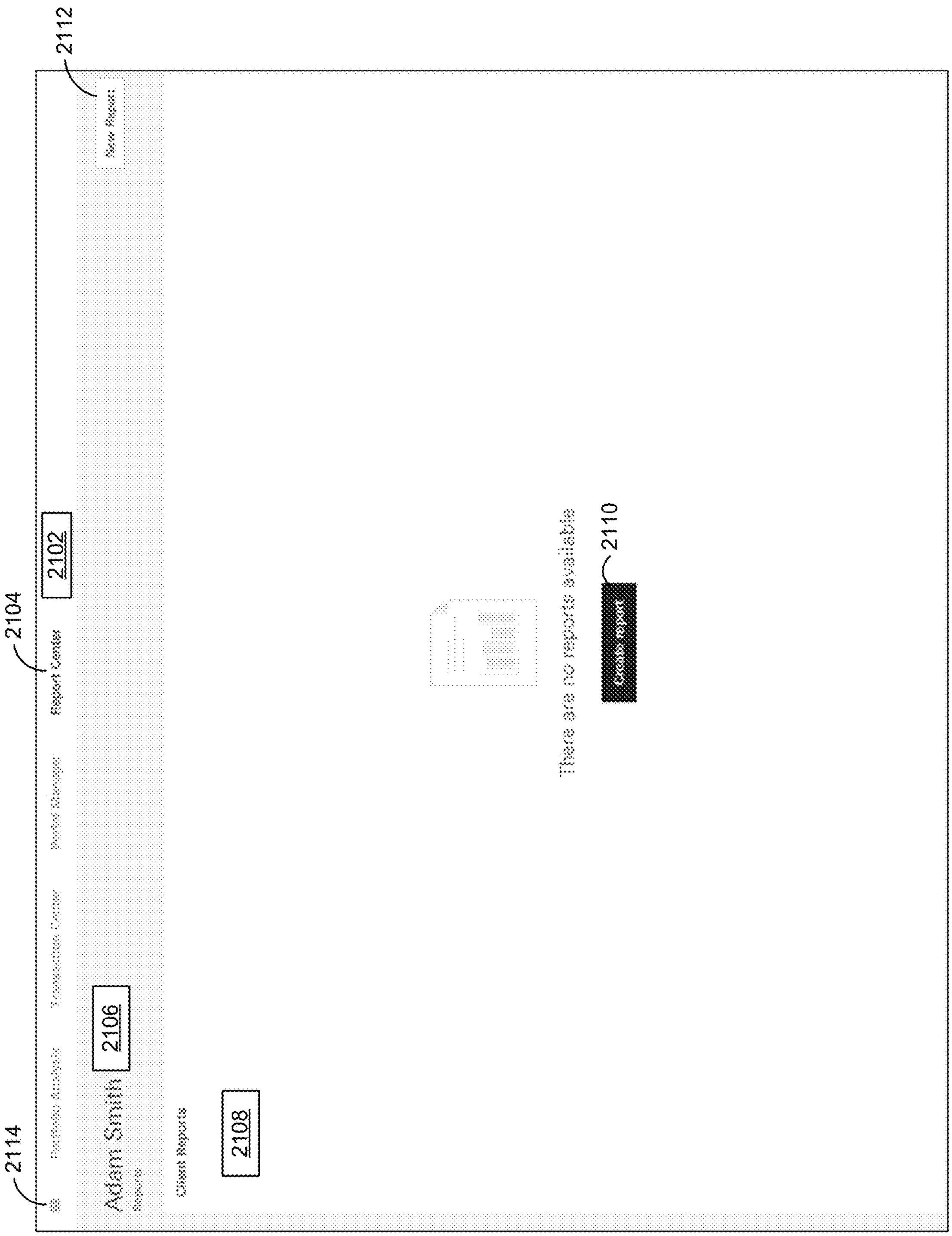
FIGS. 21-26 illustrate example user interfaces of the system in which a report may be generated and/or edited.

Referring to FIG. 21, example user interface shown in which the user may create a new report. The user interface includes a top portion 2102 including selectable indications "Portfolio Analysis," "Transaction Center," "Portal Manager," and "Report Center" 2104. In the user interface of FIG. 21, Report Center 2104 is selected indicating that the user is viewing the report center aspect of the system. Selection of the other selectable indications cause other user interfaces to be displayed to the user. For example, selection of the Portfolio Analysis indication may cause a user interface, such as the user interface of FIG. 4 described above, to be displayed to the user. Selection of button 2114 may cause a sidebar to be displayed on a left side of the user interface showing a listing of various selectable perspectives (for example, various clients, legal entities, and/or the like). In the user interface of FIG. 21, the current selected perspective is "Adam Smith" 2106. A middle portion 2108 of the user interface indicates that no reports are currently available for Adam Smith. The user may select "Create report" button 2110, and/or "New Report" button 2112, to begin generating a new report.

Figure 22:
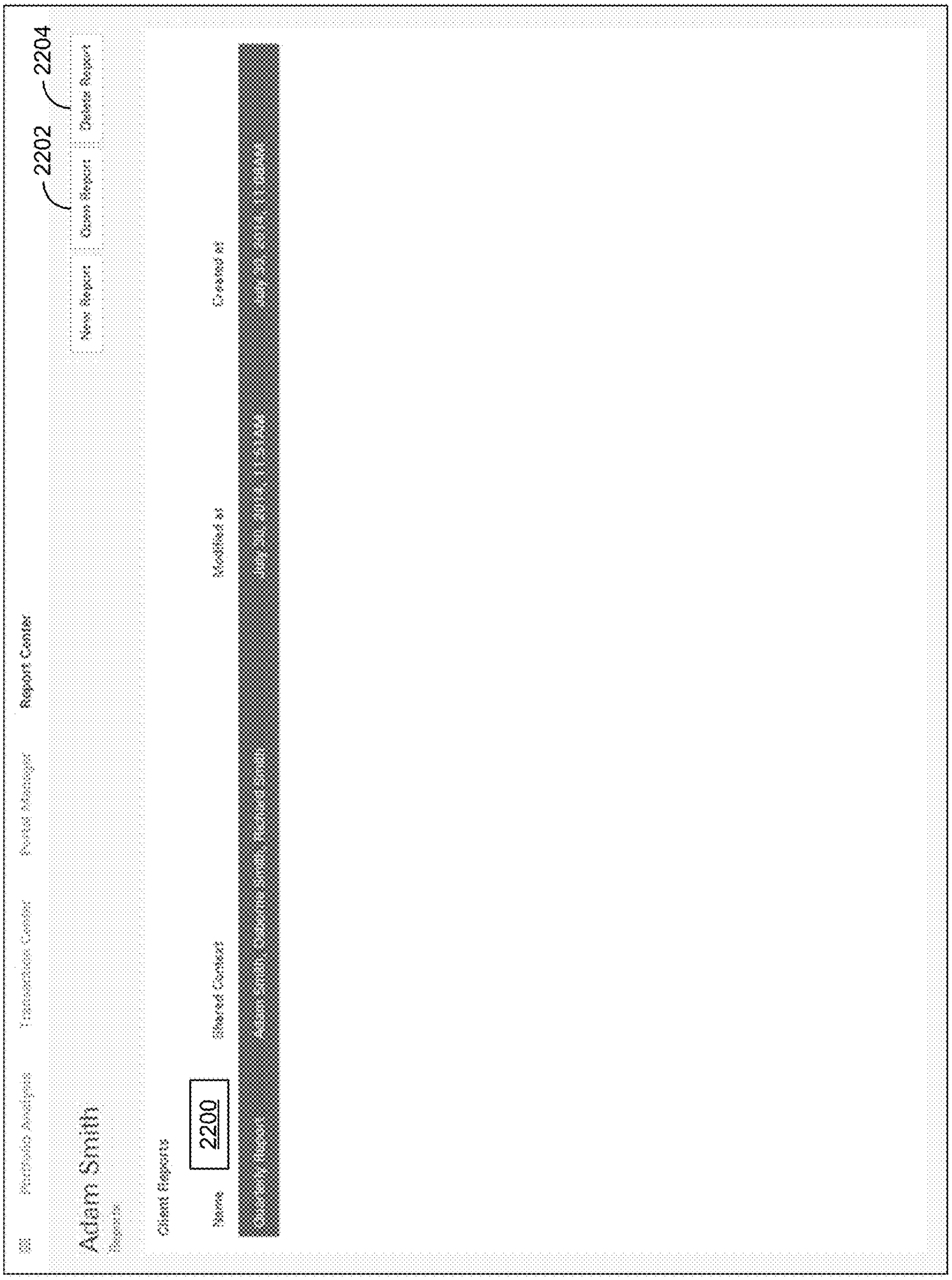

FIG. 22 shows an example user interface similar to the user interface of FIG. 21, however, as indicated in user interface portion 2200, a previously created report ("Quarterly Report") is available and may be selected by the user. Selection of a previously created report may cause the system to display user interfaces in which the previously created report may be edited, as described below. The user may select "Open Report" button 2202 to open the selected report for editing. The user may also select the "Delete Report" button 2204 to delete the selected report. As shown in the user interface portion 2200, the previously created report, named "Quarterly Report," is available in multiple contexts (including, Adam Smith, Osborne Smith, and Richard Smith), was last modified on July 30, and was created on July 30. As the previously created report is available in multiple contexts, user interfaces in either the "Osborne Smith" context or the "Richard Smith" context will also list the previously created "Quarterly Report."

Figure 23:
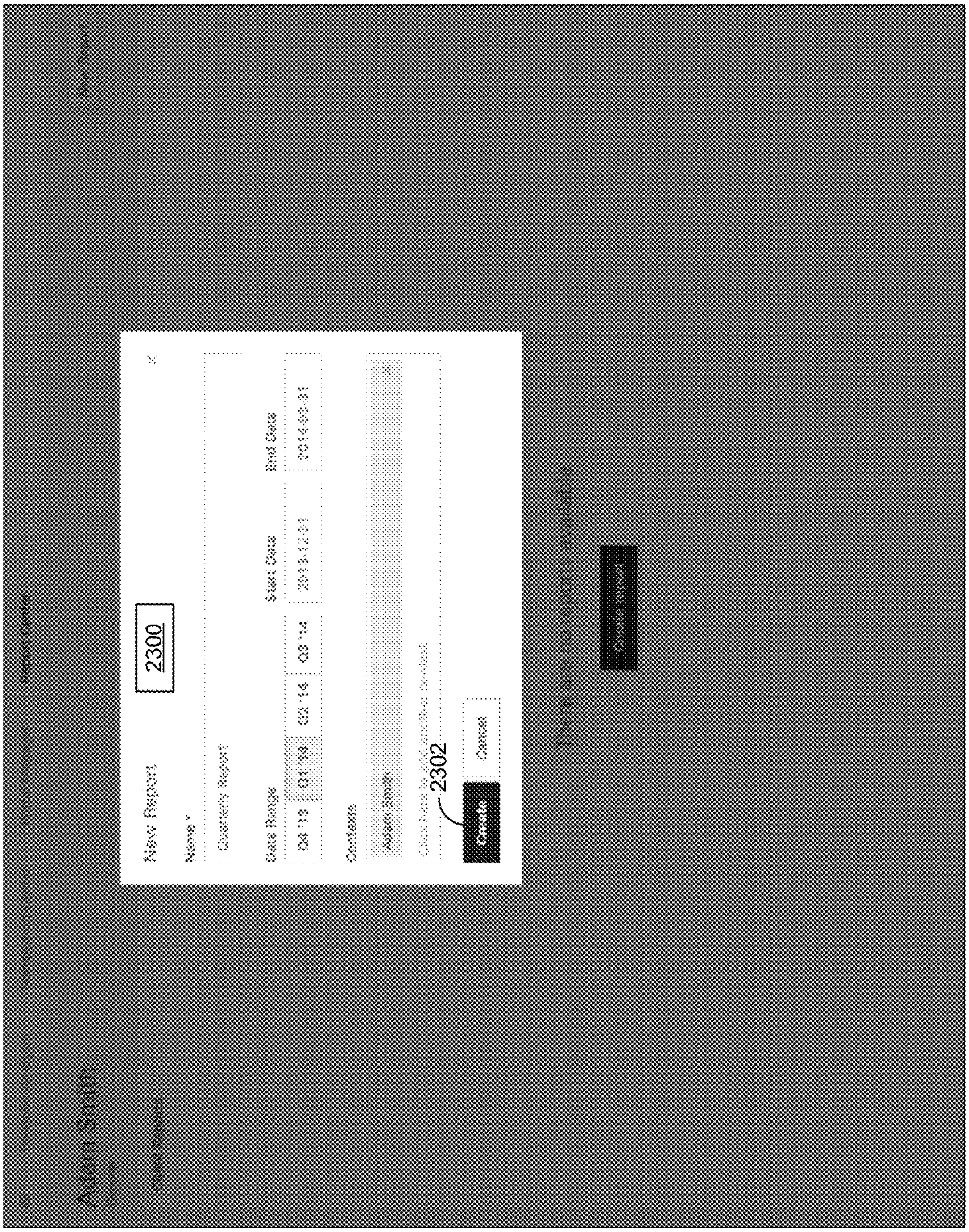

FIG. 23 shows an example user interface in which the user has selected the Create Report button so as to create a new report. Dialog box 2300 is shown including various options associated with the new report. For example, the user may enter a name for the report, a date range for the report, and/or one or more contexts for the report. As used in the user interfaces of FIGS. 21-26, 27-52, 55-57, 58-60, and 62-71, the term "context" may be used to refer to simply a perspective (in cases in which a date (or date range) may also be specified), or may be used to refer to both a perspective and/or a date (or date range). Referring again to FIG. 23, selection of the "Create" button 2302 will cause the system to generate a new report based on the selected options.

Figure 24:
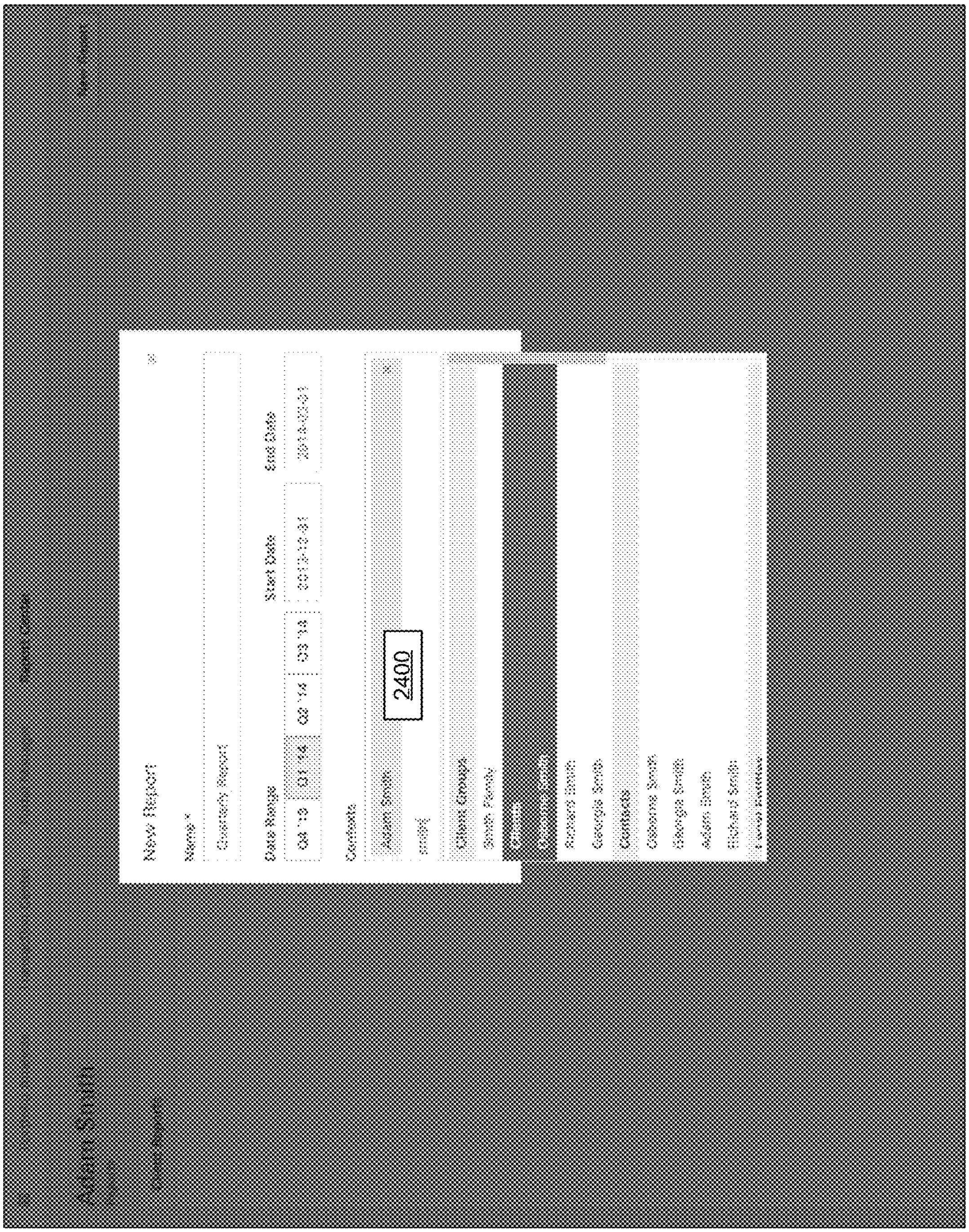

FIG. 24 shows an example user interface similar to FIG. 23 in which the user may specify one or more contexts (here used simply to refer to perspectives) when generating a new report. As shown in context box 2400, in response to the user typing a name, the system automatically determines any matching contexts and displays them in a drop-down box. The user may then select multiple contexts to be applied to new report.

Figure 25:
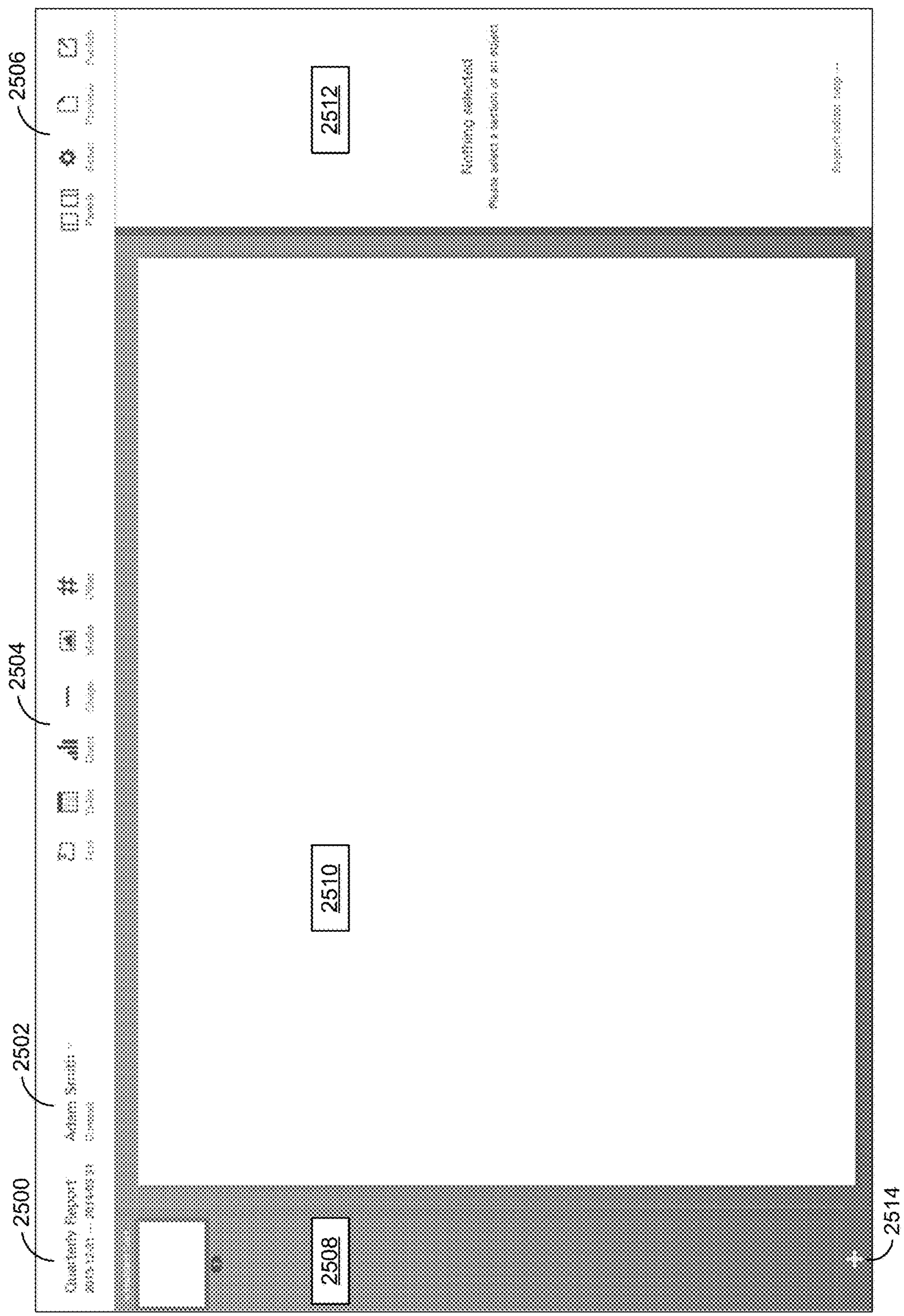

FIG. 25 shows an example user interface that is displayed to the user when a new report is initially generated. The user interface includes an indication of the report name and applicable (and/or user-specified) date range 2500, an indication of a current context 2502 as well as a drop-down to switch among different contexts applicable to the current report, user interface elements buttons 2504 that may be selected by the user to add various elements (such as text, tables, charts, shapes, and/or the like) to the report, various function buttons 2506, a thumbnail sidebar 2508, a report view portion 2510, a property editor sidebar 2512, and a section insert button 2514. Function buttons 2506 include a "Panels" button that may be used to toggle display of the thumbnail sidebar 2508 and/or property editor sidebar 2512, a "Setup" button that may be used to display a dialog similar to dialog 2300 of FIG. 23 for editing properties of the report (including, for example, changing the context, perspective, and/or date or date range associated with the report), a "Preview" button that may be used to view a preview the report as it would appear after printing or publishing to PDF, and a "Publish" button that may be used to initiate PDF generation of the report (as described below). In some embodiments, the report view portion 2510 shows the report in the same, or substantially the same, format and look as the report appears after publishing or conversion to PDF (as described below).

The user may interact with the report view portion 2510 of the user interface to add report elements to the report and/or edit the report. Thumbnails (for example, reduced size previews or icons) of every page of the report are shown in the thumbnail sidebar 2508. The thumbnail sidebar 2508 also shows the various sections of the report, and the pages corresponding to each section. As described below, selection of a report element, page (or group of pages), and/or section causes various related properties be displayed in the property editor sidebar 2512 such that the user may edit the properties associated with the selected report element or section. In some embodiments, an indication of a selection of a report element, a page (or group of pages), and/or a section is represented in the user interface. For example, a selected aspect of the report may be represented by a highlighting, color change, a color outline, and/or the like. In the embodiments described below, selected aspects are indicated by a grey outline around the selected element, page, and/or section.

Figure 26:
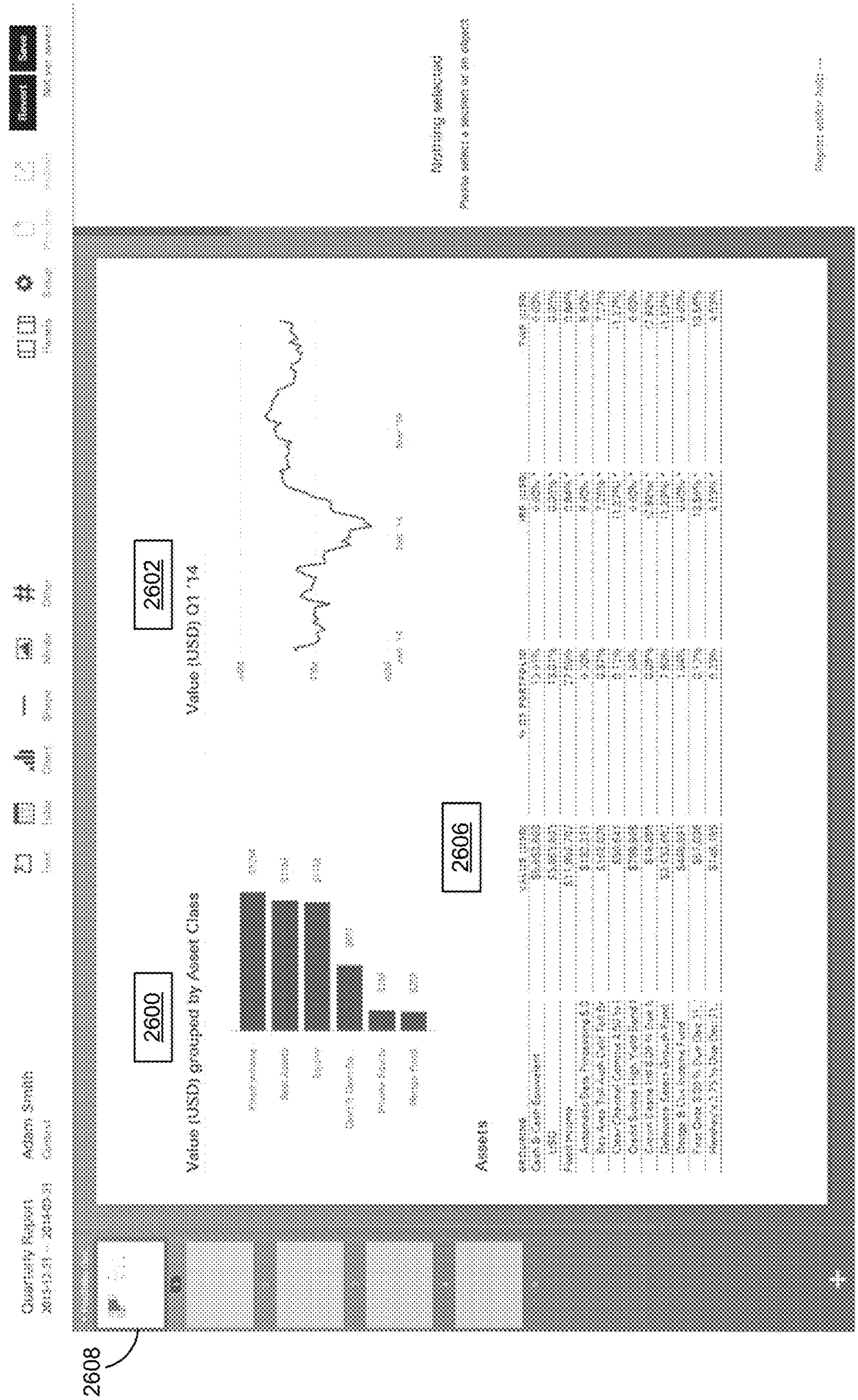

FIG. 26 shows an example user interface in which various elements have been added to the report. For example a bar chart 2600 (showing a value of grouped assets in selected context (including the selected perspective and time)), a line graph 2602 (showing a change in a financial portfolio value over time), and a table 2606 (showing a list of portfolio assets grouped by asset type) are included in a first page of the report. As shown in the thumbnail sidebar, the thumbnails corresponding to the pages of the report have been updated, including first page thumbnail 2608.

6.1 Linking to Template Report Sections

FIGS. 27-52 illustrate example user interfaces of the system in which template report sections (also referred to herein as "linked sections" and/or "master report sections") may be inserted into a report while maintaining a link to the template section. As described above, report sections may be linked to template report sections. A template report section may define a particular layout and/or arrangement of information in a report section. A template report section may also, after being inserted and/or embedded in a report, maintain a link back to the template report section such that any changes to the template report section are reflected in the report. A template report section may further include one or more linked variables (also referred to herein as "symbolic references") which may be filled in with information drawn from a context (including, for example, a perspective and/or a date or date range) of a financial report that is linked to the template report section. For example, a template report section may reference a client name. When that template report section is linked to a section of a financial report in the context of a client named "John Smith," the client's name ("John Smith") is automatically input into the client name variable designated in the template report section. Further examples of linked variables include tables and charts of numerical information. In these examples numerical information may be automatically calculated by, for example, traversal of complex data structures, and presented in each applicable context.

Figure 27:
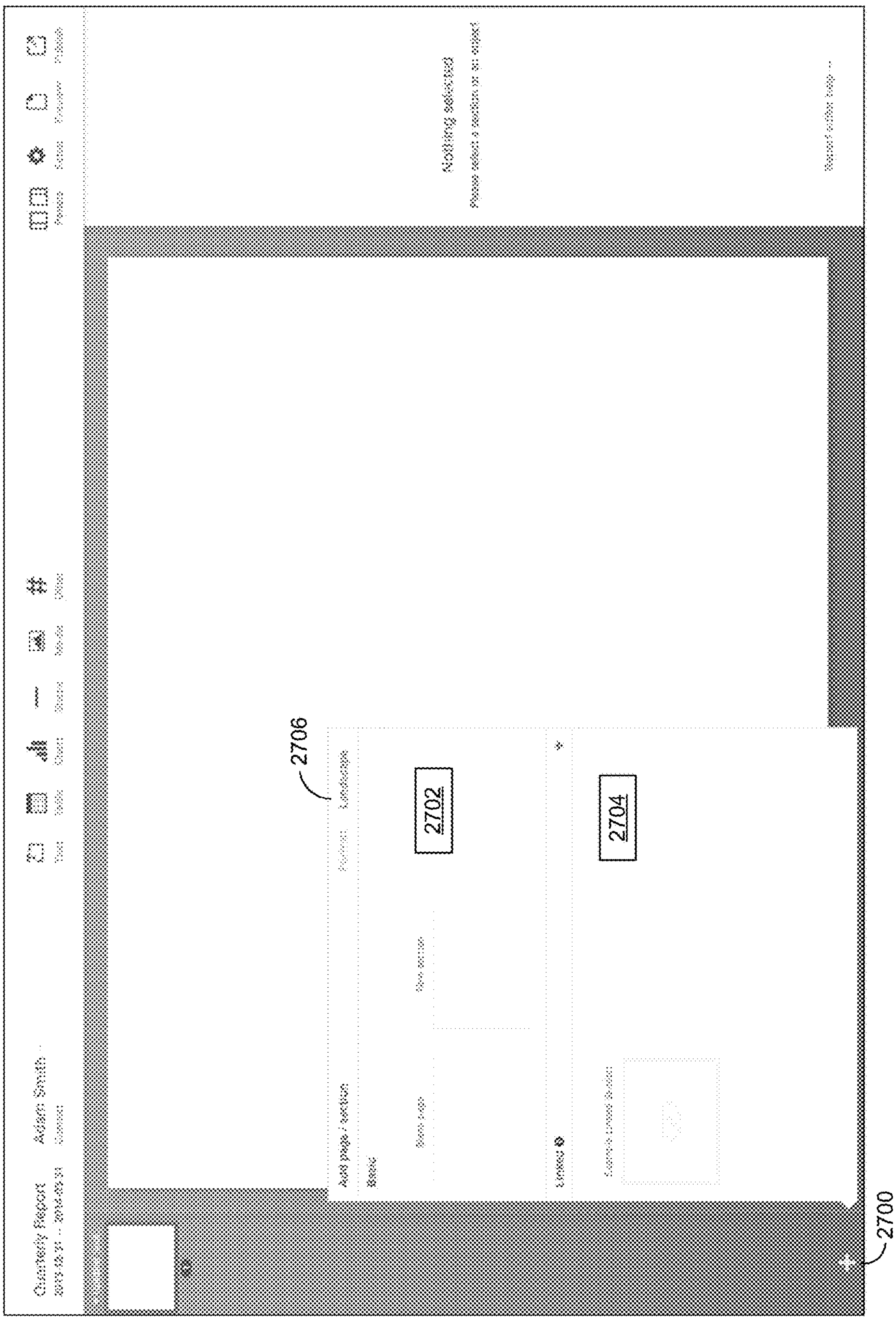
FIGS. 27-52 illustrate example user interfaces of the system in which template report sections may be linked to report sections.

FIG. 27 shows an example user interface in which the user has selected section insert button 2700. Selection of the section insert button 2700 causes a dialog 2706 to be displayed. In the dialog 2706, the user may select a previously created section to add to the current report. Alternatively, the user may select to create a new section. Sections that may be added to the report include "basic" sections 2702, and "linked" sections 2704. In an embodiment, basic sections include any sections not linked to a template, or master, section (for example, a basic section that has been inserted into a report is not automatically updated when a change is made to the basis section in a library of section and/or in another report). Basic report sections may share many characteristics with template report sections as described above (for example, they may define a particular layout and/or arrangement of information, and/or may include linked variables, among other characteristics), however without including any link back to a template section. Dialog 2706 may show a list of sections previously created by the user, and/or other users related to the user. For example, an organization (for example, a firm) of which the user is a member may create various sections that may be used in multiple reports by multiple users. Such sections may be generated a single time and then made available for use by various users in the organization. Accordingly, in some embodiments, an organization may use the system (including linked section) to create a library of sections (or multiple libraries of sections) that may be used and reused in multiple reports, and updated simultaneously by simply updating the template/linked section. Examples of linked section that may be created by an organization and shared among multiple users include a coversheet, a disclosure page, a market overview section, a portfolio allocation section, and/or the like.

Sections may include one or multiple pages. Adding a basic section to the report will cause the pages (including any elements on those pages) corresponding to that basic section to be added to the report with no link back to the basic section. Adding a linked section to the report will cause the pages (including any elements on those pages) corresponding to that linked section to be added to the report, however, the added section will include a link back to a template section associated with the selected linked section. Accordingly, any edits to the template section by any user of the system, may cause a corresponding edit to linked section added to the report. Such linking of sections is described in further detail in reference to the figures below.

Figure 28:
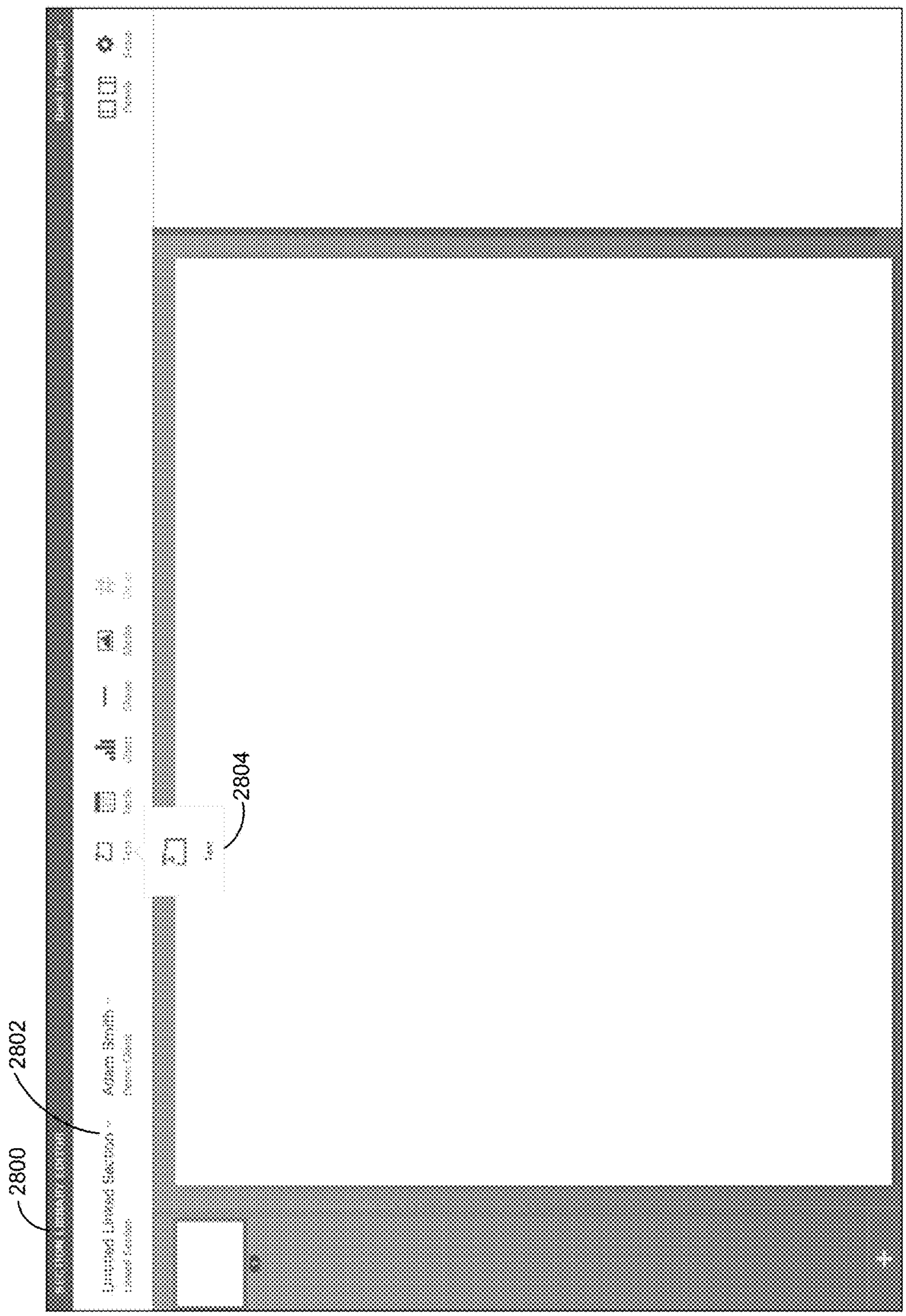
Figure 29:
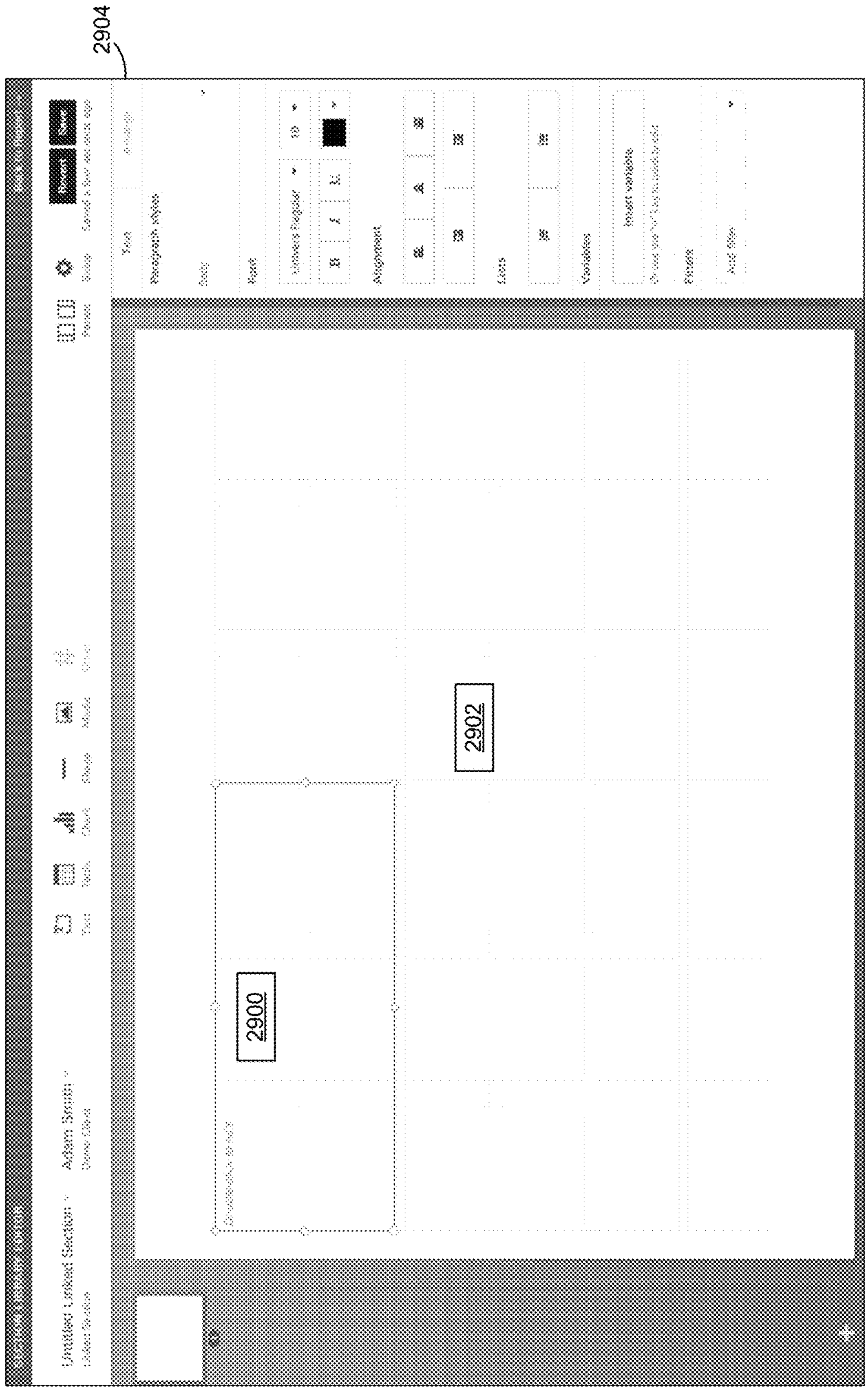

FIG. 28 illustrates a user interface in which a new linked section is generated and edited by the user. Top colored bar 2800 provides an indication to the user that the current user interface shows a section, rather than a report, being edited. As shown in at indicator 2802, the section being edited is titled "Untitled Linked Section," and it is a linked section rather than a basic section. Further, the user has selected to insert a text element by selection of the text button 2804. FIG. 29 shows that a text element 2900 has been added to the report response to the user selection of the text button. In an embodiment, the user interface includes a grid 2902 in the report review portion of the user interface. The grid 2902 may be useful to the user in positioning and sizing various elements in the report. In an embodiment, the grid 2902 is only displayed when an element is being edited or resized in the report. In some embodiments, elements in the report snap to lines of the grid 2902 as they are resized and/or moved. Element properties sidebar 2904 shows various editable properties for the currently selected element 2900. For example, the user may change paragraph styles, font properties, alignment properties, list properties, and insert variables, and/or add filters to the text element 2900.

Figure 30:
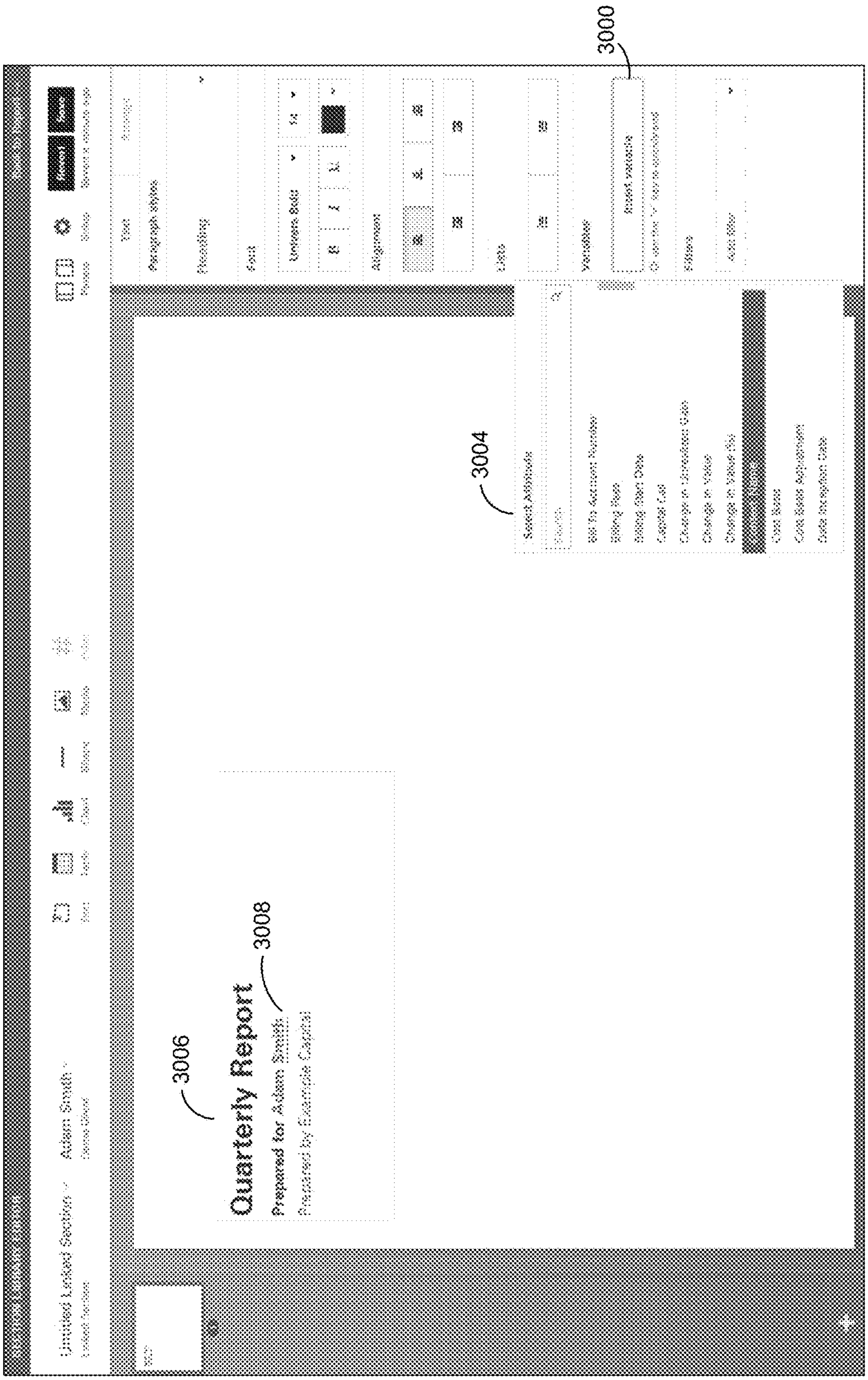

FIG. 30 shows the example user interface of FIG. 29 in which the user is added text to the text element 3006. Additionally, the user selected the "Insert variable" button 3000 so as to insert a variable into the report. Variables are also referred to as "symbolic references" herein. As described above, variables, or symbolic references, comprise links to data and/or metadata that may be associated with a given context (including, for example, a perspective and/or a date or date range). Thus, when a context changes, the variable is automatically updated based on data and/or metadata associated with the new context. In the example shown in FIG. 30, the user has used the "Select Attribute" box 3004 to enter a "context name" variable at location 3008. Thus, while the current context is "Adam Smith," when the linked section is inserted into a different context, a name of that different context will replace Adam Smith at location 3008. Insertion of variables, or symbolic references are described in further detail above.

Figure 31:
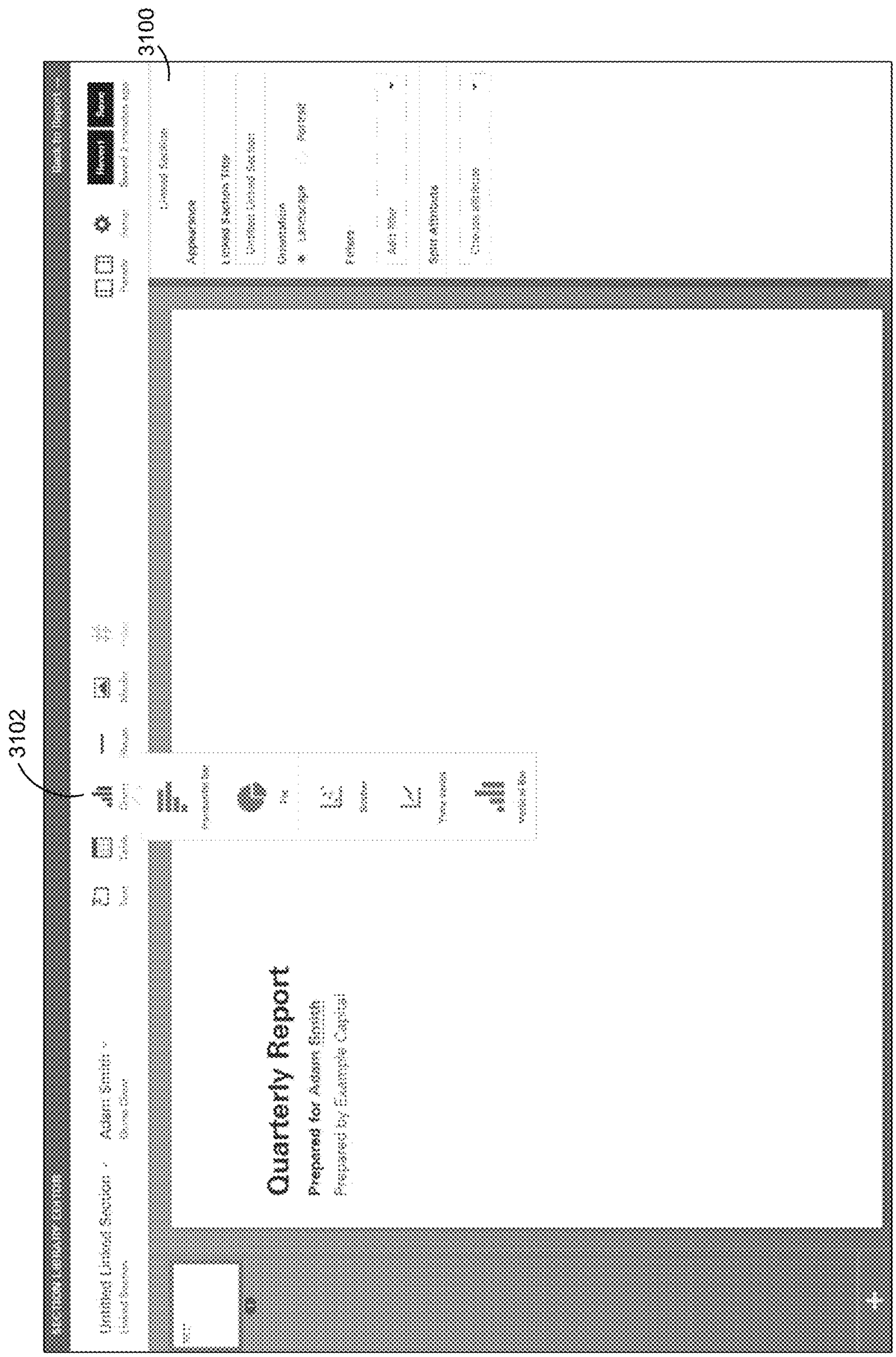
Figure 32:
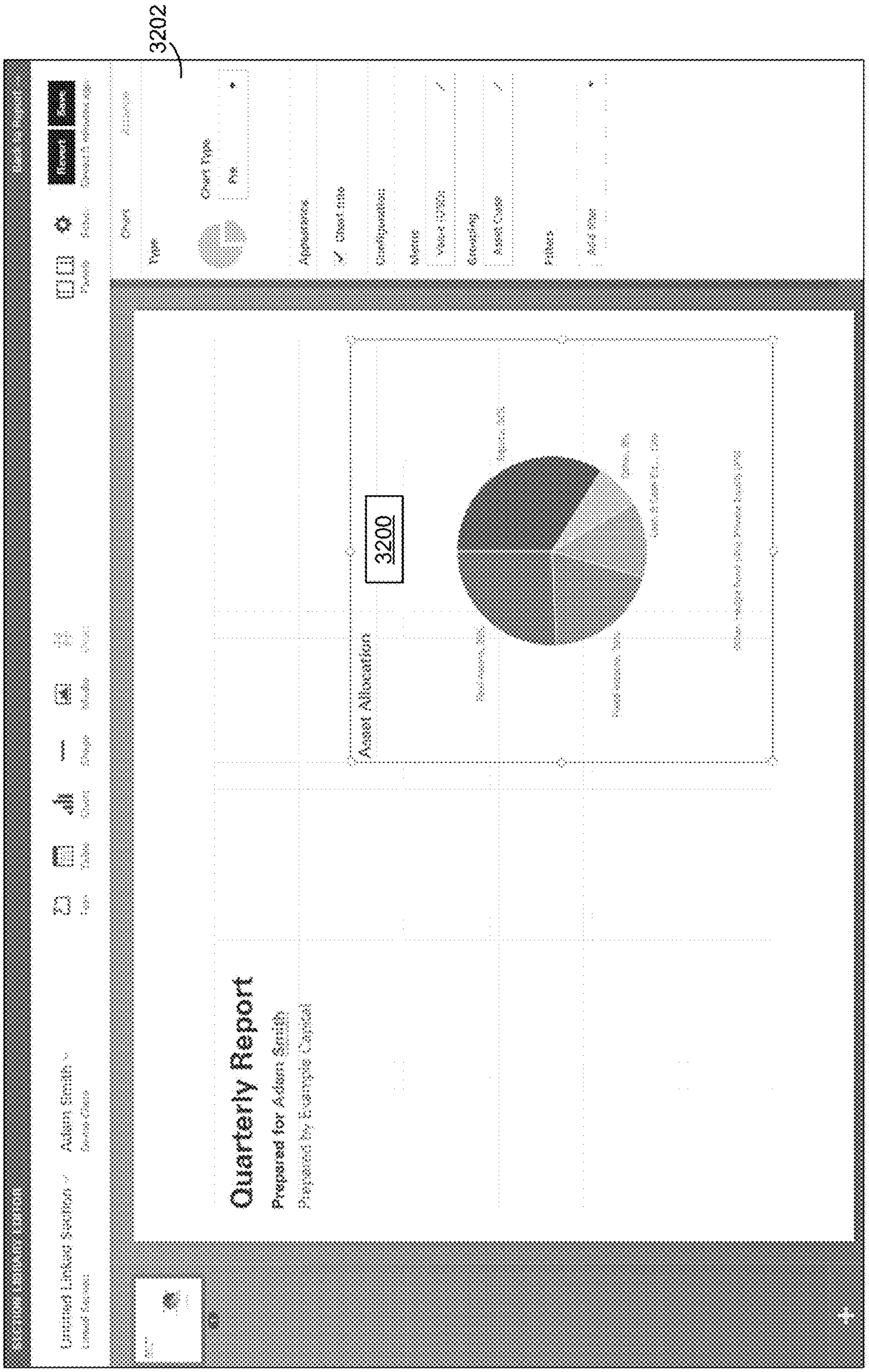
Figure 33:
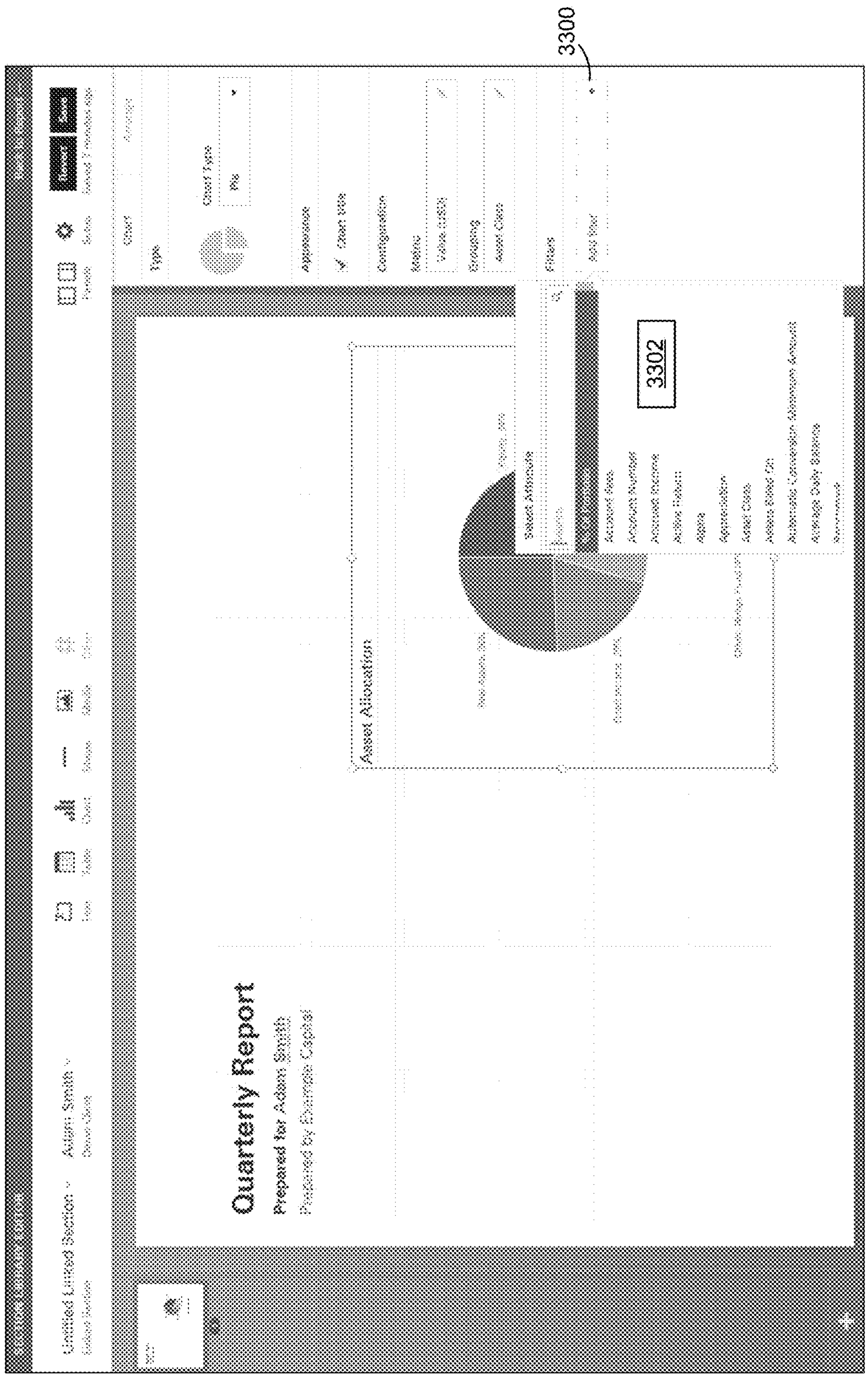
Figure 34:
Figure 35:
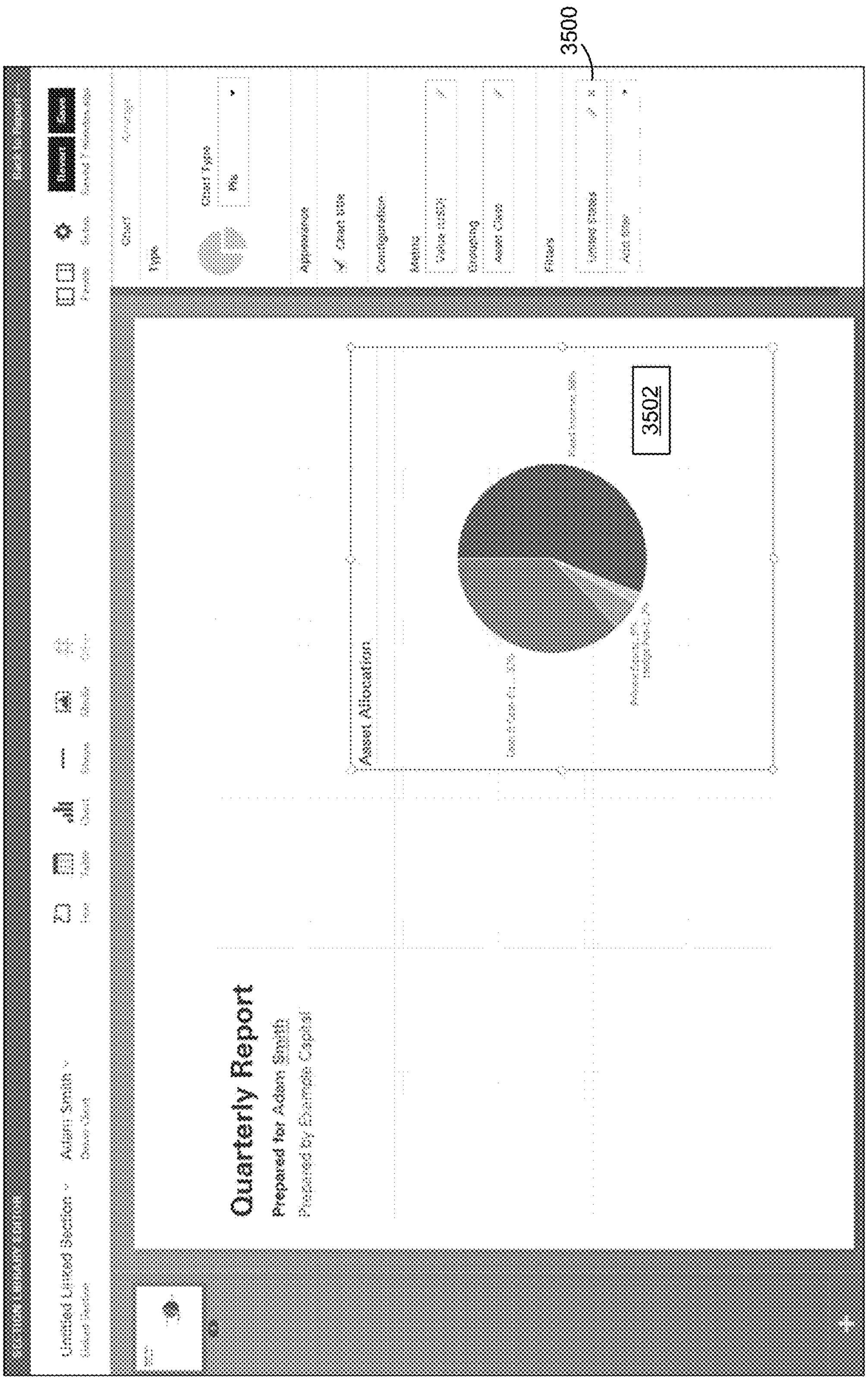

FIG. 31 illustrates an example user interface of FIG. 30 after the user has selected the chart element button 3102. Selection of the chart element button 3102 causes a drop-down to be displayed with various chart types that may be inserted into the report. FIG. 32 shows a user interface in which the user has inserted a pie chart 3200. Various editable properties associated with the pie chart element are shown in the sidebar 3202. As shown, the pie chart element 3200 shows an asset allocation of all assets in the current context (for example, the perspective of "Adam Smith"). FIG. 33 shows a user interface in which the user is applying a filter to the selected pie chart element. The user has selected the "add filter" button 3300. A "select attribute" dialog 3302 is shown, including various attributes on which the pie chart element may be filtered. FIG. 34 shows the user interface in which the user has selected a "geography" attribute on which to filter the pie chart element. A secondary dialog 3400 is shown in which the user may specify a geographical area with which to filter the pie chart element. FIG. 35 shows a user interface in which a filter 3500 has been applied to the pie chart element 3502. The filter has filtered out all assets that are not located and/or associated with United States. As described above, in response to the filter being applied by the user, the system automatically recalculates the data to the input to the pie chart element, in the current context, by traversal of the graph 102.

Figure 36:
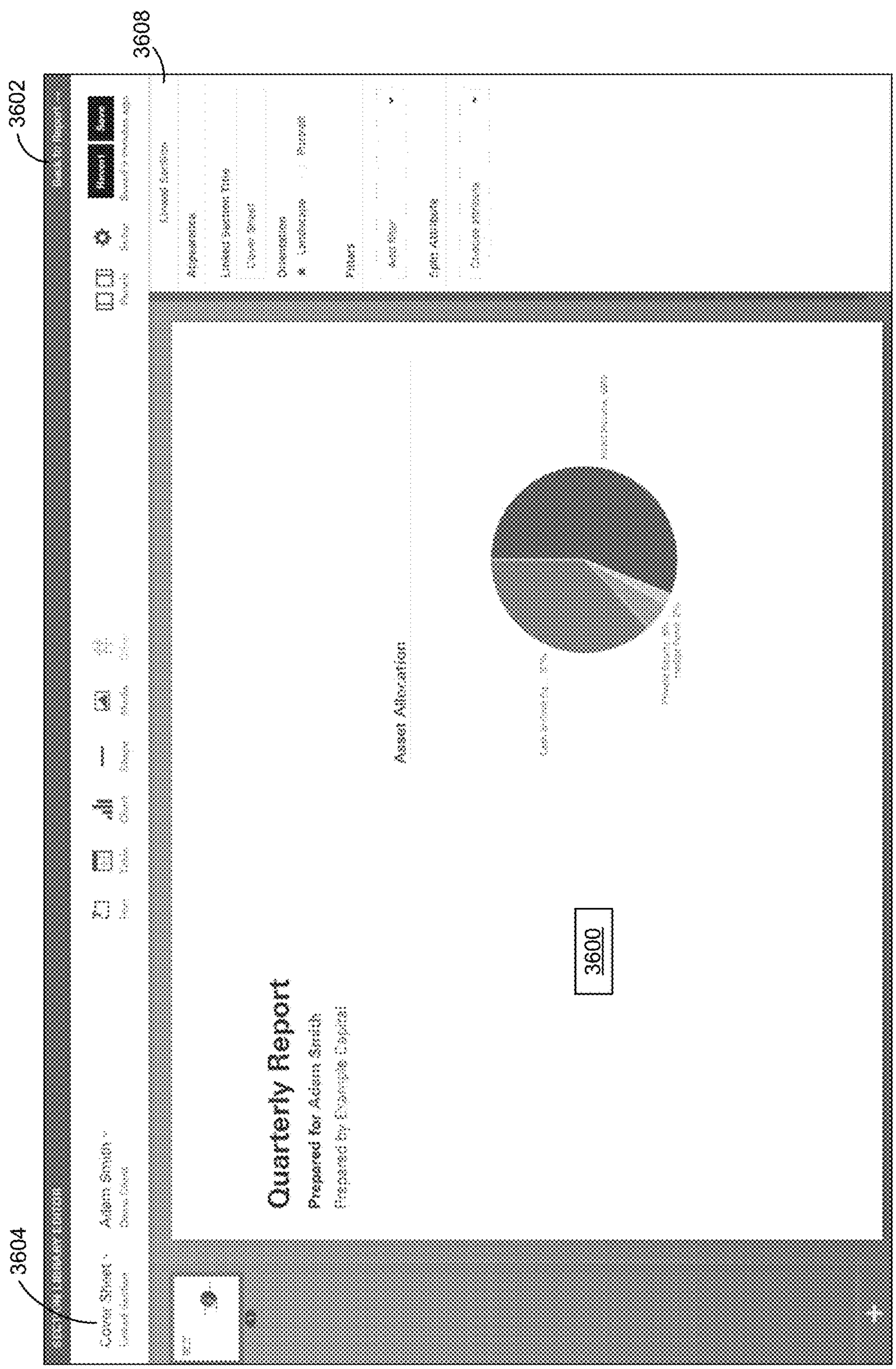

FIG. 36 shows a user interface in which user has selected to edit properties associated with the section 3600 shown in the sidebar 3608. In particular, the user has updated the name of the section to be "Cover Sheet," as indicated at 3604. The user may select a "Back to Report" button 3602 two exit the section editor and return to the report editor user interface.

Figure 37:
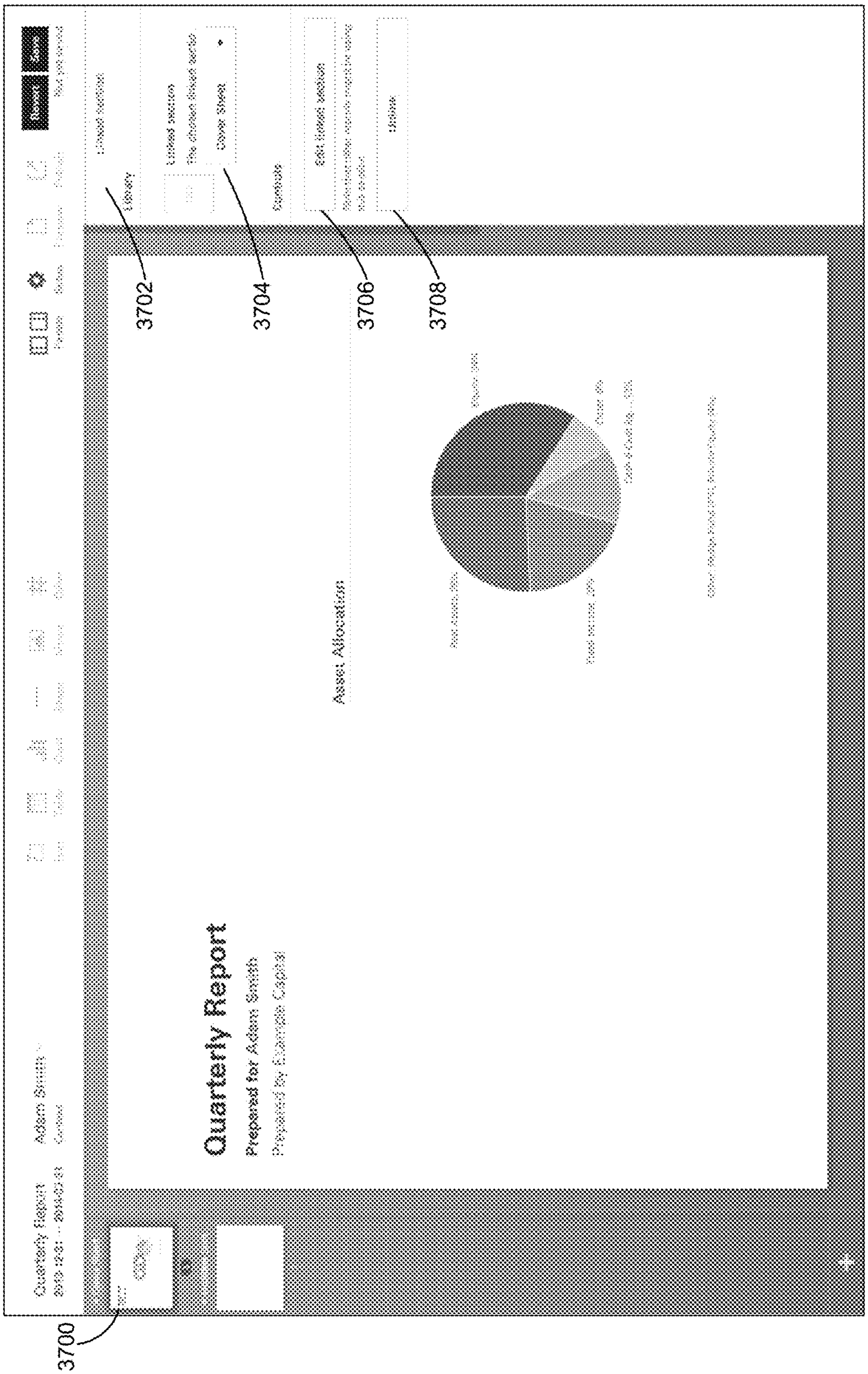

FIG. 37 illustrates a user interface in which the user has inserted the "Cover Sheet" template section into the report. The thumbnail sidebar shows the "Cover Sheet" section and its corresponding thumbnails 3700. Additionally, properties associated with the selected template section are shown in the properties sidebar 3702. Drop-down 3704 may be used to change to a different template section. Edit button 3706 may be used to return the section editor user interface in which currently selected template section may be edited. The unlink button 3708 may be used to unlink the currently selected template section and convert it into a basic section. After unlinking a template section, the unlinked section may then be customized and edited in the current report. However, any later updates to the previously linked section will no longer propagate to the unlinked section. In an embodiment, a linked section in a report is indicated by an icon or other indication in the thumbnail sidebar, such as a link icon (and/or other icon or indication) overlaid on the thumbnail 3700. In an embodiment, a linked section may only be edited in the section editor and not in the report editor. Alternatively, editing of a linked section in the report editor may automatically cause the changes to be propagated to all other reports linked to the linked section.

As described above, the system is configured to automatically re-traverse the graph 102 and calculate new data when the context (including, for example, the perspective and/or date or date range) is changed in a view and/or report. Similarly, changes to a linked section cause the system to automatically update any elements associated with that section in any reports in which the linked section has been included.

Figure 38:
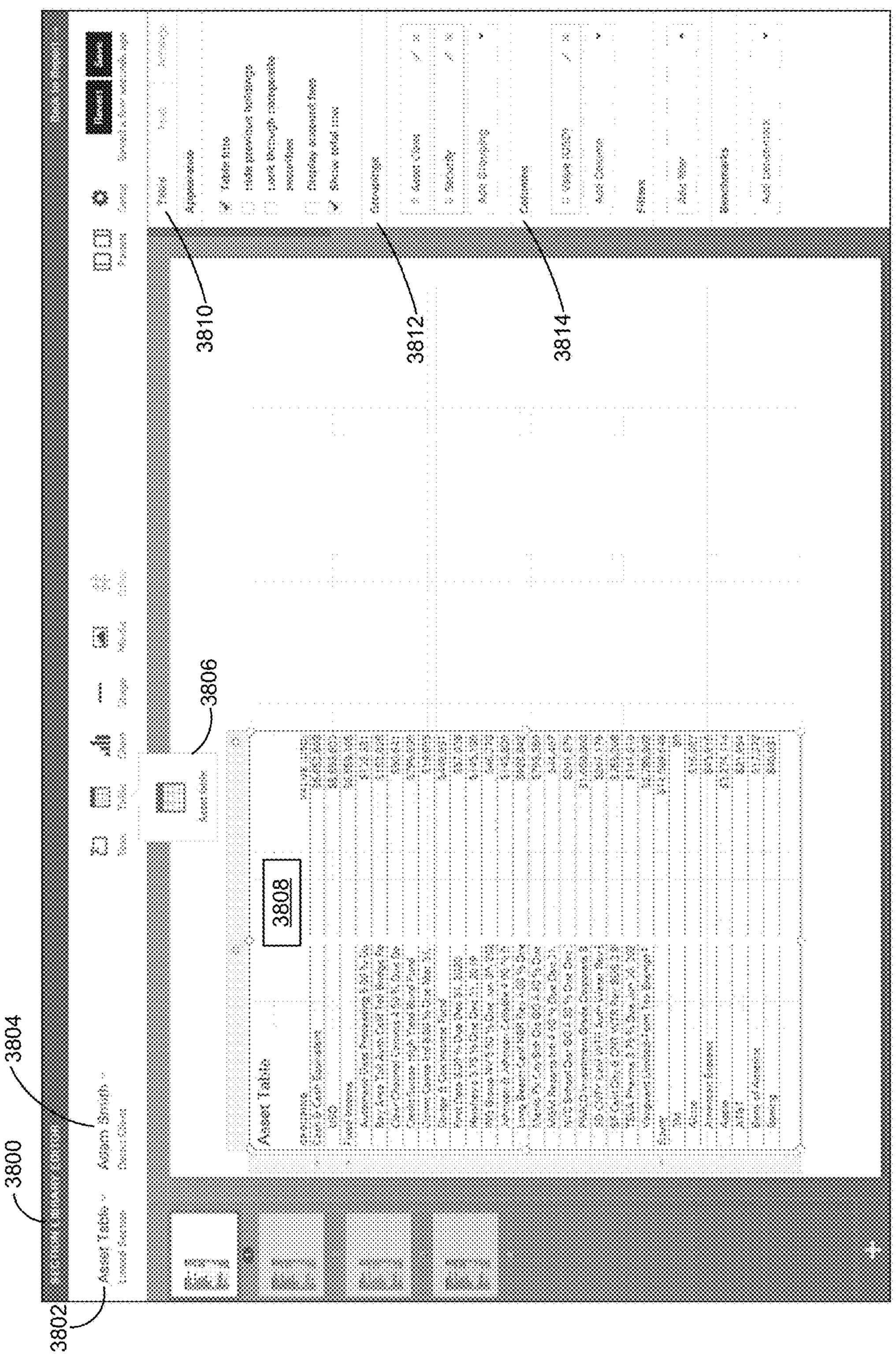
Figure 39:
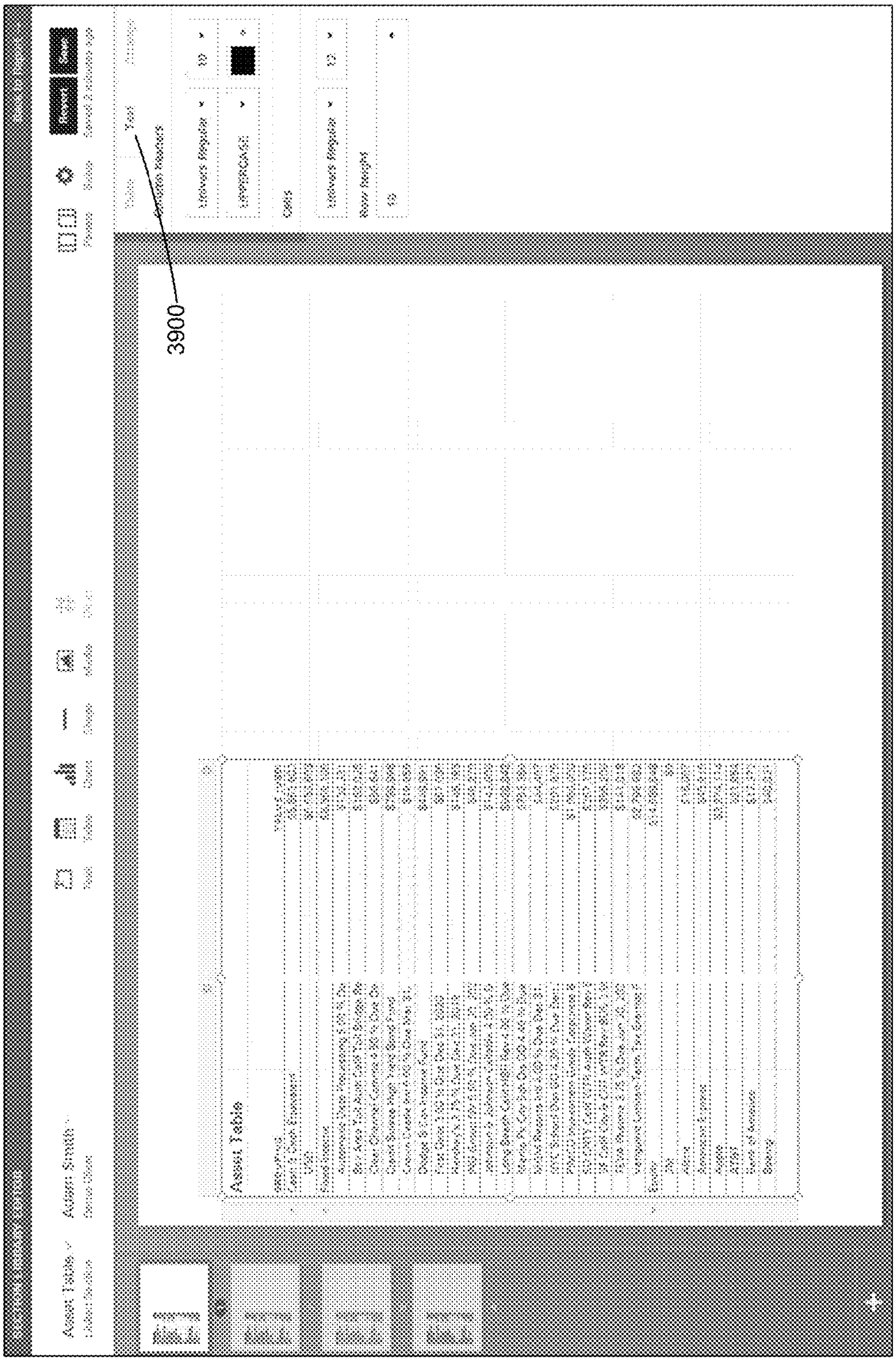
Figure 40:
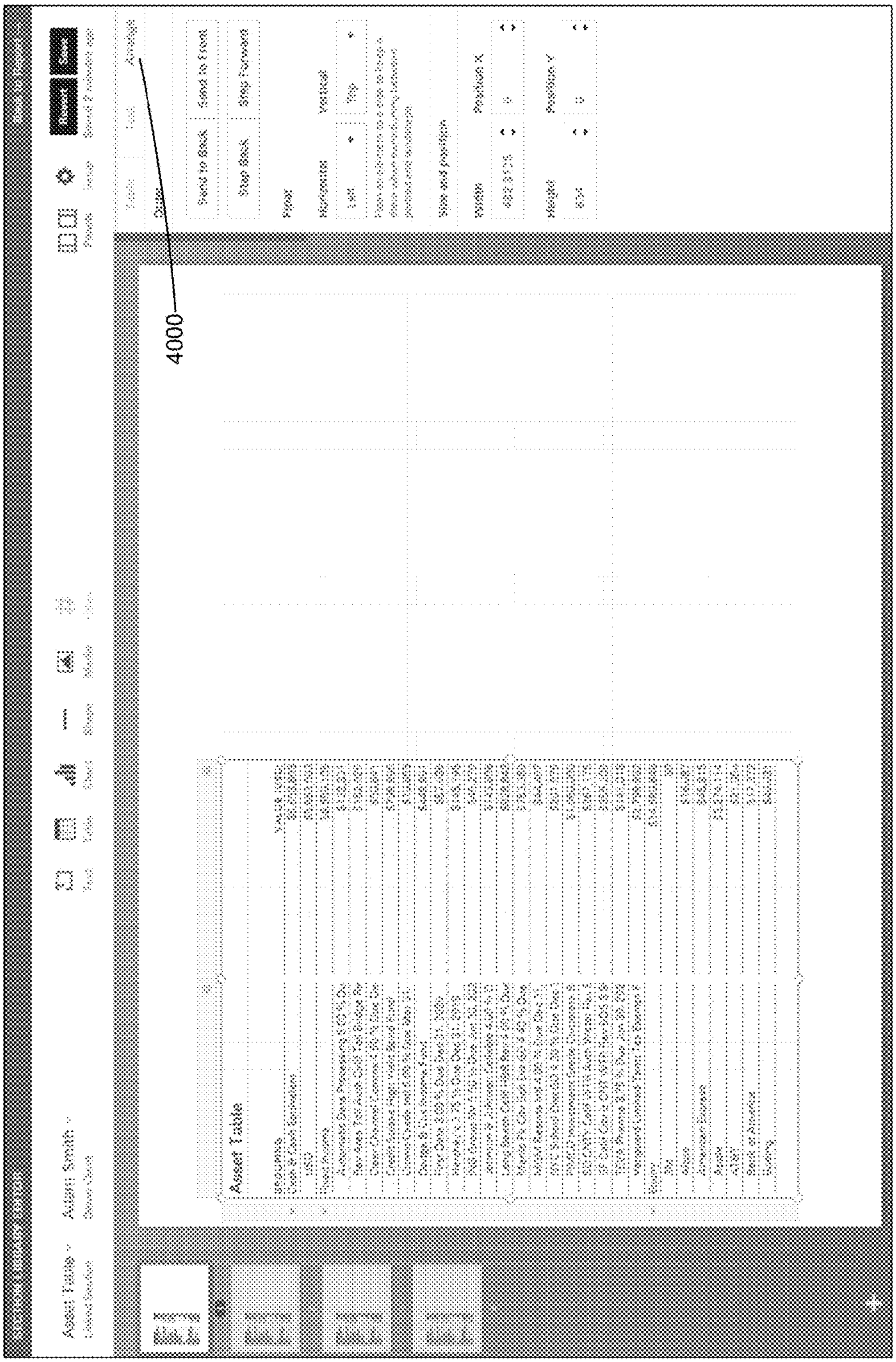
Figure 41:
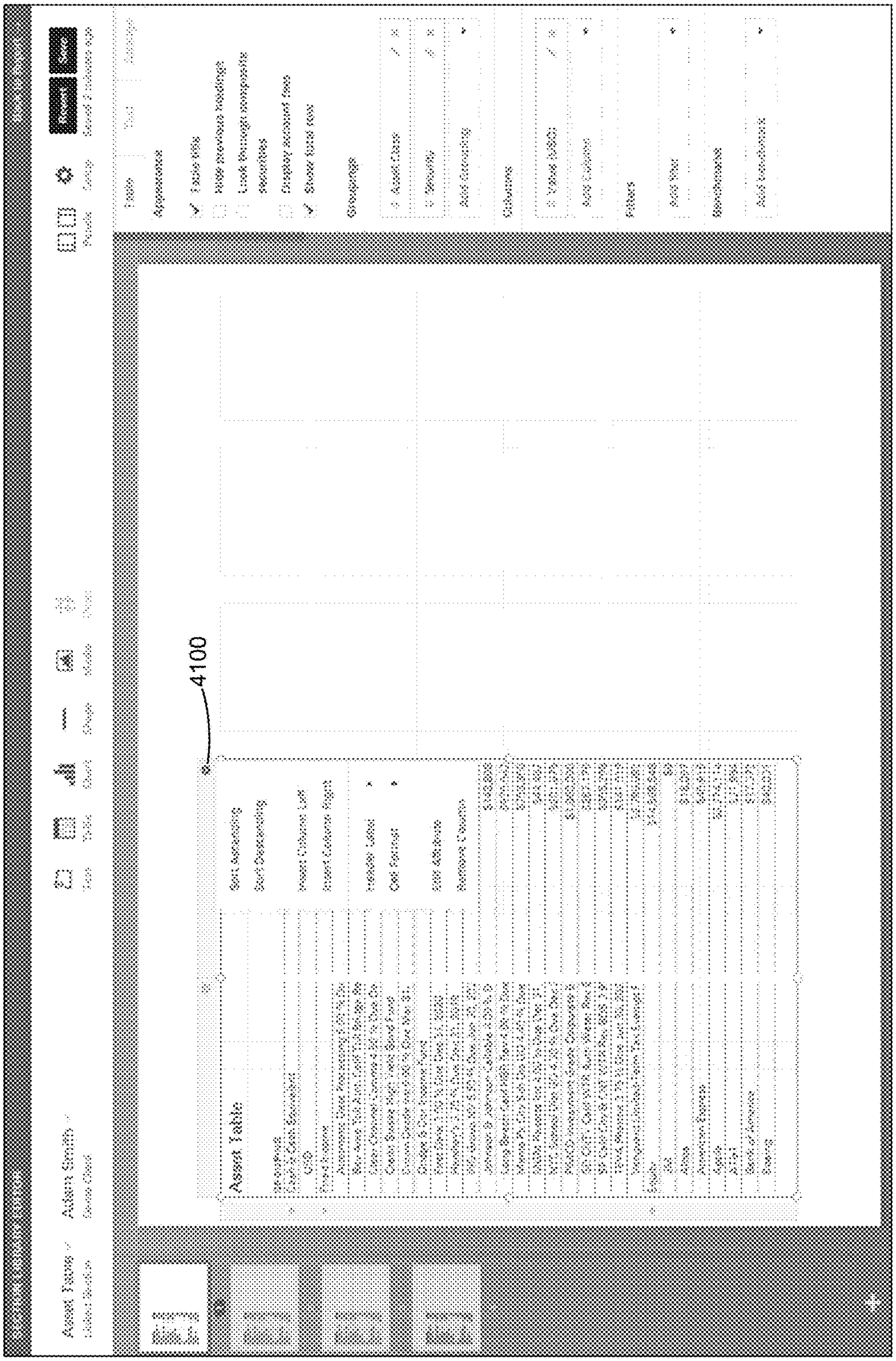
Figure 42:
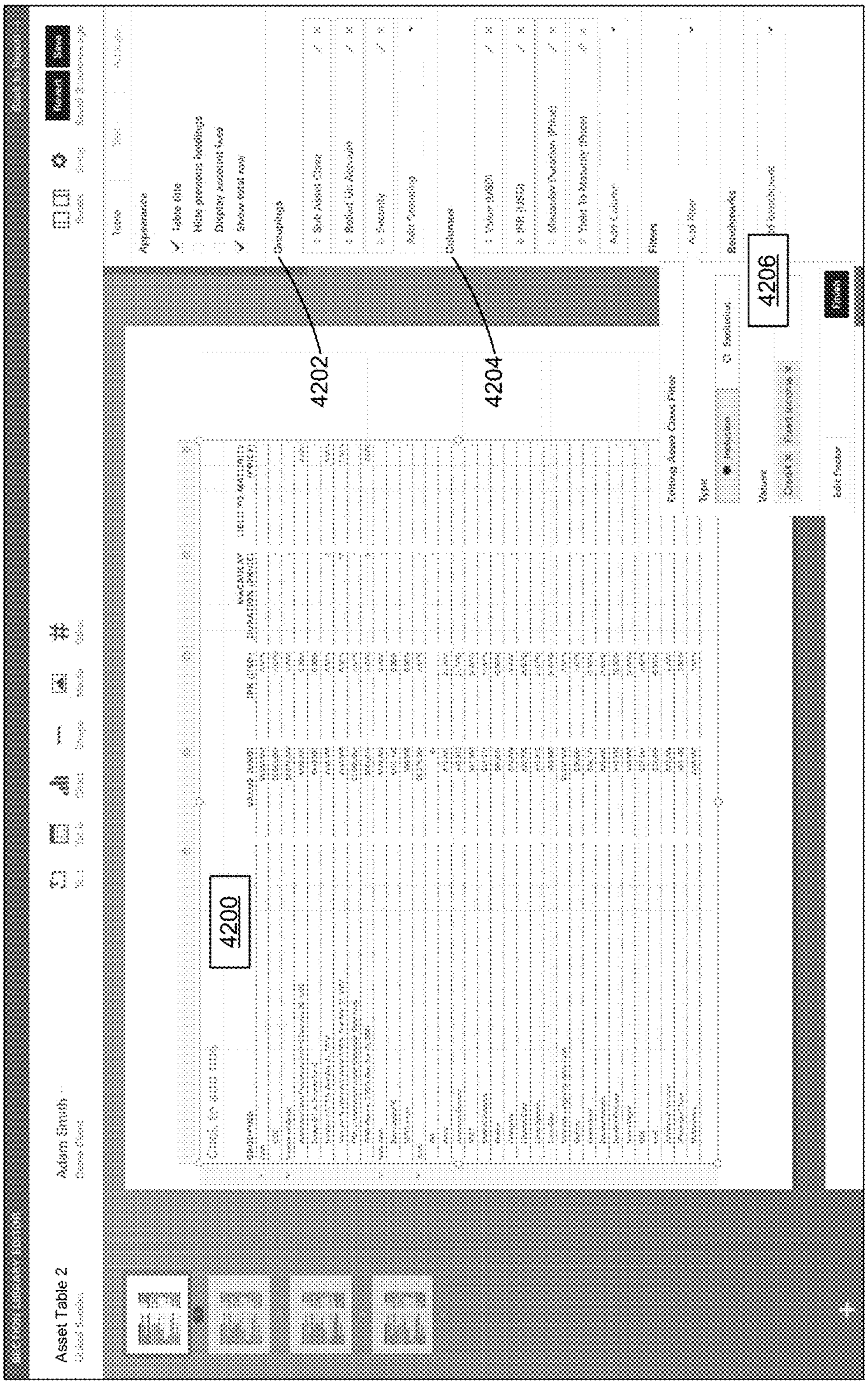

FIG. 38 illustrates another example user interface in which the user is editing another linked section titled "Asset Table." That a section is being edited is indicated by the colored bar 3800. The name of the section being edited is indicated by indicator 3802, and the current context (for example, the perspective) is indicated by indicator 3804. The user has selected, via asset table button 3806, to insert a table 3808 into the report. Properties associated with the table are indicated in the sidebar 3810. Groupings associated with table 3808 are indicated, and may be edited, in the sidebar at indicator 3812. Columns associated with table 3808 are indicated, and may be edited, in the sidebar at indicator 3814. As shown, the inserted table lists all assets currently associated with the current context. FIG. 39 illustrates a user interface in which additional properties associated with the table may be edited by selection of text button 3900. FIG. 40 illustrates a user interface in which yet additional properties associated with the table may be edited by selection of arrange button 4000. FIG. 41 illustrates a user interface in which yet additional properties associated with the table (including sorting of the table) may be edited by selection of icon 4100. FIG. 42 illustrates a user interface in which table 4200 has been modified (from the table displayed in the user interface of FIG. 41) by the addition of groupings and columns. Further, as indicated by the filter dialog 4206, the user is adding a filter to the table such that the table only includes credit and fixed income asset classes. Editing table properties (including selection of columns and groupings), as well as filtering various report elements, is described in further detail above in reference to, for example, FIGS. 5-7.

Figure 43:
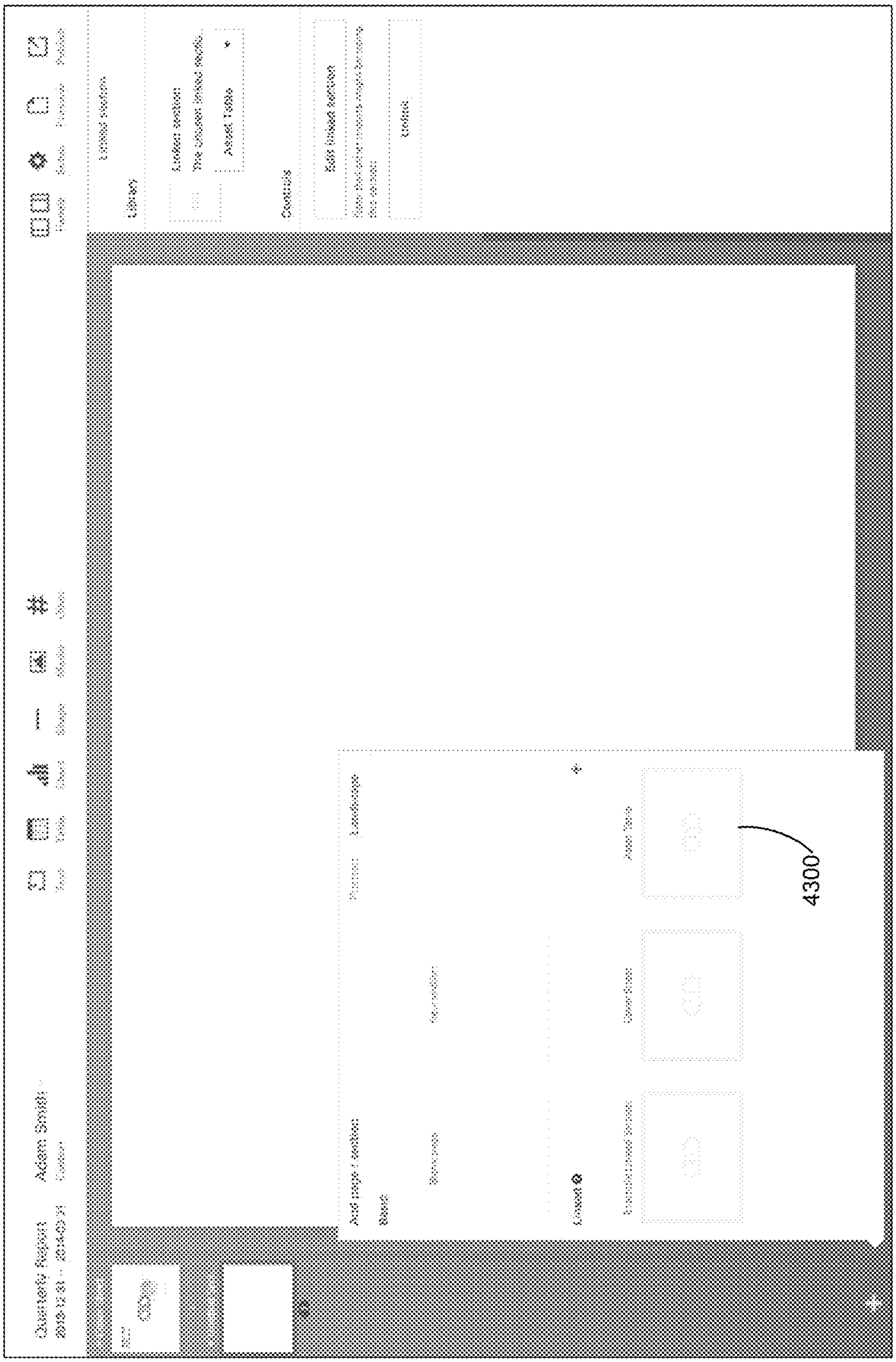
Figure 44:
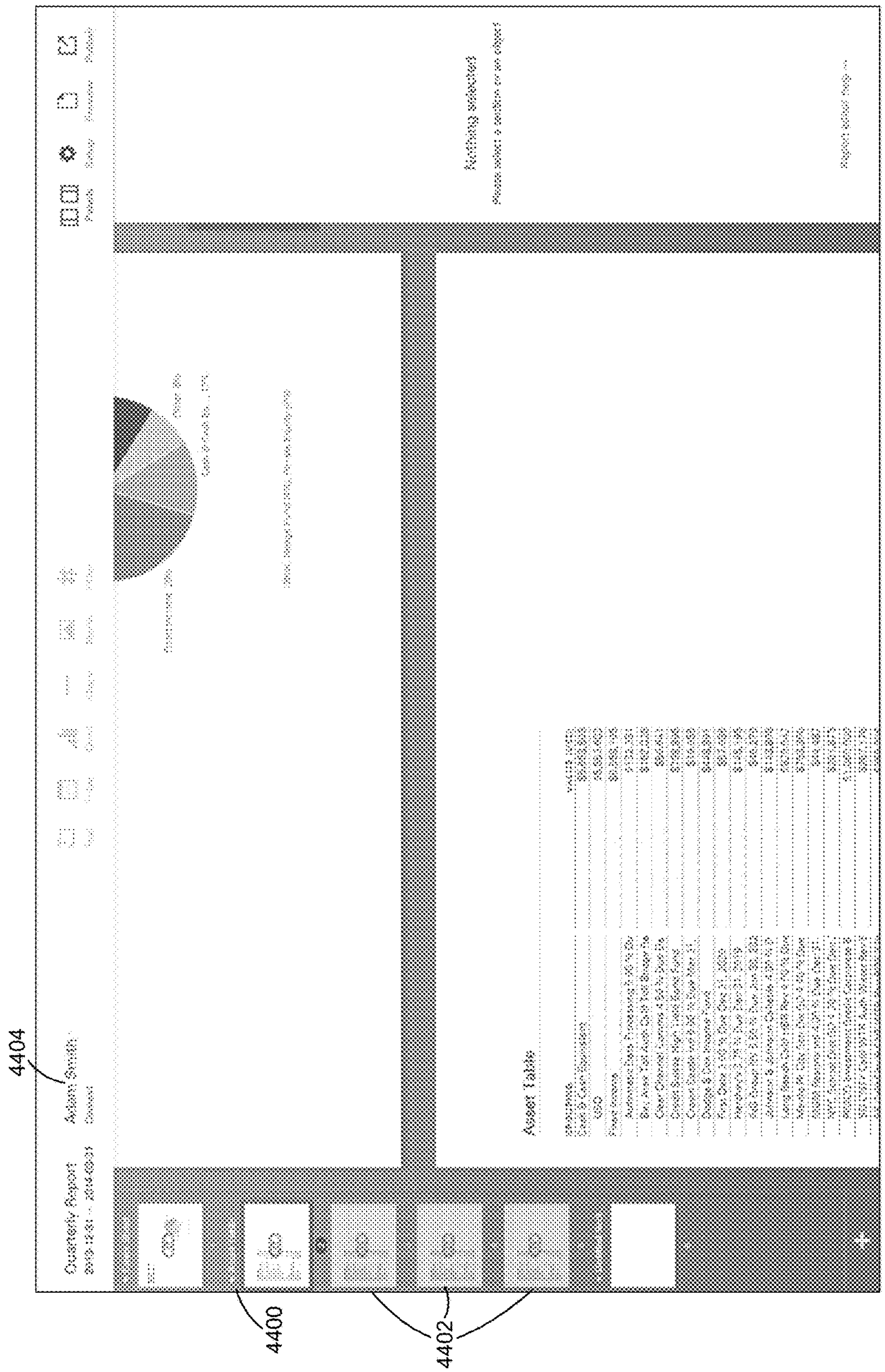

FIG. 43 illustrates a user interface in which the user is making a selection to add the "Asset Table" linked section 4300 (that was being edited in the user interface of FIG. 38). FIG. 44 illustrates a user interface in which the user has inserted the "Asset Table" linked section, as indicated in the thumbnail sidebar at 4400. As shown, in the current context "Adam Smith" 4404, the "Asset Table" linked section includes a first page and three additional pages 4402. As described above, in an embodiment the system dynamically adds pages to a report as needed to display calculated data associated with an element (such as a table). Accordingly, in the example user interface of FIG. 44, the "Asset Table" section requires four pages to display all the related data in the table. As shown in the thumbnail sidebar, the dynamically added pages 4402 are indicated by a greying of the thumbnails. While greying of thumbnails is used to indicate dynamically added pages in FIG. 44, any other indicators such as icons or coloring may similarly be used in the user interface. Additionally, while the example user interface of FIG. 44 shows pages being dynamically added to a linked section, in various embodiments pages may also be dynamically added to basic sections. Note that dynamic addition of pages to a linked section in a given report and context does not cause any changes to be made to the actual linked-to section (for example, the template section that is linked to) that may, for example, require unlinking of the linked section. Rather, the format and arrangement of the elements of the linked section is unchanged in the report, but pages are automatically added to the section to display all data associated with elements already in the linked section.

In an embodiment, dynamically added pages may not be edited by the user as the contents of the dynamically added pages may be determined by the content of the pages on which the dynamically added pages are based. Further, the number and content of dynamically added pages may change when the context of the report is changes, and/or other changes are applied to the elements of the section (for example, filtering applied to a table element). In various embodiments, a section may include multiple pages, each having one or more associated dynamically added pages. Dynamically added pages, and the data inserted into the pages, may be automatically determined by the system, as further described below in reference to the figures below, and the flowchart of FIG. 54.

Figure 45:
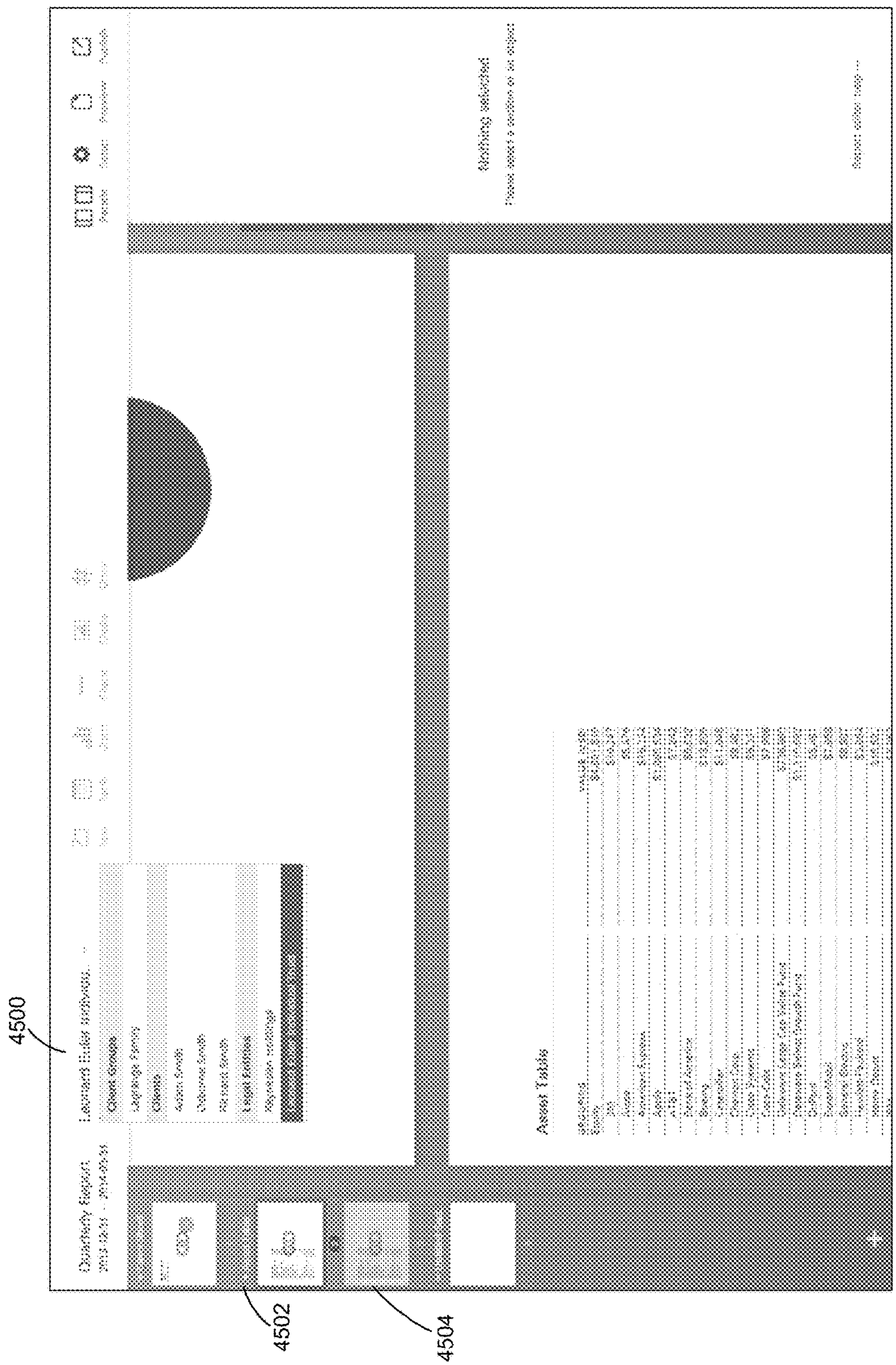
Figure 46:
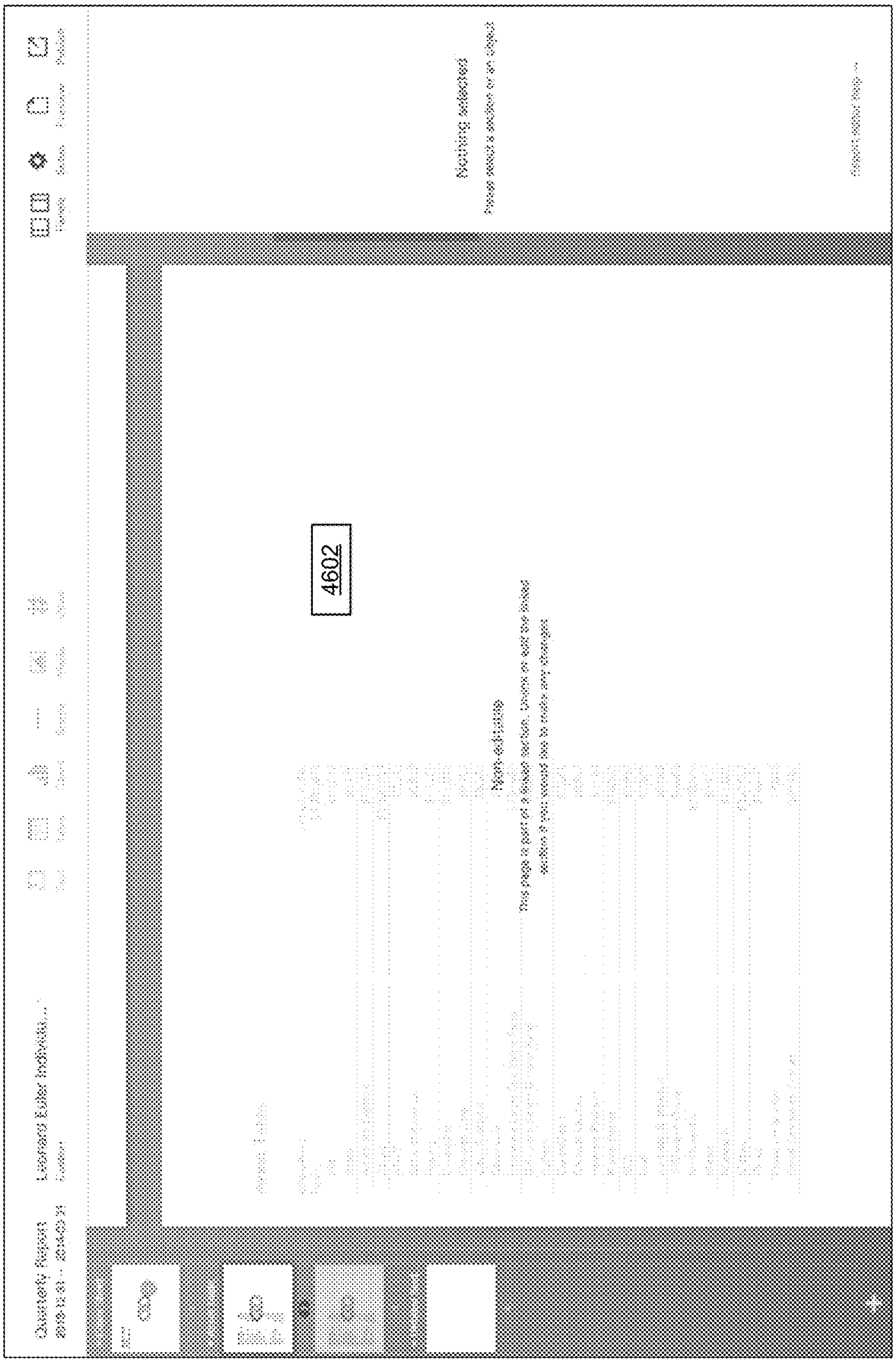

FIG. 45 illustrates a user interface, similar to the user interface of FIG. 44, in which the user has changed the context (for example, the perspective) of the report as shown at indicator 4500. Changing the context (including, for example, a perspective and/or a date or date range) of the report causes the system to automatically re-traverse the graph 102 and determine data to be inserted into the various elements of the report. In the example of FIG. 45, the asset table is updated with asset information related to the new context. As shown, the asset table now spans two pages rather than four. Thus, the "Asset Table" section as indicated in thumbnail sidebar at 4502, includes a single dynamically added page 4504. FIG. 46 illustrates a user interface in which page 4602 of the linked section may not be edited.

Figure 47:
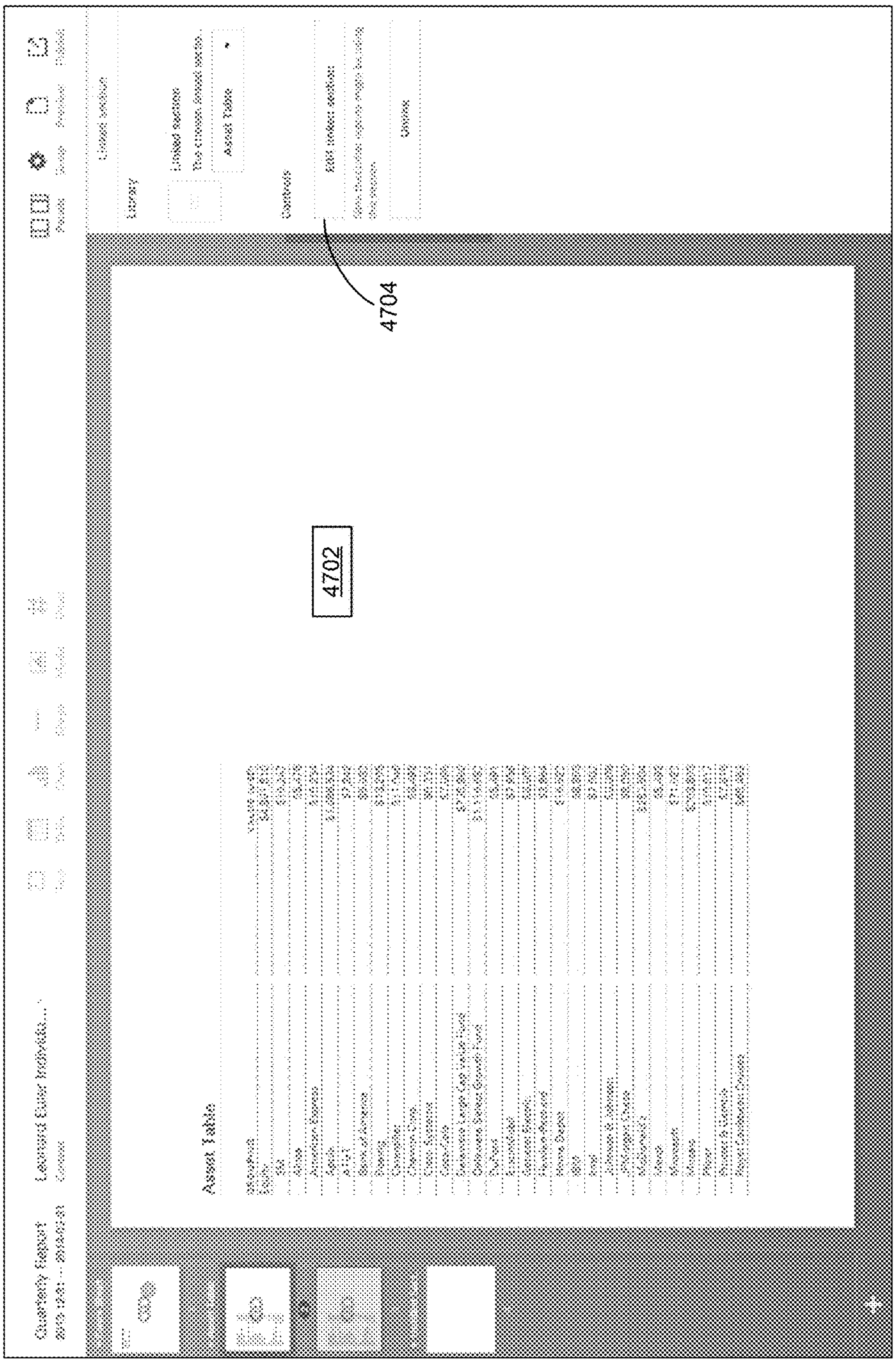
Figure 48:
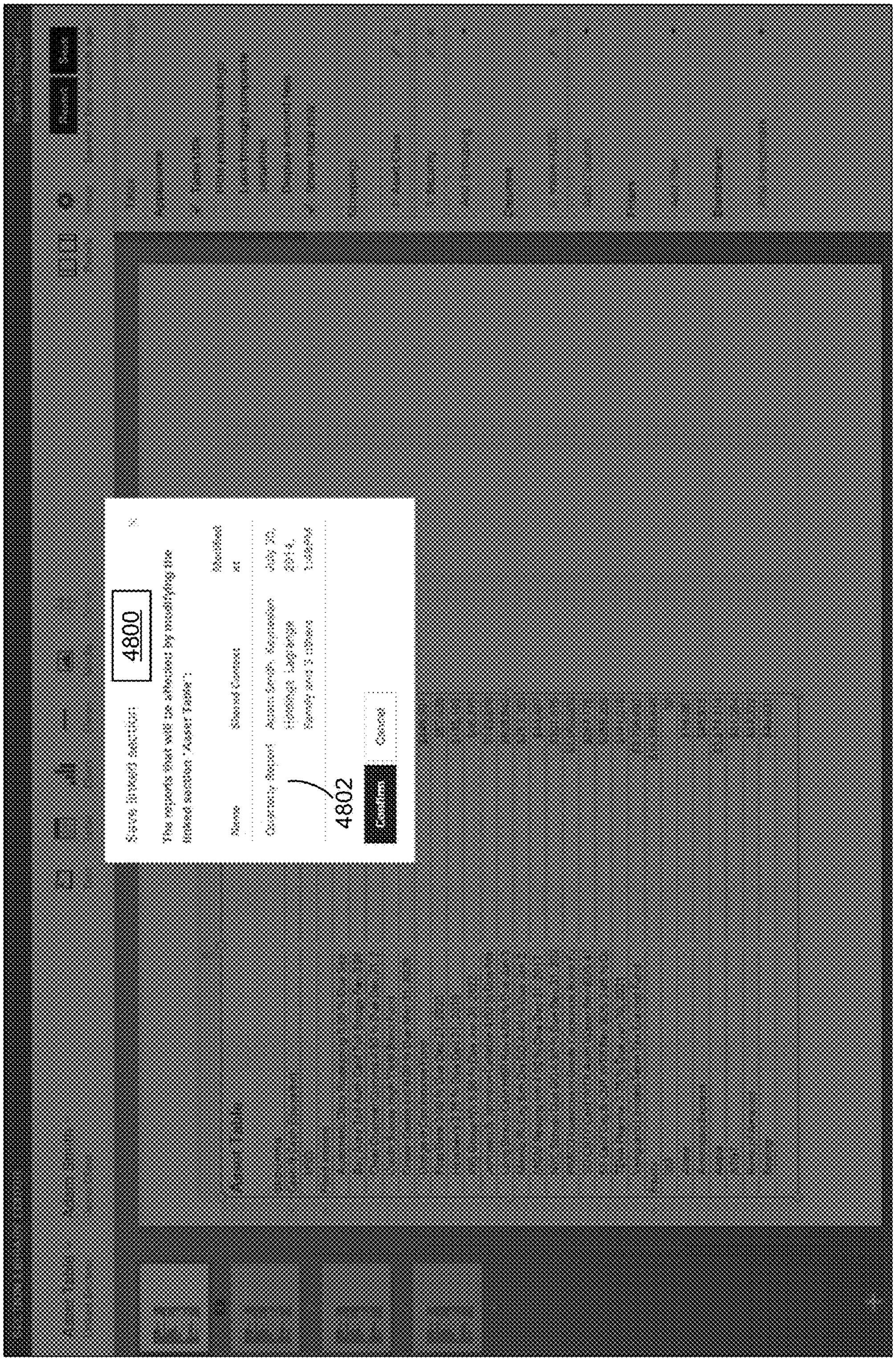

FIG. 47 illustrates a user interface in which the user may select a button 4704 to edit the linked section. After editing of a linked section, a dialog such as dialog 4800 of FIG. 48 may be displayed to the user. As shown at indicator 4802 (in FIG. 48), the edited linked section is used in various other contexts. Accordingly, in some embodiments, confirmation is requested from the user that the user's intent is to edit the linked section in each of the associated contexts. In response to confirmation from the user, the system automatically updates all reports linked to the edited linked section, and recalculates the corresponding data. In some embodiments, reports that include linked sections (which have been updated) are not updated until those reports are viewed by a user, or the reports are rendered (for example, for PDF generation, as described below).

Figure 53:
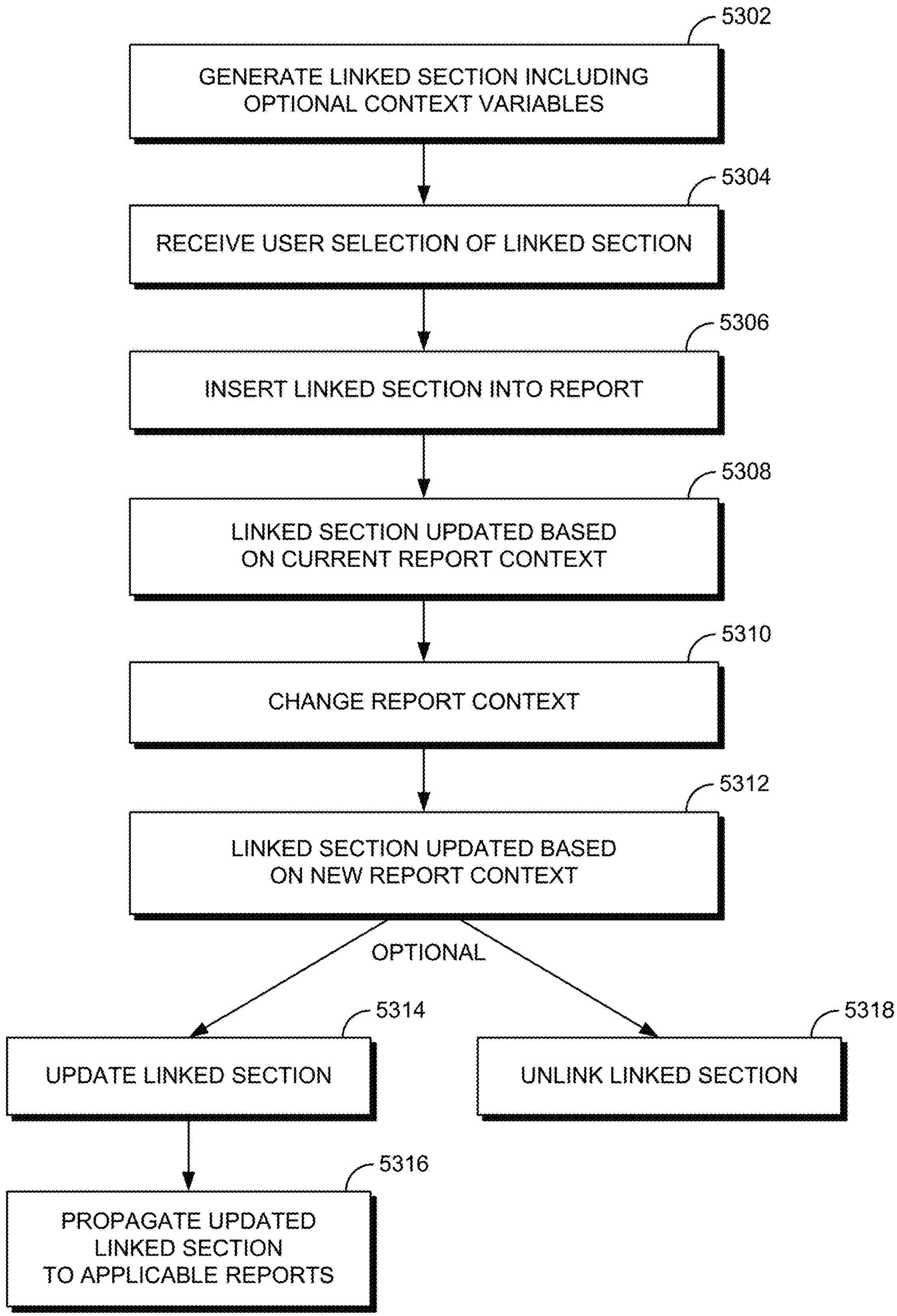
FIG. 53 is a flowchart showing an example method of the system in which template report sections are linked to report sections.

FIG. 53 is a flowchart showing an example method of the system in which template report sections are linked to report sections. In various embodiments, fewer blocks or additional blocks may be included in the process of FIG. 53, or various blocks may be performed in an order different from that shown in the figure. Further, one or more blocks in the figure may be performed by various components of the system as described above and below, for example, one or more of view computation unit 106 and/or report unit 109.

At block 5302 the user may generate a linked section including optional contextual variables (also referred to herein as symbolic references). Examples of creating and editing linked sections have been described above in reference to the various figures. In some embodiments, the system may be configured to automatically generate linked sections. For example, the system may automatically generate cover page sections including, for example, a logo associated with a firm.

At block 5304 the system may receive a user selection of a linked section to be inserted into a report. At block 5306, the system inserts the selected linked section into the report being edited in response to the user input. At block 5308, the inserted linked section is updated based on the context associated with the report into which the linked section is inserted. Examples of such insertion and updating of linked sections in a report and associated context are described above in reference to the various example user interfaces. At block 5310, in response to a change in context associated with a report (for example, the report context may be changed by the user), at block 5312 the linked section is updated based on the changed context. As described above, the system automatically traverses the graph 102 to determine data to be inserted into the linked section based on the context or changed context. Accordingly, in various embodiments the user is enabled to generate reports including complex data efficiently and easily.

Optionally, at block 5318, the user may unlink the linked section. In this block, the previously linked section becomes a basic section which may be edited in the particular report to which the section was inserted without effect on other reports and/or contexts in which the previously linked section is included.

Further, optionally, at block 5314, the user may select to edit and/or update the linked section via the linked section editor as described above. At block 5316, any changes made to the linked section are propagated to any other reports and/or contexts in which the linked section is included.

Accordingly, in various embodiments, linked sections provide a first level of abstraction for efficient creation of reports. For example, a linked section may be considered to be templates of a section that may be inserted into reports and automatically populated with report data. The report itself, likewise, may be considered a second level of abstraction for efficient creation of reports. For example, a report may be considered a template of a report that may be generated and/or edited by a user, and then populated with report data in multiple contexts (for example, when the report is published as PDFs, as described below). Accordingly, the system provides two levels of abstraction that may be used by the user to efficiently generate complex reports in multiple contexts and including complex data associated with each context.

6.2 Dynamic Page Generation

As described above, in some embodiments the system provides dynamic page generation in the user interface for generating and/or editing financial reports. In these embodiments, the system automatically adds pages to a financial report as needed to display requested data. For example, the user may insert a table into the report, specifying particular financial data that is to be calculated and input into that table. In this example, depending on the context (including, for example, a perspective and/or a date or date range), more or fewer pages may be needed in the report to display the table with the requested financial data. Accordingly, when a context is specified, the system automatically calculates the financial data by accessing and traversing one or more complex data structures (as described above and below), determines a number of pages needed to display the table, and inserts the determined number of pages. The user interface may include, in an embodiment, thumbnail views of the pages in the report, including dynamically inserted pages. In this embodiment, the dynamically inserted pages may be indicated by, for example, greying out of the thumbnails. Example user interfaces and methods of the system for dynamic page generation are described above in reference to FIGS. 43-47. Additional example user interfaces are described below.

Figure 54:
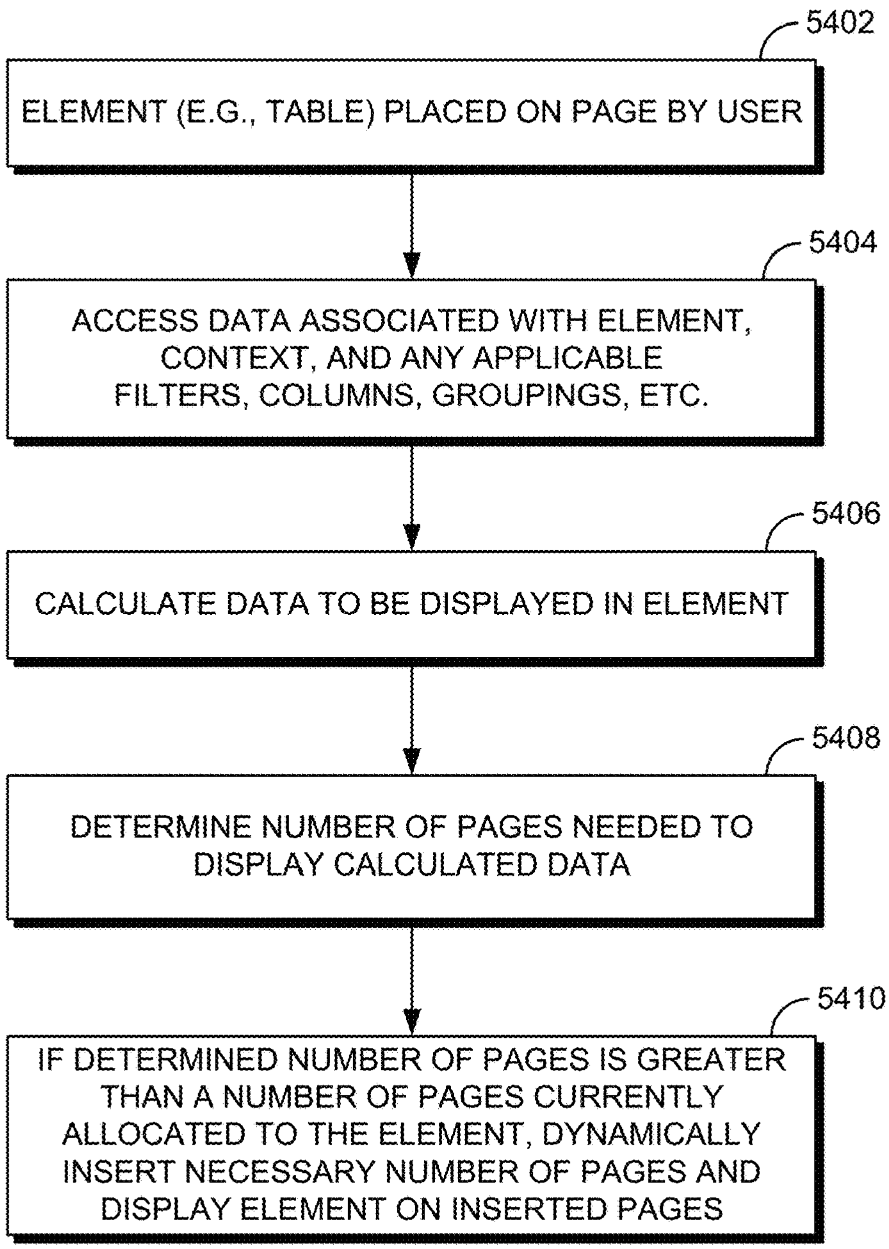
FIG. 54 is a flowchart showing an example method of the system in which pages of a report are dynamically generated.

FIG. 54 is a flowchart showing an example method of the system in which pages of a report are dynamically generated. In various embodiments, fewer blocks or additional blocks may be included in the process of FIG. 54, or various blocks may be performed in an order different from that shown in the figure. Further, one or more blocks in the figure may be performed by various components of the system as described above and below, for example, one or more of view computation unit 106 and/or report unit 109.

At block 5402, a report element (for example, a table) may be placed on a page of a report by the user. At block 5404, the system accesses data, a context (including, for example, a perspective and/or a date or date range), and any applicable filters, columns (for example, when the element is a table), and/or groupings (for example, when the element is a table) associated with the element. Then, in block 5406, the system calculates the data to be displayed in the element based on the various information associated with the element. For example, as described above, the view computation unit 106 may traverse the graph 102 in view of a context associated with the report and calculate complex data to be inserted into the element (for example, the table). In the example of a table element, the system may determine groupings and/or columns associated the table and for which data is to be computed. Further, the system determines any applicable filters applied to the element in computing the data associated with element.

At block 5408, the system determines a number of pages needed in the report to display the calculated data. For example, as described above, in some contexts and/or when particular filters or groupings are applied to a table element, more or fewer pages may be needed to display a table element. Accordingly, at block 5410, if the determined number of pages is greater than a number of pages currently allocated to the element, the system dynamically inserts a necessary number of pages into the report, and displays the element on inserted pages. In various embodiments, the system intelligently spans the inserted element across the dynamically added pages. For example, a table element may be inserted across multiple pages such that the table is broken up in multiple pieces and all rows of the table are displayed in the report.

In some embodiments, changes of formatting of a report element may also cause the system to automatically and dynamically add pages to a report to facilitate the changes. For example, the user may changes font size of a table element. In response, the size of the table element may grow or shrink, and more or fewer pages may be needed to contain the table. Accordingly, the system automatically determines a number of pages needed, inserts the determined number of pages, and spans the table across the pages of the report.

FIGS. 49-52 illustrate example user interfaces of the system in which report pages are dynamically added to a report. Similar to the example user interfaces of FIGS. 43-47 above, a number of pages dynamically added by the system varies based on changes to the element in the report and/or a context change. In the examples user interfaces of FIGS. 43-47, the "Asset Classes" section has been unlinked and is a basic section of the report. Additionally, the "Asset Classes" section includes two elements on the first page of the section, a pie chart and a table.

Figure 49:
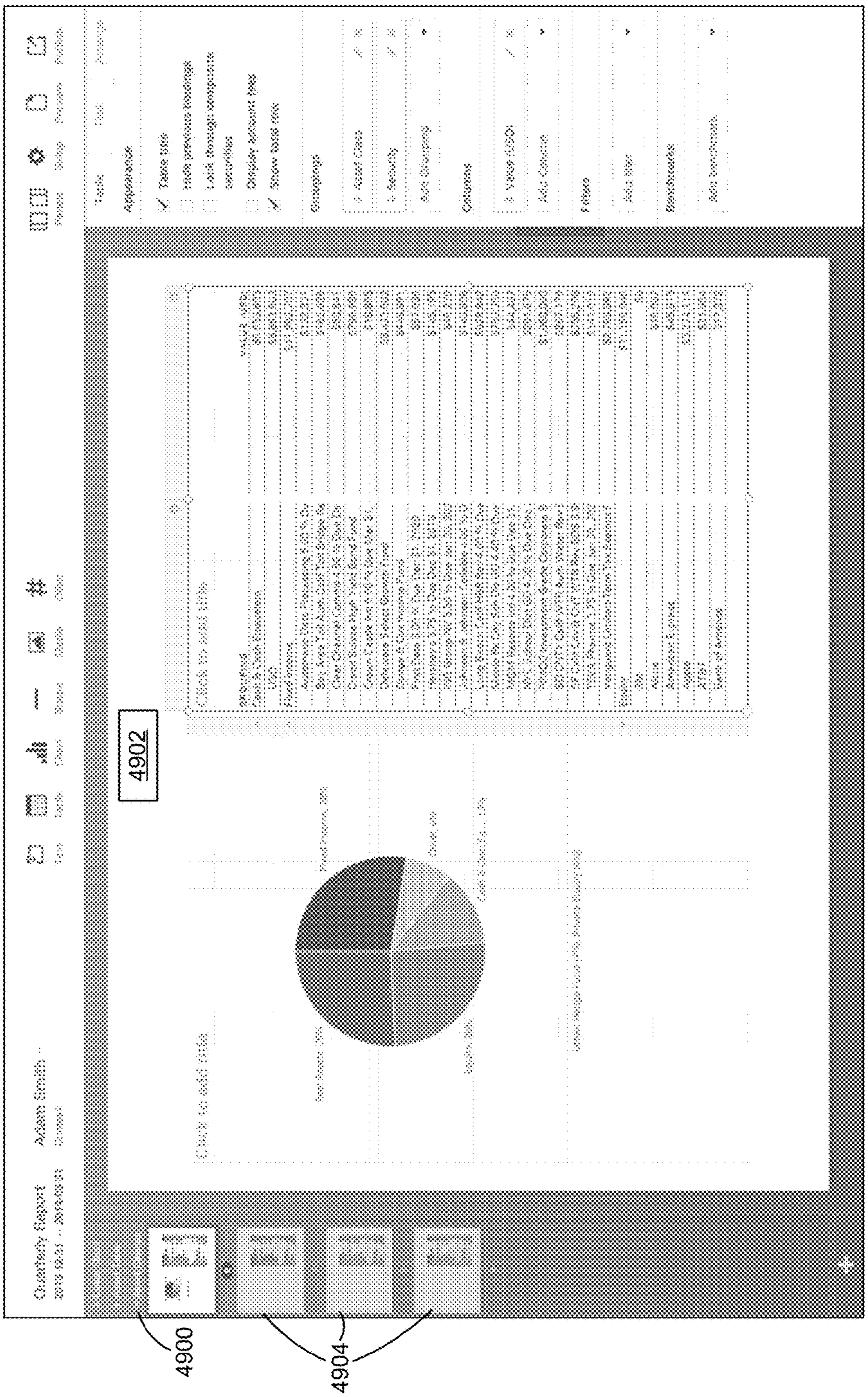

Referring to FIG. 49, an example user interface shown and the "Asset Classes" section is included in a report (as indicated by the thumbnails sidebar at section indicator 4900). The first page of the section 4902 includes a pie chart element and a table element. As indicated by the thumbnails 4904, the pie chart element fits on a single page, while the table element spans four pages. Accordingly, in the example shown, the system has automatically and dynamically added three pages to the report, and spanned the table across the four pages of the section.

Figure 50:
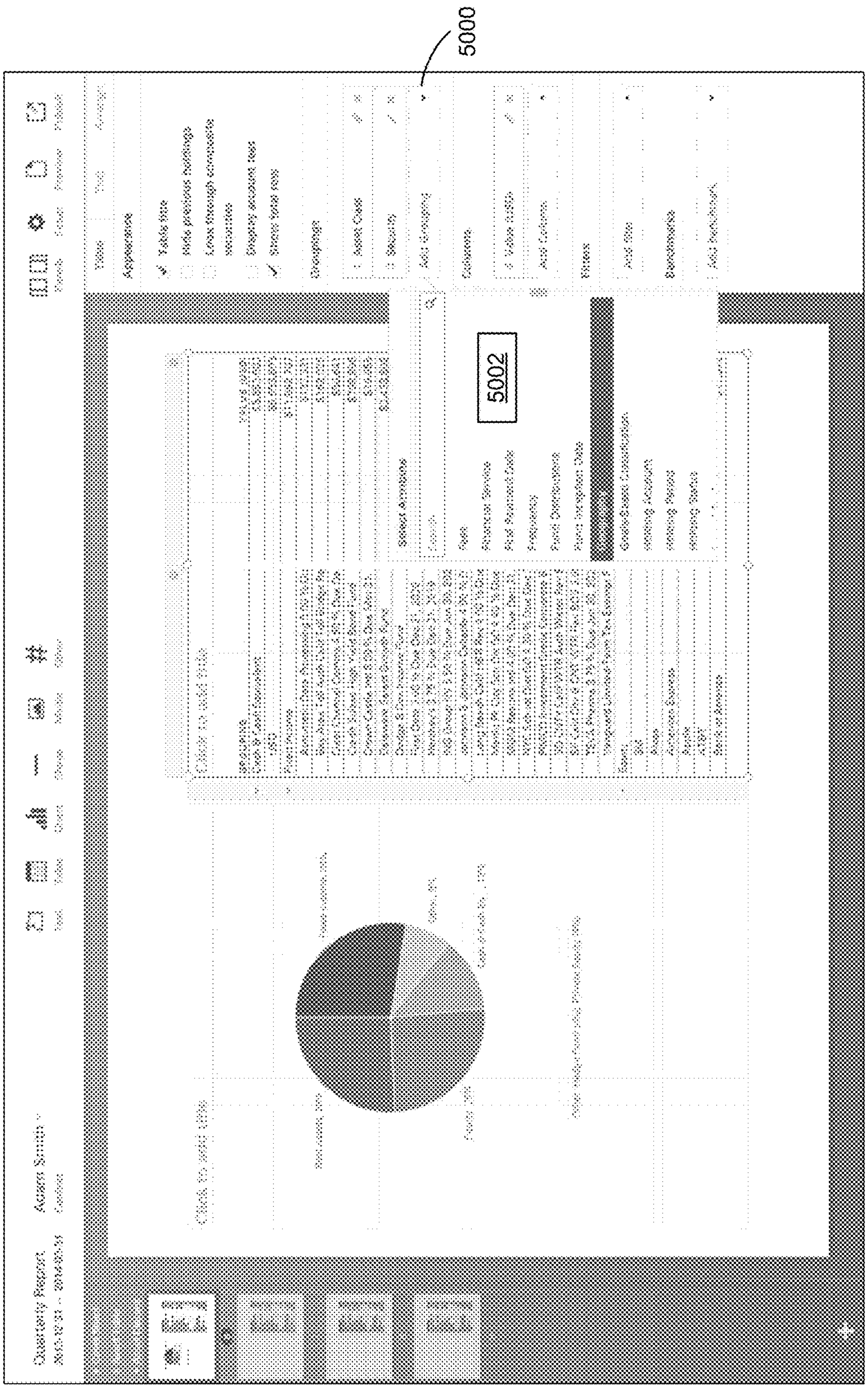
Figure 51:
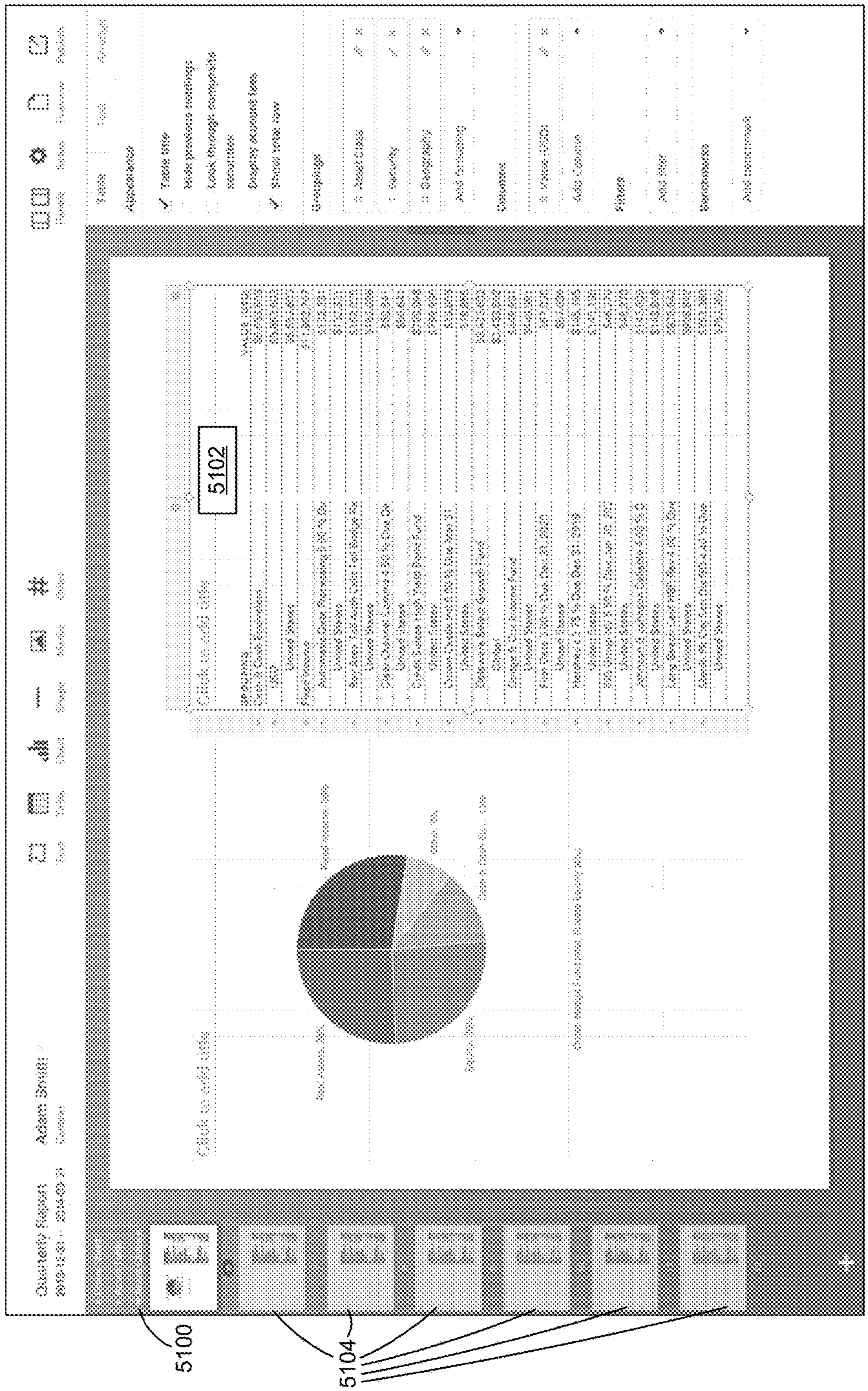

In FIG. 50, the user has selected the "add grouping" button 5000 to add an additional grouping to the table element. As shown in dialog 5002, the user selects a geography grouping. In FIG. 51, table 5102 has been updated based on the new grouping selected by the user. Accordingly, the system recalculates the data to be displayed in the table, re-determines a number of pages needed to display the table and the report, and dynamically adds the necessary pages and spans the table across the pages. Accordingly, as shown in the "Asset Classes" thumbnail section 5100 of the thumbnails sidebar, six pages 5104 have been dynamically added to the section.

Figure 52:
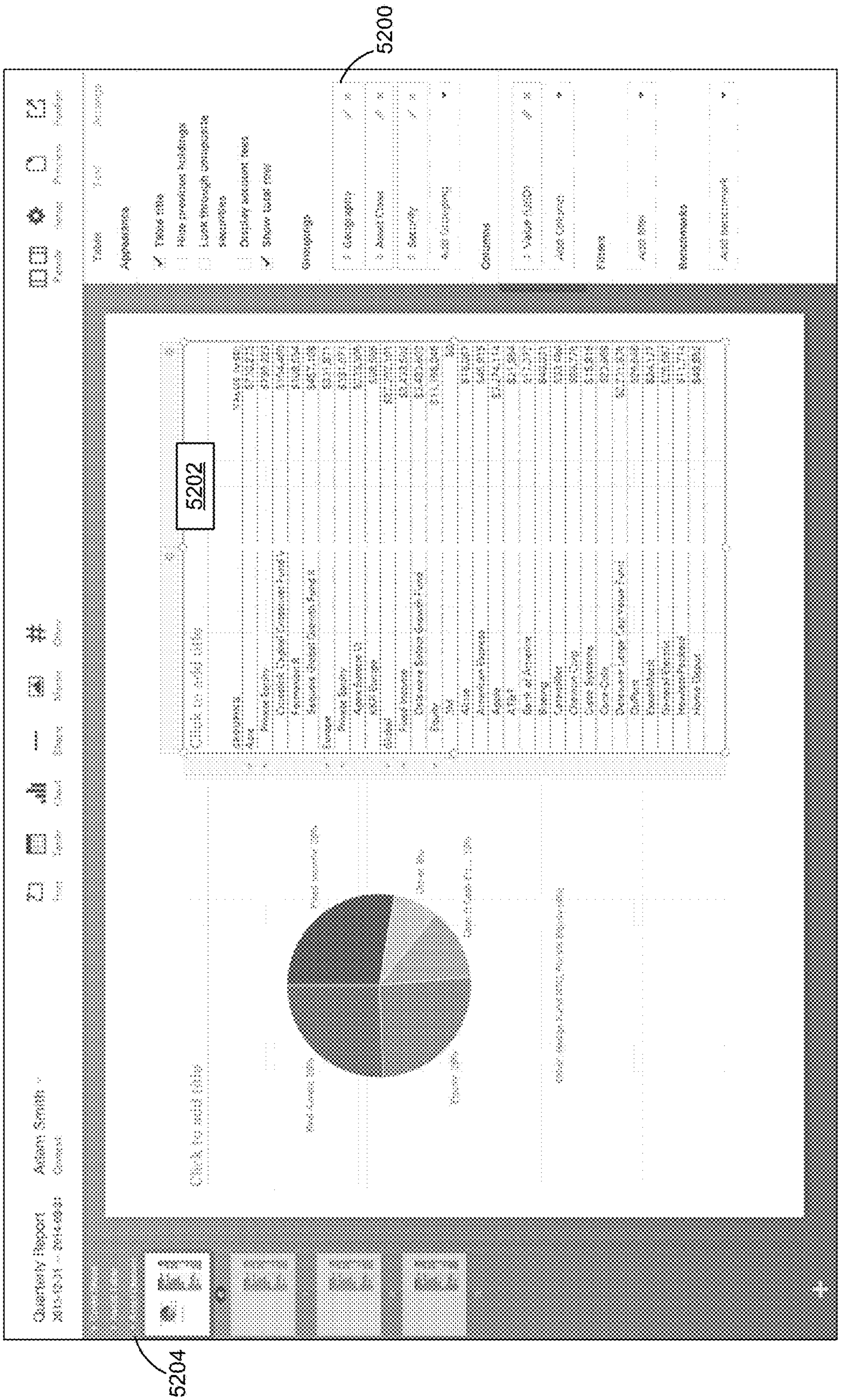

In FIG. 52, the user has rearranged the groupings as shown at 5200. Accordingly, the system has again automatically and dynamically updated the table and the number of pages needed to display the table in the report (as indicated at 5204).

Figure 59:
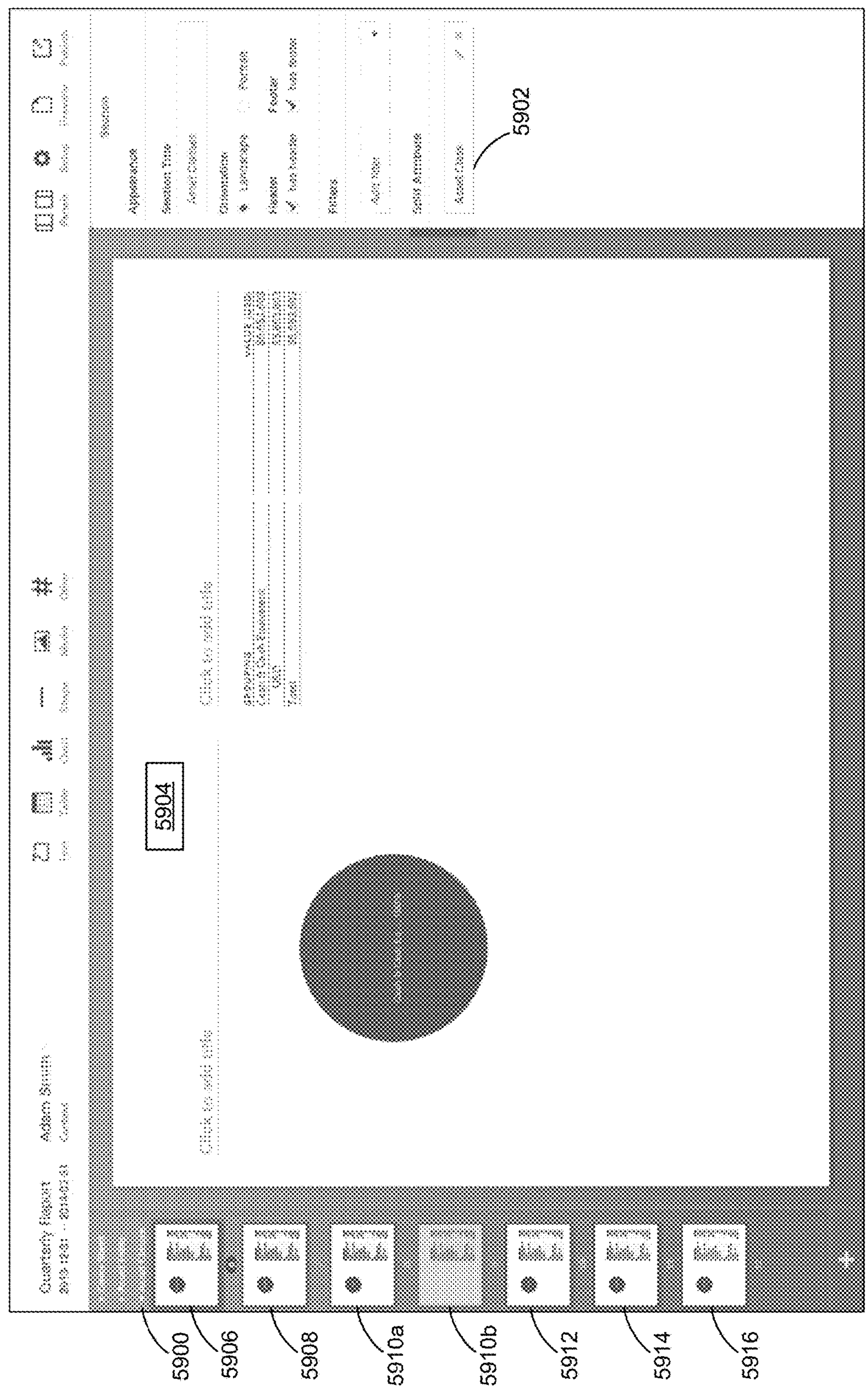
Figure 60:
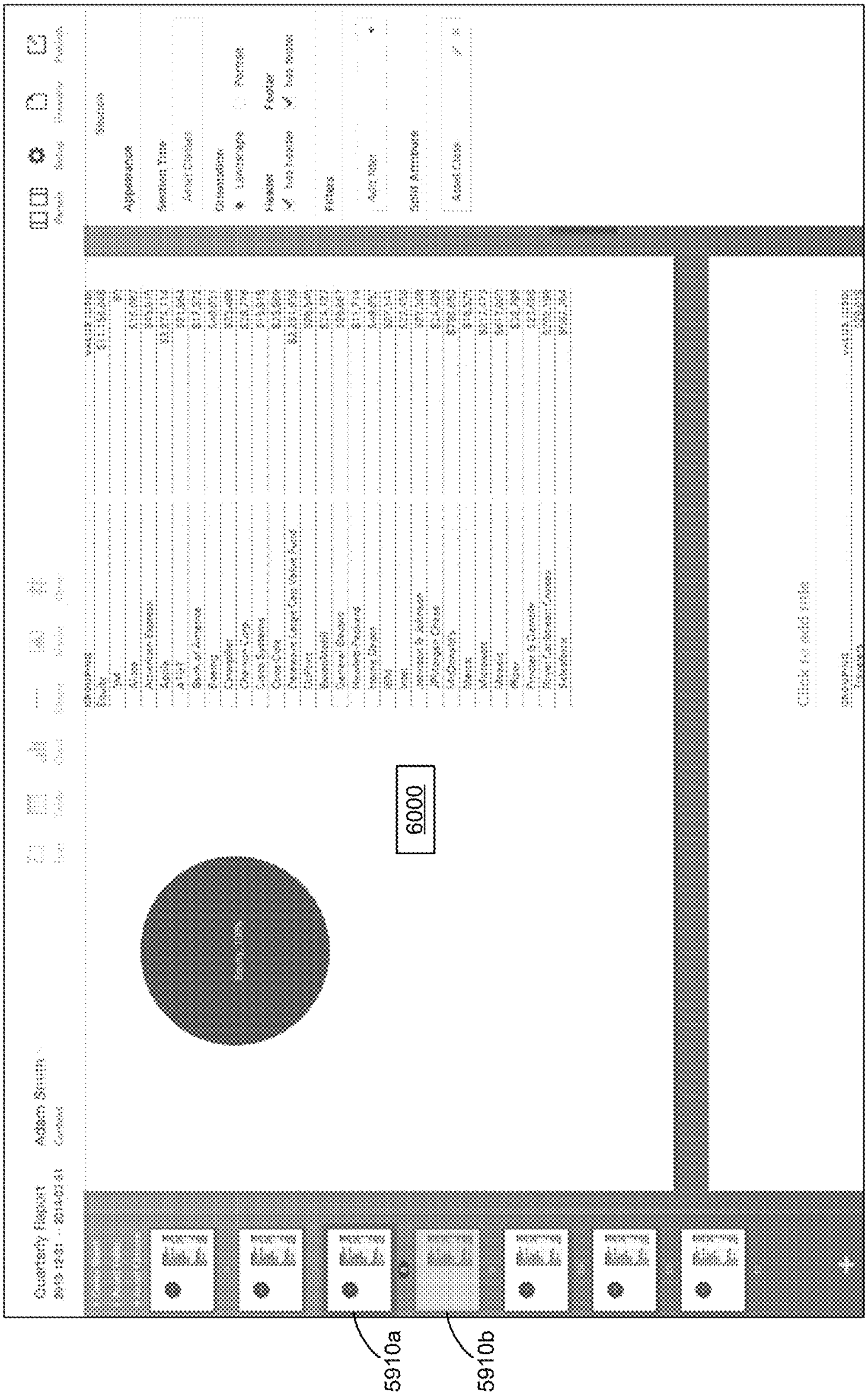

FIGS. 59-60 described below illustrate another example of dynamic page generation.

6.3 Linking to Template Headers and Footers

In various embodiments, headers and footers of pages in a report may be linked in a manner similar to the linking of sections described above. For example, a template or linked header may be generated by a user, which header may then be inserted into multiple reports. Thereafter, when the linked header is updated, the header in all associated reports is also updated. As with linked sections, linked headers/footers may include variables that change depending on a context (including, for example, a perspective and/or a date or date range) of the report into which the headers/footers are inserted. In some embodiments, a page header or footer edited and/or inserted in one page of a section may be applied to all pages in the section. In some embodiments, a page header or footer edited and/or inserted in one page of a report may be applied to all pages in the report. In some embodiments, the user may specify whether a header or footer is to be applied to multiple related pages, or only the current page.

Figure 55:
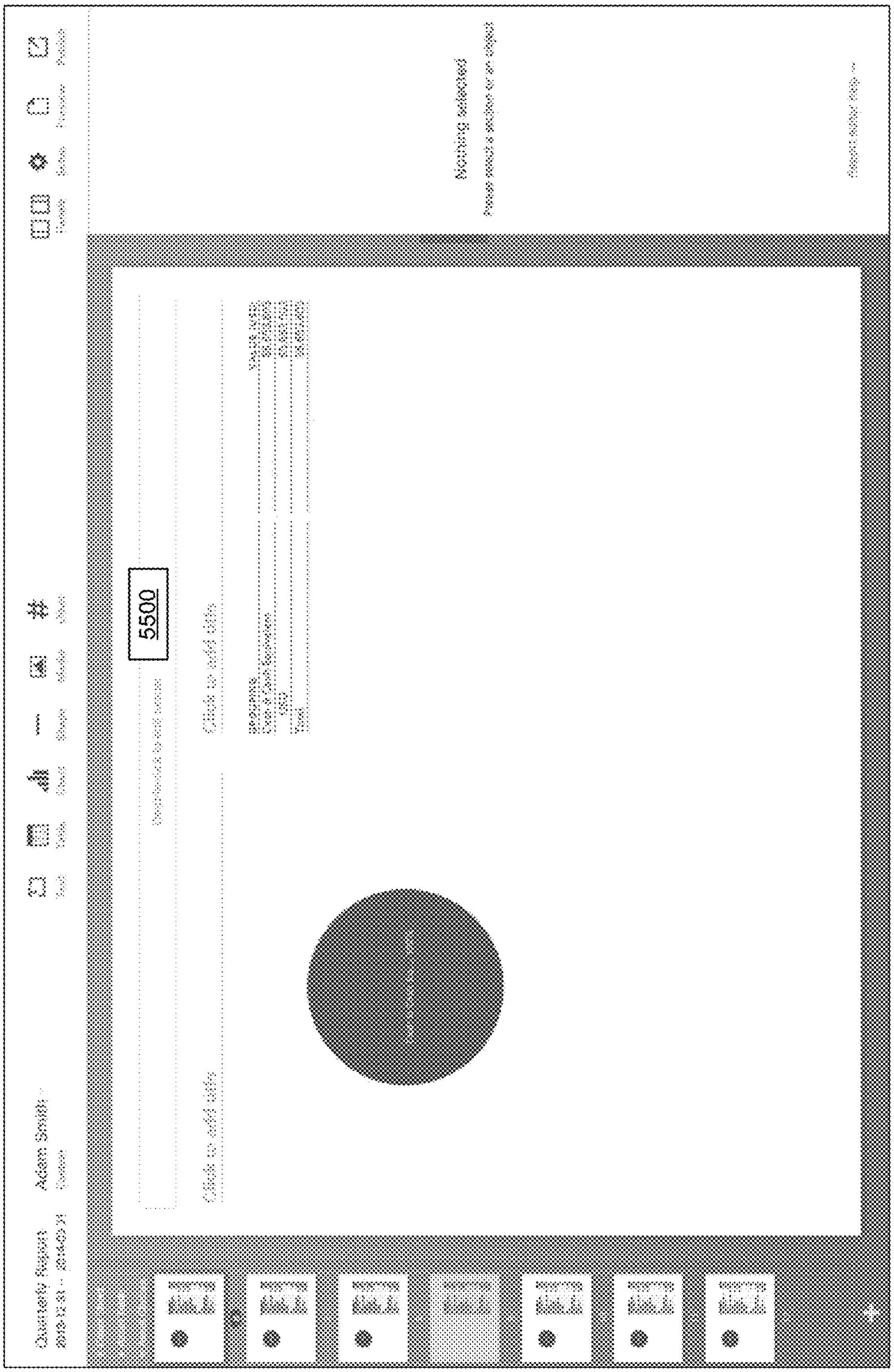
FIGS. 55-57 illustrate example user interfaces of the system in which template headers and/or footers may be linked in reports.
Figure 56:
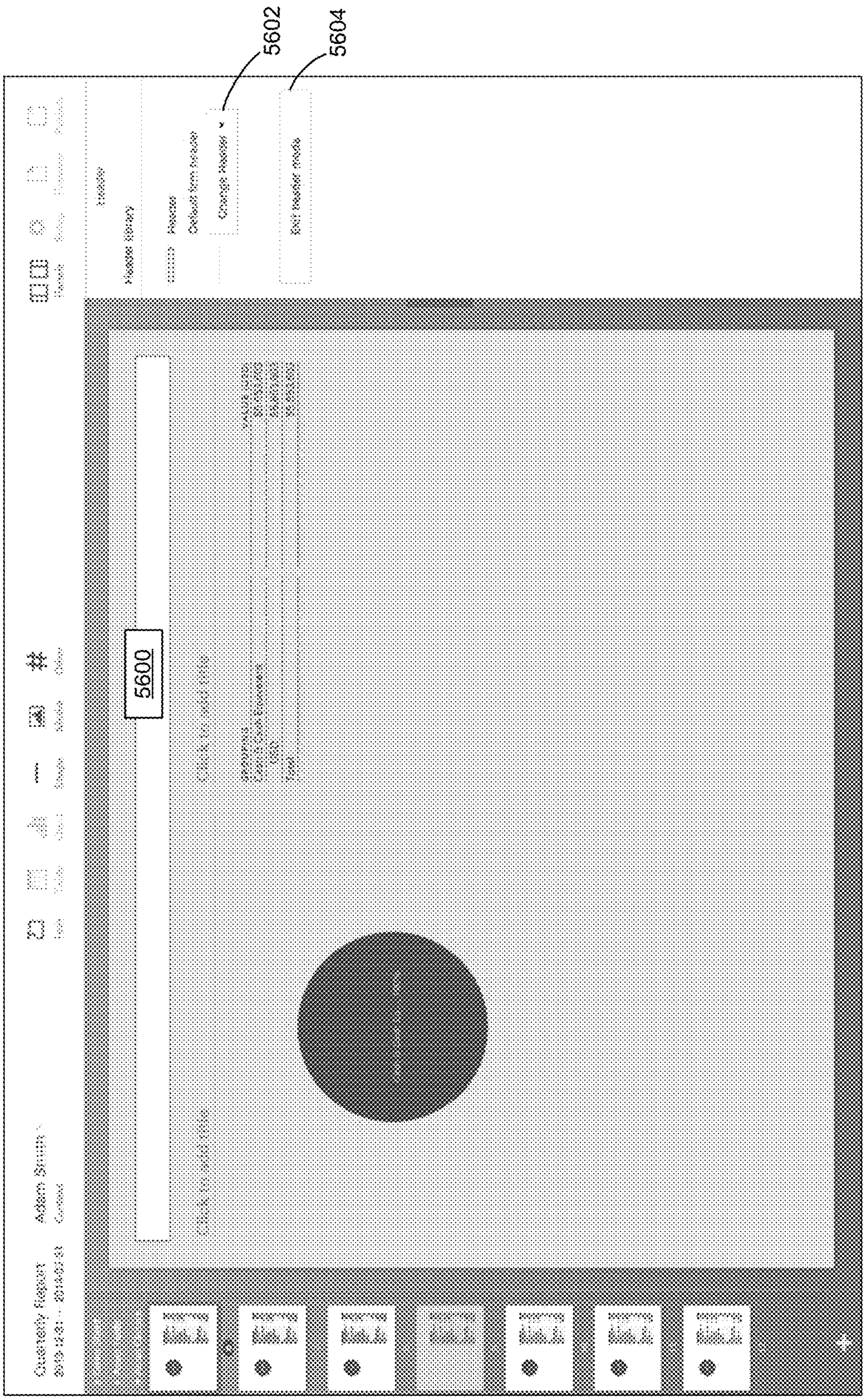
Figure 57:
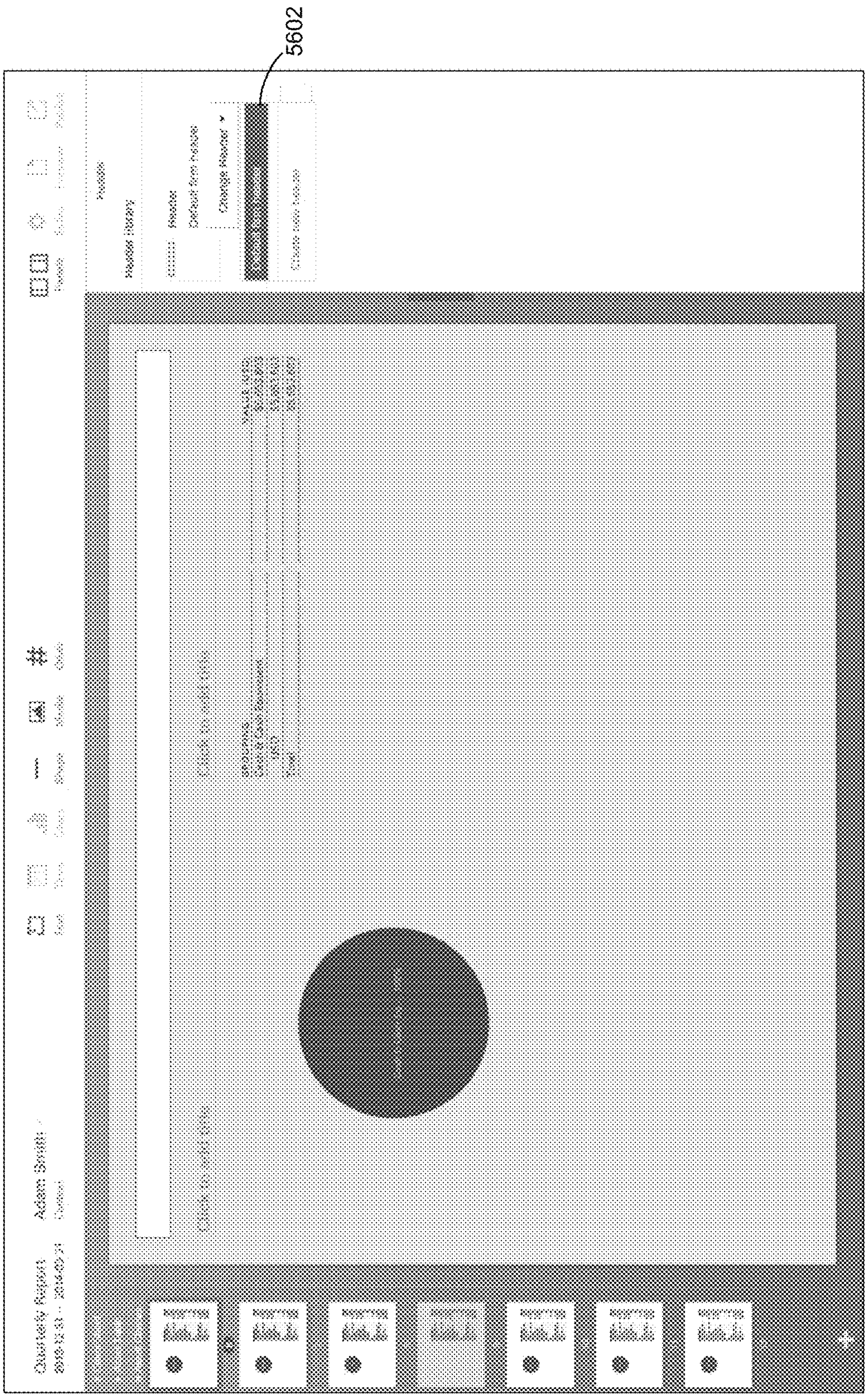

FIGS. 55-57 illustrate example user interfaces of the system in which template headers and/or footers may be linked in reports. FIG. 55 shows an example user interface in which a report includes a header 5500. Information including a header box outline may become visible when the user hovers a cursor over the header area. Footers may be inserted and/or edited in an analogous manner.

In FIG. 56, the user has selected to edit header 5600 by double-clicking in the header box outline. The properties sidebar indicates that the user may select a dropdown 5602 to change the header, and/or select a button 5604 to exit the header mode (the header mode being a mode in which the header is editable). In FIG. 57, the user is selecting a "Default firm header" 5602, which may be a linked header including, for example, a logo for the firm. As the header is linked, when the linked header is updated (for example, if the firm logo is updated) the header in the report will also automatically be updated. In an embodiment, the user may select to unlink a linked header, similar to the unlinking of a linked section.

6.4 Splitting Report Sections

Figure 58:
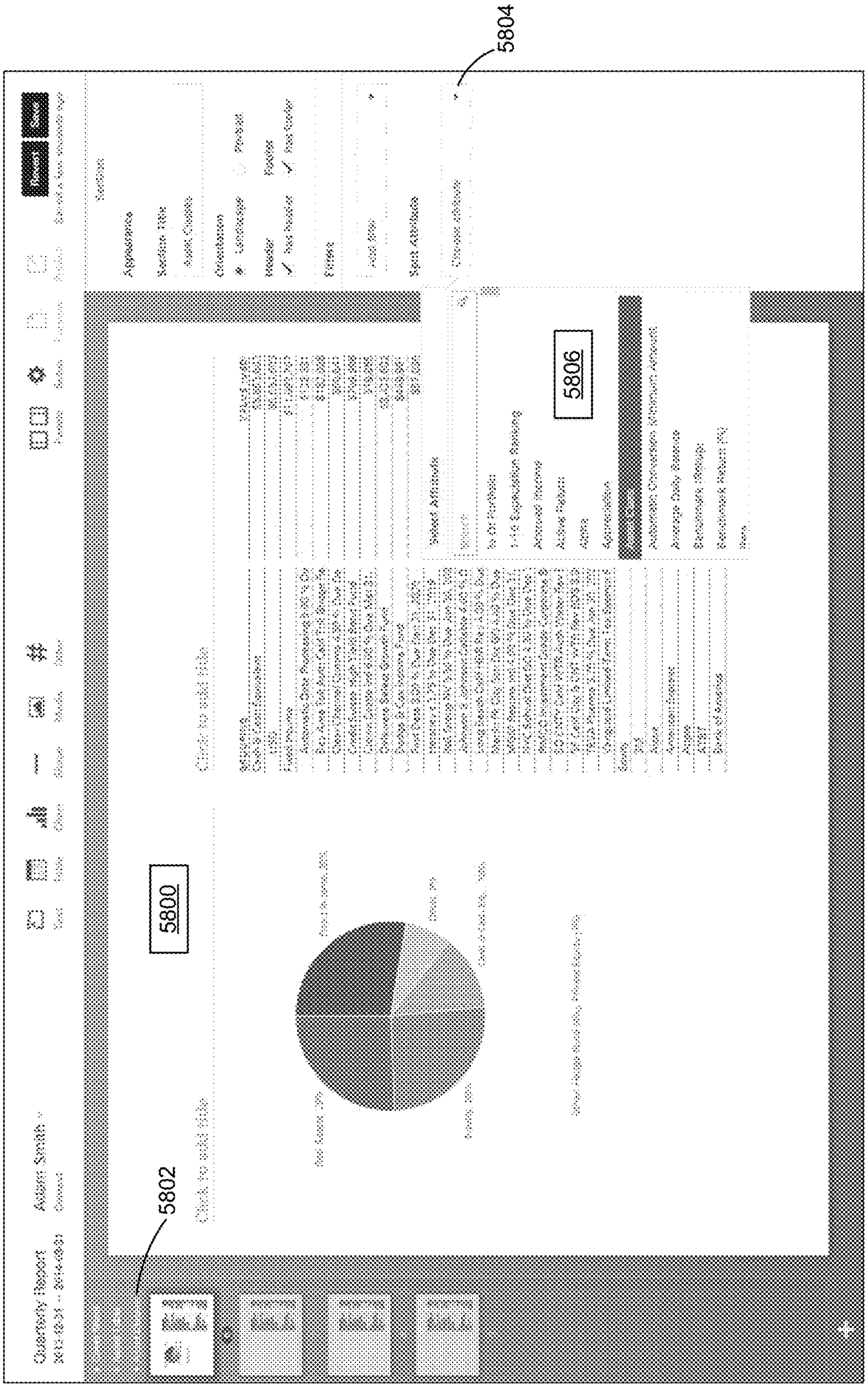
FIGS. 58-60 illustrate example user interfaces of the system in which report sections may be split in a report.

FIGS. 58-60 illustrate example user interfaces of the system in which report sections may be split in a report. As described above, in some embodiments the system provides automatic splitting (also referred to herein as "duplication") of report sections based on a specified split attribute. In these embodiments, the system automatically, based on a split attribute (provided, for example, by a user), divides a report section into multiple parts and inserts needed pages into the report. Each of the parts generated by the system may be based on the report section which is split. For example, a report section may include a table displaying calculated financial data of multiple asset classes. The user may specify a split attribute of "asset class," such that the system automatically splits the report section into multiple parts, each part including a table displaying calculated financial data of different respective asset classes. In this example, the system automatically calculates the financial data to be put in each part of the report section by accessing and traversing one or more complex data structures (as described above and below).

Referring now to FIG. 58, a user interface is shown including a report 5800 including an "Asset Classes" section 5802. The report of FIG. 58 is similar to the report shown in FIG. 49 and described above. The user, in the properties editor sidebar of FIG. 58, may edit properties associated with the selected "Asset Classes" section. The user may select selection box 5804 to specify an attribute on which to split the section. In the dialog 5806, the user may select to split the section according to, for example, asset classes by selecting the asset class attribute.

FIG. 59 illustrates a user interface in which the report of FIG. 58 has been updated in response to selection of the asset class split attribute (as shown at indicator 5902). As shown in the thumbnails sidebar, "Asset Classes" section 5900 now includes seven pages. Each page (with the exception of dynamically added pages) includes data associated with a different asset class, which is the attribute on which the section was split. The format of each page is additionally based on the format of the section prior to the split (for example, the section includes a pie chart element and a table element next to each other).

Accordingly, in the embodiment shown in FIG. 59, page 5904, corresponding to thumbnail 5906, displays data associated with a first asset class, "Cash & Cash Equivalents." As shown in FIG. 60, page 6000, corresponding to thumbnail 5910*a*, displays data associated with a second asset class, "Equity." Additionally, as shown in FIG. 60 and by thumbnail 5910*a*, the table element of the "Equity" asset class spans multiple pages. Accordingly, the system automatically and dynamically adds the necessary pages. Referring again to FIG. 59, additional pages (represented by thumbnails 5908, 5912, 5914, and 5916) corresponding to other asset classes are also added to the report automatically.

In various embodiments, the user may specify any attribute on which to split a report section. Further, modifiers may be applied to the attributes (as with the various filters and other attribute selections described herein). For example, when specifying a split on the asset class attribute, the user may specify that only asset classes constituting more than a particular percentage of the portfolio should be split out. In an embodiment, the system may include any other values of a given attribute that are not split out in an aggregated part of the section.

Figure 61:
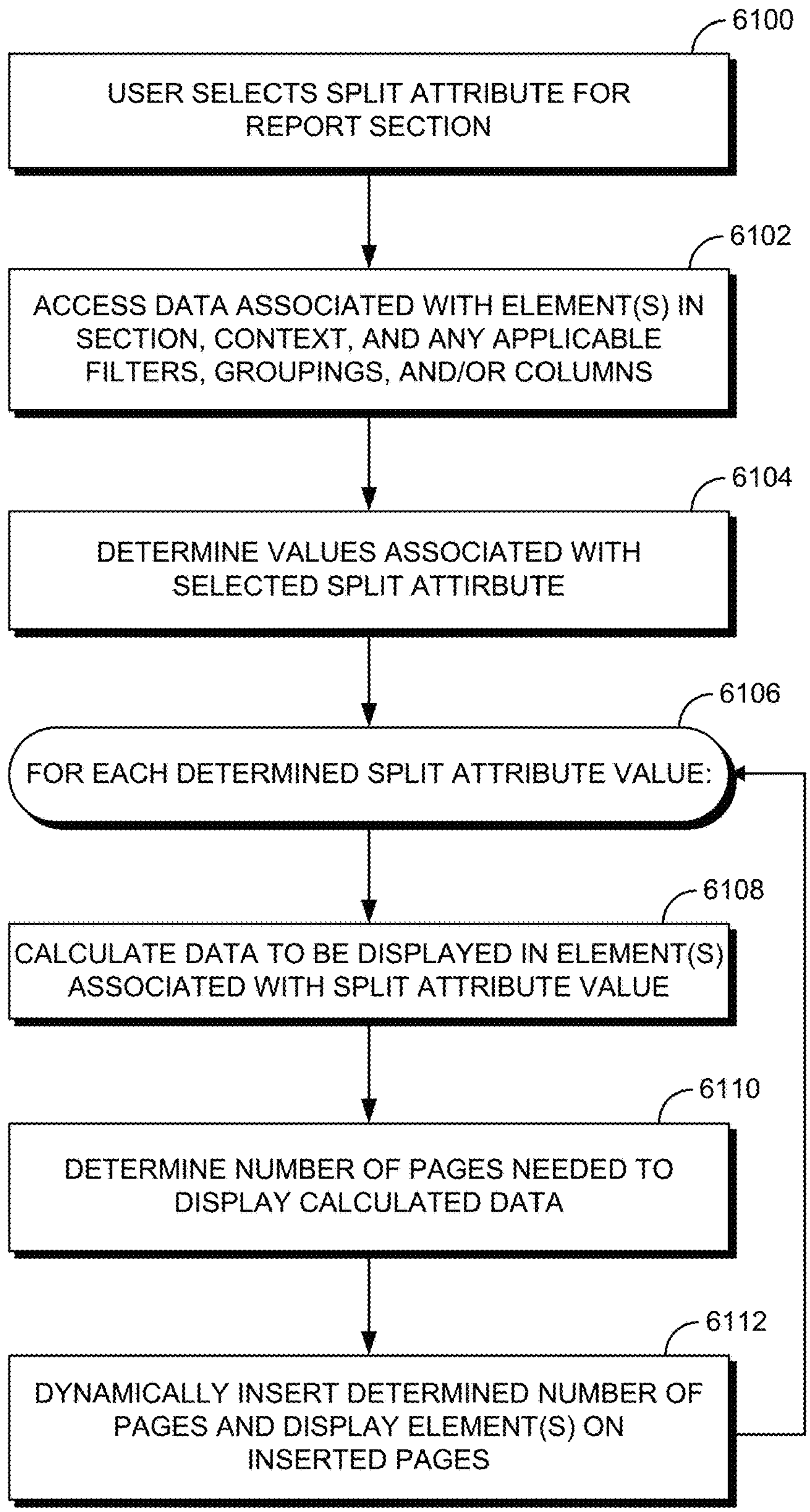
FIG. 61 is a flowchart showing an example method of the system in which report sections are split in a report.

FIG. 61 is a flowchart showing an example method of the system in which report sections are split in a report. In various embodiments, fewer blocks or additional blocks may be included in the process of FIG. 61, or various blocks may be performed in an order different from that shown in the figure. Further, one or more blocks in the figure may be performed by various components of the system as described above and below, for example, one or more of view computation unit 106 and/or report unit 109.

At block 6100, the user may select an attribute upon which to split a report section. The selection of the attribute may be received by the system, at which point, at block 6102, the system accesses data associated with any report elements (for example, tables and charts) in the section, determines a context and any applicable filters, columns, groupings, and/or the like (this block is similar to block 5404 of FIG. 54 described above). Then at block 6104, the system determines values associated with the split attribute. For example, in the asset class example described above, values may include "cash," "equity," "fixed income," and/or the like. Then, for each of the determined values of the split attribute (block 6106), the system automatically calculates data to be displayed in the report elements associated with the split attribute values (block 6108, which is similar to block 5406 of FIG. 54), determines a number of pages needed to display the calculated data (block 6110, which is similar to block 5408 of FIG. 54), and inserts the determined number of pages and displays the elements with the calculated data (block 6112, which is similar to block 5408 of FIG. 54).

Accordingly, in some embodiments the system dynamically generates pages while also splitting a report section according to an attribute. In various embodiments, as described above, the user may apply one or more filters to whole report sections, including split sections. Such filters are applied to the various elements of each of the split section, and the system automatically updates the elements, as described above.

6.5 Additional Report Generation User Interface Features

FIGS. 62-70 illustrate example user interfaces of the system including other features of the user interface for generating and/or editing reports.

Figure 62:
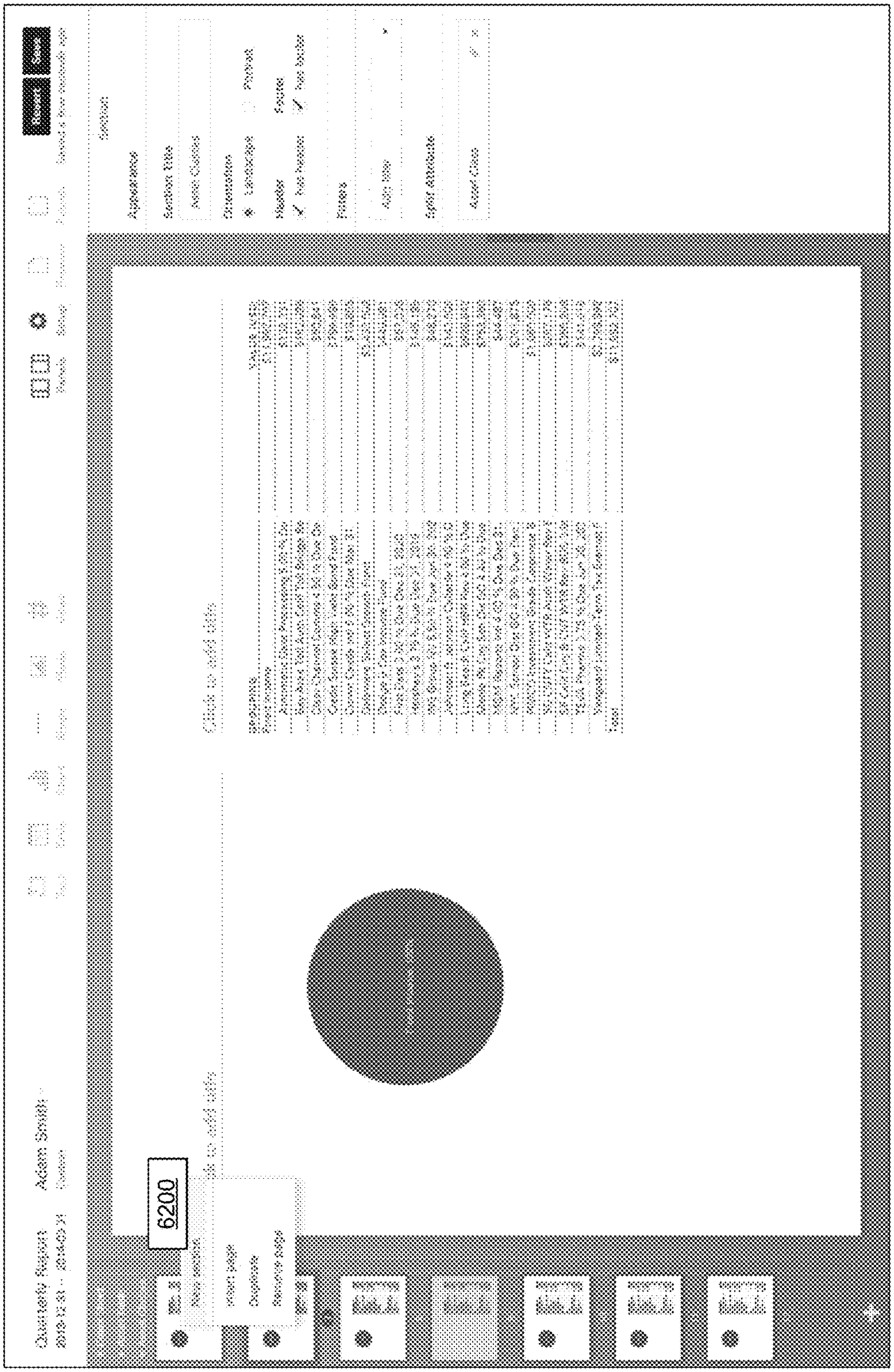
FIGS. 62-70 illustrate example user interfaces of the system including other features of the user interface for generating and/or editing reports.

FIG. 62 illustrates a user interface in which a user may select, at selection box 6200, various action associated with a report section. The selection box 6200 may be activated by, for example, a secondary input (such as a right click of a mouse, or a long press of a touch input) to the user interface on the section of the report of interest.

Figure 63:
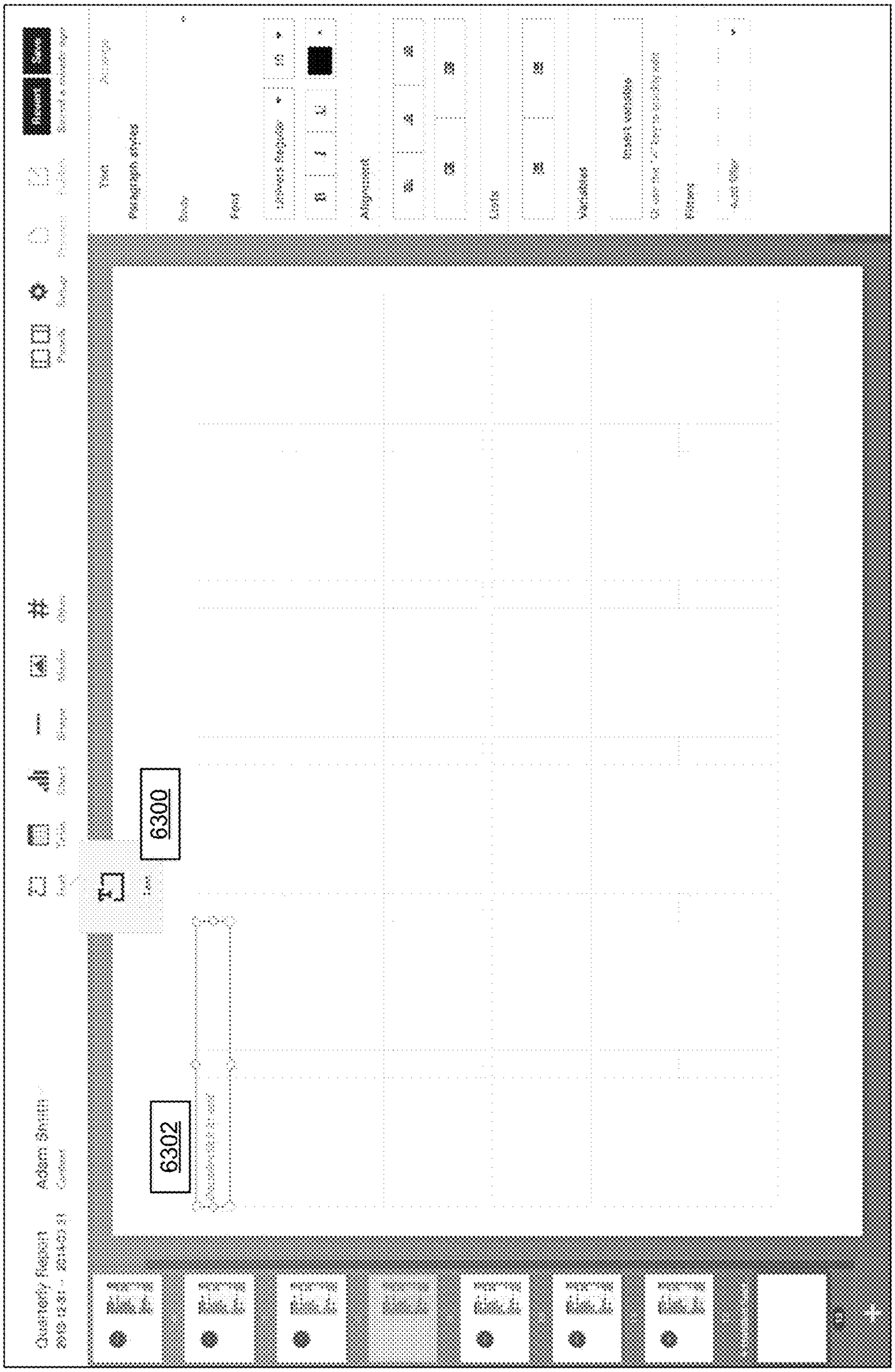

FIG. 63 illustrates a user interface in which selection of a text element button 6300 causes a text element 6302 to be inserted into a report. Further various properties associated with the text element are shown in the properties sidebar.

Figure 64:
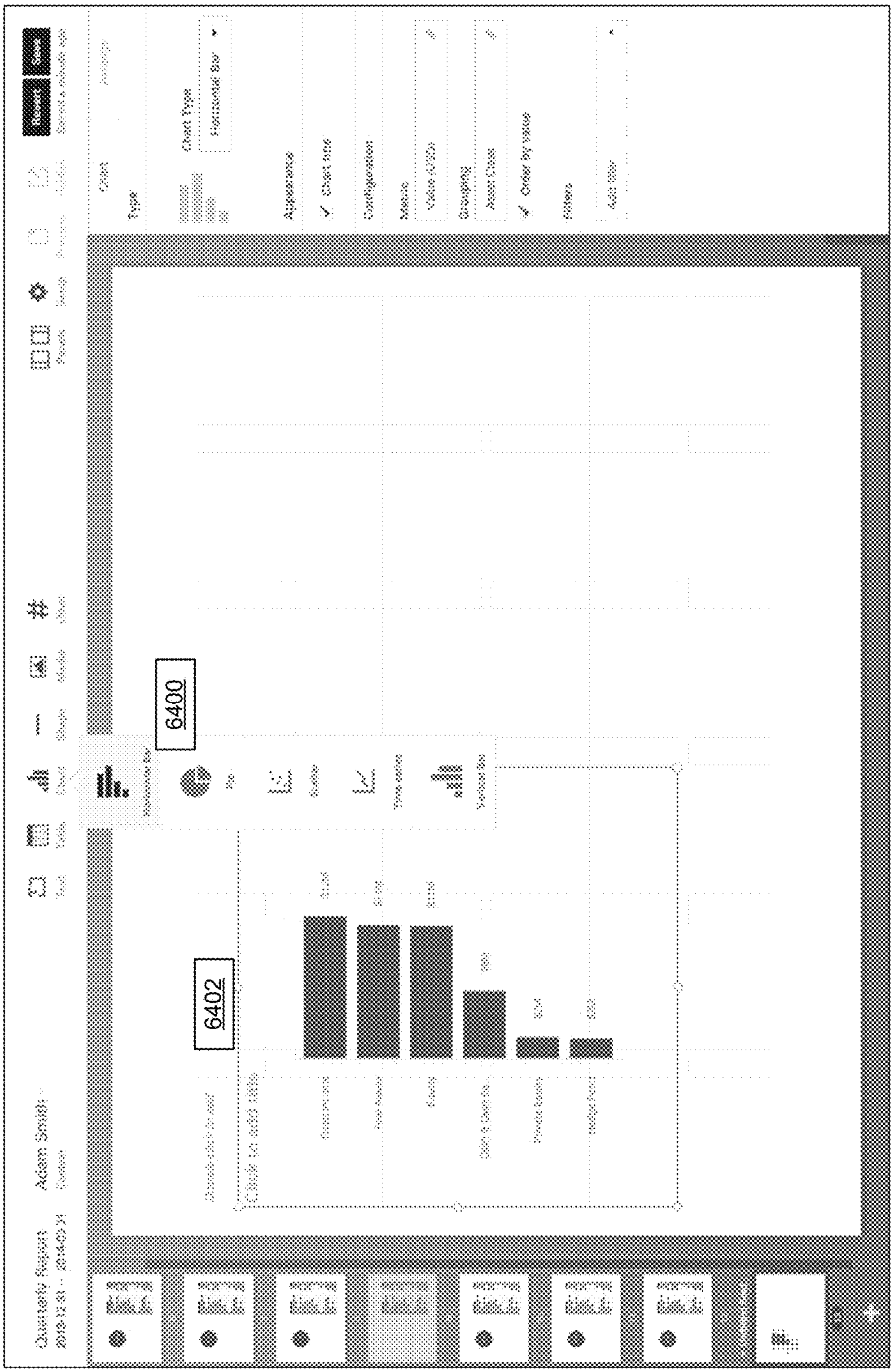

FIG. 64 illustrates a user interface in which selection of a horizontal bar chart element button 6400 causes a horizontal bar chart element 6402 to be inserted into a report. Further various properties associated with the horizontal bar chart element are shown in the properties sidebar.

Figure 65:
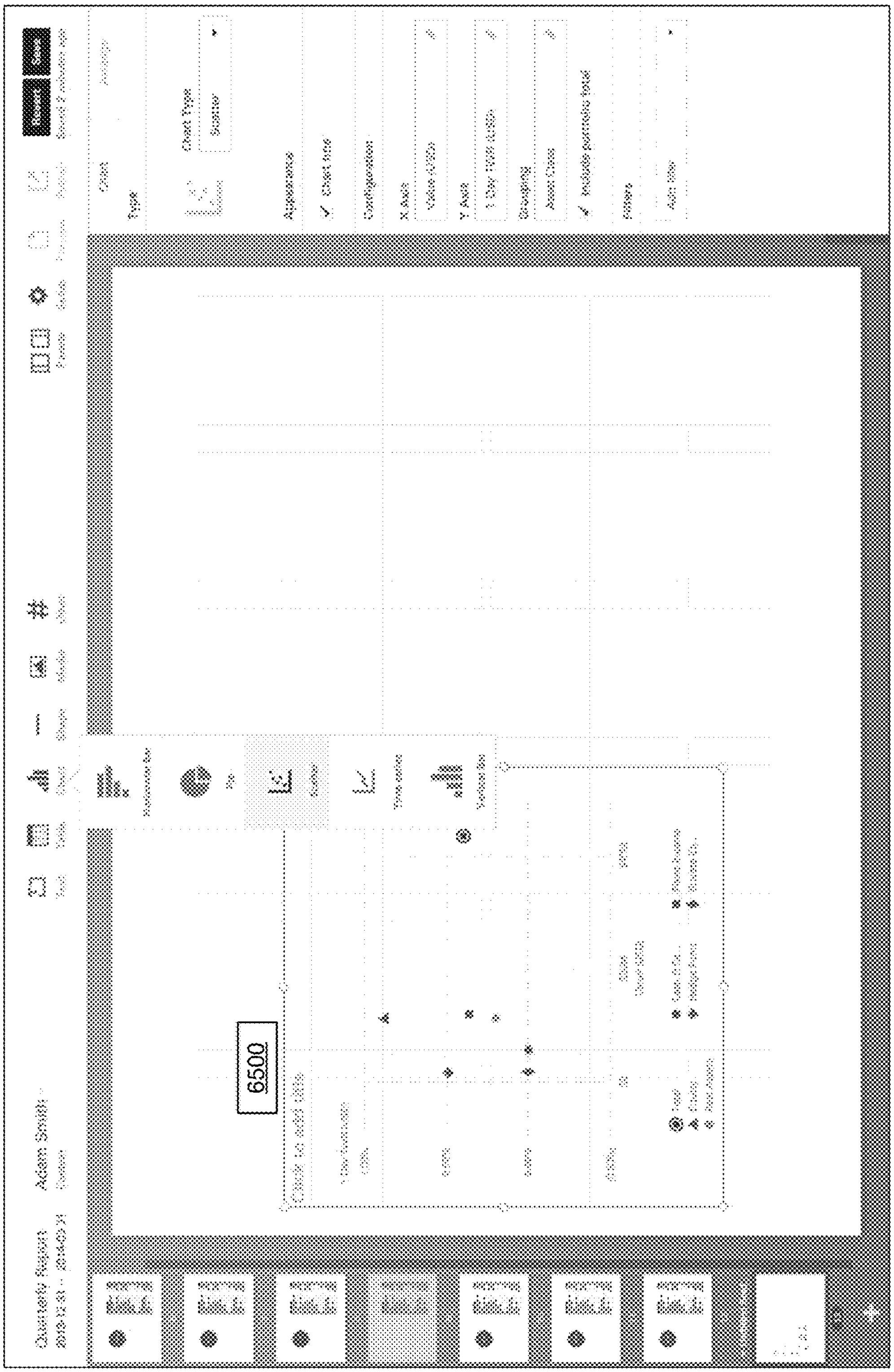

FIG. 65 illustrates a user interface in which selection of a scatter plot chart element button causes a scatter plot chart element 6500 to be inserted into a report. Further various properties associated with the scatter plot chart element are shown in the properties sidebar.

Figure 66:
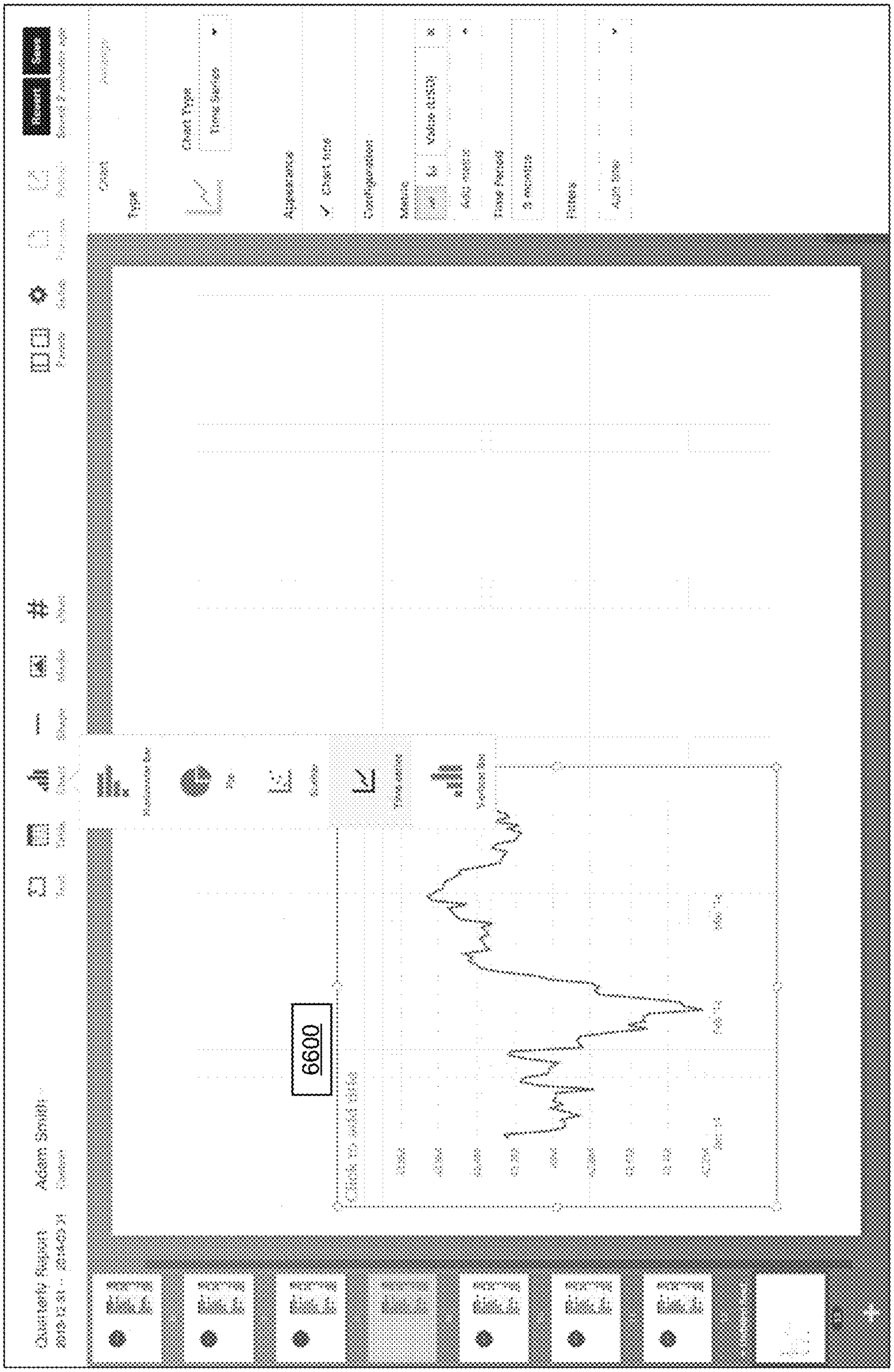

FIG. 66 illustrates a user interface in which selection of a time series chart element button causes a time series chart element 6600 to be inserted into a report. Further various properties associated with the time series chart element are shown in the properties sidebar.

Figure 67:
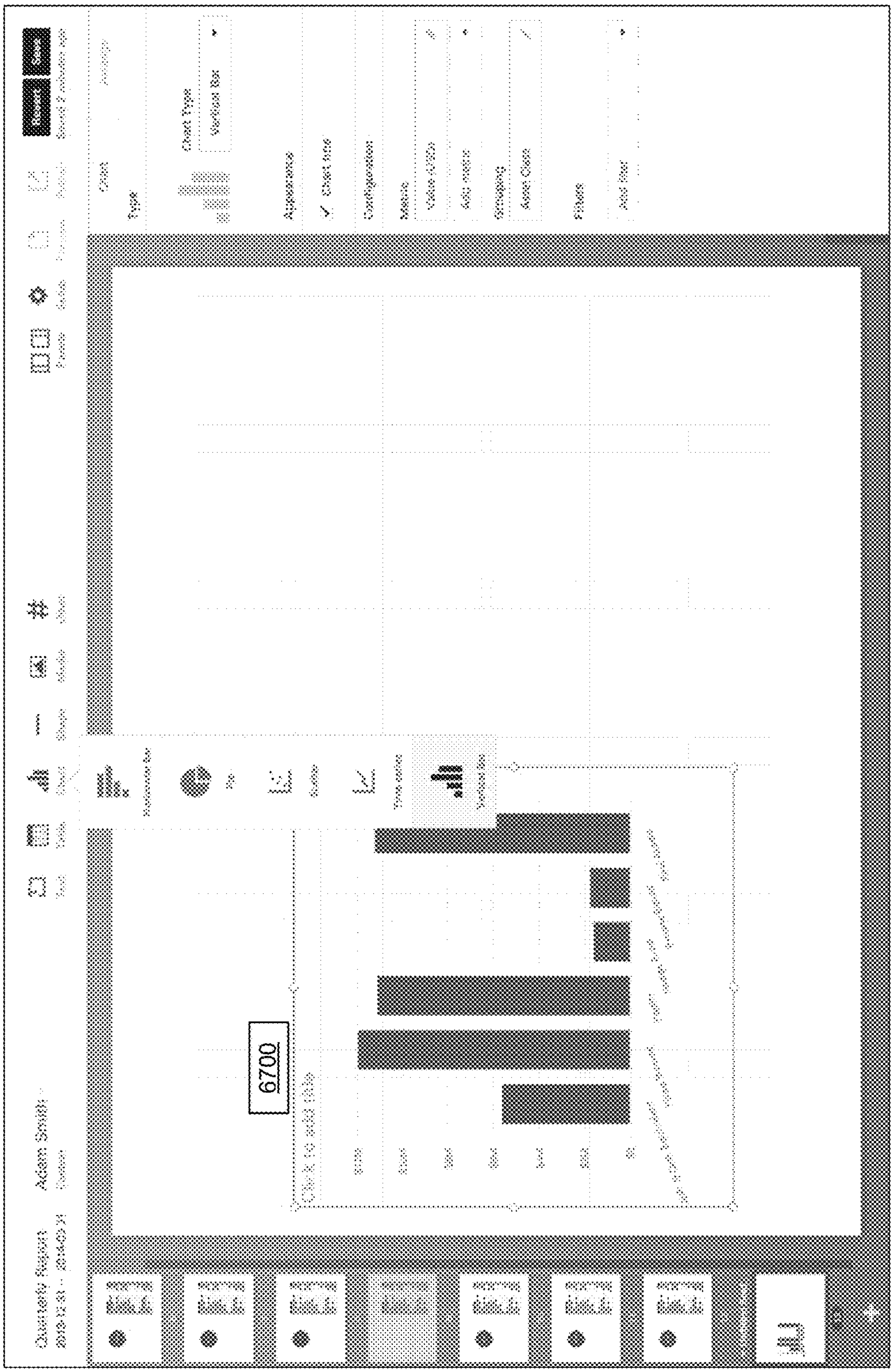

FIG. 67 illustrates a user interface in which selection of a vertical bar chart element button causes a vertical bar chart element 6700 to be inserted into a report. Further various properties associated with the vertical bar chart element are shown in the properties sidebar.

Figure 68:
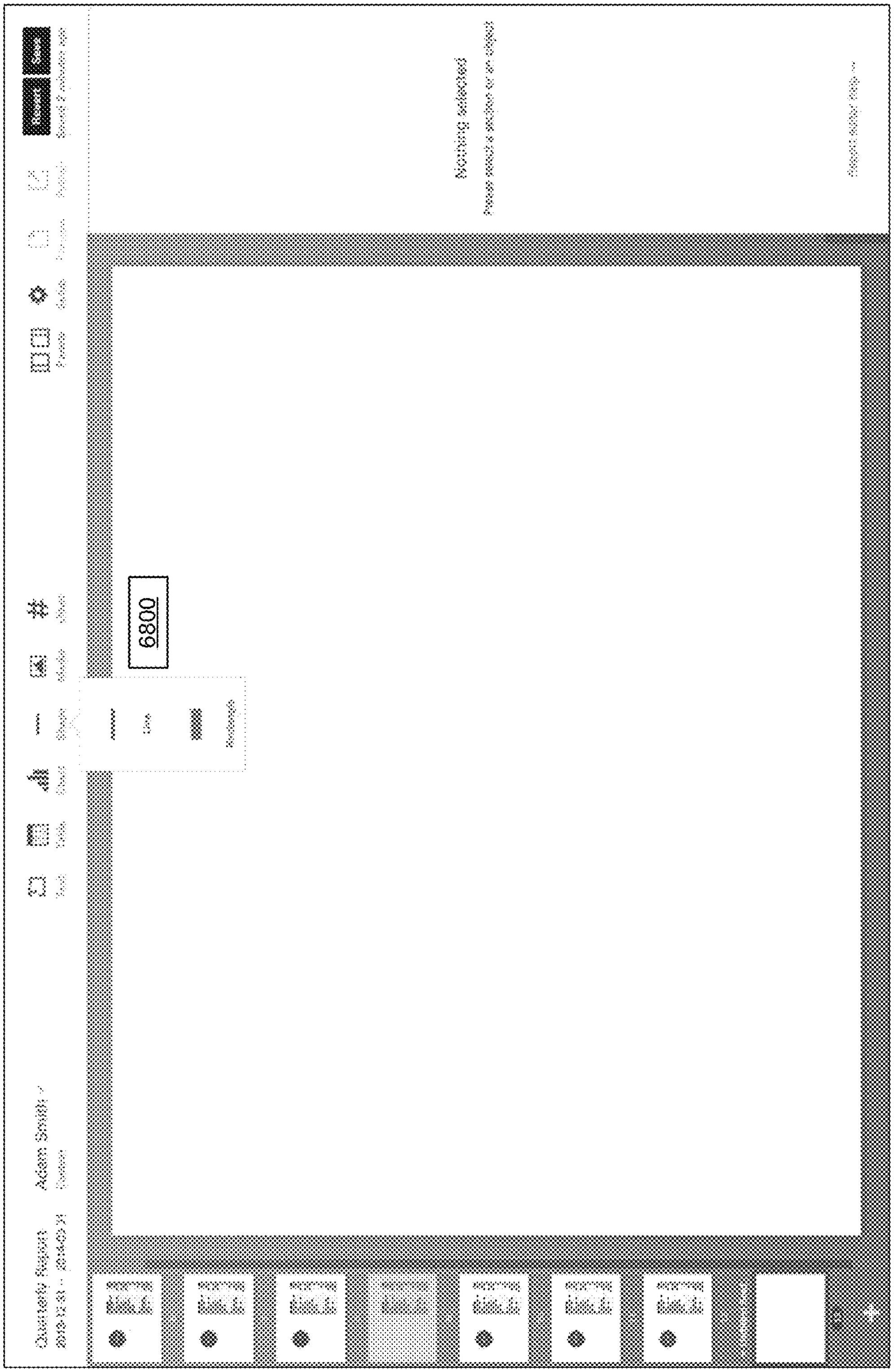

FIG. 68 illustrates a user interface including line and rectangle buttons 6800 which may be used to insert lines and/or rectangles into a report.

Figure 69:
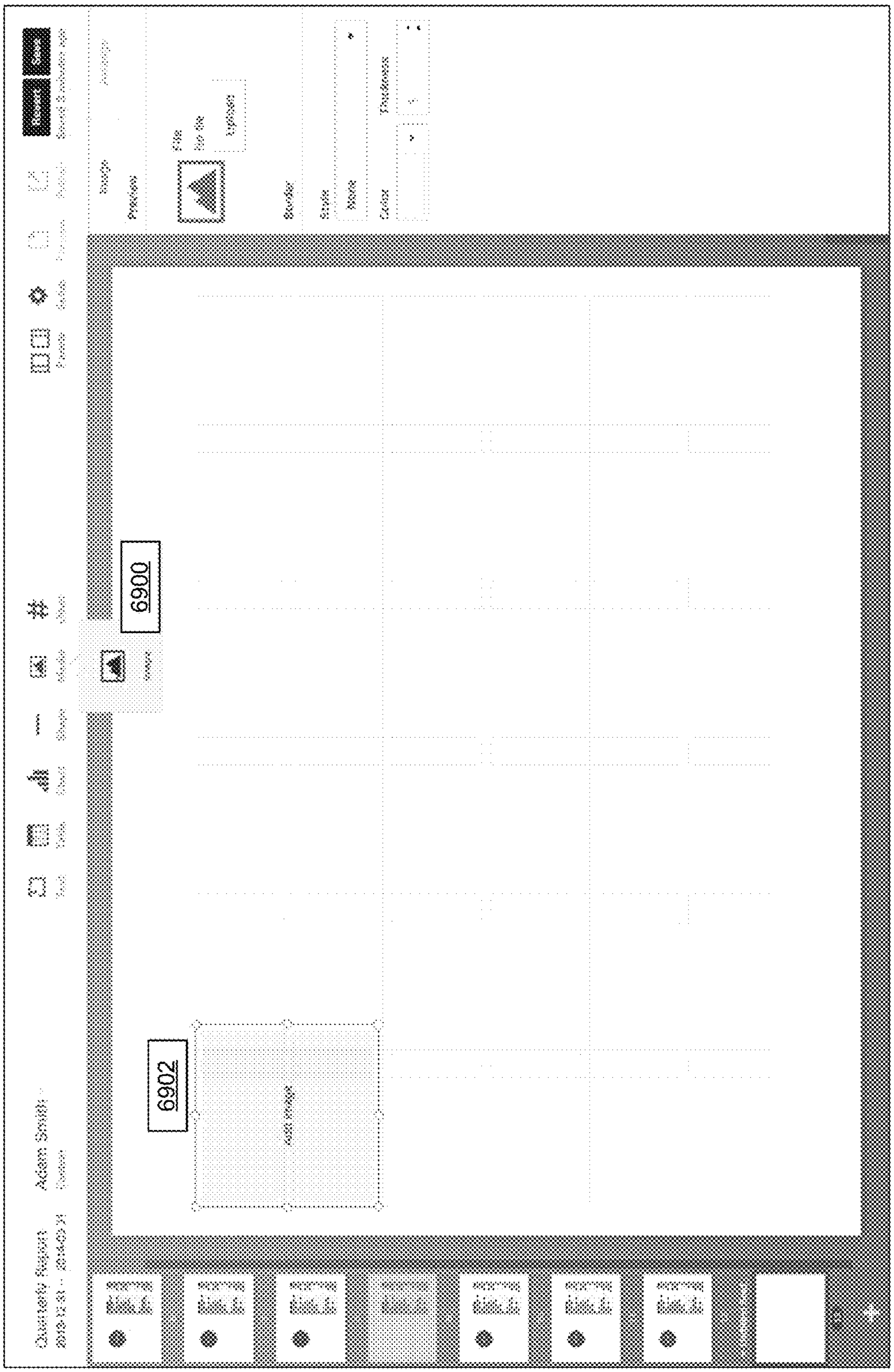

FIG. 69 illustrates a user interface in which selection of image element button 6900 causes an image element 6902 to be inserted into a report. Further various properties associated with the image element are shown in the properties sidebar.

Figure 70:
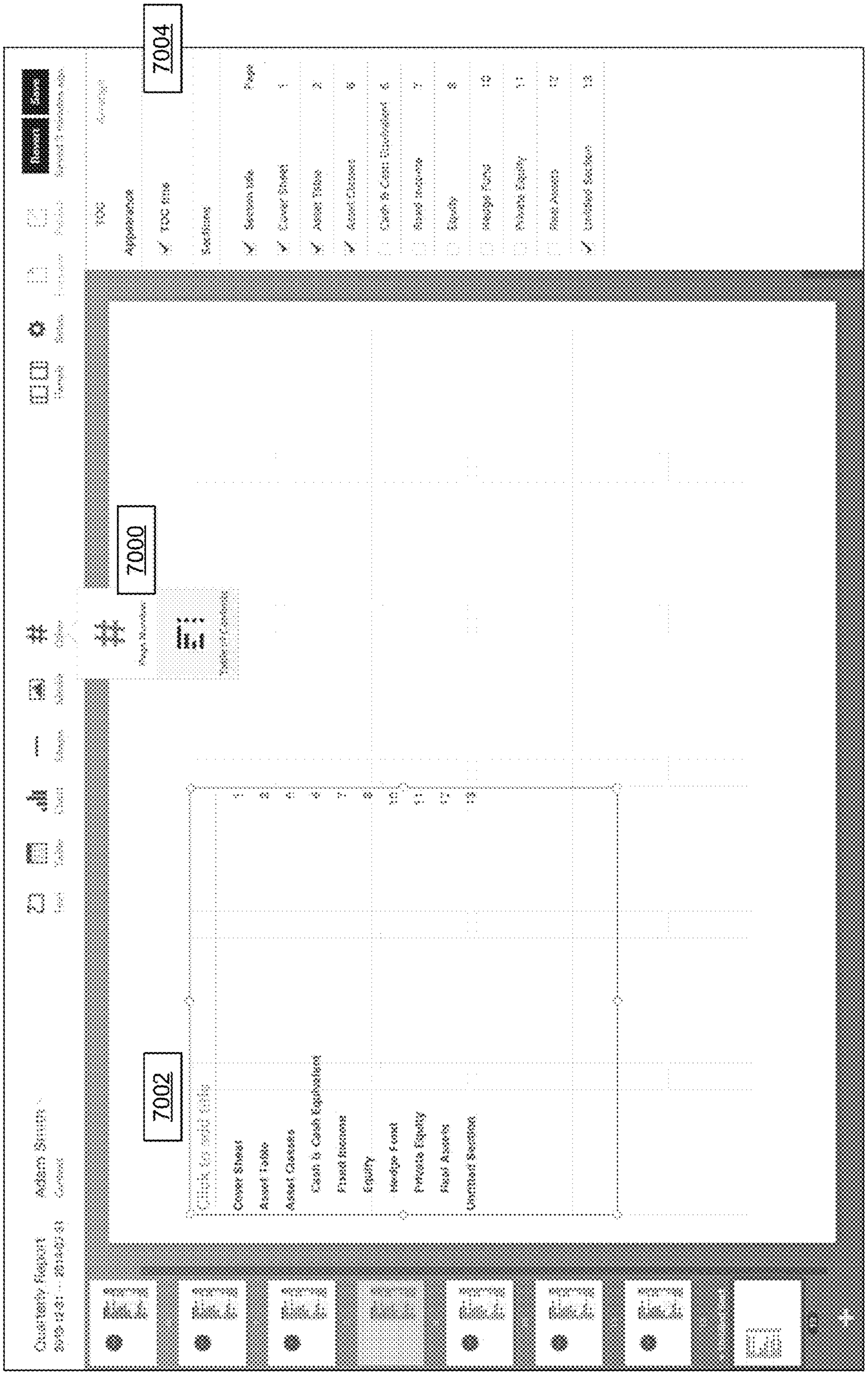

FIG. 70 illustrates a user interface in which selection of table of contents element button 7000 causes a table of contents element 7002 to be inserted into a report. The table of contents 7002 is automatically populated by the system based on the sections in the report, including split sections as described above. Further various properties associated with the image element are shown in properties sidebar 7004. As shown, the user may select to include or not include various sections in the table of contents.

In various embodiments, the various user interface features described above in reference to FIGS. 62-70 may be available to the user and input into reports as described herein. As described above, the various user interface features may be filtered and/or otherwise customized by the user (including for example, changes of context, including perspective and/or date or date range), which may cause the system to automatically re-calculate data and update the user interfaces and reports. Further, the various features may include one or more variables (also referred to herein as "symbolic references") that may be automatically updated by the system.

6.6 Automatic PDF Generation

As mentioned above, in some embodiments the system provides for automatic PDF report generation. For example, after a report has been created and/or edited by the user, the user may initiate an automatic process of the system wherein the system converts generates PDF versions of the report in each context (including, for example, a perspective and/or a date or date range) associated with the report. Thereafter, the system may additionally automatically communicate the PDF versions of the report to particular recipients associated with each of the contexts (for example, clients associated with the respective contexts). In these embodiments, the system may initialize multiple instances of PDF generation processes in parallel. Each PDF generation process may be provided with an authentication token (which may be used to enable authenticated access of report data as the PDF generation process may occur on a computing device separate from a computing device on which the user generated and/or edited the report) and a context (including, for example, a perspective and/or a date or date range), such that the process may generate and render the report, and generate the PDF based on the rendered report. Generated reports may be automatically electronically delivered to a specified recipient, and/or the specified recipient may be provided with a notification that the report is generated and a link to access the generated report.

As described above, "PDF" refers to a static PDF file for communication to an external user or computer. In an embodiment, the static PDF file is rendered in a vectorized PDF format, enabling zoom-in to an arbitrary level of magnification without introducing jagged font edges or other artifacts of image transformation.

Figure 71:
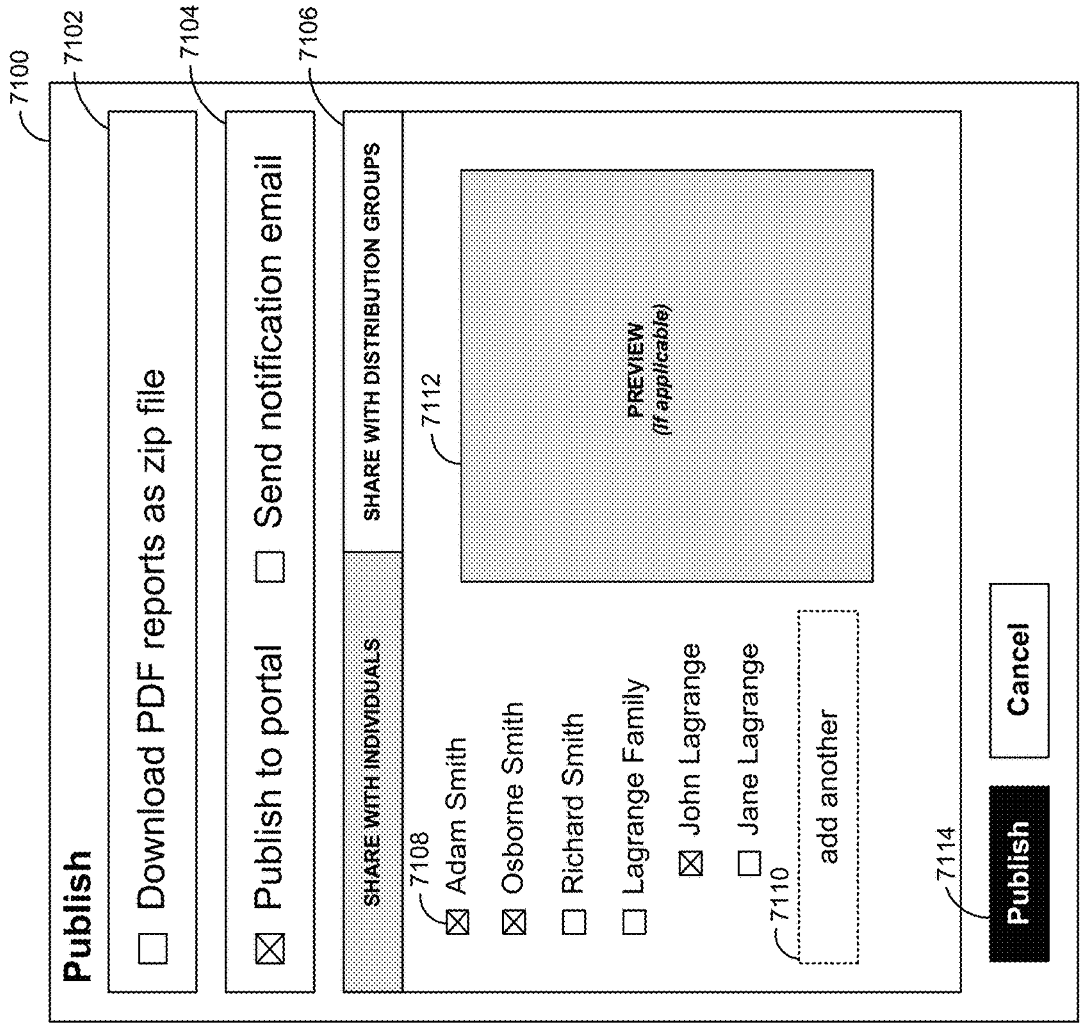
FIG. 71 illustrates an example user interface of the system in which a user may initiate PDF report generation and/or publishing.

FIG. 71 illustrates an example user interface 7100 of the system in which a user may initiate PDF report generation and/or publishing. In an embodiment, the example user interface 7100 may be presented in response to the user selecting a "Publish" and/or "Generate PDFs" button or other user interface selection element of the user interface. For example, the user may select the "Publish" button in the function buttons 2506 of the example user interface of FIG. 25.

As shown, the example user interface 7100 includes various selections and checkboxes that may be selected or unselected by the user for initiating the PDF generation process. For example, selection box 7102 allows the user to specify whether or not the PDF reports should be downloaded as a zip (or other compressed and/or container file) file after PDF generation. Selection boxes 7104 allow the user to specify whether or not the PDF reports are to be published to a client portal and/or a notification email is to be sent after PDF generation. In various embodiments, the system includes user interfaces through which other users (for example, report recipients associated with particular contexts, such as clients of the user) may access their associated reports and/or various other information. In these embodiments, the system may, when the "Publish to portal" checkbox is selected, make the generated PDF report available to the other users via their particular user interface. In some embodiments, when the "Send notification email" checkbox is selected, the report recipients are notified via email when their respective PDF reports have been generated. In some embodiments, the generated PDF reports may be made attached to the notification emails that are sent. In other embodiments, links (such as hyperlinks) to PDF reports and/or the recipients' user interfaces (as described above) may be provided in the notification emails. In various embodiments, notification may be provided to the recipients via messaging protocols other than email including, for example, SMS, MMS, popups on a mobile device, and/or the like.

In user interface portion 7106, the user may specify particular contexts in which the PDF report is to be generated and/or recipients of the PDF report. In some embodiments, one or more recipients may be associated with each context. For example, the system may store names and contact information for each recipient such that the recipients may be contacted when a PDF report is generated in their respective associated contexts. Accordingly, the user may select one or more of the checkboxes shown in the user interface portion 7106, such as checkbox 7108, to specify various recipients and/or contexts in which the PDF report is to be generated. The user may select button 7110 to add additional recipients/contexts in which the PDF report is to be generated. In block 7112, a preview of the PDF report may be generated and displayed by the system. The preview of the report may be based on one of the contexts selected. Further, in some embodiments the user may use the user interface portion 7106 to specify distribution groups with which the PDF reports are to be shared. Each of such distribution groups may include one or more recipients associated with one or more contexts.

The user may select publish button 7114 to initiate the PDF generation process. When initiated, and as described below, the PDF generation process determines all contexts specified by the user and/or associated with specified recipients, generates PDF versions of the report in each of those determined contexts, and then communicates the generated PDF reports to those recipients in accordance with the user's selections.

In an embodiment, the system may not present a user interface such as the user interface 7100 when the PDF generation process is initiated. Rather, the system may automatically begin the PDF generation process based on predefined set of preferences and/or defaults.

Figure 72:
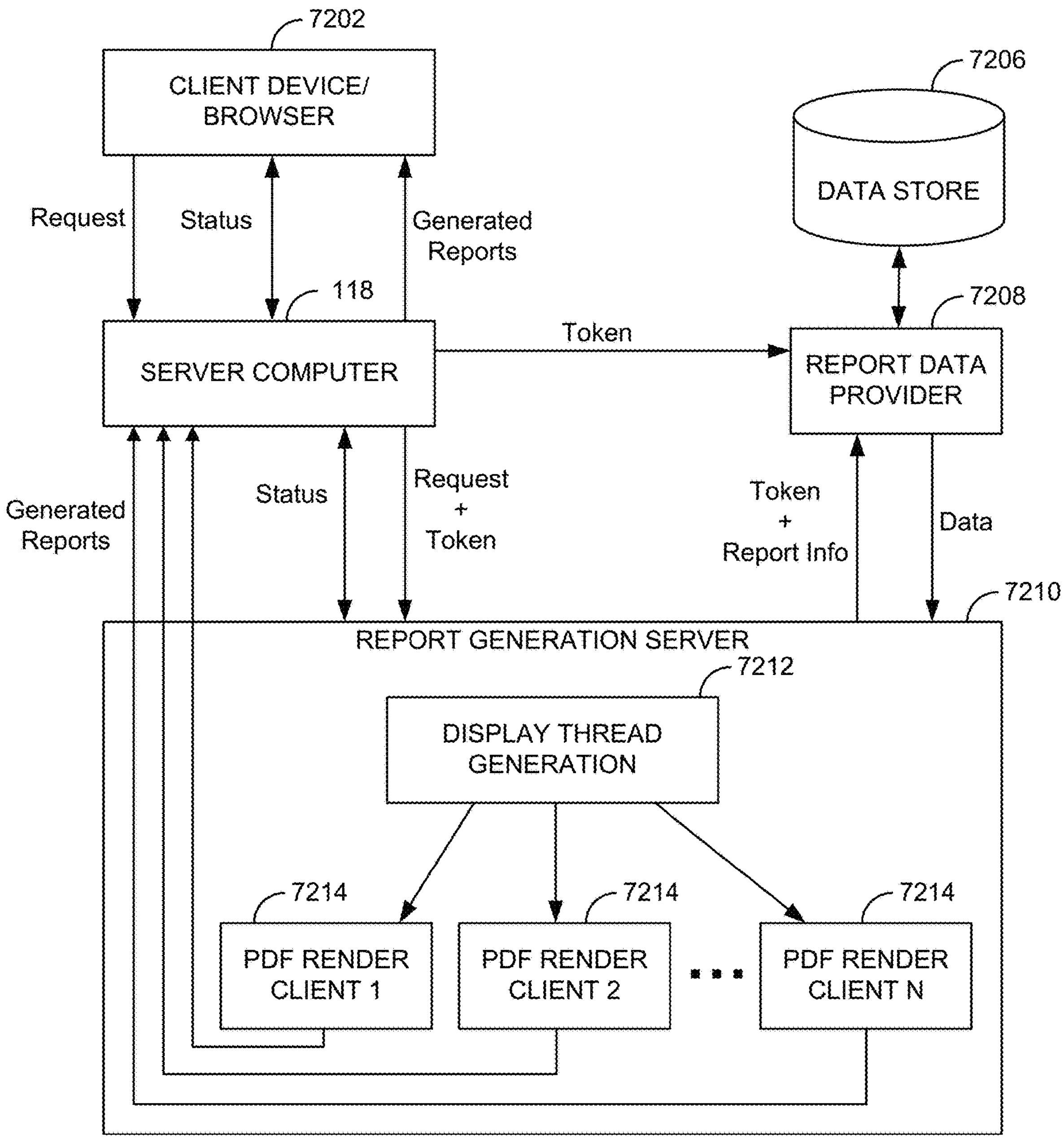
FIG. 72 is a data flow diagram showing example communications in the system in which PDF reports are generated and/or published.

FIG. 72 is a data flow diagram showing example communications in the system in which PDF reports are generated and/or published. Each of the components of the system shown in the embodiment of FIG. 72 may be included and/or embodied in one or more integrated and/or separate computing devices. The components of the embodiment of FIG. 72 include a client device and/or browser program 7202, the server computer 118 (as described in reference to FIG. 1), a data store 7206, a report data provider 7208, and a report generation server 7210.

The client device and/or browser program 7202 represents and computing device and/or user interface of the system through which the user may initiate generation of PDF reports, receive notifications regarding a status of PDF reports being generated, and/or user interfaces and/or devices thorough which PDF reports may be communicated to recipients. For example, the client device and/or browser program 7202 may be user interfaces of the system, the client computer 116 (and/or user interfaces displayed thereon), and/or other computing devices and/or user interfaces.

Report data provider 7208 provides access to various data needed by the report generation server 7210, and generates various views and report user interfaces, for rendering reports and generating PDFs. Data may be stored and retrieved from the data store 7206. The report data provider 7208 is a computing device of the system capable of generating code for rendering user interfaces as described above and throughout this disclosure. Accordingly, in an embodiment the report data provider 7208 may be a computer system as described in reference to FIG. 1 (including, for example, memory 100, graph 102, table view 105, rendering unit 107, graph model logic 113, and/or the like). Accordingly, while the report data provider 7208 is represented as a separate block in FIG. 72, the functionally of the report data provider 7208 described herein may implements in various components of the system.

The server computer 118 facilitates generation of the PDF reports, and is described above. In some embodiments, other components of the system may take the place of the server computer 118, and/or the server computer 118 may be integrated with the report generation server 7210. The report generation server 7210 is a computing device of the system capable of communicating with the report data provider 7208 and rendering user interfaces and generating PDF reports, as described below. As with the report data provider 7208, each of the report generation server 7210 and data store 7206 are represented in FIG. 72 as single blocks for convenience of description. However, in various embodiments the functionality of the report generation server 7210 and data store 7206 may be provided by various components of the system as previously described. For example, the data store 7206, the report data provider 7208, and/or the report generation server 7210 may comprise one or more of, or a combination of, the data repository 104, the custodian interface unit 113, and/or the asset custodian computer 120, and/or other components described in reference to FIG. 1.

In operation, and as shown in the embodiment of FIG. 72, the client device and/or browser program 7202 sends a request to the server computer 118 that PDF reports be generated. For example, such a request may be sent when the user selects the "Publish" button 7114 in the user interface of FIG. 71. The request may include various items of information including, for example, an indication of the user sending the request, an indication of the report to be published, indications of the report recipients and/or related contexts, and/or other configuration information (for example, whether the PDF reports are to be published to a client portal, whether a notification email is to be sent, whether the PDF reports are to be downloaded as a zip file, and/or the like).

In response to receiving the request, the server computer 118 may generate a token (also referred to herein as an "authentication token") that may identify the user and may be used to authenticate the user's identity. The token may comprise a unique, randomly-created data item, the possession of which may provide authentication of an identity and/or authorization. The token may be used, as described below, by the report generation server 7210 to securely access system data and generate the PDF reports as if the user is logged in to (also referred to herein as being "authenticated with") the system.

As shown, the token, once generated, is transmitted to the report data provider 7208 where it is stored and may be used to authenticate data access by the report generation server 7210 (as described below). Additionally, the token and the request (including, for example, an identification of the user, indication of the user sending the request, an indication of the report to be published, and/or indications of the report recipients and/or related contexts) are communicated by the server computer 118 to the report generation server 7210. A status of the request may be continuously communicated between the server computer 118 and the report generation server 7210, and the server computer 118 and the client device and/or browser program 7202. For example, that the PDF generation request has been communicated to the report generation server 7210 may be provided as a status update to the client device and/or browser program 7202, and a message to that effect may be displayed to the user. Similarly, as the PDF reports are generated (as described below), the status of the PDF report generation (for example, a number or reports generated or in process of being generated, and/or an expected completion time) may be communicated by the report generation server 7210 to the server computer 118, and by the server computer 118 to the client device and/or browser program 7202. Accordingly, in an embodiment the user may be updated periodically, continuously, and/or substantially continuously with the progress of the PDF generation process.

In response to the receipt of the request and token, the report generation server 7210 may begin the PDF report generation. In some embodiment, the report generation server 7210 may include a job queue such that, when all resources of the server are busy, the request may be queued until the request may be performed. In some embodiments, the report generation server 7210 comprises multiple computing devices in a distributed and/or hosted computing environment (for example, a cloud computing environment). In these embodiments, additional computing devices and/or resources may be provisioned and released as requests are received and completed by the report generation server 7210 such that the requests may be fulfilled efficiently.

As shown, in an embodiment the report generation server 7210 includes a display thread generation module 7212 and one or more PDF rendering clients 7214. The display thread generation module 7212 may comprise a software module stored in memory of the report generation server 7210 and executed by one or more processors of the report generation server 7210 to manage and distribute PDF report generation jobs to the PDF rendering clients 7214. Each of the PDF rendering clients 7214 may comprise individual instances or threads of a software program for generating a virtual report editor user interface (such as the user interfaces described above) for rendering reports and then converting the rendered reports to PDF document files. For example, in some embodiments each of the PDF rendering clients 7214 comprises a virtual instance of a browser program capable to virtually rendering browser user interfaces, as well as a PDF conversion program capable of converting rendered reports to PDF document files. An example of a PDF conversion program that may be used in the system is the open source tool Webkit2pdf.

In operation, when a request is received by the report generation server 7210, the display thread generation module 7212 determines a number of reports to be generated, and a number of contexts in which each of those reports is to be generated. For example, the request may include two reports, each associated with 5 different contexts. Accordingly, the display thread generation module 7212 will determine that 10 total PDF reports are to be rendered by the system. Then, the display thread generation module 7212 initiates PDF rendering clients 7214 as necessary to generate the determined PDF reports. For example, continuing the example above, the display thread generation module 7212 may initiate 10 PDF rendering clients 7214. Each of the PDF rendering clients 7214 is provided with information including an indication of a report to be generated, a context in which the report is to be generated, and the token. In some embodiments, more or fewer PDF rendering clients 7214 may be initiated by the display thread generation module 7212, depending on computing resources available. In these embodiments, the display thread generation module 7212 may queue certain reports to be generated, and manage initiating additional PDF rendering clients 7214 as PDF generation jobs are completed. Accordingly, the display thread generation module 7212 ensures all PDF reports associated with the request are generated.

Each of the PDF rendering clients 7214, upon instantiation and receipt of the information including an indication of a report to be generated, a context in which the report is to be generated, and the token, communicates with the report data provider 7208 to generate a report user interface. For example, a PDF rendering client 7214 may communicate with the report data provider 7208 and request a user interface showing, for a particular user (for example, the requesting user), a particular report, in a particular context, similar to the way in which a user interface is requested and generated above (for example, as described in reference to user interface of FIG. 26). In order to prevent unauthorized requests, the report data provider 7208 may require that the request from the PDF rendering client 7214 be authorized. Accordingly, the PDF rendering client 7214 may also provide the token. The report data provider 7208 may then compare the token provided by the PDF rendering client 7214 to the token provided by the server computer 118 and determine that the request is authorized. The report data provider 7208 may then respond to the authorized request by, for example, accessing the report information, accessing the data store 7206, traversing the graph 102 to calculate the data to be input to the report, generating the report, and providing user interface data (or the user interface itself) to the PDF rendering client 7214 (as described above).

The PDF rendering clients 7214 then receives data from the report data provider 7208, renders the user interface with the report, and initiates conversion of the rendered report to PDF. For example, in embodiments in which the PDF rendering client 7214 is a browser program, the browser program may print the rendered report to a PDF rendering program. Once the PDF report is generated, it is provided by the report generation server 7210 to the server computer 118, as shown in FIG. 72. Then, the server computer 118 may, for example, notify the recipient that the PDF report has been generated, provide a link to the report to the recipient, and/or the like (as discussed above).

Figure 73:
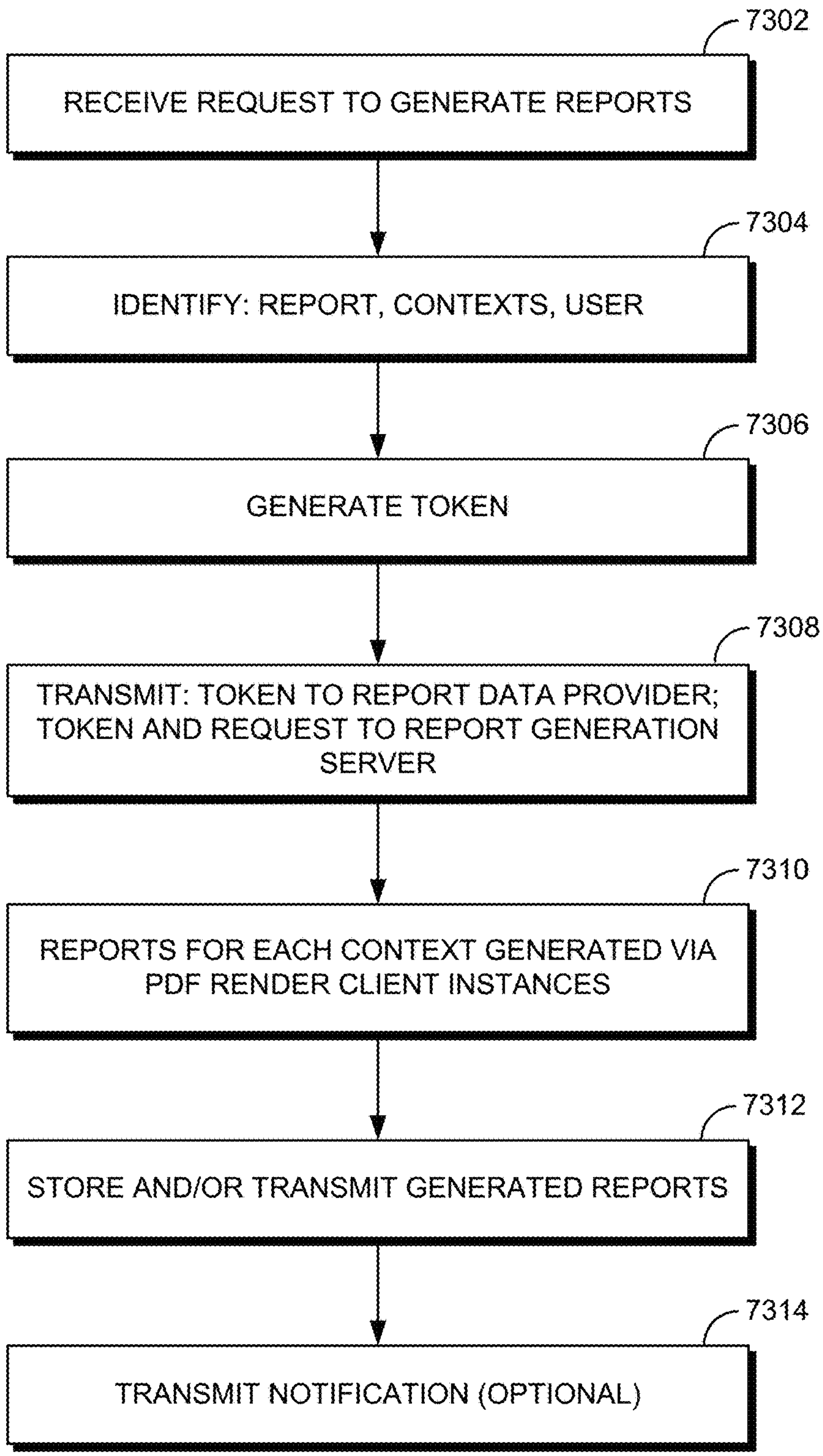
FIG. 73 is a flowchart showing an example method of the system in which PDF reports are generated and/or published.

FIG. 73 is a flowchart showing an example method of the system in which PDF reports are generated and/or published, as described in reference to FIGS. 70-71. In various embodiments, fewer blocks or additional blocks may be included in the process of FIG. 73, or various blocks may be performed in an order different from that shown in the figure. Further, one or more blocks in the figure may be performed by various components of the system as described above and below, for example, one or more of the server computer 118, the display generation server 7210, and/or the report data provider 7208.

At block 7302, a request is received by the system to generate PDF reports, as described above. At block 7304, the system identifies information associated with the request including, for example, the report to be generated, context (including, for example, a perspective and/or a date or date range) in which the report is to be generated, and the user requesting the PDF reports. At block 7306, the system (for example, the server computer 118) generates an authentication token, as described above. At block 7308, the token is transmitted to the report data provider 7208, and the token and request information is transmitted to the report generation server 7210.

At block 7310, PDF reports in each of the contexts are generated via the PDF rendering clients 7214 (for example, browser program instances). At block 7212, the generated PDF reports are stored and/or transmitted by the system to recipients (as described above). At block 7314, the system may optionally automatically notify the recipients that PDF reports are available, as described above.

In some embodiments, notifications may be provided before, during, or after generation of a PDF report. Further, in some embodiment, the system may preemptively generate PDF reports. For example, the system may, in some embodiments, automatically generate PDF report before the user has selected the Publish button 7114. Preemptive generation of PDF reports may, in some instances, decrease a delay between the user's request for PDF report generation, and completion of the PDF report generation process. In instances in which the user modifies the request after preemptive generation (for example, the user may deselect a context after a report for the context is already generated), the system may automatically delete the preemptively generation report that is no longer needed.

In some embodiments, report may be generated by the system in one or more other formats (for example, other electronic document formats) other than PDF including, for example, HTML, DOC, and/or the like. In some embodiments, the system may include a user interface in which the user may edit and/or generate the notifications to be sent to recipients, for example, similar to the user interface described in reference to FIG. 18 above.

7.0 Authentication and Permissioning

As described above, in some embodiments the system may include user authentication and permissioning. For example, a user of the system may be required to provide authentication information (for example, a username and password, a fingerprint scan, and/or the like) when accessing the system. Such authentication information may be required by the system before the user may view one or more of the user interfaces described herein, and/or may generate tables based on particular data stored by the system. In some embodiments, the user's identity may be used to determine particular data of the system which is accessible to the user. For example, the system may include data associated with many clients, only some of which are associated with the user. Accordingly, only data related to the clients associated with the user may be available via the various user interfaces. Thus, the user's identity may, in some embodiments, be authenticated before any data is shown to the user. Permissions data may be associated with the various data stored by the system such that the system may make available to a particular user only data that is permissioned such that it should be made available to that particular user.

For example, in reference to FIG. 13C in some instances a first user may have permission to view Stock "D" (or particular attributes or other metadata associated with node D), while a second user may not have permission to view Stock "D". Accordingly, while Stock "D" may exist in graph 1542 no matter whether the first user or the second user is logged in to the system, when traversing the graph and/or generating tables, Stock "D" may be effectively invisible to the second user. Thus, in this example, a table generated for the second user would not include any data associated with Stock "D".

Additional examples of permissioning and permissions implementations that may be used in conjunction with the present disclosure are described in U.S. Provisional Patent Application No. 62/065,486, filed Oct. 17, 2014, and titled "SYSTEM AND ARCHITECTURE FOR ELECTRONIC PERMISSIONS AND SECURITY POLICIES FOR RESOURCES IN A DATA SYSTEM," the entire disclosure of which is hereby made part of this specification as if set forth fully herein and incorporated by reference for all purposes, for all that it contains.

In some embodiments, the system stores separate graphs associated with various clients of a firm (e.g., a wealth management, financial advisor, or investment firm). For example, a firm may have multiple clients, each of whom may manage one or more portfolios. In order to segregate data associated with each of the clients to as to prevent disclosure of confidential information, the system may maintain a separate graph for each of the clients. Such a segregation of graphs may advantageously enable protection of each client's data. In some examples, however, multiple clients' graphs may include common data entities/nodes. For example, a first client's graph may include Stock A, while a second client's graph may similarly include Stock A. In an embodiment, Stock A in each of the first and second client's graphs may indirectly reference a common Stock A node. Alternatively, the Stock A node in each of the first and second client's graphs may reference a common source of metadata and/or attributes associated with the Stock (for example, publicly available data such as a stock price). Such indirect referencing of a common node, and/or referencing a common source of attributes may advantageously reduce memory requirements of the system while maintaining privacy of each client's graphs.

In some embodiments, the system may include a single graph for multiple clients and/or for all clients of a firm. In these embodiments, the system may advantageously prevent disclosure of confidential information (for example, the graph may include data pertaining to a single client, or a subset of the clients on the system) via permissioning (as described above). Further, in these embodiments the system may advantageously further reduce memory requirements as redundant data may further be eliminated (for example, a single instance of all assets (for example, Stock A, etc.) may be maintained by the system).

Additionally, the specialized graph data structure utilized by the system enables data security (for example, protection and partitioning of client data) while simultaneously taking advantage of redundant data to reduce memory needs and computation needs. For example, as described above, in some embodiments particular data nodes may be shared among multiple clients in a common graph, and computations (for example, graph traversal) for all of the multiple clients may be run on the common graph, while at the same time permissioning of the common nodes of the graph for particular clients provides data security.

8.0 Data Caching

In various embodiments the system may cache data generated by graph traversals so as to speed up computation of data for table generation and/or speed up graph traversals. For example, in various embodiments the system may automatically store enumerated paths, calculated bucketing trees, and/or calculated column values. Accordingly, the system may, in future graph traversals, and when no changes have been made to at least portions of the graph that would invalidate such caches, utilize such caches to speed up computations. Accordingly, in these embodiments the system may reduce computational needs and speed up generation of tables and user interfaces requested by the user.

9.0 Additional Embodiments

Embodiments of the present disclosure have been described that relate to interactive user interfaces for enabling non-technical users to quickly and dynamically edit and generate detailed reports through automatic access and traversal of complex data structures, and calculation of complex report data based on property values of multiple nodes within such complex data structures, all in substantially real-time. The system may eliminate the need for a skilled programmer to generate a customized report. Rather, the system may enable an end-user to customize and generate a complex report in multiple contexts automatically. Accordingly, embodiments of the present disclosure enable report generation and editing in fewer steps, result in faster creation of reports, consume less processing and/or memory resources than previous technology, permit users to have less knowledge of programming languages and/or software development techniques, and/or allow less technical users or developers to create reports than the user interfaces described above. Thus, the systems and user interfaces described herein may be more efficient as compared to previous systems and user interfaces.

Further, embodiments of the present disclosure have been described including interactive user interfaces that embody two levels of abstraction and enable efficient and rapid generation of multiple reports. Linked sections may provide a first level of abstraction for efficient creation of reports. For example, a linked section may be considered to be templates of a section that may be inserted into reports and automatically populated with report data. The report itself, likewise, may be considered a second level of abstraction for efficient creation of reports. For example, a report may be considered a template of a report that may be generated and/or edited by a user, and then populated with report data in multiple contexts (for example, when the report is published as PDFs, as described below). Accordingly, the system may provide two levels of abstraction that may be used by the user to efficiently generate and output complex reports in multiple contexts and including complex data associated with each context. Additionally, such reports may be output in multiple formats and mediums, such as electronic (for example, PDF and/or interactive user interface) and/or physical (for example, paper). Such efficient report generation may not have been available before creation of the efficient technical system and methods of the present disclosure. The report generation system and methods described herein may find particular usefulness in the field of financial management and reporting, as the various examples described herein show. However, the report generation system and methods of the present disclosure may also be used to equal advantage and usefulness in any number of other fields.

This application includes descriptions of various user interface components (e.g. tables, graphs, etc.), some of which may be generated using certain software libraries licensed under an open source copyright license. Such components are included herein as examples of user interface components which may be used or exchanged, in other embodiments, with other similar components that are not licensed under an open source copyright license. Nothing in any such open source copyright licenses or the inclusion of these user interface components herein should be construed in any way as a license, implied or otherwise, under any patents that may result from the present application.

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The term "continuous" as used herein, is a broad term encompassing its plain an ordinary meaning and, as used in reference to various types of activity (for example, scanning, monitoring, logging, and the like), includes without limitation substantially continuous activity and/or activity that may include periodic or intermittent pauses or breaks, but which accomplish the intended purposes described (for example, continuous scanning may include buffering and/or storage of data that is thereafter processed, for example, in batch and/or the like).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to access one or more electronic data sources in order to automatically generate PDF reports, the computing system comprising:
- a computer processor; and
- a computer readable storage medium storing program instructions configured for execution by the computer processor to cause the computing system to:
  - receive, by the computing system and from a server computer, a report generation request including identification of a report to be generated, one or more contexts associated with the report, and an authentication token that has also been provided to a report data provider by the server computer, wherein:
    - the report includes at least one report element,
    - the at least one report element includes at least one of a text box, a table, or a graph,
    - each of the one or more contexts is associated with at least one of an individual or legal entity, and
    - each of the one or more contexts is further associated with a date range;
  - for each of the one or more contexts, initiate, by the computing system, an instance of a PDF report renderer configured to:

provide a data request associated with the context to the report data provider, wherein the data request includes the authentication token configured to authorize the data request associated with the context with the report data provider;

receive, from the report data provider, a response to the data request including calculated data associated with the context;

render the report in the context based on the received calculated data; and convert the rendered report to PDF.

2. The computing system of claim 1, wherein the program instructions are further configured for execution by the computer processor to cause the computing system to:

compile rendered PDF reports from each of the one or more contexts into a compressed file.

3. The computing system of claim 1, wherein the program instructions are further configured for execution by the computer processor to cause the computing system to:

provide a notification to one or more individuals associated with each respective context, each notification including the respective rendered PDF report.

4. The computing system of claim 3, wherein the program instructions are further configured for execution by the computer processor to cause the computing system to:

for each of the one or more contexts, wait until completion of conversion of the rendered report to PDF before providing the notification.

5. The computing system of claim 1, wherein the program instructions are further configured for execution by the computer processor to cause the computing system to:

generate user interface data for rendering an interactive user interface on a computing device, the interactive user interface including a portal through which individuals associated with each respective context may access their respective rendered PDF reports.

6. The computing system of claim 1, wherein the program instructions are further configured for execution by the computer processor to cause the computing system to:

generate user interface data for rendering an interactive user interface on a computing device, the interactive user interface including a dialog through which indication of preferences may be provided, the preferences including at least one of a selection of the one or more contexts, a selection for creation of a zip file, a selection for notification to be sent to recipients of reports, or a selection for publication of reports to a portal user interface.

7. The computing system of claim 6, wherein the interactive user interface further includes a preview of a report in one of the one or more contexts.

8. The computing system of claim 1, wherein the reports are rendered and converted to PDF before an indication by the user is received.

9. A computer-implemented method comprising:

by a computing system comprising one or more processors executing program instructions:

receiving, by the computing system and from a server computer, a report generation request including identification of a report to be generated, one or more contexts associated with the report, and an authentication token that has also been provided to a report data provider by the server computer, wherein:

the report includes at least one report element, the at least one report element includes at least one of a text box, a table, or a graph, each of the one or more contexts is associated with at least one of an individual or legal entity, and each of the one or more contexts is further associated with a date range;

for each of the one or more contexts, initiating, by the computing system, an instance of a PDF report renderer configured to:

provide a data request associated with the context to the report data provider, wherein the data request includes the authentication token configured to authorize the data request associated with the context with the report data provider;

receive, from the report data provider, a response to the data request including calculated data associated with the context;

render the report in the context based on the received calculated data; and convert the rendered report to PDF.

10. The computer-implemented method of claim 9 further comprising:

by the computing system comprising the one or more processors executing program instructions:

compiling rendered PDF reports from each of the one or more contexts into a compressed file.

11. The computer-implemented method of claim 9 further comprising:

by the computing system comprising the one or more processors executing program instructions:

providing a notification to one or more individuals associated with each respective context, each notification including the respective rendered PDF report.

12. The computer-implemented method of claim 11 further comprising:

by the computing system comprising the one or more processors executing program instructions:

for each of the one or more contexts, waiting until completion of conversion of the rendered report to PDF before providing the notification.

13. The computer-implemented method of claim 9 further comprising:

by the computing system comprising the one or more processors executing program instructions:

generating user interface data for rendering an interactive user interface on a computing device, the interactive user interface including a portal through which individuals associated with each respective context may access their respective rendered PDF reports.

14. The computer-implemented method of claim 9 further comprising:

by the computing system comprising the one or more processors executing program instructions:

generating user interface data for rendering an interactive user interface on a computing device, the interactive user interface including a dialog through which indication of preferences may be provided, the preferences including at least one of a selection of the one or more contexts, a selection for creation of a zip file, a selection for notification to be sent to recipients of reports, or a selection for publication of reports to a portal user interface.

15. The computer-implemented method of claim 14, wherein the interactive user interface further includes a preview of a report in one of the one or more contexts.

16. The computer-implemented method of claim 9, wherein the reports are rendered and converted to PDF before an indication by the user is received.

17. The computer-implemented method of claim 9, wherein the report generation request includes a plurality of contexts, and wherein the computer-implemented method further comprises:

by the computing system comprising the one or more processors executing program instructions:

instantiating a plurality of instances of the PDF report renderer in parallel for each of two or more of the plurality of contexts.

18. The computing system of claim 1, wherein the report generation request includes a plurality of contexts, and wherein the program instructions are further configured for execution by the computer processor to cause the computing system to:

instantiate a plurality of instances of the PDF report renderer in parallel for each of two or more of the plurality of contexts.

* * * * *